(12) United States Patent
Signorelli et al.

(10) Patent No.: US 12,529,291 B2
(45) Date of Patent: *Jan. 20, 2026

(54) POWER SYSTEM FOR DOWNHOLE TOOLSTRING

(71) Applicant: FASTCAP ULTRACAPACITORS LLC, Woburn, MA (US)

(72) Inventors: Riccardo Signorelli, The Woodlands, TX (US); John J. Cooley, Boston, MA (US)

(73) Assignee: FASTCAP ULTRACAPACITORS LLC, Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,354

(22) Filed: May 26, 2023

(65) Prior Publication Data

US 2023/0374888 A1 Nov. 23, 2023

Related U.S. Application Data

(60) Division of application No. 16/530,698, filed on Aug. 2, 2019, now Pat. No. 11,697,978, which is a
(Continued)

(51) Int. Cl.
*E21B 41/00* (2006.01)
*H01G 11/62* (2013.01)
(Continued)

(52) U.S. Cl.
CPC ......... *E21B 41/0085* (2013.01); *H01G 11/62* (2013.01); *H02J 7/0016* (2013.01);
(Continued)

(58) Field of Classification Search
CPC .......... E21B 41/0085; H01G 11/00–86; H02J 7/0016; H02J 7/047; H02J 7/045;
(Continued)

(56) References Cited

U.S. PATENT DOCUMENTS

| 6,257,332 B1 | 7/2001 | Vidrine et al. |
| 7,999,695 B2 | 8/2011 | Rodney et al. |

(Continued)

FOREIGN PATENT DOCUMENTS

| JP | 2012074541 A | 4/2012 |
| WO | 2012041437 A2 | 4/2012 |

(Continued)

OTHER PUBLICATIONS

Extended European Search Report for EP Application No. 14764474. 4; Report mail date Dec. 21, 2019 (7 pages).
(Continued)

*Primary Examiner* — George S Gray

(57) ABSTRACT

A downhole power system includes an energy storage adapted to operate at high temperatures, and a modular signal interface device that serves to control the energy storage component as well as offer a means of data logging at high temperatures. The controller is fabricated from pre-assembled components that may be selected for various combinations to provide desired functionality. The energy storage may include at least one ultracapacitor.

20 Claims, 23 Drawing Sheets

Related U.S. Application Data continuation of application No. 14/525,159, filed on Oct. 27, 2014, now abandoned, which is a continuation-in-part of application No. PCT/US2014/029992, filed on Mar. 15, 2014, which is a continuation-in-part of application No. 13/843,746, filed on Mar. 15, 2013, now abandoned.

(60) Provisional application No. 61/896,009, filed on Oct. 25, 2013, provisional application No. 61/888,133, filed on Oct. 8, 2013.

(51) Int. Cl.
*H02J 7/00* (2006.01)
*H02J 7/34* (2006.01)

(52) U.S. Cl.
CPC ... H02J 7/007192 (2020.01); *H02J 7/007182* (2020.01); *H02J 7/345* (2013.01)

(58) Field of Classification Search
CPC .................. H02J 7/345; H02J 7/007192; H02J 7/007182; H02J 7/04; H02J 7/0063; H02J 7/0067; H02J 7/0072; H02J 7/008; H02J 7/0086; H02J 7/042; H02J 7/085; H02J 7/0091; H02J 7/087; H02J 7/125; H02J 7/0047; H02J 7/0048; H02J 7/0049; H02J 7/005; H02J 7/0013; H02J 7/0014; H02J 7/0018; H02J 7/0019; H02J 7/0024; H02J 7/0025; H02J 2007/20; H01M 19/44
USPC ...... 361/502–522; 166/244.1, 65.1; 320/114, 320/130, 107; 323/282
See application file for complete search history.

(56) References Cited

U.S. PATENT DOCUMENTS

| | | |
|---|---|---|
| 2002/0043369 A1 | 4/2002 | Vinegar et al. |
| 2006/0191681 A1 | 8/2006 | Storm et al. |
| 2008/0059089 A1 | 3/2008 | Hornick et al. |
| 2011/0170236 A1 | 7/2011 | Young |
| 2012/0268074 A1* | 10/2012 | Cooley ................. H01M 10/39 320/167 |
| 2012/0273271 A1 | 11/2012 | Stuart-Bruges |
| 2013/0026978 A1 | 1/2013 | Cooley et al. |
| 2013/0271066 A1 | 10/2013 | Signorelli et al. |
| 2014/0265565 A1 | 9/2014 | Cooley et al. |
| 2015/0002987 A1 | 1/2015 | Signorelli et al. |
| 2018/0068804 A1 | 3/2018 | Brambilla et al. |
| 2018/0135408 A1 | 5/2018 | Cooley et al. |

FOREIGN PATENT DOCUMENTS

| | | |
|---|---|---|
| WO | 2013009729 A1 | 1/2013 |
| WO | 2013010641 A1 | 1/2013 |
| WO | 2013126915 A1 | 8/2013 |
| WO | 2014145259 A2 | 9/2014 |
| WO | 2014145520 A2 | 9/2014 |
| WO | 2015054432 A1 | 4/2015 |
| WO | 2015102716 A2 | 7/2015 |

OTHER PUBLICATIONS

International Search Report for International Application No. PCT/US2014/029992 International Filing date Mar. 15, 2014; Report Mail Date Oct. 7, 2014; 4 pages.

International Search Report for International Application No. PCT/US2014/059775 International Filing date Oct. 8, 2014; Report Mail Date Jan. 7, 2015; 4 pages.

Written Opinion for International Application No. PCT/US2014/029992 International Filing date Mar. 15, 2014; Report Mail Date Oct. 7, 2014; 6 pages.

Written Opinion for International Application No. PCT/US2014/059775 International Filing date Oct. 8, 2014; Report Mail Date Jan. 7, 2015; 8 pages.

* cited by examiner

Primary Structures of Cations

POWER SYSTEM FOR DOWNHOLE TOOLSTRING

CROSS REFERENCE TO RELATED APPLICATIONS

The present application is a divisional of U.S. patent application Ser. No. 16/530,698, filed Aug. 2, 2019, which is a continuation of U.S. patent application Ser. No. 14/525,159, filed Oct. 27, 2014, Aug. 26, 2019, which claims the benefit of U.S. Provisional Patent Application No. 61/896,009, filed Oct. 25, 2013. U.S. patent application Ser. No. 14/525,159 is also a continuation-in-part of International Patent Application No. PCT/US2014/029992 filed Mar. 15, 2014. International Patent Application No. PCT/US2014/029992 is a continuation-in-part of U.S. patent application Ser. No. 13/843,746 filed Mar. 15, 2013, Sep. 14, 2017 and claims the benefit of U.S. Provisional Patent Application No. 61/888,133 filed Oct. 8, 2013. The entire contents of each of the foregoing applications is incorporated herein by reference.

BACKGROUND OF THE INVENTION

Systems and methods directed to providing power to instruments in a downhole environment are generally described.

As people and companies continue to search for and extract oil, the quest for hydrocarbons has grown increasingly complex. For example, it is well known that the "easy oil" is generally gone, and exploration now requires searching to greater depths than ever before by drilling a wellbore deep into the Earth. While drilling of the wellbore permits individuals and companies to evaluate sub-surface materials and to extract desired hydrocarbons, many problems are encountered in these harsh environments, where downhole temperatures may range up to or in excess of 300 degrees Celsius.

As well drilling and logging plunges ever deeper into the Earth's crust, the exposure of downhole tooling to high temperature environments continues to increase. Moreover, present day instrumentation is generally not built to operate in such an environment, and will fail well before reaching ambient temperatures within this range. This complication has given rise to all sorts of complex instrumentation. Consistent with other segments of technology, increasing complexity of instrumentation presents users with increasing power demands.

In particular, elevated temperatures often present technical limitations where conventional systems fail. For example, conventional power systems comprising electronics and energy storage will fail at temperatures found in downhole environments either due to degradation or destruction of the conventional energy storage or of the conventional electronics. Moreover, improved instrumentation systems often demand greater capabilities of power systems.

As such, there is a growing need for power systems comprising an energy storage device for downhole operations in high temperature environments up to about 200 degrees Celsius, or higher. Preferably, the energy storage device would provide users with power where conventional devices fail to provide useful power.

SUMMARY OF THE INVENTION

Accordingly, various embodiments relate to a downhole power supply system that includes an energy storage and, in certain embodiments, a modular signal interface device. The modular signal interface device may be used, for example, to control the energy storage component. In certain embodiments, the modular signal interface device can log data. The energy storage and/or the modular signal interface device may be configured, in some embodiments, to operate at high temperatures. The controller may be fabricated from pre-assembled components that may be selected for various combinations to provide desired functionality. The energy storage may include at least one ultracapacitor.

In one aspect, the invention provides a system comprising an MSID, and a housing structure configured to accommodate the MSID for placement into a toolstring.

In another aspect, the invention provides a system comprising an MSID, and a housing structure configured to accommodate the MSID for mounting on or in the collar.

In another aspect, the invention provides a power system, the system comprising an MSID of the present invention; a high temperature rechargeable energy storage device; and a housing structure in which the MSID and high temperature rechargeable energy storage device are both disposed for placement into a toolstring.

In another aspect, the invention provides a data system, the system comprising a controller adapted to receive power from a power source and configured for data logging; and one or more sensor circuits configured to receive data; and wherein the system is adapted for operation in a temperature range of between about seventy five degrees Celsius to about two hundred and ten degrees Celsius.

In another aspect, the invention provides a data system, the system comprising a controller adapted to receive power from a power source and configured for drilling optimization; and one or more sensor circuits configured to receive drilling data in real-time, suitable for modification of drilling dynamics; and wherein the system is adapted for operation in a temperature range of between about seventy five degrees Celsius to about two hundred and ten degrees Celsius.

In another aspect, the invention provides a data system, the system comprising a controller adapted to receive power from a power source and configured to determine torque on bit (TOB); and one or more sensor circuits configured to receive data; and wherein the system is adapted for operation in a temperature range of between about seventy five degrees Celsius to about two hundred and ten degrees Celsius.

In another aspect, the invention provides a data system, the system comprising a controller adapted to receive power from a power source and configured to determine weight on bit (WOB); and one or more sensor circuits configured to receive data; and wherein the system is adapted for operation in a temperature range of between about seventy five degrees Celsius to about two hundred and ten degrees Celsius.

In another aspect, the invention provides a data system, the system comprising a controller adapted to receive power from a power source and configured to determine temperature by way of a temperature sensor (e.g., a resistance temperature detector (RTD) which indicates a temperature by way of changing resistance); one or more sensor circuits configured to receive data; and wherein the system is adapted for operation in a temperature range of between about seventy five degrees Celsius to about two hundred and ten degrees Celsius.

In another aspect, the invention provides a power system adapted for buffering the power from a power source to a load comprising: a high temperature rechargeable energy storage (HTRES); and a controller for controlling at least one of charging and discharging of the energy storage, the controller comprising at least one modular circuit configured to control the input power from the power source and output HTRES voltage; wherein the system is adapted for operation in a temperature range of between about seventy five degrees Celsius to about two hundred and ten degrees Celsius.

In another aspect, the invention provides a power system adapted for buffering the power from a power source to a load comprising: a high temperature rechargeable energy storage (HTRES); and a controller for controlling at least one of charging and discharging of the energy storage, the controller comprising at least one modular circuit configured for reducing battery consumption by greater than 30%; wherein the system is adapted for operation in a temperature range of between about seventy five degrees Celsius to about two hundred and ten degrees Celsius.

In another aspect, the invention provides a power system adapted for buffering the power from a power source to a load comprising: a high temperature rechargeable energy storage (HTRES); and a controller for controlling at least one of charging and discharging of the energy storage, the controller comprising at least one modular circuit configured for increasing battery run time by greater than 50%; wherein the system is adapted for operation in a temperature range of between about seventy five degrees Celsius to about two hundred and ten degrees Celsius.

In another aspect, the invention provides a power system adapted for buffering the power from a power source to a load comprising: a high temperature rechargeable energy storage (HTRES); and a controller for controlling at least one of charging and discharging of the energy storage, the controller comprising at least one modular circuit configured for increasing the operating efficiency to greater than 90%; wherein the system is adapted for operation in a temperature range of between about seventy five degrees Celsius to about two hundred and ten degrees Celsius.

In another aspect, the invention provides a power system adapted for buffering the power from a power source to a load comprising: a high temperature rechargeable energy storage (HTRES); and a controller for controlling at least one of charging and discharging of the energy storage, the controller comprising at least one modular circuit configured to draw a constant current from the battery and constant output voltage across the battery discharge; wherein the system is adapted for operation in a temperature range of between about seventy five degrees Celsius to about two hundred and ten degrees Celsius.

In another aspect, the invention provides a power system adapted for buffering the power from a power source to a load comprising: a high temperature rechargeable energy storage (HTRES); and a controller for controlling at least one of charging and discharging of the energy storage, the controller comprising at least one modular circuit configured to control the input current from the power source and output HTRES voltage; wherein the system is adapted for operation in a temperature range of between about seventy five degrees Celsius to about two hundred and ten degrees Celsius.

In another aspect, the invention provides a method of improving the efficiency of drilling dynamics comprising using any data system described herein.

In another aspect, the invention provides a method for fabricating a power system of the present invention comprising: selecting a high temperature rechargeable energy storage (HTRES); and a controller for controlling at least one of charging and discharging of the energy storage, the controller comprising at least one modular circuit configured to control the buffering of power from a power source to a load; and incorporating the HTRES and controller into a housing, such that a power system described herein.

In another aspect, the invention provides a method for buffering the power from a power source to a load comprising electrically coupling a power source to any power system of claims described herein, and electrically coupling said power system to a load, such that the power is buffered from the power source to the load.

In another aspect, the invention provides a method for fabricating a data system of the present invention comprising: selecting a controller adapted to receive power from a power source and configured for data logging, one or more sensor circuits configured to receive (e.g., and interpret) data; and wherein the system is adapted for operation in a temperature range of between about seventy five degrees Celsius to about two hundred and ten degrees Celsius; and incorporating controller and said sensor circuits into a housing, such that a data system of claims described herein.

In another aspect, the invention provides a method for data logging comprising electrically coupling a power source to any data system described herein, such that data logging is enabled.

Other advantages and novel features will become apparent from the following detailed description of various non-limiting embodiments when considered in conjunction with the accompanying figures. In cases where the present specification and a document incorporated by reference include conflicting and/or inconsistent disclosure, the present specification shall control.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings. The accompanying figures are schematic and are not intended to be drawn to scale. In the figures, each identical or nearly identical component illustrated is typically represented by a single numeral. For purposes of clarity, not every component is labeled in every figure, nor is every component of each embodiment shown where illustration is not necessary to allow those of ordinary skill in the art to understand the invention. In the figures:

Figure 11:
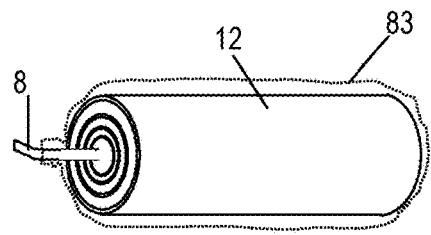
Figure 12A:
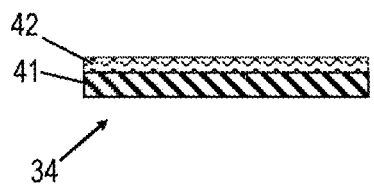
Figure 12B:
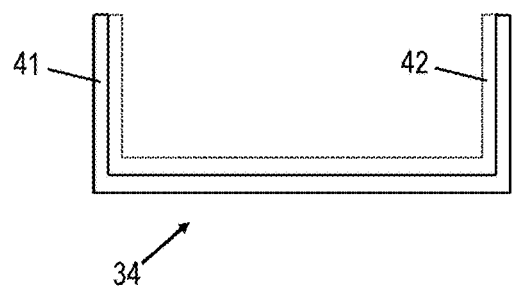
Figure 12C:
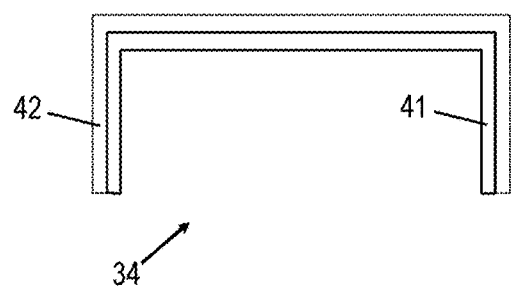
Figure 13:
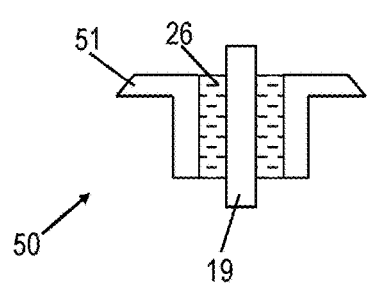
Figure 14:
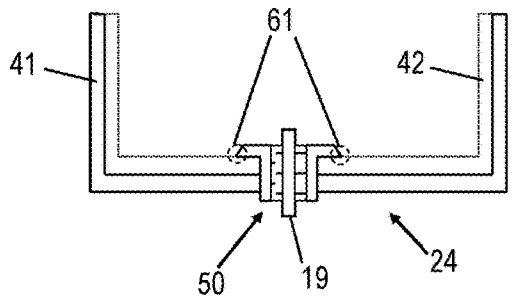
Figure 15:
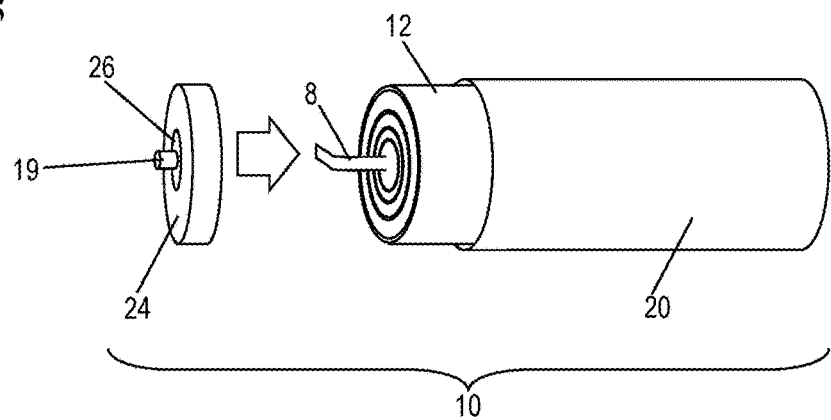
Figure 16A:
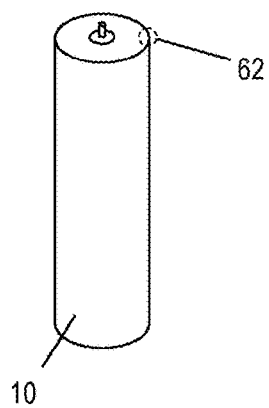
Figure 16B:
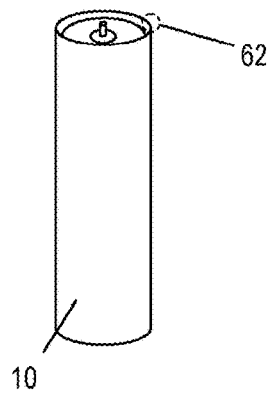
Figure 16C:
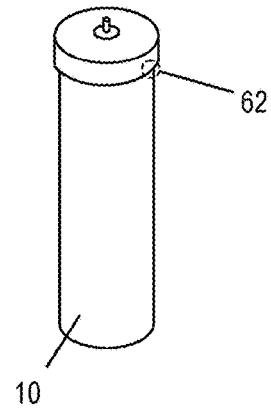
Figure 17:
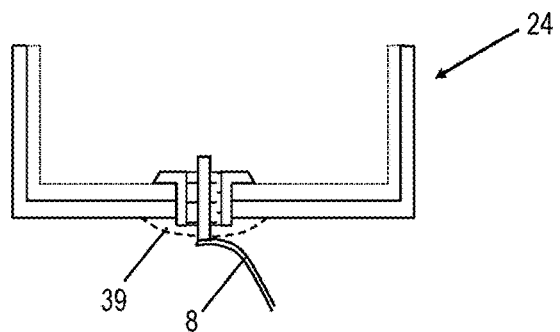
Figure 18A:
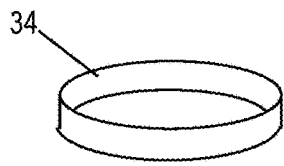
Figure 18B:
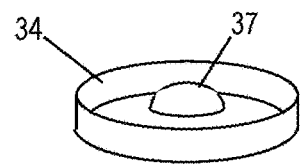
Figure 18C:
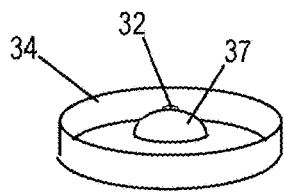
Figure 19:
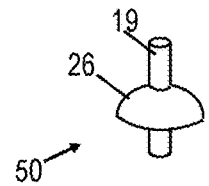
Figure 20:
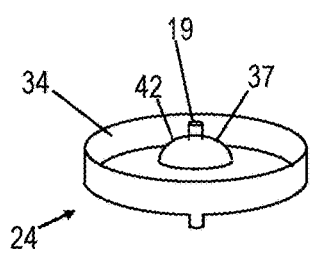
Figure 21:
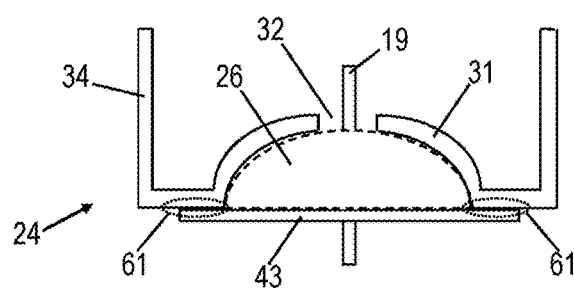
Figure 22:
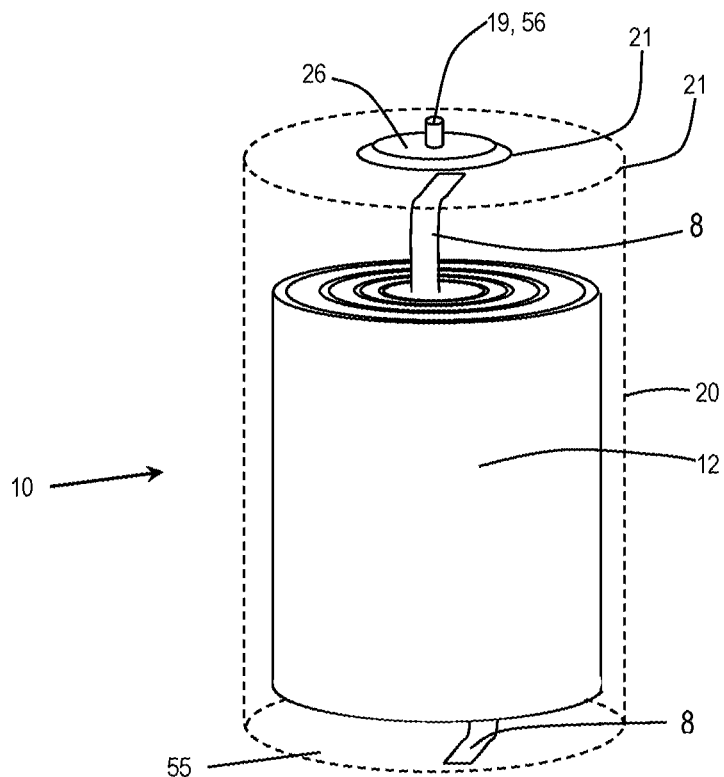
Figure 23:
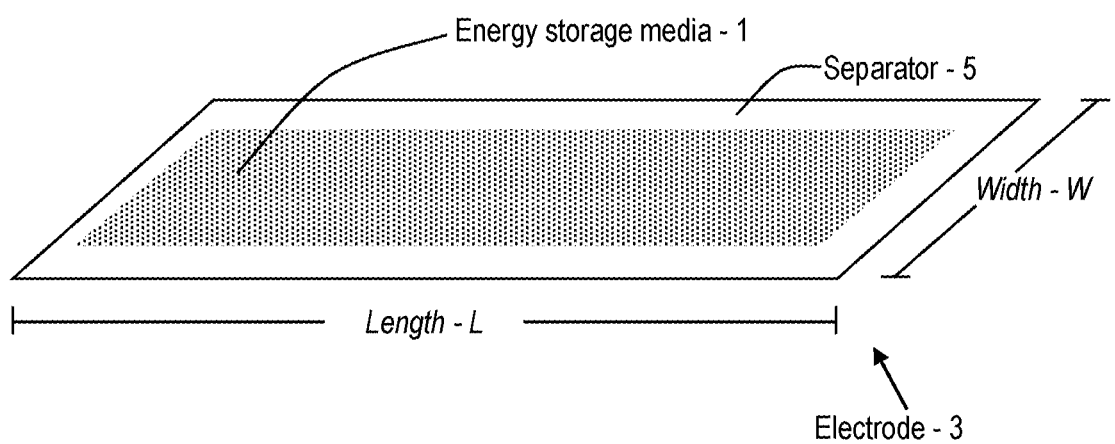
Figure 24:
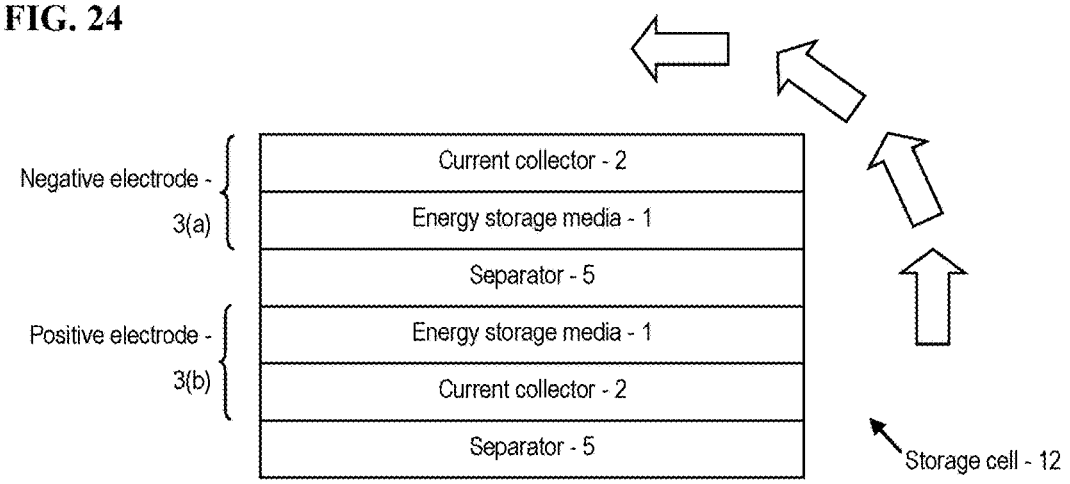
Figure 25:
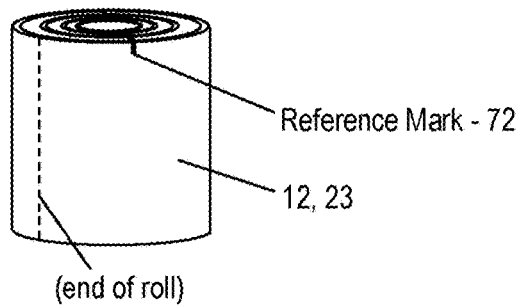
Figure 26:
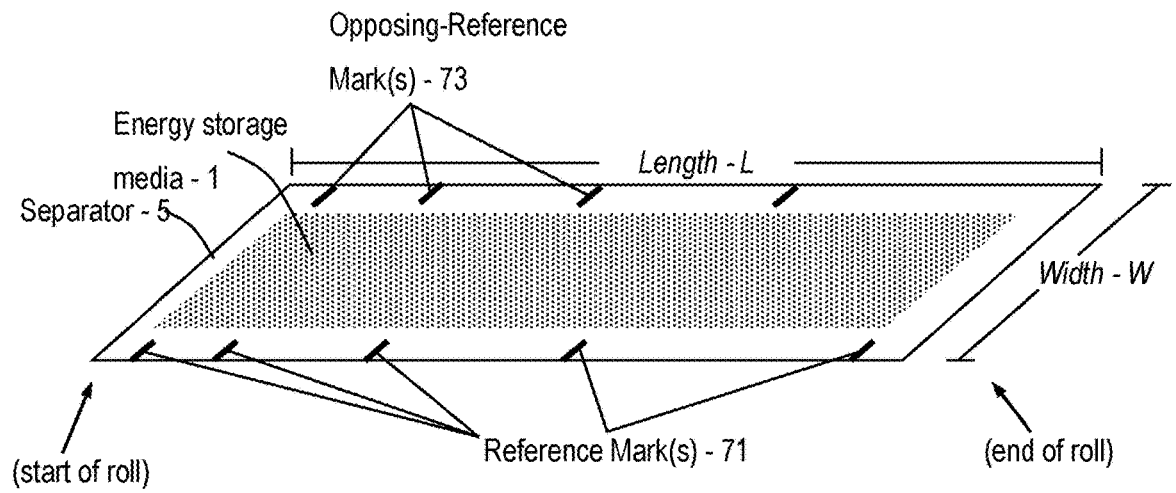
Figure 27:
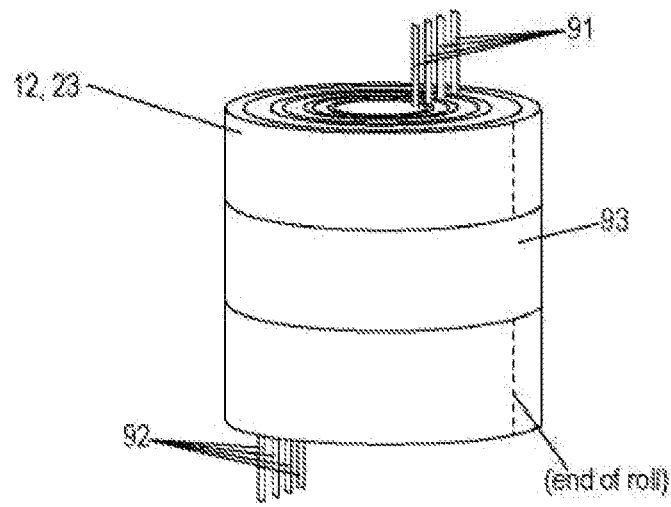
Figure 28:
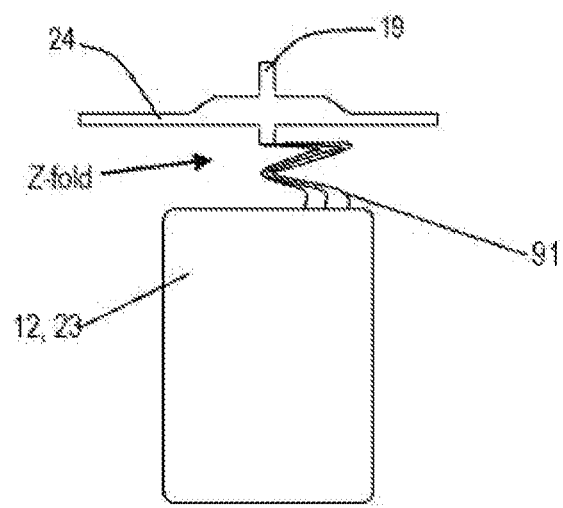
Figure 29:
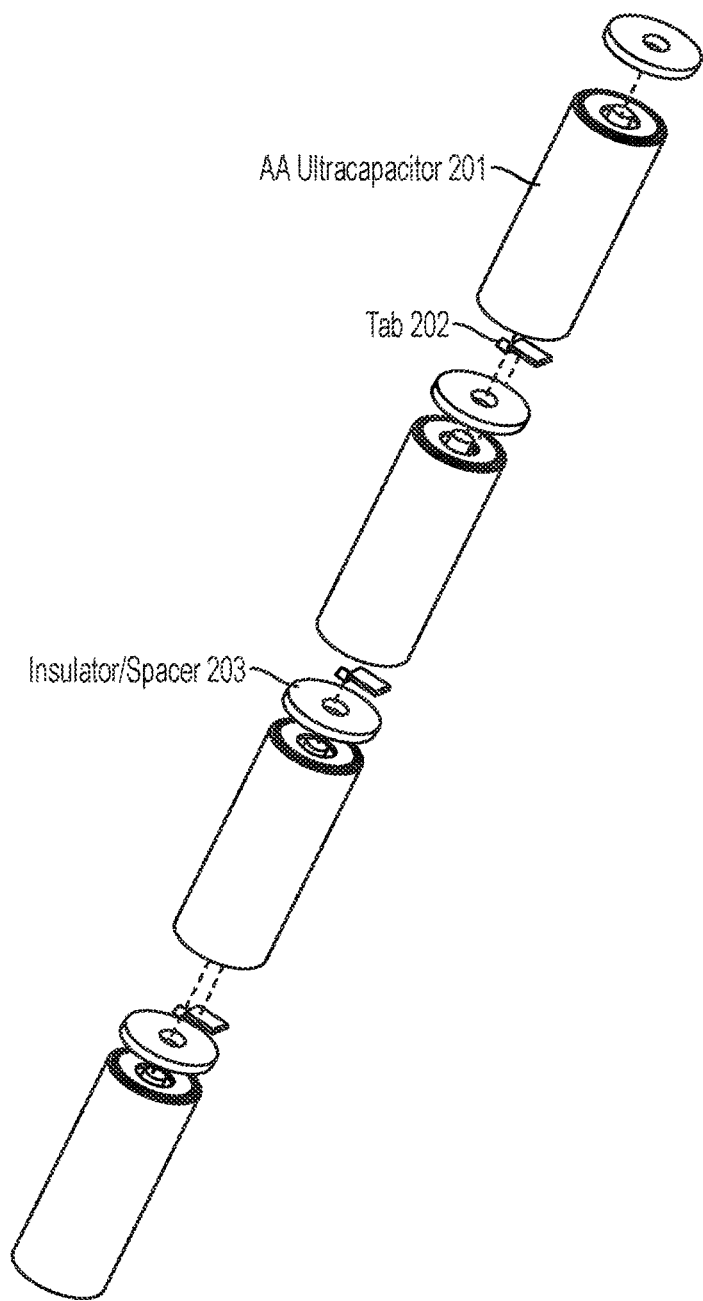
Figure 30:
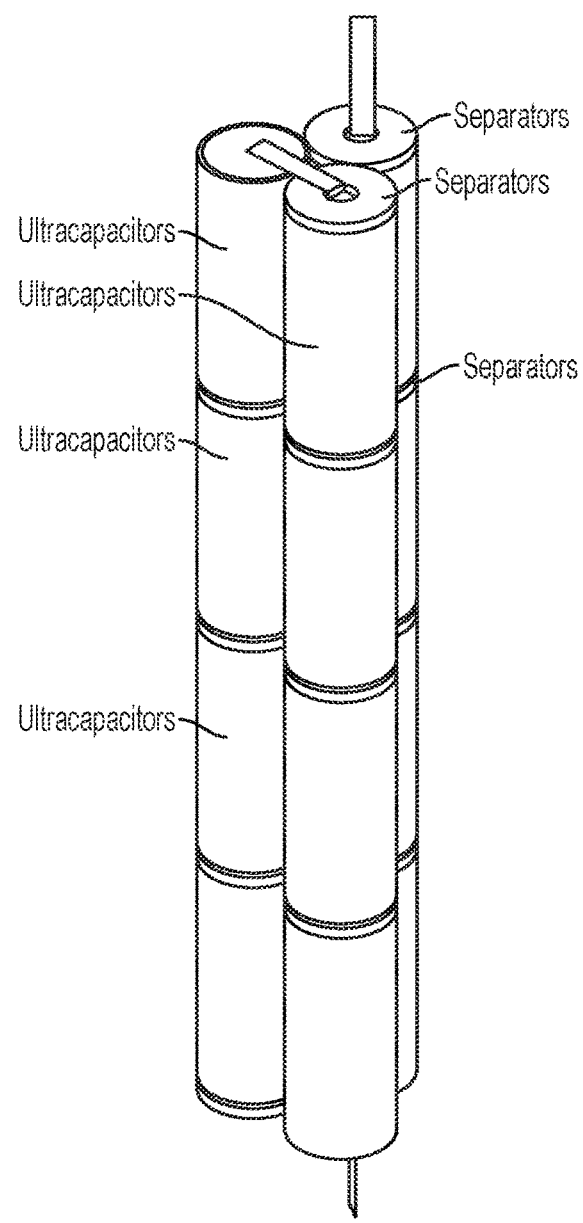
Figure 31A:
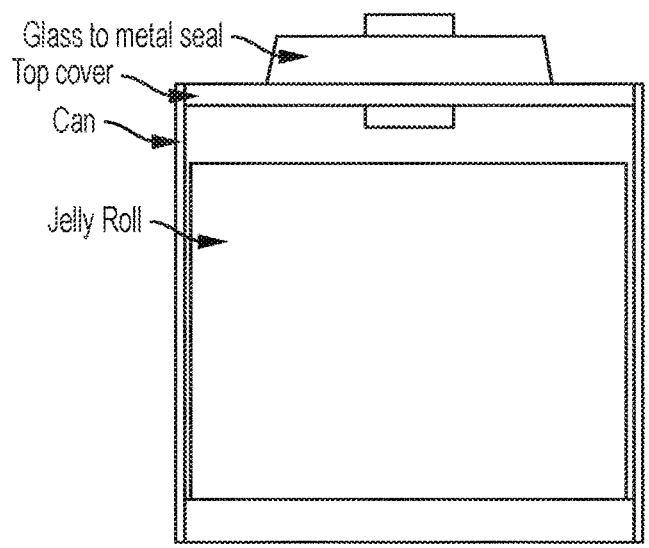
Figure 31B:
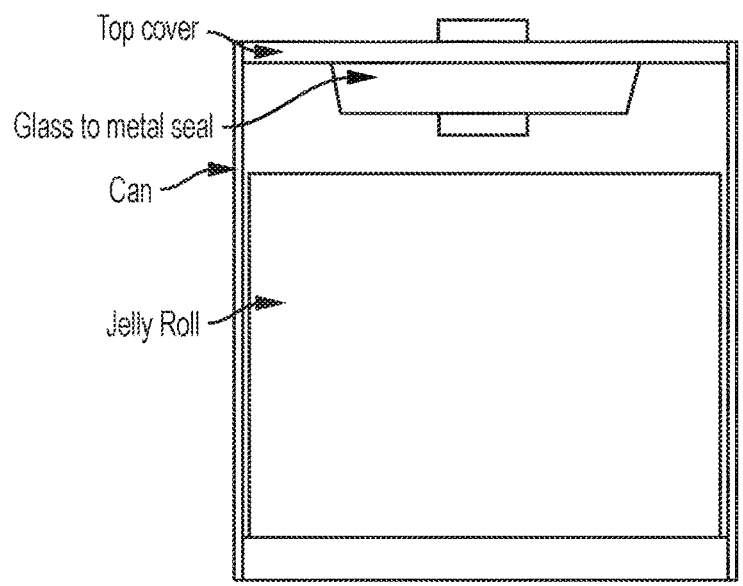
Figure 32:
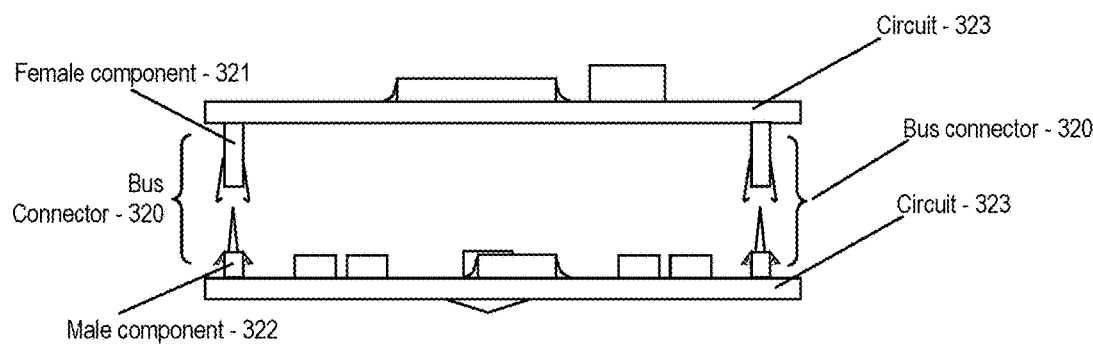
Figure 33:
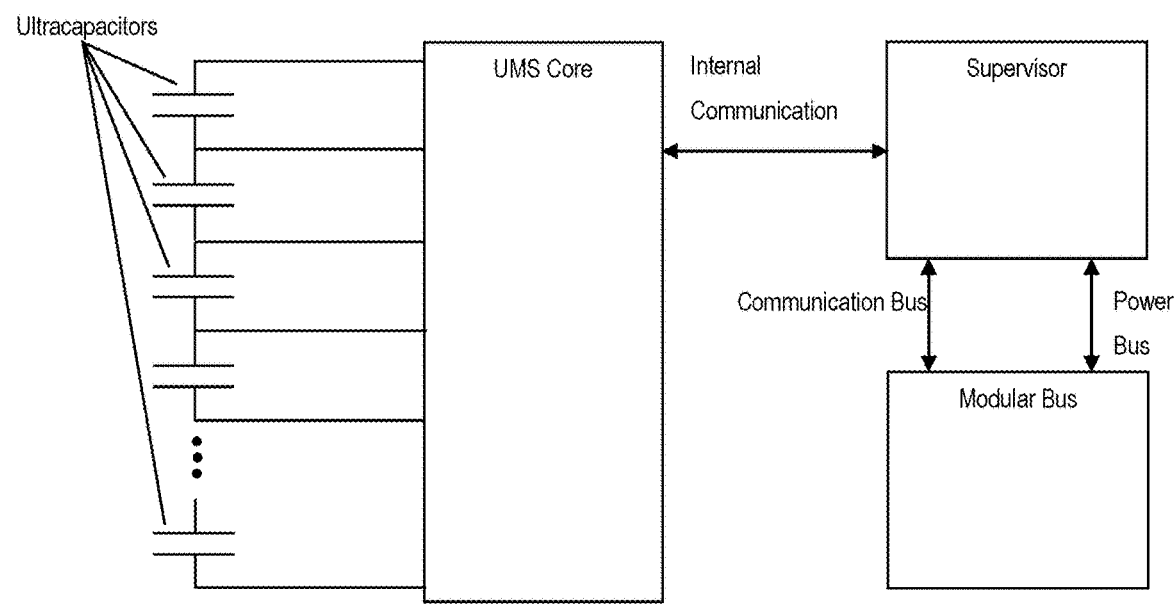
Figure 34:
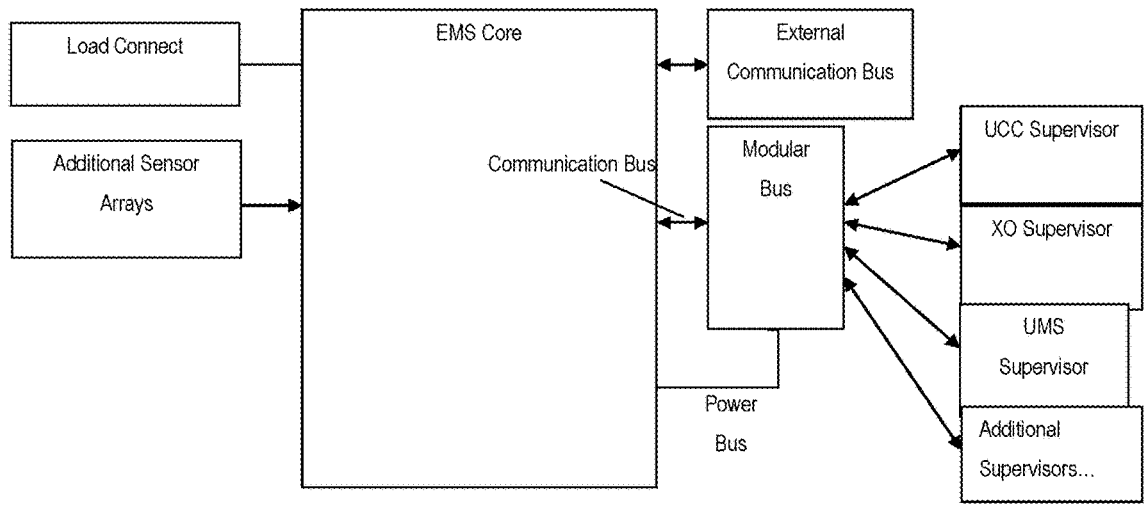
Figure 35:
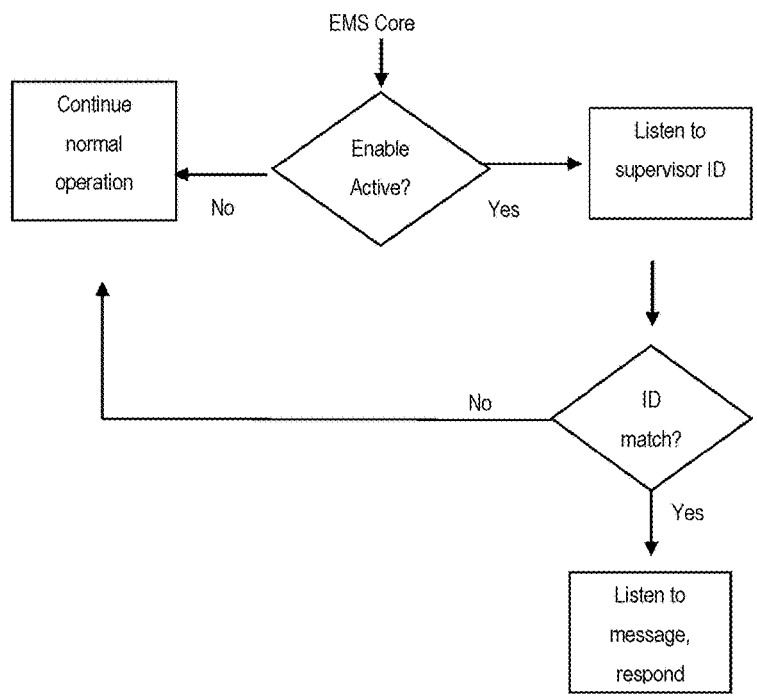
Figure 36:
Figure 37:
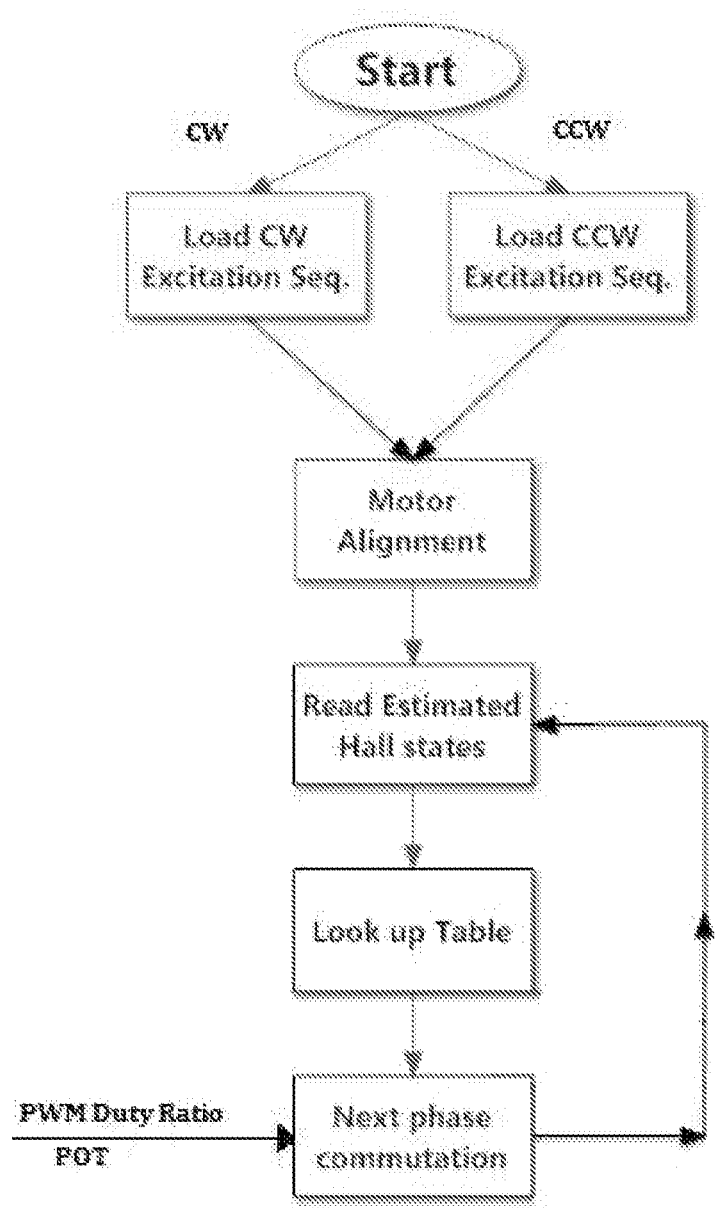
Figure 38A:
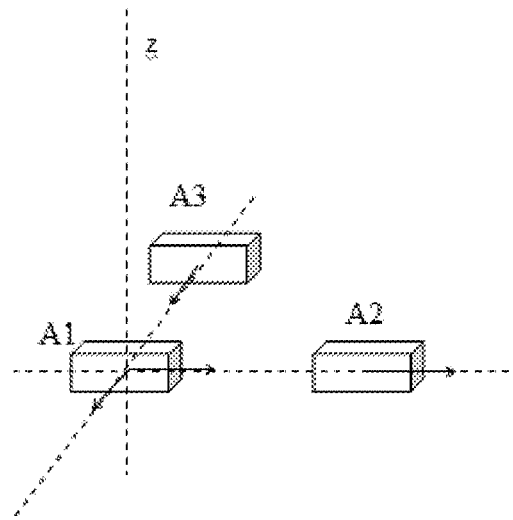
Figure 38B:
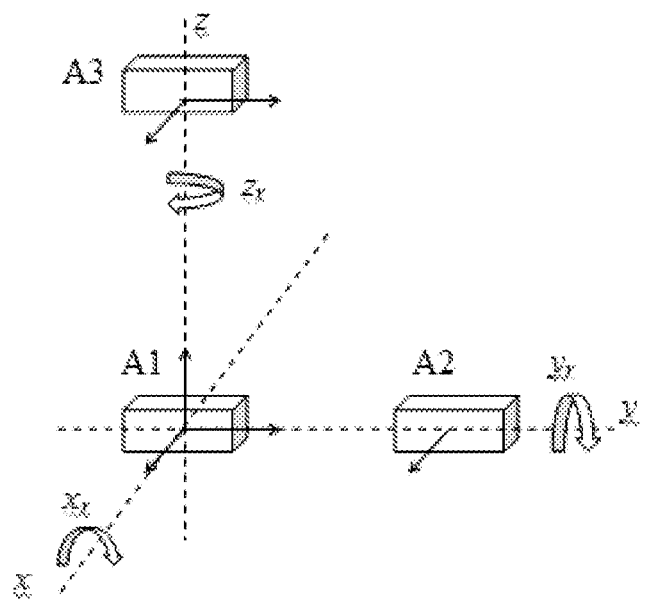
Figure 39:
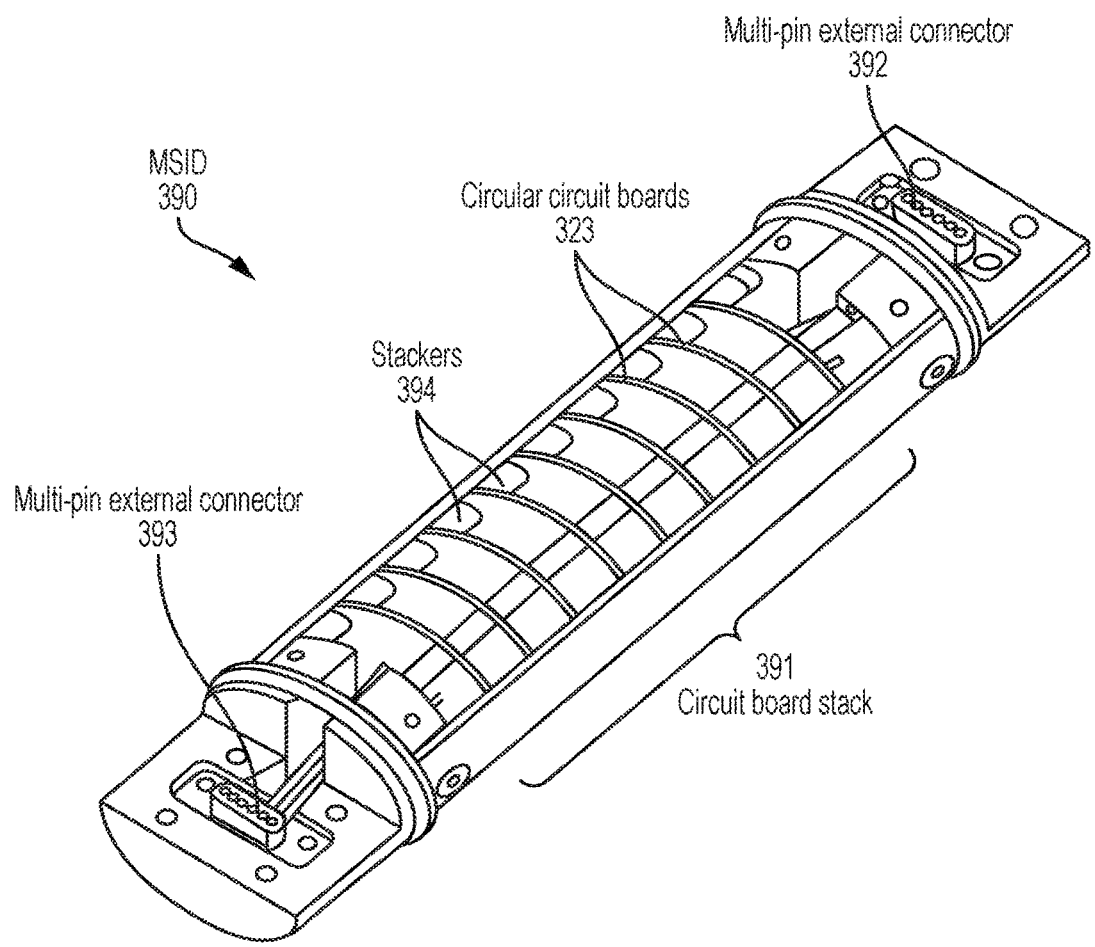

FIG. 11 depicts a barrier disposed about a storage cell as a wrapper, according to certain embodiments;

FIGS. 12A, 12B and 12C, collectively referred to herein as FIG. 12, depict exemplary embodiments of a cap that include multi-layered materials;

FIG. 13 is a cross-sectional view, according to some embodiments, of an electrode assembly that includes a glass-to-metal seal;

FIG. 14 is a cross-sectional view of the exemplary electrode assembly of FIG. 13 installed in the exemplary cap of FIG. 12B;

FIG. 15 depicts an exemplary arrangement of an energy storage cell in process of assembly;

FIGS. 16A, 16B and 16C, collectively referred to herein as FIG. 16, depict certain embodiments of an assembled energy storage cell;

FIG. 17 depicts use of polymeric insulation over an exemplary electrode assembly;

FIGS. 18A, 18B and 18C, collectively referred to herein as FIG. 18, depict aspects of an exemplary template for another embodiment of the cap for the energy storage;

FIG. 19 is a perspective view of an electrode assembly, according to certain embodiments, that includes hemispherically shaped material;

FIG. 20 is a perspective view of an exemplary cap including the electrode assembly of FIG. 19 installed in the template of FIG. 18C;

FIG. 21 is a cross-sectional view of the cap of FIG. 20;

FIG. 22 is a transparent isometric view of an exemplary energy storage cell disposed in a cylindrical housing;

FIG. 23 is an isometric view of an embodiment of an exemplary energy storage cell prior to being rolled into a rolled storage cell;

FIG. 24 is a side view of a storage cell, showing the various layers of one embodiment;

FIG. 25 is an isometric view of a rolled storage cell, according to some embodiments, which includes a reference mark for placing a plurality of leads;

FIG. 26 is an isometric view of the exemplary storage cell of FIG. 25 with reference marks prior to being rolled;

FIG. 27 depicts an exemplary rolled up storage cell with the plurality of leads included;

FIG. 28 depicts, according to certain embodiments, a Z-fold imparted into aligned leads (i.e., a terminal) coupled to a storage cell;

FIG. 29 depicts an exemplary ultracapacitor string, as described herein, highlighting certain components of assembly;

FIG. 30 depicts an exemplary ultracapacitor string in a 3 strand pack assembly of ultracapacitors;

FIG. 31A depicts a cell assembly without excess internal space;

FIG. 31B depicts a cell assembly with excess internal space;

FIG. 32 depicts modular board stackers as bus connectors, comprising headers and receptacles;

FIG. 33 depicts aspects of an ultracapacitor management system;

FIG. 34 depicts an exemplary embodiment of a system disclosed herein;

FIG. 35 depicts a flow diagram relating to communication protocols;

FIG. 36 depicts a circuit model of a motor;

FIG. 37 depicts a flow diagram relating to motor control;

FIGS. 38A and 38B, collectively referred to herein as FIG. 38, depict configurations of accelerometers; and FIG. 39 depicts a downhole system with a cut away from the housing showing the internal components.

Figure 40A:
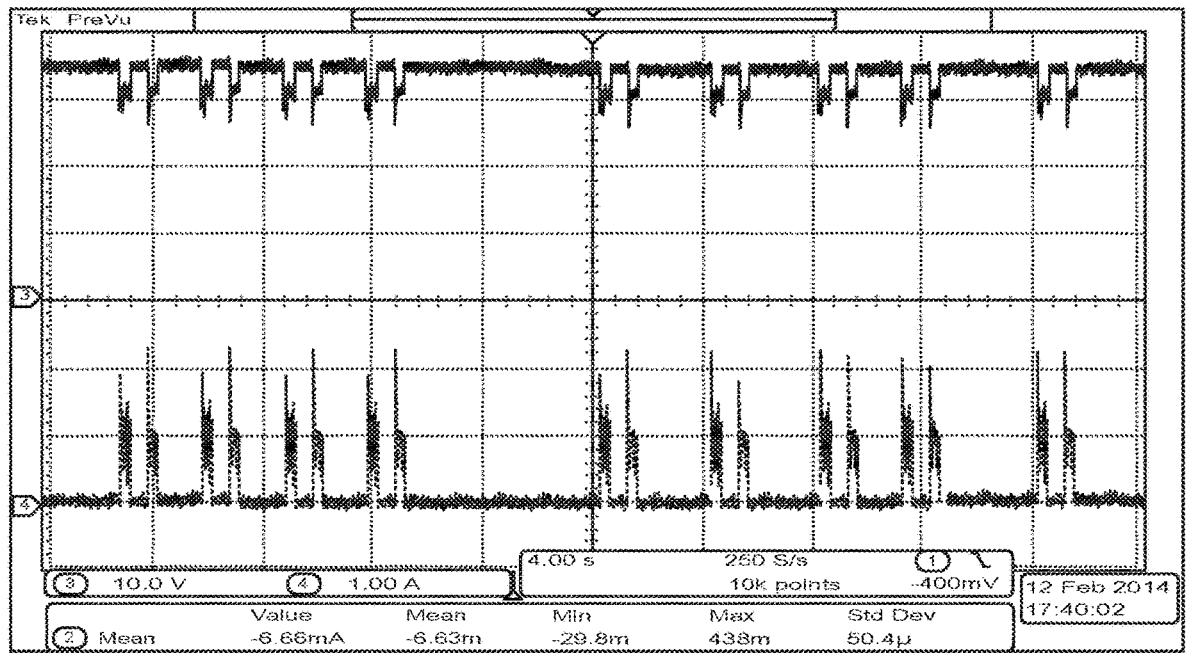
Figure 40B:
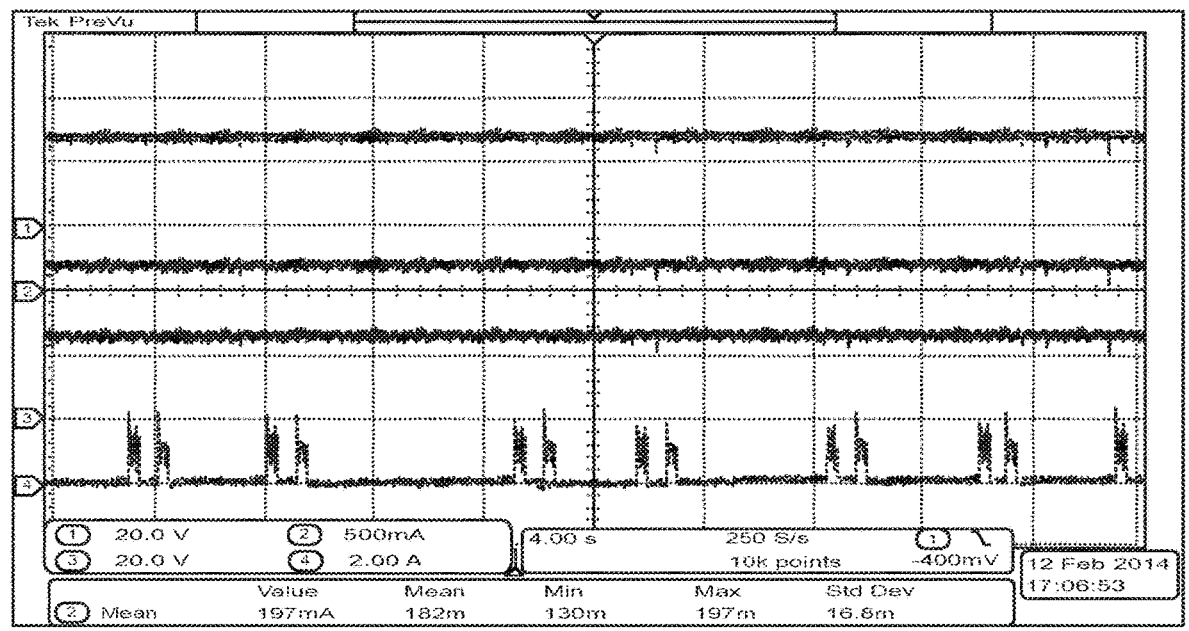

FIGS. 40A and 40B, collectively referred to herein as FIG. 40, depict exemplary current and voltage data illustrating the MSID-based devices, system, and methods disclosed herein.

Figure 41A:
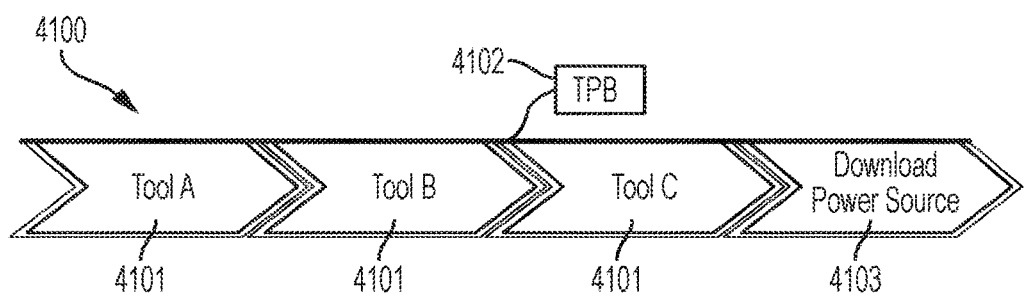
Figure 41B:
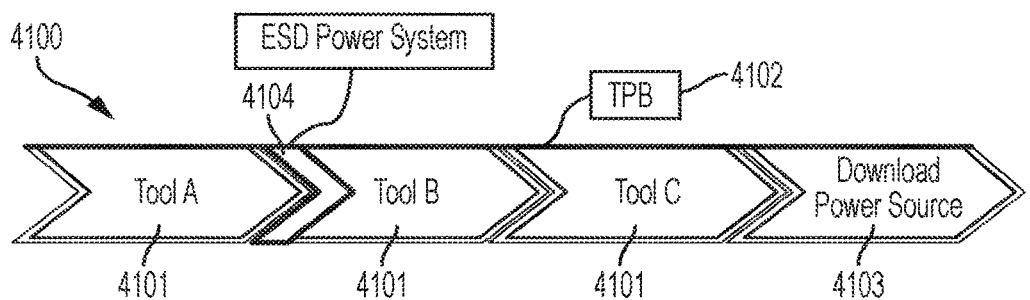

FIGS. 41A and 41B are schematic of a tool string and associated downhole power supply system. FIG. 41A does not induce an energy storage device (ESD). FIG. 41B includes an ESD.

DETAILED DESCRIPTION OF THE INVENTION

Disclosed herein are various configurations of a downhole system that includes an energy storage and, in certain embodiments, a modular signal interface device. The modular signal interface device may be used, for example, to control the energy storage component. In certain embodiments, the modular signal interface device can log data. The energy storage and/or the modular signal interface device may be configured, in some embodiments, to operate at high temperatures. The systems, some of which may be power systems, provide users with greater capabilities than previously achieved downhole. Such systems, while shown specifically for use in downhole environments, may be used for any application where similar environments exist, such as engine compartments of planes, cars, etc, or energy production plants/turbines. However, in order to provide context for the downhole power systems and methods for use, some background information and definitions are provided.

The systems disclosed herein may be used in various non-limiting applications as outlined below:
1) During Drilling Operations
   a) While Drilling
      i) MWD
      ii) LWD
   b) Wireline Logging
      i) Electric Line
      ii) Memory Logging
2) During Completion Operations
   a) Wireline Logging
      i) Electric Line
      ii) Memory Logging
3) During Production Operations
   a) Permanent Logging
   b) Wireline Logging
      i) Electric Line
      ii) Memory Logging Refer now to FIG. 1 where aspects of an apparatus for drilling a wellbore 101 (also referred to as a "borehole") are shown. As a matter of convention, a depth of the wellbore 101 is described along a Z-axis, while a cross-section is provided on a plane described by an X-axis and a Y-axis.

In this example, the wellbore 101 is drilled into the Earth 102 using a drill string 111 driven by a drilling rig (not shown) which, among other things, provides rotational energy and downward force. The wellbore 101 generally traverses sub-surface materials, which may include various formations 103 (shown as formations 103A, 103B, 103C). One skilled in the art will recognize that the various geologic features as may be encountered in a subsurface environment may be referred to as "formations," and that the array of materials down the borehole (i.e., downhole) may be referred to as "sub-surface materials." That is, the formations 103 are formed of sub-surface materials. Accordingly, as used herein, it should be considered that while the term "formation" generally refers to geologic formations, and "sub-surface material," includes any materials, and may include materials such as solids, fluids, gases, liquids, and the like.

In this example, the drill string 111 includes lengths of drill pipe 112 which drive a drill bit 114. The drill bit 114 also provides a flow of a drilling fluid 104, such as drilling mud. The drilling fluid 104 is often pumped to the drill bit 114 through the drill pipe 112, where the fluid exits into the wellbore 101. This results in an upward flow, F, of drilling fluid 104 within the wellbore 101. The upward flow, F, generally cools the drill string 111 and components thereof, carries away cuttings from the drill bit 114 and prevents blowout of pressurized hydrocarbons 105.

The drilling fluid 104 (also referred to as "drilling mud") generally includes a mixture of liquids such as water, drilling fluid, mud, oil, gases, and formation fluids as may be indigenous to the surroundings. Although drilling fluid 104 may be introduced for drilling operations, use or the presence of the drilling fluid 104 is neither required for nor necessarily excluded from well logging operations. Generally, a layer of materials will exist between an outer surface of the drill string 111 and a wall of the wellbore 101. This layer is referred to as a "standoff layer," and includes a thickness, referred to as "standoff, S."

The drill string 111 generally includes equipment for performing "measuring while drilling" (MWD), also referred to as "logging while drilling" (LWD). Performing MWD or LWD generally calls for operation of a logging instrument 100 that in incorporated into the drill string 111 and designed for operation while drilling. Generally, the logging instrument 100 for performing MWD is coupled to an electronics package which is also on board the drill string 111, and therefore referred to as "downhole electronics 113." Generally, the downhole electronics 113 provides for at least one of operational control and data analysis. Often, the logging instrument 100 and the downhole electronics 113 are coupled to topside equipment 107. The topside equipment 107 may be included to further control operations, provide greater analysis capabilities, and/or log data, and the like. A communications channel (not shown) may provide for communications to the topside equipment 107, and may operate via pulsed mud, wired pipe, and/or any other technologies as are known in the art.

Generally, data from the MWD apparatus provide users with enhanced capabilities. For example, data made available from MWD evolutions may be useful as inputs to geosteering (i.e., steering the drill string 111 during the drilling process) and the like.

Figure 1:
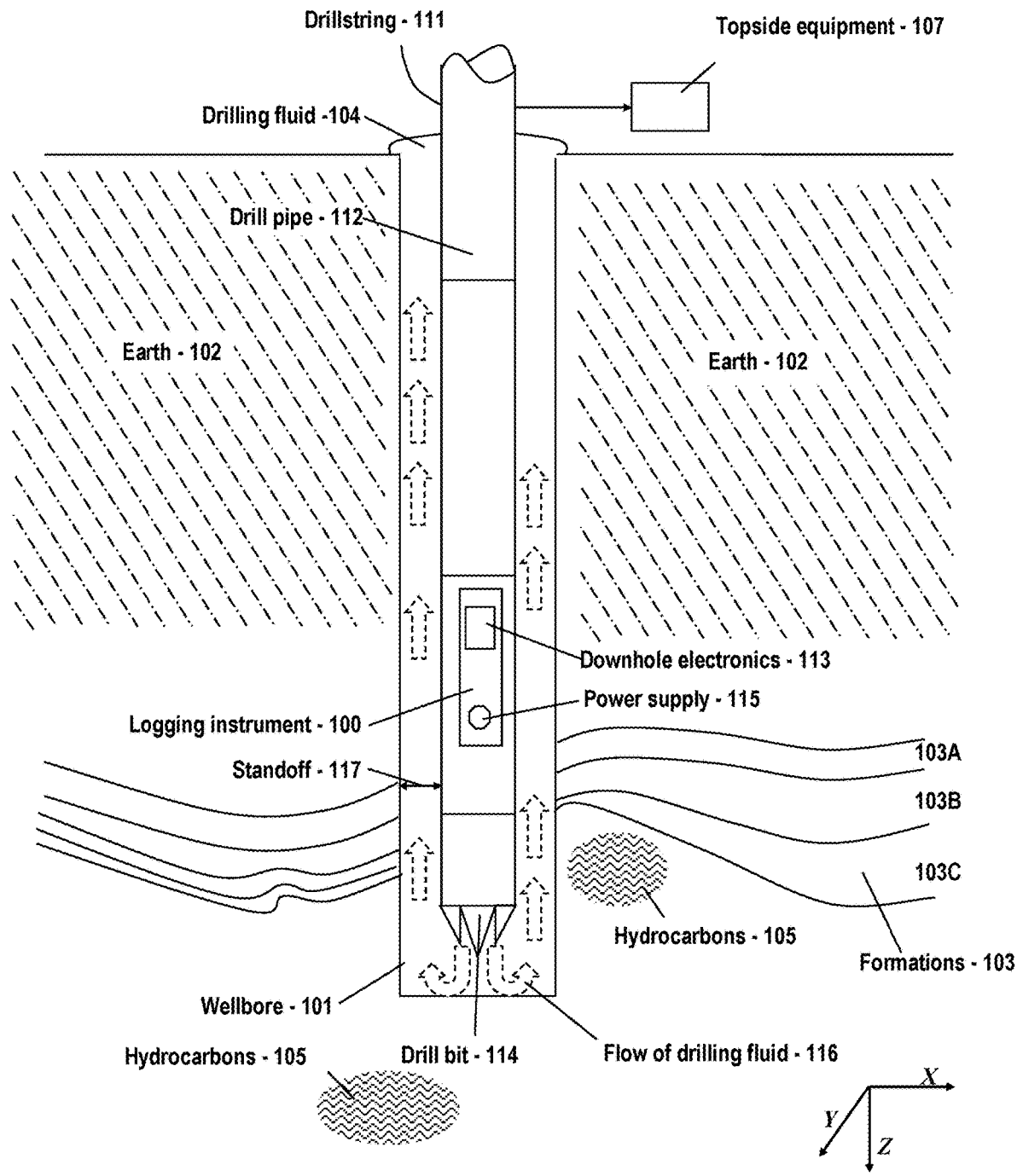
FIG. 1 illustrates an exemplary embodiment of a drill string that includes a logging instrument.
Figure 2:
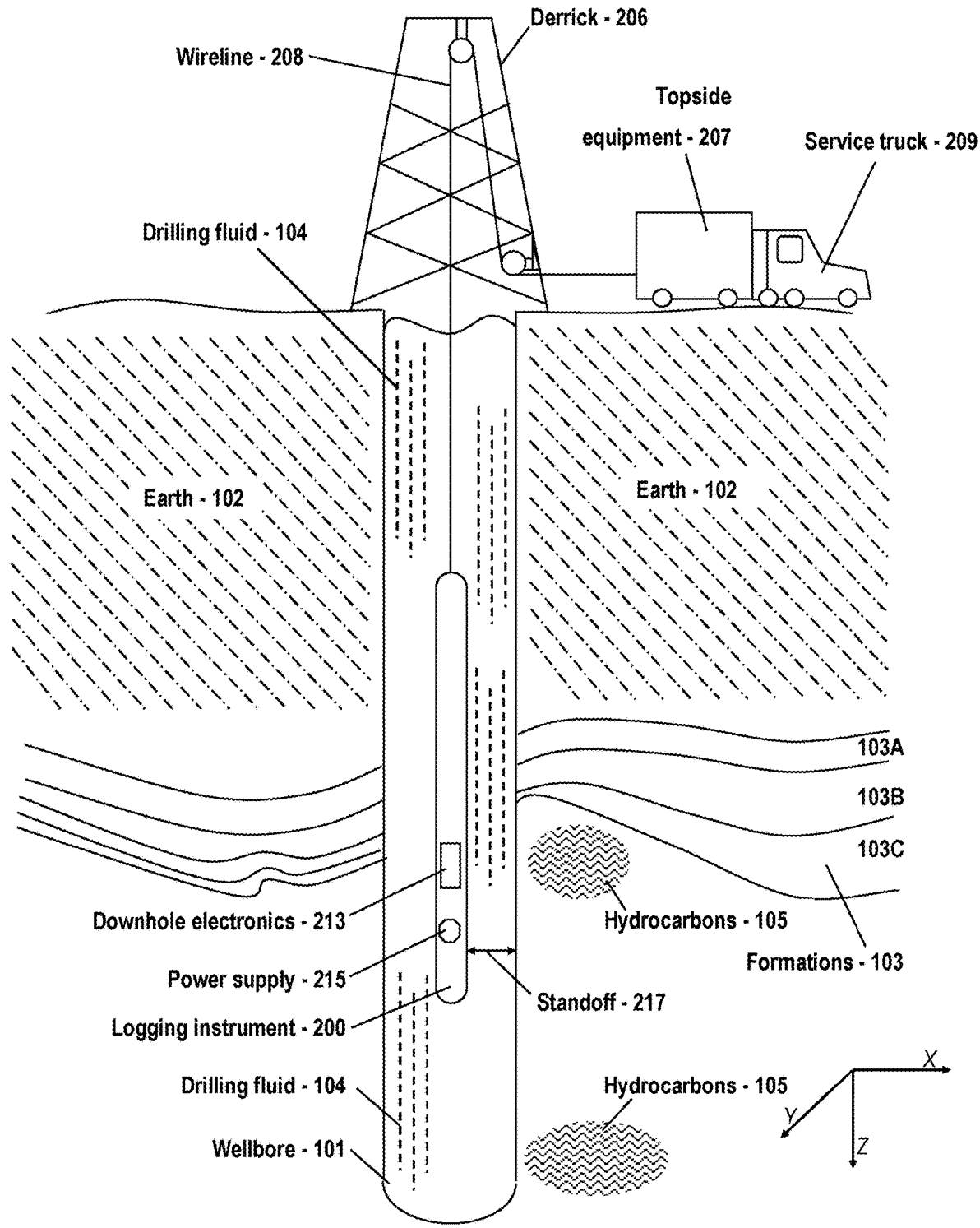
FIG. 2 illustrates an exemplary embodiment for well logging with an instrument deployed by a wireline.

Referring now to FIG. 2, an exemplary logging instrument 100 for wireline logging of the wellbore 101 is shown. As a matter of convention, a depth of the wellbore 101 is described along a Z-axis, while a cross-section is provided on a plane described by an X-axis and a Y-axis. Prior to well logging with the logging instrument 100, the wellbore 101 is drilled into the Earth 102 using a drilling apparatus, such as the one shown in FIG. 1.

In some embodiments, the wellbore 101 has been filled, at least to some extent, with drilling fluid 104. The drilling fluid 104 (also referred to as "drilling mud") generally includes a mixture of liquids such as water, drilling fluid, mud, oil, gases, and formation fluids as may be indigenous to the surroundings. Although drilling fluid 104 may be introduced for drilling operations, use or the presence of the drilling fluid 104 is neither required for nor necessarily excluded from logging operations during wireline logging. Generally, a layer of materials will exist between an outer surface of the logging instrument 100 and a wall of the wellbore 101. This layer is referred to as a "standoff layer," and includes a thickness, referred to as "standoff, S."

Generally, the logging instrument 100 is lowered into the wellbore 101 using a wireline 108 deployed by a derrick 106 or similar equipment. Generally, the wireline 108 includes suspension apparatus, such as a load bearing cable, as well as other apparatus. The other apparatus may include a power supply, a communications link (such as wired or optical) and other such equipment. Generally, the wireline 108 is conveyed from a service truck 109 or other similar apparatus (such as a service station, a base station, etc,). Often, the wireline 108 is coupled to topside equipment 107. The topside equipment 107 may provide power to the logging instrument 100, as well as provide computing and processing capabilities for at least one of control of operations and analysis of data.

Generally, the logging instrument 100 includes a power supply 115. The power supply 115 may provide power to downhole electronics 113 (i.e., power consuming devices) as appropriate. Generally, the downhole electronics 113 provide measurements and/or perform sampling and/or any other sequences desired to locate, ascertain and qualify a presence of hydrocarbons 105.

The present invention, including the modular signal interface devices, and related power systems and uses thereof will be described with reference to the following definitions that, for convenience, are set forth below. Unless otherwise specified, the below terms used herein are defined as follows:

Definitions

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including," "has" and "having" are intended to be inclusive such that there may be additional elements other than the listed elements.

The language "and/or" is used herein as a convention to describe either "and" or "or" as separate embodiments. For example, in a listing of A, B, and/or C, it is intended to mean both A, B, and C; as well as A, B, or C, wherein each of A, B, or C is considered a separate embodiment, wherein the collection of each in a list is merely a convenience. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

The terms "alkenyl" and "alkynyl" are recognized in the art and refer to unsaturated aliphatic groups analogous in length and possible substitution to the alkyls described below, but that contain at least one double or triple bond respectively.

The term "alkyl" is recognized in the art and may include saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 20 or fewer carbon atoms in its backbone (e.g., $C_1$-$C_{20}$ for straight chain, $C_1$-$C_{20}$ for branched chain). Likewise, cycloalkyls have from about 3 to about 10 carbon atoms in their ring structure, and alternatively about 5, 6 or 7 carbons in the ring structure. Examples of alkyl groups include, but are not limited to, methyl, ethyl, propyl, butyl, pentyl, hexyl, ethyl hexyl, cyclopropyl, cyclobutyl, cyclopentyl, cyclohexyl and the like.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The expression "back EMF" is art recognized and describes the induced voltage that varies with the speed and position of the rotor.

The term "buffer" as used herein, when used in the context of a system as described herein, e.g. a power system as described herein, generally relates to a decoupling of an aspect (e.g., at least one aspect) of a first input or output of said system from one aspect of second input or output of said system. Exemplary aspects include voltage, current, power, frequency, phase, and the like. The terms buffering, buffer, power buffer, source buffer and the like as used herein generally relate to the concept of the buffer as defined above.

As used herein, the term "cell" refers to an ultracapacitor cell.

As used herein, the terms "clad," "cladding" and the like refer to the bonding together of dissimilar metals. Cladding is often achieved by extruding two metals through a die as well as pressing or rolling sheets together under high pressure. Other processes, such as laser cladding, may be used. A result is a sheet of material composed of multiple layers, where the multiple layers of material are bonded together such that the material may be worked with as a single sheet (e.g., formed as a single sheet of homogeneous material would be formed).

As a matter of convention, it may be considered that a "contaminant" may be defined as any unwanted material that may negatively affect performance of the ultracapacitor 10 if introduced. Also note, that generally herein, contaminants may be assessed as a concentration, such as in parts-per-million (ppm). The concentration may be taken as by weight, volume, sample weight, or in any other manner as determined appropriate.

As used herein, use of the term "control" with reference to the power supply generally relates to governing performance of the power supply. However, in some embodiments, "control" may be construed to provide monitoring of performance of the power supply. The monitoring may be useful, for example, for otherwise controlling aspects of use of the power supply (e.g., withdrawing the power supply when a state-of-charge indicates useful charge has been expended). Accordingly, the terms "control," "controlling" and the like should be construed broadly and in a manner that would cover such additional interpretations as may be intended or otherwise indicated.

The term "cyano" is given its ordinary meaning in the art and refers to the group, CN. The term "sulfate" is given its ordinary meaning in the art and refers to the group, $SO_2$. The term "sulfonate" is given its ordinary meaning in the art and refers to the group, $SO_3X$, where X may be an electron pair, hydrogen, alkyl or cycloalkyl. The term "carbonyl" is recognized in the art and refers to the group, $C=O$.

The language "downhole conditions" or "downhole environments" may be used interchangeably herein to describe the general conditions experienced for equipment subjected to environments comprising high temperatures, e.g., greater than 75 degrees Celsius, e.g., greater than 100 degrees Celsius, e.g., greater than 125 degrees Celsius, e.g., greater than 150 degrees Celsius, e.g., greater than 175 degrees Celsius, e.g., greater than 200 degrees Celsius, and/or shock and vibrations greater than 5 G, e.g. greater than 10 G, e.g. greater than 20 G, e.g. greater than 50 G, e.g. greater than 100 G.

"Energy density" is one half times the square of a peak device voltage times a device capacitance divided by a mass or volume of said device.

As discussed herein, "hermetic" refers to a seal whose quality (i.e., leak rate) is defined in units of "atm-cc/second," which means one cubic centimeter of gas (e.g., He) per second at ambient atmospheric pressure and temperature. This is equivalent to an expression in units of "standard He-cc/sec." Further, it is recognized that 1 atm-cc/sec is equal to 1.01325 mbar-liter/sec.

The terms "heteroalkenyl" and "heteroalkynyl" are recognized in the art and refer to alkenyl and alkynyl alkyl groups as described herein in which one or more atoms is a heteroatom (e.g., oxygen, nitrogen, sulfur, and the like).

The term "heteroalkyl" is recognized in the art and refers to alkyl groups as described herein in which one or more atoms is a heteroatom (e.g., oxygen, nitrogen, sulfur, and the like). For example, alkoxy group (e.g., —OR) is a heteroalkyl group.

The term "heuristics" is art-recognized, and generally describes experience-based techniques for problem solving.

As a matter of convention, the terms "internal resistance" and "effective series resistance" and "ESR", terms that are known in the art to indicate a resistive aspect of a device, are used interchangeably herein.

As a matter of convention, the term "leakage current" generally refers to current drawn by the capacitor which is measured after a given period of time. This measurement is performed when the capacitor terminals are held at a substantially fixed potential difference (terminal voltage). When assessing leakage current, a typical period of time is seventy two (72) hours, although different periods may be used. It is noted that leakage current for prior art capacitors generally increases with increasing volume and surface area of the energy storage media and the attendant increase in the inner surface area of the housing. In general, an increasing leakage current is considered to be indicative of progressively increasing reaction rates within the ultracapacitor 10. Performance requirements for leakage current are generally defined by the environmental conditions prevalent in a particular application. For example, with regard to an ultracapacitor 10 having a volume of 20 mL, a practical limit on leakage current may fall below 200 mA.

A "lifetime" for the capacitor is also generally defined by a particular application and is typically indicated by a certain percentage increase in leakage current or degradation of another parameter such as capacitance or internal resistance (as appropriate or determinative for the given application). For instance, in one embodiment, the lifetime of a capacitor in an automotive application may be defined as the time at which the leakage current increases to 200% of its initial (beginning of life or "BOL") value. In another example, the lifetime of a capacitor in an oil and gas application may be defined as the time at which any of the following occurs: the capacitance falls to 50% of its BOL value, the internal resistance increases to 200% of its BOL value, the leakage increases to 200% of its BOL value. As a matter of convention, the terms "durability" and "reliability" of a device when used herein generally relate to a lifetime of said device as defined above.

The term "modular bus" is used herein as a convention to describe the protocol of board topology and pin assignment on each circuit board which supports the flow of power and that affords it the capability to communicate to the other circuits and/or external hardware through the aligned stackers connecting the boards.

An "operating temperature range" of a device generally relates to a range of temperatures within which certain levels of performance are maintained and is generally determined for a given application. For instance, in one embodiment, the operating temperature range for an oil and gas application may be defined as the temperature range in which the resistance of a device is less than about 1,000% of the resistance of said device at 30 degrees Celsius, and the capacitance is more than about 10% of the capacitance at 30 degrees Celsius.

In some instances, an operating temperature range specification provides for a lower bound of useful temperatures whereas a lifetime specification provides for an upper bound of useful temperatures.

The terms "optimization" and "optimize" are used herein to describe the process of moving a system or performance towards an improved system or performance as compared to a system or performance without the object or method that is being recited as causing the optimization. For clarity, it is not intended herein to suggest that by using these terms, that the most optimum value must be achieved; as such it should be understood that the an optimized range is on a spectrum of improvement.

"Peak power density" is one fourth times the square of a peak device voltage divided by an effective series resistance of said device divided by a mass or volume of said device.

The term "signal," as used herein, describes the transference of energy or data over time. Moreover, unless specified otherwise, the term signal will mean either energy transference over time, or data transference over time.

The term "subsurface" as used herein, refers to an environment below the surface of the earth or an environment having similar characteristics.

The term "system" or "systems" are used herein to include power systems, data logging systems, or a combination thereof.

The term "ultracapacitor" as used herein, describes an energy storage device exploiting art-recognized electrolytic double layer capacitance mechanisms.

As referred to herein, a "volumetric leakage current" of the ultracapacitor 10 generally refers to leakage current divided by a volume of the ultracapacitor 10, and may be expressed, for example in units of mA/cc. Similarly, a "volumetric capacitance" of the ultracapacitor 10 generally refers to capacitance of the ultracapacitor 10 divided by the volume of the ultracapacitor 10, and may be expressed, for example in units of F/cc. Additionally, "volumetric ESR" of the ultracapacitor 10 generally refers to ESR of the ultracapacitor 10 multiplied by the volume of the ultracapacitor 10, and may be expressed, for example in units of Ohms·cc.

As a matter of convention, it should be considered that the term "may" as used herein is to be construed as optional; "includes" is to be construed as not excluding other options (i.e., steps, materials, components, compositions, etc,); "should" does not imply a requirement, rather merely an occasional or situational preference. Other similar terminology is likewise used in a generally conventional manner.

As discussed herein, terms such as "adapting," "configuring," "constructing" and the like may be considered to involve application of any of the techniques disclosed herein, as well as other analogous techniques (as may be presently known or later devised) to provide an intended result.

APPLICATIONS OF THE PRESENT INVENTION

One skilled in the art will recognize that the systems of the present invention may be used in conjunction with technologies and instrumentation in support of resistivity, nuclear including pulsed neutron and gamma measuring as well as others, magnetic resonance imaging, acoustic, and/or seismic measurements, formation sampling tools, various sampling protocols, communications, data processing and storage, geosteering, rotary steerable tools, accelerometers, magnetometers, sensors, transducers, digital and/or analog devices (including those listed below) and the like and a myriad of other systems having requirements for power use downhole. A great compliment of components may also be powered by the power systems of the present invention. Non-limiting examples include accelerometers, magnetometers, sensors, transducers, digital and/or analog devices (including those listed below) and the like. Other examples include rotary steerable tools. Other examples include telemetry components or systems such as mud-pulse telemetry systems. Non-limiting examples of mud pulse telemetry systems include rotary mud pulsers, solenoid driven mud pulsers, and motor driven mud pulsers. Other non-limiting examples of telemetry systems include EM telemetry systems, wired telemetry systems, fiber optic telemetry systems and the like.

The power source may include a variety of energy inputs. The energy inputs may be generally divided into three categories. The categories include batteries, remote systems, and generators.

In some embodiments, the power source includes a primary battery. Exemplary batteries include those that are adapted for operation in a harsh environment. Specific examples include various chemical batteries, including those with lithium. More specific examples include lithium-thionyl-chloride (Li—SOCl$_2$) and batteries based on similar technologies and/or chemistries. However, it is recognized that some of these technologies may not be capable of achieving the desired temperature ratings, and that some of these technologies may only support the energy storage on a short term basis (i.e., the energy storage may include, for example, elements that are not rechargeable, or that have a shortened life when compared with other elements). Other exemplary batteries that may be included include lithium-bromine-chloride, as well as lithium-sulfuryl-chloride and fused salt.

The power source may include at least one connection to a remote power supply. That is, energy may be supplied via an external source, such as via wireline. Given that external energy sources are not constrained by the downhole environment, the primary concern for receiving energy includes methods and apparatus for communicating the energy downhole. Exemplary techniques for communicating energy to the systems of the present invention include wired casing, wired pipe, coiled tubing and other techniques as may be known in the art.

The power source may include at least one generator. Various types of energy generation devices may be used alone or in combination with each other, Exemplary types of energy generators include, without limitation, rotary generators, electromagnetic displacement generators, magnetostritive displacement generators, piezoelectric displacement generators, thermoelectric generators, thermophotovoltaic generators, and may include connections to remote generators, such as a wireline connection to a generator or power supply that is maintained topside. Other types of generators include inertial energy generators, linear inertial energy generators, rotary inertial energy generators, or vibration energy generators.

As mentioned above, other types of generators include, without limitation, rotary generators, electromagnetic displacement generators, magnetostrictive displacement generators, piezoelectric displacement generators, thermoelectric generators, thermophotovoltaic generators, and may include connections to remote generators, such as a wireline connection to a generator or power supply that is maintained topside, and a radioisotope power generator.

Rotary types of generators may include, for example, generators that rely on fluid (liquid or gas or a mixture) induced rotation, a single-stage design, a multi-stage and may be redundant.

Electromagnetic displacement types of generation may rely upon, for example, drill string vibration (wanted or unwanted), acoustic vibration, seismic vibration, flow-induced vibration (such as from mud, gas, oil, water, etc.) and may include generation that is reliant upon reciprocating motion.

Magnetostrictive types of generation are reliant on magnetostriction, which is a property of ferromagnetic materials that causes them to change their shape or dimensions during the process of magnetization. Magnetostrictive materials can convert magnetic energy into kinetic energy, or the reverse, and are used to build actuators and sensors. As with electromagnetic displacement types of generation, magnetostrictive types of generation may rely upon, for example, drill string vibration (wanted or unwanted), acoustic vibration, seismic vibration, flow-induced vibration (such as from mud, gas, oil, water, etc.) and may include generation that is reliant upon reciprocating motion, as well as other techniques that generate or result in a form of kinetic or magnetic energy.

Piezoelectric types of generation are reliant on materials that exhibit piezoelectric properties. Piezoelectricity is the charge that accumulates in certain solid materials (notably crystals, certain ceramics, and the like) in response to applied mechanical stress. Piezoelectric types of generation may rely upon, for example, drill string vibration (wanted or unwanted), acoustic vibration, seismic vibration, flow-induced vibration (such as from mud, gas, oil, water, etc.) and may include generation that is reliant upon reciprocating motion, as well as other techniques that generate or result in a form of mechanical stress.

The piezoelectric effect can be utilized to convert mechanical energy into electrical energy. For example, a piezoelectric element may be constructed in the form of a cantilevered beam, whereby movement of the end of the beam bends the beam under vibration. The piezoelectric element may also be constructed as a platter, whereby vibration causes distortion in the center of the platter. In each configuration, varying mass loads may be used to enhance the effect of the mechanical vibration. For instance, a mass may be placed on the end of the cantilevered beam to increase the level of deflection incurred on the beam caused by mechanical vibration of the system.

In some embodiments, a piezoelectric electric generator includes one to many piezoelectric elements, each element provided to convert mechanical energy into electrical current. The piezoelectric electric generator may also include one to many conducting elements to transfer the electrical current to energy conversion or storage electronics. Each piezoelectric generator may be configured in plurality to enhance energy generation capabilities. The piezoelectric generators may be placed in suitable directions to capture various modes of mechanical vibration. For instance, in order to capture three dimensions of lateral vibration, the piezoelectric generators may be placed orthogonal to each other such that each dimension of vibration is captured by at least one set of piezoelectric generators.

Generally, piezoelectric generators are useful for generating up to a watt of electric power. However, multiple generators may be used in parallel to generate additional power. In one embodiment, a single mass may be configured to deform multiple piezoelectric elements at a given time.

Like the electromagnetic generators, piezoelectric generators operate with a given natural frequency. The most power is generated when the mechanical vibration occurs at the natural frequency of the piezoelectric generator. In order to maximize the amount of generated power, the natural frequency of the piezoelectric generator may be tuned, as previously discussed, by including varying load elements to the conducting material. In another embodiment, there may be multiple piezoelectric generators tuned to different fixed frequencies to capture a range of vibration frequencies. Dampening in the form of a material attached to the piezoelectric element or a fluid surrounding the piezoelectric element may be used to broaden the effective capture spectrum of the piezoelectric generator while decreasing the resonant response.

In one embodiment where the mechanical energy source is in the form of fluid flow, a rotation based piezoelectric generator may be used. For example, one to many piezoelectric elements may be deformed due to the rotation of a structure. In one embodiment, one to many piezoelectric beams may be bent by orthogonal pins attached to a rotating wheel. As the wheel rotates around its axis, the pins contact the piezoelectric elements and cause deformation of the elements as the wheel rotates. In another embodiment, piezoelectric elements are placed parallel to and adjacent to a rotating body of varying radii. As the rotating body rotates, the piezoelectric elements are compressed to varying degrees depending on the radius at the contact point between the rotating body and the piezoelectric element. In this embodiment, there may be piezoelectric elements also placed on the rotating body to produce additional electrical energy.

Thermoelectric types of generation are reliant on materials that exhibit thermoelectric properties. Thermoelectric generators generally convert heat flow (temperature differences) directly into electrical energy, using a phenomenon called the "Seebeck effect" (or "thermoelectric effect"). Exemplary thermoelectric generators may rely on bimetallic junctions (a combination of materials) or make use of particular thermoelectric materials. One example of a thermoelectric material is bismuth telluride ($Bi_2Te_3$), a semiconductor with p-n junctions that can have thicknesses in the millimeter range. Generally, thermoelectric generators are solid state devices and have no moving parts.

Thermoelectric generators may be provided to take advantage of various temperature gradients. For example, a temperature differential inside and outside of pipe, a temperature differential inside and outside of casing, a temperature differential along drill string, a temperature differential arising from power dissipation within tool (from electrical and/or mechanical energy), and may take advantage of induced temperature differentials.

Thermophotovoltaic generators provide for energy conversion of heat differentials to electricity via photons. In a simple form, the thermophotovoltaic system includes a thermal emitter and a photovoltaic diode cell. While the temperature of the thermal emitter varies between systems, in principle, a thermophotovoltaic device can extract energy from any emitter with temperature elevated above that of the photovoltaic device (thus forming an optical heat engine). The emitter may be a piece of solid material or a specially engineered structure. Thermal emission is the spontaneous emission of photons due to thermal motion of charges in the material. In the downhole environment, ambient temperatures cause radiation mostly at near infrared and infrared frequencies. The photovoltaic diodes can absorb some of these radiated photons and convert them into electrons.

Other forms of power generation may be used. For example, radioisotope power generation may be incorporated into the power supply, which converts ions into a current.

A variety of techniques may be employed for incorporating the foregoing types of power generators into the drill string. For example, piezoelectric elements may be included into a design in order to supply intermittent or continuous power to electronics. The down-hole environment offers numerous opportunities for piezoelectric power generation due to the abundance of vibration, either wanted or unwanted, through acoustic, mechanical, or seismic sources.

There are three primary modes of vibration in a downhole drill string; drill collar whirl, bit bounce, and collar stick-slip. Each of these modes is capable of coupling into each other, causing lateral, torsional, and axial vibrations.

In a down-hole instrument, there are numerous locations that offer a potential for energy harvesting. The instrument may be composed of separate sections that are directly connected through rigid supports, left connected through a flexible connection, or left unconnected by material other than piezoelectric elements. A flexible connection may be comprised of a flexible membrane or pivoting rigid structure.

To capture energy from torsional vibration, piezoelectric material can be placed vertically along the length of the instrument. Torsional stresses between sections of the instrument may cause the piezoelectric element to deform. A conducting material can be placed along the piezoelectric element to carry generated current to energy storage or conversion devices.

In another embodiment, piezoelectric material can be utilized to generate energy from axial vibration. For instance, piezoelectric element can be placed between two or more compartments that are otherwise left unconnected or connected flexible connection. Each end of the piezoelectric element may be connected to the surface of the instrument orthogonal to the axial and tangential direction such that axial vibration will compress or extend the piezoelectric element.

In another embodiment, piezoelectric material can be utilized to generate energy from lateral vibration. For instance, piezoelectric element may be placed between two or more compartments that are otherwise left unconnected or connected via a flexible connection. The ends of the piezoelectric elements may be attached to the tangential walls of each compartment such that relative shear movement of each compartment bends the connecting piezoelectric elements.

One or many of these embodiments may be included into the same instrument to enhance energy generation.

In short, the power supply may make use of any type of power generator that may be adapted for providing power in the downhole environment. The types of power generation used may be selected according to the needs or preferences of a system user, designer, manufacturer or other interested party. A type of power generation may be used alone or in conjunction with another type of power generation.

It should be noted that as in the case of the vibrational energy generator, other forms of generators may also be controlled (i.e., tuned) to improve efficiency according to environmental factors. In each case, it is considered that "tuning" of the generator is designed to accomplish this task. In some cases, tuning is provided during assembly. In some additional embodiments, tuning is performed on a real-time, or near real-time basis during operation of the power supply.

Embodiments of a HTRES are disclosed herein. Before turning to the details of the HTRES disclosed herein, additional embodiments of HTRES include, without limitation, chemical batteries, aluminum electrolytic capacitors, tantalum capacitors, ceramic and metal film capacitors, hybrid capacitors magnetic energy storage, for instance, air core or high temperature core material inductors. Other types of that may also be suitable include, for instance, mechanical energy storage devices, such as fly wheels, spring systems, spring-mass systems, mass systems, thermal capacity systems (for instance those based on high thermal capacity liquids or solids or phase change materials), hydraulic or pneumatic systems. One example is the high temperature hybrid capacitor available from Evans Capacitor Company Providence, RI USA part number HC2D060122 DSCC10004-16 rated for 125 degrees Celsius. Another example is the high temperature tantalum capacitor available from Evans Capacitor Company Providence, RI USA part number HC2D050152HT rated to 200 degrees Celsius. Yet another example is an aluminum electrolytic capacitor available from EPCOS Munich, Germany part number B41691A8107Q7, which is rated to 150 degrees Celsius. Yet another example is the inductor available from Panasonic Tokyo, Japan part number ETQ-P5M470YFM rated for 150 degrees Celsius. Additional embodiments are available from Saft, Bagnolet, France (part number Li-ion VL 32600-125) operating up to 125 degrees Celsius with 30 charge-discharge cycles, as well as a li-ion battery (experimental) operable up to about 250 degrees Celsius, and in experimental phase with Sadoway, Hu, of Solid Energy in Cambridge, Massachusetts.

Modular Signal Interface Devices (MSID) of the Present Invention

In one embodiment of the invention, downhole electronics are controlled and/or monitored by a modular signal interface device (MSID) of the present invention. In certain embodiments, this MSID may serve to (1) control an energy storage component of a high temperature power system, e.g., a downhole power supply system, affording benefits such as increased battery consumption efficiency, higher power capability, power buffering improved reliability through voltage stability, among other benefits, (2) offer a means of data logging, or (3) both. This modular device may be fabricated from pre-assembled components, which may be attached in a modular fashion, and which may be selected from various combinations to provide desired functionality. Moreover, any energy storage component may include at least one high temperature rechargeable energy storage (HTRES) described herein, wherein any HTRES may comprise at least one high temperature ultracapacitor (HTUCap) described herein.

The modular architecture of the MSID improves the ease of manufacturability, and as such, affords an accelerated rate of manufacture of the systems of the present invention, and therefore reduces cost of production. In addition, the modular architecture of the MSID improves the ease of adding functionality as well as serviceability, which serves to reduce cost of maintenance or upgrading of functionality. Modularity also serves to reduce the design and debug cycle as circuits can be rapidly connected and disconnected for analysis. Within the framework of the modular systems described herein, new designs and functionality may quickly be added without the need for substantial changes in wiring, dimensioning, or circuit board layout.

The modular design comprises several aspects of modularity. A system of the present invention may comprise at least one, for instance, two modules, each designed to perform a certain function or to provide a certain aspect, and the modules may comprise distinct housings, and they may interface with each other at a connector interface. In some embodiments, said connector interface comprises a connector housing and a connector comprising one of pins or receptacles. In some embodiments various modules are configured to connect with each other by way of mating connectors. In some embodiments one module comprises an MSID comprising power system components and/or data system components, e.g. circuits and another module comprises an HTRES and a housing, e.g. wherein said HTRES comprises at least one ultracapacitor, e.g. an ultracapacitor string.

The modular design of the MSID derives at its core the use of a particular circuit board architecture, starting from the reduced sized circular circuit boards, that are electrically connected by stackers that afford a uniformity and modularity, wherein electrical communication is funneled through a modular bus, which in certain embodiments is connected to a junction circuit board that may aid in relating the MSID to external devices, the functions of each circuit may be locally controlled by a supervisor, which can simplify the interface between circuits interfacing the modular bus, and the total circuit board combination may be contained in a tool string space efficient housing designed to incorporate the MSID, or the MSID and any HTRES of a power system.

Circuit boards may comprise digital supervisors for simplifying or otherwise aiding the modular bus. For instance, a circuit designed for a certain function may comprise components not easily adaptable to a standard assignment of signals on pins of a modular bus or several different circuits may comprise components that are not easily adaptable to one another on a shared modular bus. A digital supervisor disposed on circuit boards interfacing a modular bus may serve to adapt said components to the shared modular bus. Specifically, and by way of example, digital supervisors may be assigned a digital identification and establish a shared communication on a modular bus. Digital supervisors may receive instructions from other supervisors or from another controller and control the function of their respective circuits accordingly. As another example, digital supervisors may interrogate or measure an aspect of their respective circuits and report that information to the shared modular bus as a digital signal. Examples of digital supervisors include microcontrollers, for instance the 16F series available from Microchip Technology Inc.

The modular signal interface devices of the present invention, useful in power systems and/or data interfaces for data logging, may be comprised of the following components:

1. Circuit Boards

The modular design of the MSID generally incorporates circular shaped circuit boards, which allow for an increase in (or maximization of) circuit/power and signal density compared to that for common rectangular designs would provide for in a cylindrical volume, i.e., the cylindrical housing. These circuit boards are generally made of high temperature laminate (e.g. p95/p96 polyimide) with a high glass transition temperature (e.g. $T_g=260°$ C.) to ensure structural integrity at the operating temperature (125° C.-150° C.). In addition, the boards may contain (4 or more) layers of copper to improve thermal performance.

2. Stackers

In certain embodiments, the modular architecture utilizes board stackers as bus connectors, comprising headers and receptacles, as shown in FIG. 32, which provide a way of easily and conveniently electrically connecting and disconnecting circuit boards. The stackers are topologically positioned in the circuit architecture to afford alignment and repeatable positioning of the top and bottom stackers, such that all circuits abiding by the modular architecture are mechanically compatible and fit together. Moreover, the stackers are selected based on their utility at temperatures greater than 75 degrees Celsius, e.g., greater 125 degrees Celsius, e.g., greater than 150 degrees Celsius, and their ability to establish contact with the mating pin of the header without loss of structural strength, e.g., by the engagement of a spring clip or twist pin or the like into the mating receptacle. In a particular embodiment, the stackers are metallic and configured to provide structural strength when subjected to mechanical vibration and shock in addition to heat, as is the case in a downhole drilling. In specific embodiments, the stacker connection apparatus is miniature to match relatively smaller sized circuit boards.

In addition, in certain embodiments, electrical redundancy is employed to mitigate the effects of a disconnection if one were to occur. In particular embodiments, the power lines have multiple redundant lines in the stackers. For instance, the capacitor string connection to the electronics may be carried over two pins for increased reliability, and reduced line resistance resulting in less energy loss and greater peak power.

With respect to firmware, communication is also made possible by the stacker hardware. Because of the limited amount of space there are many communication protocols that would be unsuitable for architecture due to the requirement of many lines to communicate. In certain embodiments, the communication protocol that is incorporated in the MSID comprises a synchronous communication protocol that utilizes four lines that can address an unlimited number of peripherals: (1) Data: Binary signal; (2) Clock: Used to trigger data capture on the data line; (3) Poll: An additional signal to control data direction and simplify hardware; and (4) Ground: System-wide node common to all circuits.

In addition, in certain embodiments, the MSID is configured with standoffs disposed between the circuit boards for increased structural integrity. Generally, the standoff supports provide a rigid support maintaining spacing between each circuit. Each of the standoff supports may be fabricated from materials as appropriate, such as metallic materials and/or insulative materials, such as forms of polymers.

In some embodiments, circuits of the present invention may be circular. In some embodiments, circuits of the present invention may be stackable. In some embodiments, circuits of the present invention may be stacked. In some embodiments, circuits of the present invention may be circular and stackable and/or stacked.

3. Junction Circuit Board

Furthermore, in certain embodiments, the MSID comprises a junction circuit board, which eases manufacturability and serviceability and may provide electrical protection. The junction circuit board can provide for electrically connecting circuit boards to end connectors of the power system or the data logging system. The junction circuit board may also connect the end connector wires or other wires to stackers that allow these signals to be accessed by the modular circuit boards. Through the use of the junction circuit board and the modular architecture of the stackable circuits, circuits can be quickly detached from the system, and replaced, if necessary.

The junction circuit board also reduces the amount of cumbersome butt joints previously necessary in such electrical connections In this respect, prior to the junction circuit board and modular architecture, all wiring needed to pass through all circuit boards, a very delicate and tedious process, resulting in reduced usable surface area, decreased yield or quality of manufacturing and decreased reliability as well as longer manufacturing times.

In certain embodiments, the junction circuit board also includes ESD protection (TVS Diode and RC snubber) to protect the sensitive nodes of the electronics. The junction circuit board may also be used to facilitate programming of the any individual circuits attached on the bus by multiplexing the programming lines and keeping the high voltage programming line separate.

The supervisor component can relate protocol commands to and from the additional circuit boards connected to the junction circuit board.

4. System Housing

The housing that contains the MSID for use with downhole electronics may be disposed inside the tool string. While the housing may be any shape suitable for disposition of the systems of the invention, in certain embodiments, the housing is circular an conforms to the diameter of the circular circuit boards described herein. Advantageously, the present systems of the present invention, e.g., power systems or data logging systems, are positioned in a housing that takes less of the valuable space in the tool string as compared with existing systems used for the same purpose. Such additional space efficiency derives from the higher power and/or signal density achieved with the circuits and architecture that comprise the MSID; wherein the decreased inner diameter of the housing affords the ability to reduce the outer diameter housing while retaining sufficient thickness of the housing material; wherein such reduction in size of the operable circuits involved significant inventive design of the circuits. However, additional embodiments of housing improvements, including increases to modular aspects of the housing for ease of serviceability and manufacture are shown herein below.

System Components

In one embodiment, the system of the present invention comprises a modular signal interface device (MSID) configured as a component of a power system. In one example, the MSID may comprise various circuits. Non-limiting examples include a junction circuit, at least one sensor circuit, an ultracapacitor charger circuit, an ultracapacitor management system circuit, a changeover circuit, a state of charge circuit, and an electronic management system circuit.

In one embodiment, the MSID comprises a junction circuit, an ultracapacitor charger circuit, an ultracapacitor management system circuit, a changeover circuit, a state of charge circuit, and an electronic management system circuit.

In one embodiment, the MSID further comprises modular circuit boards. In further embodiments the modular circuit boards are circular. In further embodiments, the modular circuit boards are stacked. In further embodiments, the modular circuit boards are circular and stacked.

In certain embodiments, the power source comprises at least one of a wireline power source, a battery, or a generator.

In certain embodiments, the power source comprises at least one battery. In this embodiment, the MSID may further comprise a cross over circuit, particularly when the power source comprises more than battery. In particular embodiments, the MSID further comprises a state of charge circuit board.

In certain embodiments, the power source comprises a wireline, and at least one battery, e.g., a backup battery. In this embodiment, the MSID may further comprise a cross over circuit. In particular embodiments, the MSID further comprises a state of charge circuit.

In certain embodiments, the power source comprises a generator.

In certain embodiments, the power source comprises a generator, and at least one battery, e.g., a backup battery. In this embodiment, the MSID may further comprise a cross over circuit. In particular embodiments, the MSID further comprises a state of charge circuit.

In certain embodiments, the circuit boards may be combined to provide multi-functional circuit boards.

In certain embodiments, the MSID comprises a power converter. In further embodiments said power converter is a switched-mode power converter. In some embodiments, said power converter is regulated by way of feedback control. Examples of power converters include inductor-based converters, for example, buck, boost, buck-boost, cuk, forward, flyback, or variants or the like as well as inductorless converters such as switched capacitor converters.

By using switched mode power conversion, power systems of the present invention generally achieve efficiencies greater than 60%, e.g. greater than 70%, e.g. greater than 80%, e.g. greater than 90%, e.g. greater than 95%.

By using regulated power converters, power systems of the present invention afford regulated aspects of voltage, current and/or power. By using power converters, power systems of the present invention afford transformations of power, voltage and/or current.

1. Ultracapacitor Charger (UCC)

In certain embodiments, the MSID comprises a power converter. In further embodiments, the power converter is a UCC circuit. The UCC circuit features high temperature operation, e.g., greater than 75 degrees Celsius, e.g., greater than 125 degrees Celsius, e.g., 150 degrees Celsius, adjustable charge current control, redundant over voltage protection for the capacitor bank, and a wide input/output voltage range. In certain embodiments, the controller IC uses current mode regulation to mitigate the effect of the art-known right half plane (RHP) zero on output voltage during load transients. In this respect, the UCC circuit of the present invention provides an optimal range of operation whereby the converter is charging at a calibrated duty cycle to minimize overall losses, e.g., wherein the bus voltage is optimized.

In certain embodiments, the UCC circuit uses switch mode power conversion, wherein at low ultracapacitor charge, the IC uses the more efficient, i.e., less lossy, current mode control, and subsequently switches to voltage control mode at greater levels of ultracapacitor charge storage where such switching would result in more efficient charging of the ultracapacitor.

In certain embodiments, the MSID affords input current shaping, e.g., in applications where continuous and steady current draw from the energy source is desirable or a particular pulsed profile is best. In particular embodiments, such current shaping prevents undesirable electrochemical effects in batteries such as cathode freezeover effects or passivation effects.

In certain embodiments, the MSID affords input current smoothing, e.g., in applications where continuous and steady current draw from the energy source is desirable. In particular embodiments, such current smoothing reduces conduction losses in series resistances.

In certain embodiments, wherein the UCC circuit is operating in constant voltage mode, the UCC is capable of supplying a constant voltage in the event of a capacitor string disconnection. For example, the UCC can continue to source power into the load at a lower level.

In one embodiment, the UCC controller is implemented digitally. The advantages of such a system include component reduction and programmability. In certain embodiments, the control of the switch network is performed by a microcontroller/microprocessor.

In one embodiment, adjustable current may be established digitally with a Pulse Width Modulated (PWM) control signal created by a supervisor and a low pass filter to produce an analog voltage that the controller IC interprets as the controller IC does not communicate digitally. The controller IC is configured to regulate output current, e.g., the ultracapacitor charge current. Through control of the charge current, the UCC circuit is capable of regulating the voltage on the ultracapacitors, e.g. by hysteretic control wherein the voltage is kept within a voltage band by on-off control of the IC.

The UCC circuit, in certain embodiments, may be digitally controlled. In further embodiments, the UCC circuit is digitally controlled by the electronics management system (EMS). In further embodiments, the UCC circuit can enter sleep mode to conserve energy and this aspect may be provided for by a digital control.

The UCC controller can also be implemented in an analog fashion. In such a configuration, the feedback control would generally be carried out with the use of components such as operational amplifiers, resistors, and capacitors. While effective, a minor disadvantage of this configuration is the inherent lack of flexibility controlling charge current and output voltage.

In certain embodiments, the controller integrated circuit (IC) at the center of the Ultracapacitor Charger (UCC) is electrically connected by modular bus stackers to and programmed to communicate with the junction circuit, the EMS circuit, cross over circuit, and/or one or more energy sources (such as battery, generator, or wireline). The UCC circuit may also comprise a resistor network for voltage sampling, a step down power section (e.g., a Buck converter), a step up power section (e.g., a boost converter), an inductor current sense resistor required for current mode control, and/or a charge current sense resistor required for regulating the charge current.

In certain embodiments, a power converter for charging an ultracapacitor is controlled hysteretically. For example, a charging current is regulated by the converter and a feedback control circuit. A voltage of an ultracapacitor is measured by the power converter or a supervisor or the like. The power converter may be disabled for instance when a voltage on an ultracapacitor reaches a certain threshold. Alternatively, the charging current may be reduced when the voltage reaches a certain threshold. In this way, various benefits may be realized. First, a voltage set point and hysteresis band may be set in firmware or software, i.e. digitally, without a redesign of feedback control circuitry, e.g. redesign that may otherwise be required for stability and dynamics. Thus, the output voltage is easily adjusted by a user or by a controller, e.g. in run-time. Second, whereas an efficiency of charging an ultracapacitor will generally be improved by limiting or regulating a charging current, and many loads expect a voltage within a range to operate properly, a controller having a feedback control for regulating a charging current may be used to provide for a voltage chosen to fall within a range to operate a load properly.

2. Cross Over (XO) Circuit

In certain embodiments, the cross over circuit is a peripheral circuit board that can seamlessly be added into the modular architecture through stackers electrically connected and controlled by the junction circuit board to enable the use of multiple power sources. Along with the UCC circuit, the cross over circuit possesses autonomous capability.

In one embodiment, the cross over circuit can be preprogrammed to switch from one power source to another after the initial source has been depleted.

In another embodiment, the cross over circuit has the ability to parallel two sources together and to either increase the power capable of being delivered to the load, or to extract the very last remaining energy of the individual power sources where the individual, nearly depleted sources could not deliver enough power to drive the load alone.

The cross over circuit, in certain embodiments, may be digitally controlled by the electronics management system (EMS) and can enter sleep mode to conserve energy.

The cross over circuit may comprise a supervisor, and in certain embodiments is electrically connected by the modular bus stackers to, and programmed to communicate with: the junction circuit, the EMS circuit, state-of-charge circuit, and/or one or more energy sources (such as battery, generator, or ultracapacitor string) through the supervisor of the circuit. The cross over circuit may also comprise a current sense resistor; a resistor network for voltage sampling; a current sense resistor for state-of-charge measurements; a unidirectional primary disconnect that allows the BUS voltage to be bootstrapped to the primary source, where power is initially processed through a low forward voltage diode in parallel with the p-channel MOSFET to reduce dissipation during the bootstrapping operation and once voltage is established on the bus, the primary disconnect may be turned on (the p-channel MOSFET is enhanced) by a resistor-diode network and n-channel MOSFET; a bidirectional secondary disconnect that processes power from the secondary source to the BUS, where the secondary disconnect, unlike the primary disconnect, can fully disconnect the secondary source from the BUS; a resistor-diode network for biasing the gate of the p-channel MOSFET, sized to allow for low voltage disconnect operation (resistor divider) and high voltage disconnect operation (diode clamps the gate voltage to a safe operating voltage); and/or a bleed resistor to ensure the n-channel MOSFET is turned off in the absence of a control signal.

3. State of Charge (SoC) Circuit

In certain embodiments, the SoC circuit serves to provide for an estimate of the remaining and/or used capacity of a given energy source. This circuit can combine measured current, temperature, the time domain shape of the current profile, and can produce a model to determine the remaining runtime for a given energy source.

Measurement of current is an important factor in determining the service time of an energy source, in particular, a battery. As such, in certain embodiments, current may be measured using an off-the-shelf IC that serves as a transconductance amplifier. In certain embodiments, current may be measured using Hall Effect sensors/magnetometers, inductive sensors, magnetic sensors, or high-side or low side current sense resistors Temperature may be measured using a resistance temperature detector (RTD), a resistor with a large temperature coefficient, (temperature dependent resistance). The resistance is read through the use of a resistor divider tied to the output pin of a microcontroller. The resistor divider is pulled up to 5V when a measurement is to be taken. Turning the resistor divider on and off saves power and reduces self-heating in the resistance. Other methods of measuring temperature include use of bi-metallic junctions, i.e. thermocouples, or other devices having a known temperature coefficient transistor based circuits, or infrared detection devices.

These measurements can be used as inputs to a given model describing the behavior of a given energy source over time. For instance, great variations in battery current have been shown to reduce the rated capacity of a Li-SOCL2 battery. For this battery chemistry, knowledge of the current profile would be useful in determining the remaining capacity of the battery.

The state of charge circuit may comprise a supervisor, and in certain embodiments is electrically connected by the modular bus stackers to, and programmed to communicate with: the junction circuit, the EMS circuit, the cross over circuit, and/or one or more energy sources (such as battery or ultracapacitor string) through the supervisor of the circuit. The state of charge circuit may also comprise an external comm bus implemented with pull up resistors; a voltage regulator used to establish an appropriate voltage for the supervisor and other digital electronics; a current sense circuit; unidirectional load disconnect, wherein a p-channel MOSFET is enhanced via a control signal to the pulldown n-channel MOSFET and a resistor divider ratio is chosen to allow proper biasing of the p-channel MOSFET at low voltage levels, while the zener diode serves to clamp the maximum source-gate voltage across the MOSFET; and/or resistor divider networks and ADC buffer cap necessary for analog voltage reading 4. Ultracapacitor Management System (UMS) Circuit In certain embodiments, the MSID comprises an ultracapacitor management system (UMS) circuit. The ultracapacitor management system circuit has the primary purpose of maintaining individual cell health throughout operation. The UMS circuit may measure individual cell voltages or voltages of a subset of cells within a string and their charge/discharge rates. The UMS circuit supervisor uses these parameters in order to determine cell health which may be communicated to the electronics management system (EMS) circuit to be included in optimization algorithms and data logs.

Additionally, in certain embodiments, the UMS circuit is responsible for cell balancing and bypassing. Cell balancing prevents ultracapacitors from becoming overcharged and damaged during operation. Cell bypassing diverts charge and discharge current around an individual cell. Cell bypassing is therefore used to preserve efficient operation in the event that a cell is severely damaged or exhibiting unusually high equivalent series resistance (ESR).

The UMS circuit is capable of determining individual cell health through frequent cell voltage measurements and communication of the charge current with the EMS. The cell health information may be relayed to the EMS circuit over the modular communication bus, e.g., through the modular bus stackers. The cell health information can then be used by the EMS circuit to alter system behavior. For example, consider that the EMS circuit is supporting high output power to a load by regulating to a high output capacitor voltage. If however, the UMS circuit reports that one or multiple ultracapacitors are damaged, the EMS can choose to regulate to a lower output capacitor voltage. The lower output voltage reduces output power capabilities but helps preserve ultracapacitor health.

As such, in one embodiment, the UMS circuit offers a convenient method to independently control cell voltage levels while monitoring individual and ultracapacitor string cell health.

In certain embodiments, as shown in FIG. 33, the supervisor of the UMS circuit may communicate to the UMS core via an internal circuit communication bus. In this example, data and command signals are transferred over the internal communication bus. The supervisor controls the UMS core to measure each cell voltage. Depending on the state of charge, the supervisor commands the UMS core to balance each cell. In particular embodiments, the balance time and frequency is controlled via the supervisor to optimize cell health and to minimize heat increases that may arise during balancing. Cell health may be monitored by the supervisor and communicated by the supervisor to the EMS circuit via the modular bus. Additionally, in certain embodiments, through the use of external devices, e.g. MOSFETs, the supervisor can decide to bypass a given cell.

The UMS Core has circuitry that enables measuring the voltage of individual cells. Additionally, the UMS core is capable of removing charge from individual cells to reduce the cell voltage. In one embodiment, the UMS core balances individual cells by dissipating the excess energy through a passive component, such as a resistance. In another embodiment, charge can be removed from one cell with high voltage and transferred to another cell with low voltage. The transfer of charge can be accomplished through the use of external capacitors or inductors to store and release excess charge.

In certain embodiments, since cell balancing and monitoring does not have to occur continuously, i.e., at all times, the UMS circuit may enter a low power sleep state. For instance, an EMS circuit may control the UMS circuit via the modular communication bus so that: (1) when not in use, the UMS circuit can go to a low power consumption mode of operation and (2) when called upon, the EMS circuit can initiate cell monitoring and balancing via the UMS supervisor.

In certain embodiments, the modular bus enables bi-directional communication between the UMS circuit supervisor, EMS circuit, and other supervisor nodes on the communication bus. As shown in FIG. 33, power to the UMS circuit supervisor may also be provided through the modular bus.

In certain applications, balancing circuitry may automatically balance a cell when the cell voltage exceeds a set voltage. This behavior affords the capability to perform real-time adjustments to the ultracapacitor string voltage. An UMS circuit may be configured to communicate on the modular bus thereby enabling real-time updates to cell balancing behavior. In addition, communication on the modular bus enables data to be stored external to the UMS circuitry. This modularity enables the UMS circuit to have a wide range of applications.

In certain embodiments, the supervisor and modular bus allow for changes in the ultracapacitors and system requirements, such as logging resolution and lifetime, without requiring extensive revisions to UMS circuitry.

In certain embodiments, the cell health information can be stored locally on the UMS circuit or stored by the EMS after transmission over the modular bus. The cell information can be useful in determining whether a bank of ultracapacitors needs to be replaced after usage or whether service is required on individual cells.

In certain embodiments, when a cell experiences a high voltage, the UMS circuit is capable of discharging that cell to a lower voltage. By discharging the cell to a lower voltage, cell lifetime is improved. Maintaining balanced cell voltage over the entire string improves optimizes lifetime of the capacitor string.

In certain cases, discharging a cell produces excess heat that can damage surrounding electronics. Furthermore, it is often advantageous to control the discharge current from a cell in order to prevent damage to the cell or excess thermal losses. As such, in certain embodiments, the UMS circuit is capable of controlling the discharge current profile, by distributing discharge currents across a widely separated circuit area, enabling improved thermal management and cell health. For example, heat caused by a discharging event is often localized to a section of the UMS circuit. If multiple cells need to be balanced, it is advantageous in order to reduce temperature increases not to balance cells that would cause temperature increases in adjacent location on the UMS circuit. Therefore, the UMS circuit manages temperature increases by selecting which cells to balance based on their spatial location on the UMS circuit. These features may be managed my a supervisor and additionally may be managed by an EMS and/or a combination of the above.

In certain embodiments, the UMS circuit also manages temperature increases during balances by controlling the time of discharge. For example, instead of constantly discharging an ultracapacitor until the desired cell voltage is met, the supervisor chooses to start and stop charging periodically. By increasing the duty cycle between discharge events, temperature increases caused by cell discharge current can be mitigated.

In certain embodiments, a damaged cell may exhibit a decreased capacitance compared to surrounding cells. In this case, the cell will exhibit higher charge and discharge rates. Normal balancing operations will mitigate any damage to the cell in this case. Similarly, in certain embodiments, a cell may exhibit increased leakage current, causing a constantly dropping cell voltage. A decreased voltage on a cell will require other cells to maintain a higher average voltage. Again, normal balancing operations will mitigate damage to cells in this case.

In certain embodiments, a cell may be damaged to the point where it exhibits very high ESR, degrading the power handling of the entire capacitor string. In these cases, typical balancing operations will not fix the problem. At this juncture, the UMS circuit can choose to bypass any given cell. Cell bypassing may be achieved via nonlinear devices such as external diodes that bypass charge and discharge current, such that every other cell must store a higher average voltage. However, power handling capability of string is maintained.

In certain embodiments, where there are multiple batteries and/or ultracapacitors connected in series or parallel series, it is important to both monitor and balance the state of charge of individual cells. The UMS circuit comprises of necessary circuitry to monitor and balance a string of ultracapacitors while including additional functionality to improve efficiency, system health, and thermal management.

The UMS circuit in certain embodiments comprises a supervisor, is electrically connected by the modular bus stackers to, and programmed to communicate with: the junction circuit, the EMS circuit, the state of charge circuit, the cross over circuit, or other circuits in the MSID, and/or one or more energy sources (such as a battery, wireline or generator). The UMS circuit may also comprise an integrated circuit (IC) or controller for performing the functions of the UMS, switch devices such as transistors or diodes, and various ancillary components. The IC may be selected from off-the-shelf monolithic control IC's.

5. Electronics Management System (EMS) Circuit

In certain embodiments, the MSID comprises an EMS circuit. The EMS circuit is a multifunctional device capable of one or more of the following: collecting and logging data of system performance and environment conditions; managing other circuits; and communicating to external systems for programming and data transmission.

In certain embodiments, the EMS circuit hardware is tightly integrated with surrounding hardware, enabling the control and monitoring of total system behavior. The hardware may be complemented by intelligent firmware that manages the operation of several other microcontrollers, using external sensors and communication between the microprocessors to intelligently optimize system performance. The effect is an extremely versatile and capable system, one that can adapt in real-time to changes in the environment and requirements.

In certain embodiments, the EMS circuit collects and logs data of system performance and environmental conditions. The EMS circuit, e.g., via the EMS circuit supervisor, is responsible for recording sensor data directly from external sensors and through communication over the modular bus from other circuits. This data may be used to evaluate system performance for optimization. In general, significant events may also be logged for later evaluation.

In certain embodiments, the EMS circuit manages surrounding circuits for optimal system performance. For example, the EMS circuit may control the UCC circuit charging current. The charging current may be selected based on the data collected throughout the system through sensors and communication with the circuits. The EMS circuit can also put various circuit components into a low power sleep state to conserve power when possible.

In certain embodiments, the EMS circuit communicates to external systems for programming and/or data transmission. The external communication bus on the EMS circuit enables communication to outside hardware and software. This connection enables the EMS circuit to be reprogrammed while disposed in the system. The EMS can then reprogram other supervisors or direct other supervisors on their operation, effectively reprogramming the entire system. The external communication bus is also used to transmit data logs from internal memory to external software. In this way, data can be collected during operation and analyzed post-operation by external equipment, e.g., an external PC.

In one embodiment, the Electronics Management System (EMS) circuit serves to collect information from available supervisors and sensors and dependently control system behavior. The EMS also provides an interface to external electronics, such as PC software or firmware programmers. Through the external communication bus, it is possible to program the EMS circuit core, e.g., the EMS circuit supervisor, and consequently all other supervisors connected to the EMS circuit.

The EMS circuit core may be comprised of one or more digital circuits, e.g., microcontrollers, microprocessor, or field-programmable gate array (FPGA) units. In certain embodiments, the EMS circuit core is connected to a load connect/disconnect circuit that allows the ultracapacitor string to be connected or disconnected to an external load. The capacitor string may be disconnected from the load if, for example, the capacitor string voltage is too low or too high for the particular load. During normal run-time operation, the load is connected to the ultracapacitors through a load driver circuit.

In certain embodiments, the EMS circuit is connected to additional sensors that are not interfaced to other supervisors. These sensors may include one or more of the group consisting of a temperature sensor, a load current sensor, an input battery current sensor, an input voltage sensor, and a capacitor string voltage sensor.

Through the modular bus, the EMS circuit may be connected to other circuits. The communication bus may comprise data line, a clock line, and an enable line. In some embodiments, supervisors interface to the data, clock, and enable lines. Furthermore, each supervisor can be prescribed an identification address.

In one embodiment, to communicate over the internal communication bus, the EMS circuit, as shown in FIG. 35, activates the enable line and sends over the data and clock lines the identification address of the target supervisor followed by the desired data command instructions. When the supervisors see the enable line activated, each supervisor will listen for its prescribed identification address. If a supervisor reads its identification address, it will continue to listen to the EMS circuit message and respond accordingly. In this way, communication is achieved between the EMS circuit supervisor and all other supervisors.

In certain embodiments, the EMS circuit interfaces with the UCC circuit and controls the UCC circuit charge current. The charge current is controlled to regulate the output ultracapacitor voltage. Feedback control and/or heuristic techniques are used to ensure safe and efficient operation of the electronics, ultracapacitors, and input battery stack.

In certain embodiments, the EMS circuit interfaces with the cross over circuit to record and potentially control the battery connection state. The state of the cross over circuit and crossover events may be logged via the EMS and internal/external memory.

In certain embodiments, the EMS circuit interfaces with the UMS circuit in order to monitor and log cell health and/or discharge events.

In certain embodiments, the EMS circuit is capable of bringing supervisors into a low power state to decrease power consumption and optimize run-time behavior.

As described herein, the EMS circuit has a unique hardware structure that allows communication to and from a large variety of sensors, lending itself to a variety of advantages that generally serve to optimize one or more performance parameters, e.g., efficiency, power output, battery lifetime, or capacitor lifetime.

The EMS circuit in certain embodiments comprises a supervisor, is electrically connected by the modular bus stackers, and programmed to communicate with: the junction circuit, the UMS circuit, the state of charge circuit, the cross over circuit, and/or one or more energy sources (such as battery or ultracapacitor string) through the supervisor of the circuit. The EMS circuit may also comprise at least one digital controller, e.g. a microcontroller, a microprocessor, or an FPGA, and various ancillary components.

6. Load Driver Circuit

In certain embodiments, an MSID may comprise a load driver circuit.

For embodiments of the present invention wherein the power system may provide power for relatively high energy applications (e.g., driving a solenoid based or motor-based mud pulser, an EM transmitter, or a motor drive for extended periods of time), the MSID may comprise a load driver circuit. The load driver circuit, in certain embodiments, acts as a power converter that may provide an aspect of regulation, for instance voltage regulation of the output of a power system despite another widely varying voltage aspect. For example, when a power source is intermittent, e.g. it provides power for several minutes and then ceases to provide power for several minutes, a power system may be required to provide power to a load when the power source is not providing power. In this example, a HTRES may provide the stored energy for the supply of power during the period when the power source is not providing power. If the HTRES is a capacitor, for instance an ultracapacitor, a limited energy capacity of said HTRES may lead to a widely varying voltage of said HTRES during a period when the power system is providing power to a load, but the power source is not providing power. A load driver may be employed in this example to provide for a regulated load voltage despite the widely varying HTRES voltage. The load driver may function as a power converter so that it processes the power drawn from said HTRES and delivered to said load and so that it also incorporates said regulation aspects, i.e. a regulated power converter, in this example, an output voltage regulated power converter. Generally a regulation aspect is enabled by art-known feedback regulation techniques.

In certain embodiments, the controller integrated circuit (IC) at the center of the load driver circuit is electrically connected by modular bus stackers to and programmed to communicate with the remainder of the MSID. For example, in certain embodiments, the remainder of the MSID may comprise various circuits. Non-limiting examples include a junction circuit, at least one sensor circuit, an ultracapacitor charger circuit, an ultracapacitor management system circuit, a changeover circuit, a state of charge circuit, and an electronic management system circuit.

In one embodiment, the MSID further comprises modular circuit boards. In further embodiments the modular circuit boards are circular. In further embodiments, the modular circuit boards are stacked. In further embodiments, the modular circuit boards are circular and stacked.

In certain embodiments, the power source comprises at least one of a wireline power source, a battery, or a generator.

In certain embodiments, the power source comprises at least one battery. In this embodiment, the MSID may further comprise a cross over circuit, particularly when the power source comprises more than battery. In particular embodiments, the MSID further comprises a state of charge circuit board.

In certain embodiments, the power source comprises a wireline, and at least one battery, e.g., a backup battery. In this embodiment, the MSID may further comprise a cross over circuit. In particular embodiments, the MSID further comprises a state of charge circuit.

In certain embodiments, the power source comprises a generator.

In certain embodiments, the power source comprises a generator, and at least one battery, e.g., a backup battery. In this embodiment, the MSID may further comprise a cross over circuit. In particular embodiments, the MSID further comprises a state of charge circuit.

In certain embodiments, the circuit boards may be combined to provide multi-functional circuit boards.

The load driver circuit features high temperature operation, e.g., greater than 75 degrees Celsius e.g., greater than 125 degrees Celsius, e.g., 150 degrees Celsius, and may comprise any of an adjustable charge current control, redundant over voltage protection for the capacitor bank, and a wide input/output voltage range, and voltage mode regulation.

In certain embodiments, the load driver charges a capacitor, e.g. an ultracapacitor. In these embodiments, an adjustable current may be established digitally with a Pulse Width Modulated (PWM) control signal created by a supervisor and a low pass filter to produce an analog voltage that the controller IC interprets as the controller IC does not communicate digitally. The controller IC is configured to regulate output current, e.g., the ultracapacitor charge current. Through control of the charge current, the UCC circuit is capable of regulating the voltage on the ultracapacitors, e.g. by hysteretic control wherein the voltage is kept within a voltage band by on-off control of the IC.

The load driver circuit, in certain embodiments, may be digitally controlled. In further embodiments, the load driver circuit is digitally controlled by the electronics management system (EMS). In further embodiments, the load driver circuit can enter sleep mode to conserve energy and this aspect may be provided for by a digital control.

The load driver controller can also be implemented in an analog fashion. In such a configuration, the feedback control would generally be carried out with the use of components such as operational amplifiers, resistors, and capacitors. While effective, a minor disadvantage of this configuration is the inherent lack of flexibility controlling charge current and output voltage.

In certain embodiments, the controller integrated circuit (IC) at the center of the load driver circuit is electrically connected by modular bus stackers to and programmed to communicate with the junction circuit, the EMS circuit, cross over circuit, and/or one or more energy sources (such as battery, generator, or wireline). The load driver circuit may also comprise a resistor network for voltage sampling, a step down power section (e.g., a Buck converter), a step up power section (e.g., a boost converter), an inductor current sense resistor required for current mode control, and/or a charge current sense resistor required for regulating the charge current.

In one embodiment, the load driver circuit controller is implemented digitally. The advantages of such a system include component reduction and programmability. In certain embodiments, the control of the switch network is performed by a microcontroller/microprocessor.

7. Amplifier Circuit

Processing of high power levels often requires very efficient power electronics. Inefficiencies in power electronics result in temperature increases that can damage electronics and ultracapacitors. Therefore, in order to process significant power, high efficiency power electronics are often required. The class D topology, is art-recognized, as designed for high efficiency operation. High efficiency is achieved by running the output transistors in either a fully enhanced or off state. When fully enhanced, the MOSFETs can ideally be considered a short with no internal resistance. In this state, there is high current but no voltage drop over the output transistors, resulting in no power loss. In their off state, the MOSFETs ideally block all current at high voltage, resulting in no power loss. In present embodiment, the MOSFETs are not considered ideal switches, but rather power losses are mitigated through properly chosen switching frequencies and low loss components. The above essentially describes the basic concepts associated with art-recognized switch-mode operation. When switched-mode operation is applied to amplifiers, those amplifiers are often termed class-D amplifiers.

In certain embodiments, a class D Amplifier enables significantly higher power capabilities when compared to existing solutions. In a particular embodiment, the amplifier comprises six main components connected in a Class D full bridge switching amplifier configuration, i.e., also together referred to as a Class D amplifier: (1) High voltage capacitor rail; (2) Modulator; (3) device drivers; (4) Switching Section; (5) Signal low pass filters; and (6) Load impedance.

High Voltage Capacitor Rail

The high voltage capacitor rail supplies a positive rail voltage to the output transistors. In order to deliver significant power to the load, it is important that the high voltage capacitor rail maintain low impedance, minimizing power losses under heavy loads.

Modulator

The modulator has the function of modulating the signal provided to the load. The modulator may function in a number of ways. The modulator may modulate a number of quantities, e.g. power, voltage, current, frequency, and phase.

An example open-loop method for modulating amplitude of the voltage presented to the load includes providing a time-varying analog signal as a time-varying reference input to a pulse-width modulator circuit, e.g. a comparator having two inputs one being said reference, the other being a triangle wave signal oscillating at the desired switching stage switching frequency, the pulse-width modulator circuit providing the pulse width modulated gate driver control signal. By time-varying the reference voltage input to the pulse width modulator circuit, the duty ratio of the gate driver control signal is also varied, the duty cycle of said control signal in turn may control the instantaneous voltage presented to the load.

An example closed-loop method for modulating amplitude of the voltage presented to the load includes providing a time-varying analog signal as a time-varying reference input to a feedback control circuit, the feedback control circuit configured to regulate the voltage presented to the load by various methods known in the art. Generally, the feedback circuit comprises measurement aspects of feedback signals, an error amplifier, a dynamic compensator, a pulse width modulator, a gate driver, which may comprise a dead-time circuit. The dynamic compensator is generally designed to achieve a combination of closed-loop stability and closed-loop dynamics.

Device Drivers

The device drivers generally provide current or voltage amplification, voltage level shifting, device protection and in some cases signal dead time generation in order to properly drive the transistor inputs. Generally device drivers convert a low level control signal to a signal appropriate for controlling a device. Example devices include bipolar junction transistors, MOSFETs, JFETs, Super junction transistors or MOSFETs, silicon-controlled rectifiers, insulated gate bipolar transistors and the like. Gate drivers may be provided as discrete implementations or as off-the-shelf or monolithic integrated circuits.

Switching Section

The switching section comprising generally comprises output transistors switches processes input power to provide a transformed power to the load. An example switching section is configured in a full bridge configuration such that the two of the transistors are on at any given time. In one state, two transistors are on, providing a current flow through the load in one direction. In the other state, the other two transistors are on, providing a current flow through the load in the opposite direction.

Filtering

Each of the transistors are switched a frequency well above the bandwidth of the reference signal. In order to accurately recreate an amplified version of the reference signal over the load, low pass filters are used to filter out the high frequency switching signal, ideally leaving only the low frequency reference signal transmitted through the load. The low pass filters are reactive components to prevent losses that would other occur over resistance components. Filtering between the switching section and the load should pass the frequency content desired in the modulated signal to the load. Meanwhile, the filtering should be band-limited enough to reject unwanted frequency content.

Load

In present invention, the load impedance represents the medium over which the telemetry signal is being transmitted. Load impedances commonly contain high order behavior that determines how the signal will propagate through space. Simple models, however, are represented by a power resistor.

While switching amplifiers may introduce switching artifacts in the output signal, in certain embodiments, these artifacts are minimized through the use of properly selected switching frequencies, and/or well-designed filtering. In a particular embodiment, the output filter preserves signal integrity by severely attenuating switching artifacts while preserving the information contained in the reference signal. The output filter may also contribute minimal power loss through having very low resistance components 8. Sensorless Motor Drive Circuit In harsh environment applications, brushless DC (BLDC) motors have been utilized for a variety of applications, for example, to operate mud pulsers used for downhole Measurement While Drilling (MWD), i.e., providing mud pulse telemetry. However, conventional BLDC motors often include and rely on rotor position sensors. A common example of a rotor position sensor is a Hall effect sensor. Under harsh conditions, i.e. high temperature, high shock and high vibration, e.g., temperatures greater than 70 degrees Celsius, continuous vibration greater than 2 G rms and shock greater than 20 G, rotor position sensors and in particular, Hall Effect sensors of a sensored motor present reliability limitations and are often damaged or fail. In order to address these issues, the present invention provides a sensorless BLDC motor drive that may operate either a sensorless brushless DC (BLDC) motor or a retro-fitted sensored BLDC (e.g., one with either working or failed sensors) by using electronic commutation of a 3-phase BLDC (i.e., "wye") motor, wherein the BLDC motor drive is configured to operate the BLDC motor according to a sequential commutation algorithm.

Coupling the motor drive disclosed herein with a power system also described herein can lead to a number of benefits. For example, a power system for high power applications coupled to the motor drive may be used to drive a mud pulser harder, which translates to sharper pressure pulses and potentially faster data rates for transmission to the surface, e.g., up to twice the data rates while maintaining battery life and without compromising signal integrity, e.g., using mud pulse telemetry.

The configuration eliminates the use or need of Hall Effect sensors in downhole brushless DC motor drives; where the BLDC motor drive described herein enables the use of a reliable brushless DC motor in a downhole environment. Moreover, at least five required wires (5V, GND, H1, H2, H3) present on a conventional sensored BLDC motor can be eliminated, thereby increasing reliability, and reducing complexity.

As such, another power system embodiment of the invention provides a power system adapted for buffering the power from a power source comprising: a high temperature rechargeable energy storage (HTRES), e.g., an ultracapacitor string organized in a space efficient orientation as described herein, an optional load driver circuit, a sensorless brushless DC motor drive circuit, and a controller for controlling at least one of charging and discharging of the energy storage, wherein the system is adapted for operation in a temperature range of between about seventy five degrees Celsius to about two hundred and ten degrees Celsius; and wherein the load comprises a brushless DC motor, e.g., a sensorless BLDC motor. In certain embodiments, the controller is an MSID of the present invention.

Accordingly, in another embodiment, the invention is directed to a sensorless brushless DC motor system comprised of a power source a high temperature rechargeable energy storage (HTRES), e.g., an ultracapacitor string (e.g., of 1-100 ultracapacitor cells) organized in a space efficient orientation as described herein, an optional load driver circuit, a sensorless brushless DC motor drive circuit, and a controller for controlling at least one of charging and discharging of the energy storage, wherein the system is adapted for operation in a temperature range of between about seventy five degrees Celsius to about two hundred and ten degrees Celsius; and wherein the load comprises a brushless DC motor. In certain embodiments, the controller is an MSID of the present invention.

Moreover, in certain embodiments, the sensorless brushless DC motor drive is configured to receive the filtered motor terminal voltages and compare them pair-wise using comparators whose outputs are utilized to generate commutation control signals. For example, when the positive input of the comparator goes below the negative input, the output of the comparator saturates to the negative power supply rail and to the positive power supply rail if the inputs are interchanged. The state of the rotor position can be determined from the state of the outputs of the outputs of the comparators.

A sensorless brushless DC motor, e.g., a 3-phase motor, may be driven so that its phases are energized based on the position of the rotor. As current passes through a stator coil, magnetic poles are created with polarity according to right hand thumb rule. As shown in FIG. 36, when two phases are energized at the same time, the current flowing in the two phases are in opposite directions to each other with respect to the source. Energized poles formed by the stator coils attract the rotor poles, and as the rotor is approaching those poles the corresponding stator coils may be de-energized and the next pair of coils energized to create rotor motion. When the rotor rotates, the back EMF of the inactive phase forces the comparator outputs to change state that triggers the controller to match the current state in the look up table and then move to the next state.

In certain embodiments, when the motor drive is powered on, an algorithm, such as that shown in FIG. 37, in the sensorless BLDC motor drive identifies the state of the rotor by rotating to a known position. As the rotor moves toward the new position, the movement of the permanent magnets relative to the stator windings generates sufficient back EMF such that the outputs of the comparators become valid. Having valid comparator outputs, the system has valid commutation control signals and can therefore determine both commutation timing and the next energizing step. From this point, the sensorless BLDC is able to continue sensorless operation, whereby the controller is able to look up the next state, for example, in a stored look-up table like the one shown below. Note that the next energizing state depends on the desired rotational direction (clockwise or counterclockwise). Performance is comparable to that for a sensored method in that commutation signals become available immediately after the motor drive is powered on. This eliminates the need for start-up procedures that run the motor in synchronous mode to reach speeds when back EMF can be detected.

TABLE 1

Look Up Table

| State | Current Energizing Step | Counter Clockwise Next Energizing Step | Clockwise Next Energizing Step |
|---|---|---|---|
| 101 | AB | AC | CB |
| 001 | AC | BC | AB |
| 011 | BC | BA | AC |
| 010 | BA | CA | BC |
| 110 | CA | CB | BA |
| 100 | CB | AB | CA |
| 000 | XX | AB | AB |
| 111 | XX | AB | AB |

TABLE 2

Definition of State Bits referenced in the Look up Table: State = (bit 2, bit 1, bit 0)

| | |
|---|---|
| $A_{avg} \geq C_{avg}$ | bit 2 |
| $B_{avg} \geq A_{avg}$ | bit 1 |
| $C_{avg} \geq B_{avg}$ | bit 0 |

Accordingly, in one embodiment, the invention provides a method of operating a sensorless brushless DC (BLDC) motor, e.g., a 3 phase BLDC motor, comprising a sensorless BLDC motor drive control circuit, a rotor, a stator coil, and three comparator outputs of the stator coil, wherein the steps of the method comprise rotating the rotor to align the rotor to one of a set of known states of excitation, which generates control signals at the comparators output; passing current through the stator coil such that only two comparator outputs are energized at the same time creating two phases directed in opposite directions; detecting sufficient back EMF to generate valid commutation control signals to determine both commutation timing and the next energizing step according to the known states of excitation; and performing said next energizing step according to the known states of excitation, such that rotor motion is produced in a single direction.

In a certain embodiment, the known state of excitation is determined by comparison to a predefined standard stored in memory, e.g., locally or remotely, electrically coupled to the sensorless BLDC motor drive control circuit. In certain embodiments, the known states of excitation are as provided in the Look-up Table.

In certain embodiments, the rotor is moved in one direction using the following energizing scheme:

Step 1: First output comparator (A) is driven Positive, Third output comparator (C) is driven negative and Second output comparator (B) is not driven;

Step 2: First output comparator (A) is driven Positive, Second output comparator (B) is driven negative and Third output comparator (C) is not driven;

Step 3: Third output comparator (C) is driven Positive, Second output comparator (B) is driven negative and First output comparator (A) is not driven;

Step 4: Third output comparator (C) is driven Positive, First output comparator (A) is driven negative and Second output comparator (B) is not driven;

Step 5: Second output comparator (B) is driven Positive, First output comparator (A) is driven negative and Third output comparator (C) is not driven;

Step 6: Second output comparator (B) is driven Positive, Third output comparator (C) is driven negative and First output comparator (A) is not driven;

In another embodiment, the invention provides a sensorless brushless DC (BLDC) motor drive circuit comprising a machine-readable medium having instructions stored thereon for execution by a processor to perform a method comprising operating a sensorless brushless DC (BLDC) motor, e.g., a 3 phase BLDC motor, comprising a sensorless BLDC motor drive control circuit, a rotor, a stator coil, and three comparator outputs of the stator coil, wherein the steps of the method comprise rotating the rotor to align the rotor to one of a set of known states of excitation, which generates control signals at the comparators output; passing current through the stator coil such that only two comparator outputs are energized at the same time creating two phases directed in opposite directions; detecting sufficient back EMF to generate valid commutation control signals to determine both commutation timing and the next energizing step according to the known states of excitation; and performing said next energizing step according to the known states of excitation, such that rotor motion is produced in a single direction.

In contrast to sensored BLDC motors and other sensorless operation methods, which have compromised performance at low speeds and start-up, the sensorless BLDC motor, as actuated by the BLDC motor drive of the present invention, affords the same torque even at the start-up and the rotor picks up the speed almost immediately.

In contrast to sensored BLDC motors and other sensorless operation methods, the bi-directional rotation of the sensorless BLDC motor, as actuated by the BLDC motor drive of the present invention, is immediate; which makes it suitable as an MWD tool, where opening and closing of the pressure valve is required.

The present invention, which utilizes only three comparators provides for greater ease of implementation, manufacture, and serviceability as compared with the conventional sensored motor drives currently in use.

The sensorless brushless motor drive, and the associated motor may be used in all applications where BLDC motors are being used, including, but not limited to Automation, Automotive, Appliances, Medical, Aerospace and military applications.

Fabrication of the Systems of the Present Invention
1. Ultracapacitor String

In certain embodiments of the present invention, the HTRES comprises an ultracapacitor string comprised of two or more ultracapacitor cells organized in a space efficient orientation, e.g., 1-100 ultracapacitor cells. The ultracapacitors of the present invention may comprise an ultracapacitor pack wherein the capacitor assembly, e.g., the ultracapacitor string, allows for more cells to be used in a smaller length of housing. In addition, it leaves room for electrical wires to run along the sides of the pack safely with room for potting to secure them in place.

In another embodiment, and as exemplified in FIG. 30, the invention comprises a 3 strand pack assembly of ultracapacitors, e.g., which makes the system easier to assemble because it is easier to weld together cells in a smaller group of cells then to weld one long strand of cells. In certain embodiments, an insulation technique, described herein, provides security from short circuit failures and keeps the system rigid in its structure. In particular embodiments, the potting secures the balancing and system wires in place and protects from unwanted failures, e.g., which is beneficial because more cells can now be fit in the same size ID housing tube (e.g., going from D sized form factor to AA) but in a significantly shorter housing tube.

In one embodiment, the invention provides an ultracapacitor string prepared by connecting ultracapacitors in series to be used in the systems of the invention. In certain embodiments, the cells (e.g., 12 or more) may be insulated with tape, heat shrink, washers, potting compound and/or spacers.

In one embodiment, the cell form factor is AA (~0.53" in diameter) in which 3 strands of equal number of cells are used to minimize the length of the capacitor section. In another embodiment, D cells (~1.25" in diameter) are used, but are connected in one long strand instead of three shorter strands. The insulation and assembly differs slightly for different form factors.

In certain embodiments, the ultracapacitor assembly may also include capacitor balancing wires and system wires. The AA pack allows the balancing wires to be safely wired to each cell and protected by potting and heat shrink. In certain embodiments, heat shrink is applied around each strand, balancing wires and strand, and/or the entire pack of 3 strands of cells. In certain embodiments, potting may then used between each pack of cells inside the heat shrink and between the cells. In particular embodiments, the balancing wires may be positioned in between the void spaces of the AA strands and are encapsulated in the potting. In a specific embodiment, the system wires run along the void spaces between the capacitor strands and do not increase the outermost diameter of the capacitor pack.

In certain embodiments, each cell is insulated with different layers of protection. In certain embodiments, a layer of high temperature insulation tape, such as Kapton tape, may be placed on the top of each cell with the glass to metal seal, so only the pin (positive terminal) is exposed. In certain embodiments, another piece of high temperature insulation tape may be wrapped around the top side edge of the can and folded back onto the top face of the can to hold down the first piece of tape. In a particular embodiment, a high temperature spacer disk (such as Teflon) with the same OD as the can may be positioned around the glass to metal seal pin so only the pin is exposed. In a specific embodiment, the disk sits above the top height of the pin so that when connected in series the cans do not press down onto the glass to metal when stressed but rather on the spacer.

In certain embodiments, as shown in FIG. 29, the capacitors may be connected in series using a nickel or similar tab 202. In certain embodiments, the tab may be welded (resistance or laser) to the positive terminal (usually glass to metal seal pin) of the each capacitor. In certain embodiments, the tab is run through the center of the spacer disk. The tab may be insulated with high temperature tape or high temperature heat shrink except for where it is welded to the positive terminal and the negative terminal of the next can. The tab may be run flat across the spacer disk 203 and then welded to the bottom of the next can (negative terminal). In certain embodiments, the tab is then folded back so the one can is sitting on the spacer of the next and are in the same line. For D sized cells this is continued until all are welded together in one string. For AA cells, as shown in FIG. 30, there are 3 strands with the same number of cells in each. For example, if 12 cells are needed for one system, 3 strands of 4 would be welded together. In a particular embodiment, after welding each strand together they are heat shrunk to stabilize the cells and secure the insulation and tabs.

In certain embodiments, the cell balancing wires may be attached by removing a piece of the heat shrink on each cell and welding the balancing wire to the side of the can. In certain embodiments, after welding the balancing wires, a strip of heat shrink tubing is put around the weld to help secure and protect the wire to the can. The balancing wires may be attached to each can so that they all run along the same side of the can. In a particular embodiment, tape is used to hold the wire in place after welding, and an additional layer of heat shrink can be used to keep all the wires in place and on the same side of the strand of cells. In this embodiment, an added benefit results from putting the three strands together in that the balancing wires can run in between the extra spaces between the cells of different strands and do not increase the pack diameter.

In certain embodiments, the three strands of cells are assembled to keep them all in series. For example, when using 12 AA cells there will be 3 strands of 4 cells each. One strand will have the positive terminal which will connect to the electronic system. The final negative tab of strand one will connect to the positive terminal of strand two, which will be in an opposite direction of strand one and the same will go for strand 3 so that all cells are connected positive to negative. In certain embodiments, all of the balancing wires are connected so they all come out the same end of the capacitor pack to make assembly easier. After welding together all 3 strands of cells a final layer of heat shrink may be used to keep all cells together in one rigid body. In between each cell strand, as well as slightly above the top and bottom of the pack, potting may be used to further protect the cell.

On the outside of the final heat shrink there are a number of system wires that run from end to end. In certain embodiments that use the AA assembly method, the wires have plenty of room to run in between the spaces of the capacitors without increasing the diameter of the pack. The system wires may be run from either of the positive terminal or negative terminal connectors. The wires (both system and balancing) may be connected by using butt joints alongside the cell pack or all can be run to another circuit board sitting near the ultracapacitor pack.

In certain embodiments, in order to limit the excess space in the ultracapacitors the glass to metal seal can be flipped 180 degrees so the pin is outside of the can instead of inside. Reduction of this excess space in the ultracapacitor serves to limit the amount of electrolyte needed inside the capacitor. FIGS. 31A and 31B show how excess space may be limited by flipping the glass to metal seal so that the side with the thicker housing is present on the outside of the cell rather than the inside. Such strategy may be used on any size can with any glass to metal seal that has a body housing that is thicker than the top cover being used in the can.

2. Housing of the Systems of the Invention

Figure 10A:
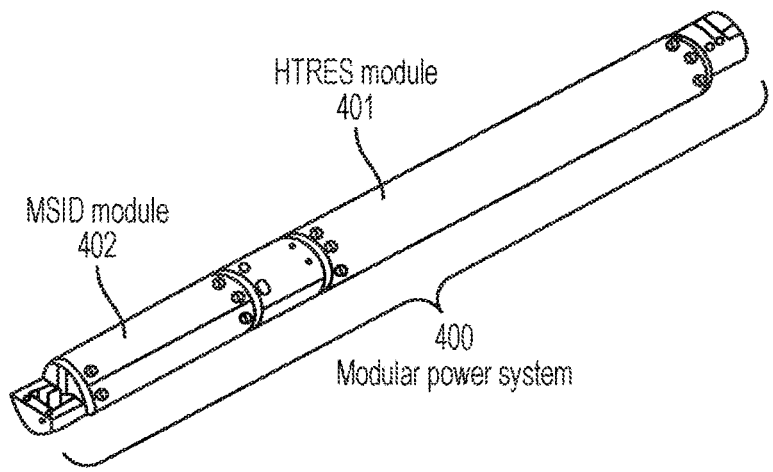
FIGS. 10A and 10B, collectively referred to herein as as FIG. 10, depicts the modular housing system, e.g., the 3 component housing in both assembled (FIG. 10A) and disconnected (FIG. 10B) views.
Figure 10B:
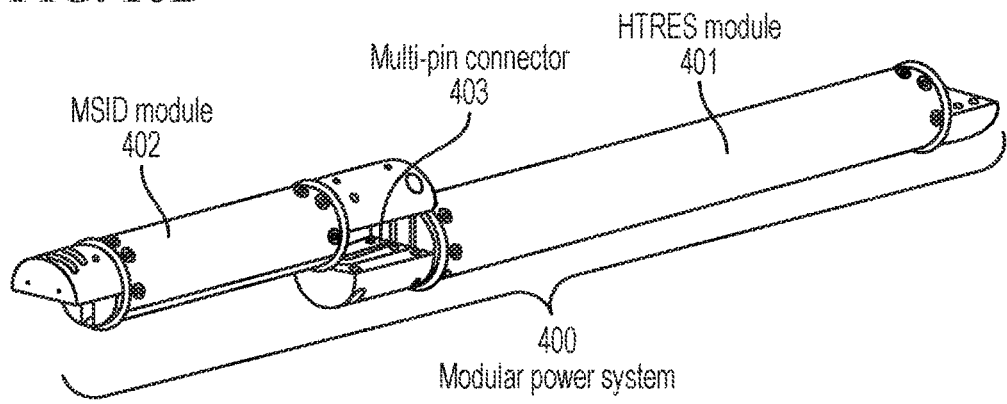

Once the various modular components, including the circuits that comprise the MSID, and any HTRES, e.g., ultracapacitors of the present invention, have been assembled (i.e., interconnected), these may be installed/disposed within a housing. For example, the assembly may be inserted into the housing such as shown in FIG. 39 or FIG. 10. In order to ensure a mechanically robust system of the invention, as well as for prevention of electrical interference and the like, in some embodiments, encapsulant may be poured into the housing. Generally, the encapsulant fills all void spaces within the housing.

In certain embodiments, the housing size is selected to fit the MSID, e.g., the diameter of the MSID. As such, the dimensions of the outer diameter may be affected by circuit board diameter of the MSID.

In certain embodiments, the housing contains the MSID, e.g., electronics module only.

In certain embodiments, the housing contains the MSID and the HTRES, e.g., the ultracapacitors of the present invention, e.g., an ultracapacitor string of the present invention.

In certain embodiments, the housing comprises a 15 pin connector containment channel. In certain embodiments, the 15 pin connector containment channel comprises a "through all pocket," or a cut out in the cap assembly of the housing design to provide a wide turning radius that reduces the stress concentration of the wire joint at the exit of the Micro-D connector. In this way wire contact with sharp edges and the wall is limited and reduces the risk of wire damage.

In certain embodiments, the housing affords concentric and decoupled mounting of the MSID to 15 pin connector containment channel.

In certain embodiments, the housing comprises an open wire containment channel that allows for the MSID and capacitor to be assembled independent from the housing, which significantly increases the manufacturability of the system. The open wire containment channel provides for drop in place mounting of the 15 pin Micro-D connector. In a particular embodiment, the tapered entrance of the open wire containment channel limits the contact of the wires with edges and channel walls.

In certain embodiments, the housing further comprises a removable thin walled housing cover. In certain embodiments, the removable thin walled housing chassis cover provides for unobstructed path for wires to be routed along side the MSID structure within the chassis. In a particular embodiment, a radial extrusion of the housing insert provides a mounting face for the removable thin walled cover.

In certain embodiments, the assembly of the MSID and any HTRES may further comprise a 37 pin connector as a removable interface between the electronics module, e.g., MSID, and HTRES module, e.g., capacitor module. This removable interface creates the inherent modularity of the system.

In certain embodiments, the 37 pin connector may be disposed in a removable housing interface between separate housings containing the MSID and the HTRES, e.g., an ultracapacitor string described herein. This provides for seamless and repeatable connection disconnection of electronics module and capacitor module. In certain embodiments, the 37 pin connection, e.g., Micro-D, is axially mounted and reduces the radial footprint required to secure the connector in place. In certain embodiments, the dual open wire channel of the separate housing interface accommodates the routing of two sets of wires from the 37 pin Micro-D connector. "Through all pockets" in one or two sides of the housing interface provides for a wide turning radius for the wires from the connector into the open channel.

As such, in one embodiment of the invention, the housing is modular, and comprises a three component housing system to separately contain (1) the MSID, e.g., in an MSID housing, (2) the HTRES, e.g., the ultracapacitor strings described herein, e.g., in an HTRES housing, and (3) the connecting wiring between the two, e.g., in a wiring interface housing. In certain embodiments, each component of the housing system may be separated into its own housing assembly that separately contains the MSID, the HTRES, or the wiring, e.g., in which each housing component is designed to interface with the other housing assemblies. In certain embodiments the connecting wiring between the MSID and the HTRES further comprises a connector, e.g., a 37 pin connector. In certain embodiments, the separate wiring interface affords modularity to the housing, which may serve to increase serviceability, improve the ease of manufacture, and reduce costs of production and/or maintenance. In certain embodiments, the system is a power system. In certain embodiments, the system is a data system.

In certain embodiments, high temperature chemical resistant O-rings, e.g., Viton O-rings, provide secure mounting and dampening which reduces the transmission of vibration from the pressure to barrel to system housing. In a particular embodiment, the O-rings are located at the base of the 15 and 37 pin connector housings, e.g., and provide for concentric mounting of the system housing within a pressure barrel.

i. Potting

In certain embodiments, the housing container further comprises an encapsulant that encapsulates the energy storage and the controller, such process also being known as "potting." In a particular embodiment, the MSID and/or the HTRES may be immersed in an encapsulant for protection against vibration and shock in high temperature environments Accordingly, the power and data systems described herein may be "potted," or inserted into the housing that is then filled with encapsulant. Among other things, the encapsulant provides for damping of mechanical shock as well as protection from electrical and environmental interferences. In one embodiment, the housing is filled with SYLGARD® 170 silicone elastomer (available from Dow Corning of Midland, Michigan) as the encapsulant.

Embodiments of the encapsulant may include, for example, a fast cure silicone elastomer, e.g., SYLGARD 170 (available from Dow Corning of Midland Michigan), which exhibits a low viscosity prior to curing, a dielectric constant at 100 kHz of 2.9, a dielectric strength of 530 volts per mil v/mil, and a dissipation factor at 100 Hz of 0.005, and a temperature range of about minus forty five degrees Celsius to about two hundred degrees Celsius. Other encapsulants may be used. An encapsulant may be selected, for example, according to electrical properties, temperature range, viscosity, hardness, and the like.

ii. Advanced Potting

In certain embodiments, by providing a sufficient number of expansion voids, e.g., at least one expansion void, in the encapsulation material, e.g. a silicone elastomer gel, in which the controller is potted in the housing, e.g., using the advanced potting method described herein, deformation of the circuit boards is reduced at high temperatures.

In certain embodiments, advanced potting methods may be utilized to prepare the systems of the present invention, e.g., in the fabrication process.

The advanced potting method comprises incorporating the use of removable inserts that are inserted, e.g., radially, through slots in the housing chassis wall. The inserts are placed at high silicone elastomer volume regions (e.g., centered between boards) during the potting process. Once silicone within chassis has cured, inserts are extracted through the slots leaving an air void of equal volume to the insert.

The advanced potting methods provided herein serve to reduce or eliminate circuit board deformation due to the thermal expansion of the silicone elastomer potting compound. Silicone elastomer has a particularly high coefficient of thermal expansion and as a result during high temperature conditions high stress concentrations develop on the circuit boards causing plastic deformation.

The advanced potting process creates air voids, e.g., at least one air void, at various high volume regions along the controller, e.g., MSID structure. During high temperature conditions these air voids provide an expansion path for the expanding silicone elastomer. As a result, stress concentrations are drawn away from circuit boards. Reduction in the stress concentrations on the circuit boards also reduces the stress on the solder joints of the surface mount components.

Moreover, this process may be useful for any potted circuitry subjected to downhole high temperatures, such as those found in downhole conditions, wherein the high temperature encapsulating potting material Systems of the Present Invention In one embodiment, systems of the present invention are comprised of an MSID of the present invention, and a housing structure configured to accommodate the MSID for placement into a toolstring.

In another embodiment, wherein the system is a power system, the system comprises an MSID of the present invention; a high temperature rechargeable energy storage device (e.g., an ultracapacitor described herein); and a housing structure in which the MSID and high temperature rechargeable energy storage device are both disposed for placement into a toolstring Generally a power system as described herein affords decoupling of an electrical aspect of a power source electrical, e.g. voltage, current, or instantaneous power from an electrical aspect of a load.

In one embodiment, systems of the present invention are comprised of an MSID of the present invention, and a housing structure configured to accommodate the MSID for mounting on or in the collar.

In certain embodiments, the MSID may be configured for data logging alone.

In certain embodiments, the MSID may be configured as a data system.

In one embodiment, the invention provides a data system (e.g., adapted for downhole environments) comprising a controller adapted to receive power from a power source and configured for data logging; one or more sensor circuits configured to receive (e.g., and interpret) data; and wherein the system is adapted for operation in a temperature range of between about seventy five degrees Celsius to about two hundred and ten degrees Celsius.

In another embodiment, the invention provides a data system (e.g., adapted for downhole environments) comprising a controller adapted to receive power from a power source and configured for drilling optimization; one or more sensor circuits configured to receive (e.g., and interpret) drilling data in real-time, suitable for modification of drilling dynamics; and wherein the system is adapted for operation in a temperature range of between about seventy five degrees Celsius to about two hundred and ten degrees Celsius.

In one embodiment, the invention provides a data system (e.g., adapted for downhole environments) comprising a controller adapted to receive power from a power source and configured to determine torque on bit (TOB); one or more sensor circuits configured to receive (e.g., and interpret) data; and wherein the system is adapted for operation in a temperature range of between about seventy five degrees Celsius to about two hundred and ten degrees Celsius.

In one embodiment, the invention provides a data system (e.g., adapted for downhole environments) comprising a controller adapted to receive power from a power source and configured to determine weight on bit (WOB); one or more sensor circuits configured to receive (e.g., and interpret) data; and wherein the system is adapted for operation in a temperature range of between about seventy five degrees Celsius to about two hundred and ten degrees Celsius.

In one embodiment, the invention provides a data system (e.g., adapted for downhole environments) comprising a controller adapted to receive power from a power source and configured to determine temperature by way of a temperature sensor (e.g., a resistance temperature detector (RTD) which indicates a temperature by way of changing resistance); one or more sensor circuits configured to receive (e.g., and interpret) data; and wherein the system is adapted for operation in a temperature range of between about seventy five degrees Celsius to about two hundred and ten degrees Celsius.

In certain embodiments, a plurality of data systems may be employed to analyze downhole conditions, e.g., vibrations and shocks in multiple areas, as they vary along the length of the drill string or tool string. In a particular embodiment, such spatial measurements may be useful for, among other things, locating, and making distinction of the source of any problem detected by a sensor. In particular embodiments, to organize data received from said plurality of data systems described herein, each may be assigned an identification or address on a data bus and each may transmit its information in conjunction with said identification or address and/or in response to a request for information from said identification, or according to a schedule which allocates a certain time or frequency to MSID with said identification.

A method of improving the efficiency of drilling dynamics, e.g., compared to currently used systems, comprising using any data system of the present invention. In certain embodiments, the method comprises employing a plurality of data systems described herein disposed at different locations in the toolstring and/or collar.

In certain embodiments, the controller for data logging is an MSID configured for data logging.

In certain embodiments, the data may be selected from shock, vibration, weight on bit (WOB), torque on bit (TOB), annular pressure and temperature, and/or hole size.

In certain embodiments, configuring the controller for data logging comprises configuring the controller to be capable of monitoring, logging, and communication of system health, e.g., communicating downhole information in real-time, e.g., providing real-time monitoring and communication of shocks, vibrations, stick slip, and temperature.

In certain embodiments, the adaptation for operation in a temperature range of between about seventy five degrees Celsius to about two hundred and ten degrees Celsius comprises encapsulating the controller with a material that reduces deformation of the modular circuits at high temperatures, e.g. a silicone elastomer gel. In a specific embodiment, the system is adapted for operation in a temperature range of between about seventy five degrees Celsius to about two hundred and ten degrees Celsius by providing sufficient number of expansion voids, e.g., at least one expansion void, in the encapsulation material in which the controller is potted in the housing, e.g., using the advanced potting method described herein.

In certain embodiments, the data logging system further comprises electrically coupled data storage, e.g., locally or remotely.

In another embodiment, the invention provides a method for data logging, e.g., in a downhole environment, comprising electrically coupling a power source to any data system of the present invention, such that data logging is enabled.

A method for fabricating a data system of the present invention comprising: selecting a controller adapted to receive power from a power source and configured for data logging, one or more sensor circuits configured to receive (e.g., and interpret) data; and wherein the system is adapted for operation in a temperature range of between about seventy five degrees Celsius to about two hundred and ten degrees Celsius; and incorporating controller and said sensor circuits into a housing, such that a data system is provided.

In certain embodiments, a reserve power source may be desirable. In this embodiment, the data system may also comprise a high temperature rechargeable energy storage (HTRES), e.g., at least one ultracapacitor described herein, and a second controller for controlling at least one of charging and discharging of the energy storage, the second controller comprising at least one modular circuit configured to intermittently supply power to the data controller and sensor circuits when no power from the power source is detected; wherein the system is adapted for operation in a temperature range of between about seventy five degrees Celsius to about two hundred and ten degrees Celsius In one embodiment, the data interface system is configured to exhibit one or more of the performance characteristics provided in the following table. For clarity, this tabular listing is for convenience alone, and each characteristic should be considered a separate embodiment of the invention.

TABLE 3

Exemplary Performance Parameters

| PARAMETER | Performance Characteristic Description | VALUE |
|---|---|---|
| Lateral vibration measurement range | Measures in two perpendicular lateral directions | 0 to 40 g RMS |
| Lateral vibration measurement resolution | | 1 g RMS |
| Lateral shock measurement range | Measures in two perpendicular lateral directions | 0 to 500 g RMS |
| Lateral shock measurement resolution | | 5 g RMS |
| Axial vibration measurement range | | 0 to 40 g RMS |
| Axial vibration measurement resolution | | 0.5 g RMS |
| Axial shock measurement range | | 0 to 500 g RMS |
| Axial shock measurement resolution | | 5 g RMS |
| Torsional oscillation measurement levels | Moderate Torsional Vibration | 0-0.5 SSI |
| | Pronounced Torsional Vibration | 0.5-1 SSI |
| Stick slip measurement levels | Significant Stick Slip | 1-2 SSI |
| | Severe Stick Slip | >2 SSI |
| Vibration Measurements Time Resolution | | 50 us |
| Shock Time resolution | cps: Shock Counts per second | 127 cps |
| Memory | | 0.5 MB-2 MB |
| Logged Parameters [The various parameters can be logged as fast as each 15 s] | RMS value | Lateral Vibrations |
| | Average value, Maximum value and shock count | Lateral shocks |
| | RMS value as fast as each 15 s | Axial Vibrations |
| | Average value and Maximum value as fast as each 15 s | Axial Shocks |
| | Maximum SSI and average SSI | |
| | Maximum SSI and average SSI | Torsional vibrations |
| | Average value | Stick Slip |
| | | Temperature |

TABLE 3-continued

Exemplary Performance Parameters

| PARAMETER | Performance Characteristic Description | VALUE |
|---|---|---|
| Logging Input Voltage | | 7 V to 30 V |
| Input Current | | <5 mA |
| OD to O-rings | | 1.5 in |
| OD to Chassis | | 1.4 in. |
| Length | Depends on memory option | 5-9 in |
| Operating Temperature | The system can safely and reliably operate for 2000 hours in this temperature range | −20° C. to 150° C. |
| Survivable Temperature | Exposure to 175° C. temperature accelerates operating life | −50° C. to 175° C. |
| Maximum continuous vibration | 15-500 Hz | 20 g RMS |
| Maximum shock | 0.5 mSec, half-sine | 1000 g |

In certain embodiments, the MSID may be configured as a power system.

In certain embodiments, the MSID may be configured as a power system and for data logging.

In configurations of the MSID wherein the MSID is configured as a power system, additional modular circuits, comprised of circular circuit boards, may be added to provide additional functionality to the system. Such additional circuits may be added via additional stackers, joining the modular bus, wherein the housing is configured/constructed to accommodate any increase in size of the MSID. Moreover, these additional circuits, due to the modular nature of the MSID, do not add additional complication to manufacturing of the MSID other than the addition of stacked circular circuit board, and may easily be removed for service or removal of functionality without damage to the remainder of the MSID.

In certain embodiments described herein, the systems of the present invention may include a High Temperature Rechargeable Energy Storage (HTRES). The energy storage may include any type of technology practicable in downhole conditions. In certain embodiments, the HTRES is configured for operation at a temperature greater than 75 degrees Celsius, e.g., a temperature that is within a temperature range of between about 75 degrees Celsius to about 210 degrees Celsius, e.g., a temperature that is within a temperature range of between about 85 degrees Celsius to about 210 degrees Celsius, e.g., a temperature that is within a temperature range of between about 95 degrees Celsius to about 100 degrees Celsius, e.g., a temperature that is within a temperature range of between about 75 degrees Celsius to about 210 degrees Celsius, e.g., a temperature that is within a temperature range of between about 110 degrees Celsius to about 210 degrees Celsius, e.g., a temperature that is within a temperature range of between about 120 degrees Celsius to about 210 degrees Celsius, e.g., a temperature that is within a temperature range of between about 130 degrees Celsius to about 210 degrees Celsius, e.g., a temperature that is within a temperature range of between about 140 degrees Celsius to about 210 degrees Celsius, e.g., a temperature that is within a temperature range of between about 150 degrees Celsius to about 210 degrees Celsius, e.g., a temperature that is within a temperature range of between about 160 degrees Celsius to about 210 degrees Celsius, e.g., a temperature that is within a temperature range of between about 170 degrees Celsius to about 210 degrees Celsius, e.g., a temperature that is within a temperature range of between about 175 degrees Celsius to about 210 degrees Celsius.

In certain embodiments of the invention, the energy storage, or HTRES includes at least one ultracapacitor (which is described below with reference to FIG. 3).

Additional embodiments of HTRES include, without limitation, chemical batteries, for instance aluminum electrolytic capacitors, tantalum capacitors, ceramic and metal film capacitors, hybrid capacitors magnetic energy storage, for instance, air core or high temperature core material inductors. Other types of that may also be suitable include, for instance, mechanical energy storage devices, such as fly wheels, spring systems, spring-mass systems, mass systems, thermal capacity systems (for instance those based on high thermal capacity liquids or solids or phase change materials), hydraulic or pneumatic systems. One example is the high temperature hybrid capacitor available from Evans Capacitor Company Providence, RI USA part number HC2D060122 DSCC10004-16 rated for 125 degrees Celsius. Another example is the high temperature tantalum capacitor available from Evans Capacitor Company Providence, RI USA part number HC2D050152HT rated to 200 degrees Celsius. Yet another example is an aluminum electrolytic capacitor available from EPCOS Munich, Germany part number B41691A8107Q7, which is rated to 150 degrees Celsius. Yet another example is the inductor available from Panasonic Tokyo, Japan part number ETQ-P5M470YFM rated for 150 degrees Celsius. Additional embodiments are available from Saft, Bagnolet, France (part number Li-ion VL 32600-125) operating up to 125 degrees Celsius with 30 charge-discharge cycles, as well as a li-ion battery (experimental) operable up to about 250 degrees Celsius, and in experimental phase with Sadoway, Hu, of Solid Energy in Cambridge, Massachusetts.

The power systems of the present invention, which comprise an MSID described herein, are useful for acting as a buffer for power supplied by a source to a load. This buffering system comprises numerous advantages over the existing systems which typically use a direct connection of the power source to the load. Such advantages include the capability to optimize one or more performance parameters of efficiency, power output, battery lifetime, or HTRES (e.g., ultracapacitor) lifetime.

Accordingly, one embodiment of the invention provides a power system adapted for buffering the power from a power source to a load, e.g., in a downhole environment, comprising: a high temperature rechargeable energy storage (HTRES), e.g., at least one ultracapacitor described herein, and a controller for controlling at least one of charging and discharging of the energy storage, the controller comprising at least one modular circuit configured for reducing battery consumption by greater than 30%, e.g., greater than 35%, e.g., greater than 40%, e.g., greater than 45%, e.g., greater than 50% (e.g., as compared to the battery consumption with the power system); wherein the system is adapted for operation in a temperature range of between about seventy five degrees Celsius to about two hundred and ten degrees Celsius.

In another embodiment, the invention provides a power system adapted for buffering the power from a power source to a load in a downhole environment comprising: a high temperature rechargeable energy storage (HTRES), e.g., at least one ultracapacitor described herein, and a controller for controlling at least one of charging and discharging of the energy storage, the controller comprising at least one modular circuit configured for increasing battery run time (i.e., battery life, or operational hours) by greater than 50%, e.g., greater than 60%, e.g., greater than 70%, e.g., greater than 80%, e.g., greater than 90%, e.g., greater than 100% (e.g., as compared to the battery consumption with the power system); wherein the system is adapted for operation in a temperature range of between about seventy five degrees Celsius to about two hundred and ten degrees Celsius.

In another embodiment, the invention provides a power system adapted for buffering the power from a power source to a load, e.g., in a downhole environment, comprising: a high temperature rechargeable energy storage (HTRES), e.g., at least one ultracapacitor described herein, and a controller for controlling at least one of charging and discharging of the energy storage, the controller comprising at least one modular circuit configured for increasing the operating efficiency to greater than 90%, e.g., greater than 95%; wherein the system is adapted for operation in a temperature range of between about seventy five degrees Celsius to about two hundred and ten degrees Celsius.

In another embodiment, the invention provides a power system adapted for buffering the power from a battery power source to a load, e.g., in a downhole environment, comprising: a high temperature rechargeable energy storage (HTRES), e.g., at least one ultracapacitor described herein, and a controller for controlling at least one of charging and discharging of the energy storage, the controller comprising at least one modular circuit configured to draw a constant current from the battery and constant output voltage across the battery discharge; wherein the system is adapted for operation in a temperature range of between about seventy five degrees Celsius to about two hundred and ten degrees Celsius. Moreover, the management of the constant current draw from the battery with a constant output voltage across the battery discharge serves to decrease the battery consumption rate by optimizing for the needs of a given battery.

In another embodiment, the invention provides a power system adapted for buffering the power from a power source to a load, e.g., in a downhole environment, comprising: a high temperature rechargeable energy storage (HTRES), e.g., at least one ultracapacitor described herein, and a controller for controlling at least one of charging and discharging of the energy storage, the controller comprising at least one modular circuit configured to control the input current (e.g., ranging from about 2 A to about 10 A) from the power source and output HTRES voltage; wherein the system is adapted for operation in a temperature range of between about seventy five degrees Celsius to about two hundred and ten degrees Celsius. In certain embodiments, the voltage is selected based upon the load. In a particular embodiment, the load may vary, and the required voltage will also vary accordingly. In certain embodiments, including a varying voltage, the power system is configured to adopt the optimum stable lowest voltage to reduce the current draw on the power source, e.g., the battery, wherein the voltage remains stable within plus or minus 2V, e.g., within plus or minus 1V. Importantly, it is well-known that voltage stability increases the longevity of the load as well as the battery life. Furthermore, in certain embodiments, the stable lowest voltage ranges from about 0V to about 10V; from about 10V to about 20V; from about 20V to about 30V; from about 30V to about 40V; from about 40V to about 50V; from about 50V to about 60V; or from about 60V to about 100V.

In another embodiment, the invention provides a power system adapted for buffering the power from a power source to a load, e.g., in a downhole environment, comprising: a high temperature rechargeable energy storage (HTRES), e.g., at least one ultracapacitor described herein, and a controller for controlling at least one of charging and discharging of the energy storage, the controller comprising at least one modular circuit configured to control the input power (e.g., ranging from about 0W to about 100 W) from the power source and output HTRES voltage; wherein the system is adapted for operation in a temperature range of between about seventy five degrees Celsius to about two hundred and ten degrees Celsius. In certain embodiments, the voltage is selected based upon the load. In a particular embodiment, the load may vary, and the required voltage will also vary accordingly. In certain embodiments, including a varying voltage, the power system is configured to adopt the optimum stable lowest voltage to reduce the power draw on the power source, e.g., the battery, wherein the voltage remains stable within plus or minus 2V, e.g., within plus or minus 1V. Importantly, it is well-known that voltage stability increases the longevity of the load as well as the battery life. Furthermore, in certain embodiments, the stable lowest voltage ranges from about 0V to about 10V; from about 10V to about 20V; from about 20V to about 30V; from about 30V to about 40V; from about 40V to about 50V; from about 50V to about 60V; or from about 60V to about 100V.

In another embodiment, the invention provides a method for buffering the power from a power source to a load, e.g., in a downhole environment, comprising electrically coupling a power source to any power system of the present invention, and electrically coupling said power system to a load, such that the power is buffered from the power source to the load.

A method for fabricating a power system of the present invention comprising: selecting a high temperature rechargeable energy storage (HTRES), e.g., at least one ultracapacitor described herein, and a controller for controlling at least one of charging and discharging of the energy storage, the controller comprising at least one modular circuit configured to control the buffering of power from a power source to a load; and incorporating the HTRES and controller into a housing, such that a power system is provided.

In certain embodiments of the power and/or data systems of the present invention, the power system is adapted for operation in a temperature range of between about seventy five degrees Celsius to about two hundred and ten degrees Celsius, e.g., between about 80 degrees Celsius to about two hundred and ten degrees Celsius, e.g., between about 90 degrees Celsius to about two hundred and ten degrees Celsius, e.g., between about 100 degrees Celsius to about two hundred and ten degrees Celsius, e.g., between about 110 degrees Celsius to about two hundred and ten degrees Celsius, e.g., between about 120 degrees Celsius to about two hundred and ten degrees Celsius, e.g., between about 125 degrees Celsius to about two hundred and ten degrees Celsius, e.g., between about 130 degrees Celsius to about two hundred and ten degrees Celsius, e.g., between about 140 degrees Celsius to about two hundred and ten degrees Celsius, e.g., between about 150 degrees Celsius to about two hundred and ten degrees Celsius, e.g., between about 160 degrees Celsius to about two hundred and ten degrees Celsius, e.g., between about 175 degrees Celsius to about two hundred and ten degrees Celsius. In certain embodiments of the power system of the present invention, the power system is adapted for operation in a temperature range of between about seventy five degrees Celsius to about 150 degrees Celsius, e.g., between about 100 degrees Celsius to about 150 degrees Celsius, e.g., between about 125 degrees Celsius to about 150 degrees Celsius.

In certain embodiments of the power and/or data systems of the present invention, the power system further comprises a housing, e.g., an advanced modular housing described herein, in which the controller (e.g., an MSID of the present invention) and any HTRES (e.g., an ultracapacitor string of the invention) are disposed, for example, wherein the housing is suitable for disposition in a tool string. In particular embodiments, the controller is encapsulated with a material that reduces deformation of the modular circuits at high temperatures, e.g. a silicone elastomer gel. In a specific embodiment, the system is adapted for operation in a temperature range of between about seventy five degrees Celsius to about two hundred and ten degrees Celsius by providing sufficient number of expansion voids, e.g., at least one expansion void, in the encapsulation material in which the controller is potted in the housing, e.g., using the advanced potting method described herein.

In certain embodiments of the power system of the present invention, the controller is an MSID of the present invention. In certain embodiments, the MSID comprises a junction circuit board, e.g., wherein said junction circuit board is adapted to communicate with external computers/networks. In certain embodiments, the MSID comprises a cross over circuit board. In certain embodiments, the MSID comprises an ultracapacitor charger circuit. In certain embodiments, the MSID comprises an ultracapacitor management system circuit. In certain embodiments, the MSID comprises an electronic management system circuit. In certain embodiments, the MSID comprises an ultracapacitor charger circuit. And in certain embodiments, the MSID comprises any combination of a junction circuit board electrically connected to a power source, an ultracapacitor charger circuit, an ultracapacitor management system circuit, and an electronic management system circuit.

In certain embodiments of the power and/or data systems of the present invention, the HTRES comprises a plurality of HTRES cells.

In certain embodiments of the power and/or data systems of the present invention, the HTRES is an ultracapacitor string described herein.

In certain embodiments of the power and/or data systems of the present invention, the power source comprises a wireline power source In certain embodiments of the power and/or data systems of the present invention, the power source comprises two batteries.

In certain embodiments of the power and/or data systems of the present invention, the power source comprises a wireline power source, and one battery, e.g., a backup battery.

In certain embodiments of the power systems of the present invention, the load comprises at least one of electronic circuitry, a transformer, an amplifier, a servo, a processor, data storage, a pump, a motor, a sensor, a thermally tunable sensor, an optical sensor, a transducer, fiber optics, a light source, a scintillator, a pulser, a hydraulic actuator, an antenna, a single channel analyzer, a multi-channel analyzer, a radiation detector, an accelerometer and a magnetometer.

In certain embodiments of the power systems of the present invention, the controller circuit may also be configured to provide intermittent power pulses, e.g., between about 50 W and 100 W.

An additional advantage of the power systems of the present invention is each highly functional system may be made without lithium.

In certain embodiments of the power system of the invention, the power system provides voltage stability to the entire tool string and all associated electronics. Such voltage stability affords a voltage stable micro-grid that that improves the lifetime of said electronics sensitive to voltage swings.

In certain embodiments of the power system of the invention, the power system may communicate downhole information in real-time.

In certain embodiments of the power system of the invention, the power system may provide real-time monitoring and communication of shocks, vibrations, stick slip, and temperature.

In certain embodiments of the power system of the invention, the power system may provide monitoring, logging, and communication of system health.

In certain embodiments of the power system of the invention, the power system may provide monitoring and communication of battery state of charge monitoring in real time or off line.

In certain embodiments of the power system of the invention, the power system may further comprise a surface decoding system.

In certain embodiments of the power system of the invention, the power system may directly drive motor pulsers In certain embodiments of the power system of the invention, the power system increases safety by allowing moderate rate cells to be used where high rate cells were necessary.

In certain embodiments of the power system of the invention, the power system may provide increased reliability with less Lithium used downhole.

In certain embodiments, wherein solenoid based or motor based mud pulsers are used in MWD and LWD tool strings, the power systems of the present invention may improve the reliability of the mud pulser, and/or improve signal integrity of the pulses.

In another embodiment, the present invention provides a power source electrically coupled to any power system of the present invention, and a load adapted for operation in a downhole environment.

1. Systems for High Efficiency Applications (a) Efficiency Optimization

In certain embodiments, the MSID may be configured to afford efficiency optimization of the power system. Efficiency of the power electronics can be generally described as the ratio between output power delivered to the load and input power being delivered by a power source, such as batteries, a wireline or a generator. In some embodiments, the EMS circuit is capable of measuring input voltage and input current directly, calculating input power as the product of the two measurements. Likewise, the EMS circuit is capable of measuring output voltage and current, calculating output power as the product of the two measurements.

Through its communication to other circuits, e.g. the UCC circuit, the EMS circuit is capable of commanding parameters such as charge current and charge time. This can enable control of both input current and output voltage. By varying the charge current and regulated output voltage, the EMS circuit is able to quantify the electronics power efficiency across the entire operating range of charge current and capacitor voltage.

In one embodiment, the MSID optimizes power electronics efficiency, e.g., through the use of the EMS and through the use of hysteretic voltage regulation whereby the charge current is switched between a chosen high current level and zero current level. The reason for this is that often power electronics operate most efficiency at the mid to upper range of their power capability range. Additionally, when the power electronics are not processing a charge current, they can be put into a low power draw state. The low power state draws only the quiescent power of each circuit. Therefore, by configuring the power system through the EMS circuit for intermittently charging ultracapacitors at a high current level for a short period of time followed by a long, low power draw "off" state, very high electronics efficiency can be achieved.

In one embodiment, through continuous measuring and control of charge current, the EMS circuit is capable of modifying the behavior of the power electronics to, in certain embodiments, achieve maximum efficiency. This real-time adjustment capability is important in order to adjust to changes in temperature, output load, capacitor efficiency, and battery efficiency.

The overall electronics efficiency is dependent on many different factors that vary with such variables as temperature and input voltage. The EMS circuit is able to accurately measure efficiency by calculating the ratio of output power to input power. However, it is difficult to predict which operating point is the most efficient in any given environment. Therefore, the EMS circuit employs a technique known as "hill climbing". The hill climbing method involves creating frequent perturbations to the charge current and observations of system behavior. After each perturbation, or change of the charge current, the total efficiency is calculated. If the change in charge current resulted in higher efficiency, the charge current is further changed in the same direction. If the change in charge current resulted in less efficiency, the charge current is changed in the opposite direction. In this way, the hill climbing method targets an operating point at which the power electronics operate at or near peak efficiency.

In certain embodiments, the MSID also optimizes for efficiency by targeting low power modes of operation for the UCC circuit. For example, in some embodiments, the UCC circuit functions as a buck and a boost power converter together. In the buck-boost mode of operation, four transistors are being switched to regulate the charge current. On the other hand, in either buck or boost modes of operation, only two transistors are being switched to regulate the charge current. Therefore, buck-boost mode generally operates with lesser efficiency than either buck or boost modes. Transitions between buck, buck-boost, and boost modes are governed by the charge current and capacitor voltage. Since both the charge current and capacitor voltage may be measured by the other circuits, e.g. the EMS circuit, the MSID can control the UCC charge current and capacitor voltage to ensure that the UCC operates in the buck and boost modes for as long as possible for the best efficiency.

In certain embodiments, various circuits or sub circuits may enter a low power sleep state to conserve power. In some embodiments, said sleep states are activated locally by circuits or by a circuit's digital supervisor. In some embodiments, said sleep states are activated centrally, e.g. by an EMS circuit, e.g. by way of a modular bus, e.g. by way or an EMS circuit communicating over a modular bus to a digital supervisor. For example, a UMS circuit may not need to operate continuously, but only intermittently and, in some embodiments, only when balancing of capacitors is needed. A UMS circuit may measure or report a substantially balanced state of a capacitor string and then enter a sleep state in methods as described above. Similar schemes may generally be applied to other circuits as well. For instance, if a capacitor string does not need to be charged, an ultracapacitor charger may enter a sleep state.

(b) Power Optimization

In certain embodiments, the MSID may be configured to afford power optimization of the power system. For example, in some embodiments, the EMS circuit is capable of adjusting output power capabilities in real-time to accommodate for changing load requirements. The ultracapacitors are able to safely store a range of voltage levels, e.g., further dependent on the number and size of the ultracapacitors. At high voltage levels, the output power capability of the ultracapacitors is increased. That is, the ultracapacitors can sustain high power output levels for a long period of time before being recharged. At lower voltage levels, the ultracapacitors cannot sustain as high of power levels but overall efficiency may be increased in order to extend battery lifetime.

(c) Voltage Optimization

In certain embodiments, the MSID may be configured to optimize a voltage presented to a load. For example, an MSID or a user, may measure lower power draw at voltages within a certain range and choose to operate in said range to extend, for instance battery lifetime. For example, an MSID may control a power system to operate with a load voltage in a range from 50 to 100 V, from 40 to 50 V, from 30 to 40 V, from 25 to 30 V, from 20 to 25 V, from 15 to 20 V, from 10 to 15 V, from 0 to 10V.

(d) Battery Lifetime Optimization

In certain embodiments, the MSID may be configured to afford battery lifetime optimization. For example, under certain conditions a battery offers longer lifetime given a steady current draw as opposed to intermittent high current draw. Under other conditions, a battery offers longer lifetime given a pulsed current draw, a current draw having high frequency content, a mildly varying current draw, a combination of the above or the like. As such, in certain embodiments, these heuristics can be utilized to shape the battery current draw in order to optimize for battery lifetime. Further, these heuristics may be applied in run-time based on sensed parameters, i.e. having a determination of the conditions that determine the optimum battery current draw. In one example, battery current is smoothed at high temperatures to decrease cathode freezeover in Lithium Thionyl Chloride cells, but includes pulses at low temperatures to encourage de-passivation of the same cells. In a particular embodiment, a hysteretic control scheme can be utilized with a non-zero low hysteresis level. By varying the charge current between two non-zero current states, capacitor voltage regulation may be achieved while reducing the negative effect of large, fast deviations in battery current draw on the health of the batteries, e.g., lithium thionyl chloride batteries. Generally, a smoother current yields a more efficient extraction of energy from a source having a series resistance aspect due to the squared relationship between current and conduction loss.

As an example, a lithium Thionyl chloride battery pack was first drawn with an ON-OFF current scheme using a power system as disclosed herein. Said battery pack in said first test achieved a lifetime of about 256 hours. In a second test, an equivalent battery pack was drawn with a smoothed current scheme using a power system as disclosed herein. Said battery pack in said second test achieved a lifetime of about 365 hours.

In certain embodiments, the MSID by controlling an aspect of battery current, a battery lifetime may be extended. In certain embodiments a power system comprises said MSID and HTRES.

In certain embodiments, a battery current is controlled to fall within a range of less than +/−51% of an average, e.g. less than 50%, e.g. less than 40%, e.g. less than 30%, e.g. less than 20%, e.g. less than 20%, e.g. less than 10%.

In certain embodiments, a battery current is controlled to include pulses of less than about 1,000 ms and up to about 5 A peak, e.g. less than about 500 ms and up to about 2 A peak, e.g. less than about 100 ms and up to about 1 A peak. In certain embodiments, a battery current is controlled to change no faster than 1 A/sec, e.g. no faster than 0.5 A/sec, e.g. no faster than 0.25 A/sec, e.g. no faster than 0.1 A/sec, e.g. no faster than 0.01 A/sec.

In certain embodiments, a battery current is controlled to achieve one of smoothing, pulsing, or shaping. In further embodiments, said battery current is controlled according to measured ambient conditions.

In certain embodiments, the MSID by configuring the power system via the EMS circuit by narrowing the hysteresis range of the charge current, battery current may be made smoother, extending battery lifetime. Generally, a smoother current yields a more efficient extraction of energy from a source, mathematically, due to the squared relationship between current and conduction losses.

In another embodiment, the power system, via the EMS circuit, is configured to operate using a linear feedback control scheme.

In both hysteretic and linear control embodiments, heuristics concerning battery chemistry, capacitor chemistry, and power electronics behavior can be implemented to further improve system performance.

In certain embodiments, a damaged battery will exhibit high effective series resistance (ESR) that reduces its power capabilities. As such, by communicating with the cross over circuit, battery state of charge circuit information can be logged. Furthermore, by measuring input battery current and input battery voltage, battery ESR can be measured by the EMS circuit. Given excessive ESR, the EMS circuit can command the cross over circuit to switch the battery supply to improve power handling capabilities.

(e) HTRES Lifetime Optimization

In certain embodiments, the MSID may be configured to afford HTRES, e.g., ultracapacitor, lifetime optimization to the power system. For example, the EMS circuit may be capable of communicating data and commands to the UMS circuit. This is beneficial for regulating each cell to the desired voltage level even as the regulated output voltage changes during optimization. Additionally, the UMS circuit reports cell health to the EMS circuit via the modular bus. If the UMS circuit reports that one or multiple capacitors are damaged, the EMS circuit can alter the control scheme to mitigate further damage and prolong system health. A damaged cell may exhibit decreased capacitance, such that the cell will charge and discharge faster than surrounding cells. A damaged cell may also exhibit high leakage currents, such that the cell will be constantly discharging, forcing other cells to obtain a higher voltage. In both cases, it is beneficial to charge the capacitor string to a lower voltage. As such, by configuring the power system, e.g., by configuring the EMS circuit to communicate with the UMS circuit, it is possible to isolate cell damage and regulate to a lower capacitor voltage to preserve capacitor health.

It should also be noted that frequent balancing of ultracapacitors reduces system efficiency. Passive balancing of cells reduces cell voltages by passing excess charge through a resistive element. Furthermore, both active and passive balancing requires frequent switching of MOSFETS, consuming additional power. Therefore, by reducing the need for cell balancing the EMS circuit can help to reduce power consumption and improve system efficiency.

In one embodiment, the power system is configured to exhibit one or more of the performance characteristics provided in the following table. For clarity, this tabular listing is for convenience alone, and each characteristic should be considered a separate embodiment of the invention.

TABLE 4

Exemplary Performance Parameters

| PARAMETER | Performance Characteristic Description | VALUE |
|---|---|---|
| Rated Output Peak Power | Peak power | 50 W |
| Maximum Peak Power | Maximum Pulse power that can be extracted from the power system | 100 W |
| Rated Output Voltage | Set output voltage can be configured based on power system needs | Customizable |
| Maximum Output Voltage | Maximum output voltage the power system can be set to provide | 28 V |
| Rated Output Current | Pulse output current supported in continuous operation | 2.5 A |
| Maximum output current | Peak Pulse output current during peak power | 5 A |
| Input Voltage | Acceptable input voltage can vary widely | 8 V to 28 V |
| Charging Current | The maximum charging current can be set to allow for maximum battery usage | Customizable |
| Efficiency during standard operation | During a directional job the efficiency of the system will to be greater than 90% | >90% |
| Diameter | 1.4 in is the diameter of the metal chasse and 1.5 in is the diameter of the o-ring | 1.4 in-1.5 in |
| Length | The system length might varies depending on the options selected | 19 in |
| Functional Temperature | The system can safely and reliably operate for at least 4000 hours in this temperature range | −20° C. to 150° C. |
| Survivable Temperature | While the system can withstand this temperature range, exposure at 175° C. temperature reduces rapidly its operating life | −50° C. to 175° C. |
| Maximum random vibrations | 15-500 Hz | 20 g RMS |
| Maximum shocks | 0.5 mSec, half-sine | 1000 g |

2. Systems for High Power Applications

The power systems described above, characterized by the advantages described above, may be configured to provide for relatively high power, e.g. more power than was practically available downhole in prior art. Generally, high power may be provided in a pulsed or intermittent fashion, e.g. not indefinitely, because a power balance must be maintained between a source and a load and a source may not generally be capable of providing said relatively high power. More specifically, and by way of example, a power system of the present invention may charge a HTRES for a first length of time and provide high power by directing energy from said HTRES to a load for a second length of time. Aspects that characterize a power system of the present invention specifically for relatively high power include high voltage and low resistance. Generally, because high power will translate to a high rate of energy transfer, a power system of the present invention may also benefit from a relatively high energy capacity HTRES. For example, a primary battery, e.g. a lithium Thionyl chloride battery for downhole applications comprising 8 DD size cells of moderate rate configuration may provide for a maximum of about $10^{-50}$ W of power. In comparison a power system of the present invention may provide for about up to 5,000 W of power.

By providing for high power, a power system of the present invention equivalently provides for a voltage stabilization effect of a shared voltage in a larger system. Specifically, a high power capability is enabled by a low resistance output and a low resistance output enables a relatively high power output with a relatively low resulting voltage drop. For instance an HTRES of the present invention may comprise high temperature ultracapacitors as disclosed herein with a string voltage of about 28 V and a resistance of about 100 mOhms. Said exemplary power system may provide for about 20 A of output current with a voltage deviation of only 2 V. The resulting power is approximately 520 W in this example. Said voltage stabilization effect may be further benefited by the use of a regulated power converter, e.g. an exemplary load converter as disclosed herein. In certain embodiments, the HTRES comprises one or more ultracapacitors described herein, e.g., ultracapacitor strings. Such ultracapacitor strings, in certain embodiments, are designed to fit within a housing structured with an inner diameter that is dictated by the outer diameter of the circular circuit boards, and wherein the outer diameter of the housing is designed to be accommodated by the tool string. Accordingly, in embodiments wherein the HTRES is comprised of the ultracapacitors of the present invention, and are organized in a space efficient ultracapacitor string orientation, as described herein, larger capacitances are produced by longer ultracapacitor strings. In certain embodiments, the ultracapacitor strings are comprised of 12 capacitors In certain embodiments, a power system of the present invention may provide for about up to 5,000 W of power, e.g. for about 1,000-5,000 W of power, e.g. for about 500-1,000 W of power, e.g. for about 250-500 W of power, e.g. for about 100-250 W of power, e.g. for about 51 to 100 W of power.

Accordingly, another power system embodiment of the invention provides a power system adapted for buffering the power from a power source supplying about 1 W to about 99 W in a downhole environment comprising: a high temperature rechargeable energy storage (HTRES), e.g., an ultracapacitor string organized in a space efficient orientation as described herein, and a controller for controlling at least one of charging and discharging of the energy storage, the controller comprising at least one modular circuit configured for providing intermittent high-power pulses, e.g., between about 100 W and 500 W; wherein the system is adapted for operation in a temperature range of between about seventy five degrees Celsius to about two hundred and ten degrees Celsius. In certain embodiments, the HTRES is characterized by a capacitance of about 1-10,000 F. In certain embodiments, the controller is configured to drive the output at a greater voltage than the input voltage. With the added power supplied by high-power pulses, it is possible to drive a load harder while maintaining battery life. For example, this configuration may be used to drive the mud pulser harder (e.g., a solenoid based or motor based mud pulser), which translates to sharper pressure pulses and potentially faster data rates for transmission to the surface, e.g., up to twice the data rates while maintaining battery life and without compromising signal integrity, e.g., using mud pulse telemetry. In another embodiment, the load on this power system may be an EM transmitter. In another embodiment, the load on this power system may be a motor drive, e.g., a sensorless brushless DC motor drive.

In certain embodiments, the power source may be a battery or a turbine powered MWD/LWD toolstring.

In certain embodiments, the input power is about 1 W to about 20 W, and the output is greater than 100 W, e.g., about 100 W to about 500 W.

In certain embodiments, the input power is about 20 W to about 50 W, and the output is greater than 100 W, e.g., about 100 W to about 500 W.

In certain embodiments, the input power is about 50 W to about 99 W, and the output is greater than 100 W, e.g., about 100 W to about 500 W.

In certain embodiments, a power system of the present invention provides for a voltage stabilization effect of a shared voltage in a larger system, by providing for up to about 500 W, e.g. up to about 250 W, e.g. up to about 100 W, while maintaining a voltage deviation of the shared voltage less than about 50%, e.g. less than about 40%, e.g. less than about 30%, e.g. less than about 20%, e.g. less than about 10%.

In certain embodiments, a system of the present invention provides for EM telemetry in a well at a depth of up to about 40,000 feet, e.g. up to about 30,000 feet, e.g. up to about 20,000 feet, e.g. up to about 10,000 feet.

In certain embodiments, a system of the present invention provides for EM telemetry in a well at a transmission frequency of up to about 100 Hz, e.g. up to about 75 Hz, e.g. up to about 50 Hz, e.g. up to about 25 Hz, e.g. up to about 15 Hz.

In certain embodiments, a system of the present invention provides for mud pulse telemetry in a well at a depth of up to about 40,000 feet, e.g. up to about 30,000 feet, e.g. up to about 20,000 feet, e.g. up to about 10,000 feet.

In certain embodiments, a system of the present invention provides for mud pulse telemetry in a well at a transmission frequency of up to about 40 Hz, e.g. up to about 30 Hz, e.g. up to about 20 Hz, e.g. up to about 15 Hz, e.g. up to about 10 Hz.

In one embodiment, the power system is configured to exhibit one or more of the performance characteristics provided in the following table. For clarity, this tabular listing is for convenience alone, and each characteristic should be considered a separate embodiment of the invention.

TABLE 5

Exemplary Performance Parameters

| PARAMETER | Performance Characteristic Description | VALUE |
| --- | --- | --- |
| Rated Output Peak Power | Peak power | 200 W |
| Maximum Peak Power | Maximum Pulse power that can be extracted from the power system | 500 W |
| Rated Output Voltage | Set output voltage can be configured based on power system needs | Customizable |
| Maximum Output Voltage | Maximum output voltage the power system can be set to provide | 28 V |
| Rated Output Current | Pulse output current supported in continuous operation | 7 A |
| Maximum output current | Peak Pulse output current during peak power | 15 A |
| Input Voltage | Acceptable input voltage can vary widely | 8 V to 28 V |
| Charging Current | The maximum charging current can be set to allow for maximum battery usage | Customizable |

TABLE 5-continued

Exemplary Performance Parameters

| PARAMETER | Performance Characteristic Description | VALUE |
|---|---|---|
| Efficiency during standard operation | During a directional job the efficiency of the system will to be greater than 90% | >90% |
| Diameter | 1.4 in is the diameter of the metal chasse and 1.5 in is the diameter of the o-ring | 1.4 in-1.5 in |
| Length | The system length might varies depending on the options selected | 19 in-24 in |
| Functional Temperature | The system can safely and reliably operate for at least 4000 hours in this temperature range | −20° C. to 150° C. |
| Survivable Temperature | While the system can withstand this temperature range, exposure at 175° C. temperature reduces rapidly its operating life | −50° C. to 175° C. |
| Maximum random vibrations | 15-500 Hz | 20 g RMS |
| Maximum shocks | 0.5 mSec, half-sine | 1000 g |

3. Systems for Intermittent Power Source Applications

In applications in downhole environments that require power for operation, where such power is intermittently interrupted (e.g., wherein power is supplied by a turbine powered MWD/LWD toolstring that generates power derived from the flow of mud through the turbine, and such mud flow is stopped to make adjustments to the toolstring), the power systems of the present invention configured to supply power to a load may be configured to operate as an intermittent power source buffer by directing energy stored in a HTRES to the load. Generally, because relatively long periods without power, e.g. 5 to 10 minutes, will translate to a high cumulative energy requirement of the energy buffer, a power system of the present invention may be aided by a relatively high energy HTRES, for instance one having about 1 to 5 Wh of energy storage. Such systems may be aided with the use of a load driver circuit.

As such, another power system embodiment of the invention provides a power system adapted for buffering the power from an intermittent power source e.g., a power source that ceases to provide power for periods of time, by directing energy stored in the HTRES to the load comprising: a high temperature rechargeable energy storage (HTRES), e.g., an ultracapacitor string organized in a space efficient orientation as described herein, an optional load driver circuit, and a controller for controlling at least one of charging and discharging of the energy storage, wherein the system is adapted for operation in a temperature range of between about seventy five degrees Celsius to about two hundred and ten degrees Celsius.

In one embodiment, the system of the present invention comprises a modular signal interface device (MSID) configured as a component of a power system. In one example, the MSID may comprise various circuits. Non-limiting examples include a junction circuit, at least one sensor circuit, an ultracapacitor charger circuit, an ultracapacitor management system circuit, a changeover circuit, a state of charge circuit, and an electronic management system circuit.

In one embodiment, the MSID comprises a junction circuit an ultracapacitor charger circuit, and ultracapacitor management system circuit, and an electronic management system circuit.

In some embodiments, the MSID comprises modular circuit boards. In further embodiments the modular circuit boards are circular. In further embodiments, the modular circuit boards are stacked. In further embodiments, the modular circuit boards are circular and stacked.

In certain embodiments, the power source comprises at least one of a wireline power source, a battery, or a generator.

In certain embodiments, the power source comprises at least one battery. In this embodiment, the MSID may further comprise a cross over circuit, particularly when the power source comprises more than battery. In particular embodiments, the MSID further comprises a state of charge circuit board.

In certain embodiments, the power source comprises a wireline, and at least one battery, e.g., a backup battery. In this embodiment, the MSID may further comprise a cross over circuit. In particular embodiments, the MSID further comprises a state of charge circuit.

In certain embodiments, the power source comprises a generator.

In certain embodiments, the power source comprises a generator, and at least one battery, e.g., a backup battery. In this embodiment, the MSID may further comprise a cross over circuit. In particular embodiments, the MSID further comprises a state of charge circuit.

In certain embodiments, the circuit boards may be combined to provide multi-functional circuit boards.

Accordingly, in another embodiment, the invention is directed to an intermittent power source buffer comprised of a power source supplying about 1 W to about 500 W, e.g., a downhole turbine, a high temperature rechargeable energy storage (HTRES), e.g., an ultracapacitor string (e.g., of 1-100 ultracapacitor cells) organized in a space efficient orientation as described herein, an optional load driver circuit, and a controller for controlling at least one of charging and discharging of the energy storage, the controller comprising at least one modular circuit configured for providing power; wherein the system is adapted for operation in a temperature range of between about seventy five degrees Celsius to about two hundred and ten degrees Celsius. In certain embodiments, this power system may be considered to have generated electrical output that may be applied to the load. In certain embodiments, the controller is an MSID of the present invention.

In certain embodiments, power may be supplied intermittently for greater than 500 hours, e.g., about 500 hours to about 1000 hours, e.g., about 1000 hours to about 1500 hours, e.g., for the life of the load.

In certain embodiments, the intermittent power source buffer may provide a range of voltage outputs, e.g., selected based upon the requirements of the load.

4. Systems for EM Telemetry

The primary challenge of telemetry is maintaining high signal to noise ratio when transmitting over noisy or very lossy formations. Lossy formations, such as highly resistive formations, attenuate the signal as it propagates resulting in decreased signal amplitude and consequently smaller signal to noise ratio. Excess external noise is summed with telemetry signal to increase the noise in a received signal. To compensate for decreased signal to noise ratio at the receiver, a slower data bit-rate is often used, sometimes with additional parity or redundancy bits. The receiver may be band-limited to reduce an overall noise content, the band-limit being lower bound by the data rate, so a lower data rate allows for lower overall noise content at an aspect of the receiver. Other methods to compensate for decreased signal to noise ratio at the receiver include increasing a magnitude of an aspect of the transmitted signal.

The output telemetry amplifier in conjunction with a power system configured to supply high-power may be utilized as a general purpose amplifier in many different scenarios. In one particular embodiment, this configuration may be used for transmitting telemetry signals over a resistive load. In another application, the same power amplifier configuration could be utilized for an inductive load, such as a motor or linear actuator.

As such, another power system embodiment of the invention provides a power system adapted for providing for high power or high voltage telemetry, by directing energy stored in the HTRES to the load comprising: a high temperature rechargeable energy storage (HTRES), e.g., an ultracapacitor string organized in a space efficient orientation as described herein, an optional load driver circuit, an amplifier circuit, and a controller for controlling at least one of charging and discharging of the energy storage, wherein the system is adapted for operation in a temperature range of between about seventy five degrees Celsius to about two hundred and ten degrees Celsius. In some embodiments the amplifier circuit is a Class-D circuit known in the art.

Accordingly, in another embodiment, the invention is directed to a telemetry device comprised of a power source, a high temperature rechargeable energy storage (HTRES), e.g., an ultracapacitor string (e.g., of 1-100 ultracapacitor cells) organized in a space efficient orientation as described herein, an optional load driver circuit, an amplifier circuit, and a controller for controlling at least one of charging and discharging of the energy storage; wherein the system is adapted for operation in a temperature range of between about seventy five degrees Celsius to about two hundred and ten degrees Celsius. In certain embodiments, the controller is an MSID of the present invention. In certain embodiments, the amplifier is a class-D amplifier.

In certain embodiments, a class-D amplifier is coupled to a dipole antenna or at least one electrode configured to wirelessly transmit information to the surface. In particular embodiments, the EM telemetry signal, e.g. at 12 Hz, may be characterized by greater power, voltage and/or current as compared with signals generated with known linear amplifiers currently used for this purpose.

In certain embodiments the power system comprising the amplifier is disposed physically in a tool string between an antenna and a conventional EM module.

In certain embodiments, the power system is also configured to receive a telemetry signal. In some examples, the controller, and in further examples, specifically, the EMS circuit, is configured to interpret said received telemetry signal.

In certain embodiments, an overall tool string architecture may be simplified by way of an interrupted connection between the antenna and the conventional aspects of the tool string, e.g. the conventional EM modulator, the other modules within an MWD or LWD tool string. The interrupted connection may comprise the power system comprising the amplifier. For instance, in this configuration, the signal presented by the conventional EM module may serve as an input signal to the power system comprising the amplifier and the power system may provide for an amplified version of said input signal to the load, e.g. the antenna. Additionally, if the power system is configured to receive a signal from a remote location, e.g. the surface, by way of the antenna, the power system may receive the signal directly from the antenna in this configuration. Further, if the signal received from the remote location is intended as a control directive an aspect of the power system comprising the amplifier, the power system can respond to said control directive in a fashion such that other aspects of the tool string are unaffected.

In certain embodiments, the amplifier circuit may be combined with the power converting load driver circuit to afford one combination circuit.

By amplifying an aspect of the telemetry signal, e.g., power, voltage, or current, a number of benefits may be realized. For example, for conditions that are otherwise fixed, an amplified aspect of the telemetry signal may lead to a higher signal to noise ratio of the received signal. Given that higher signal to noise ratio, tradeoffs may be made until the signal falls to the minimum detectable signal. Moreover, an attenuation of the telemetry signal may increase with range or depth in the formation, with frequency, and with other complicated parameters that depend on formation makeup. For instance, the system may enable longer range transmission, e.g. from deeper wells, more robust transmission, e.g., as is needed through problematic formations, and/or, faster transmission rates, e.g., by increasing the transmission frequency. Higher data transmission rates ultimately provide a means for faster and safer drilling, including faster communication of drilling dynamics to afford drilling optimization.

In certain embodiments, high power is achieved primarily through the use of a low impedance high voltage HTRES and efficient operation of the power electronics.

In certain embodiments, a power system comprising an amplifier may achieve high performance by way of two fundamental factors (1) the inclusion of relatively high power (low resistance) HTRES providing for high power buffering of the power source, and/or (2) the replacement of linear amplifiers with switched-mode amplifiers, the former typically exhibiting between about 20% and 40% overall efficiency, the latter typically exhibiting between about 80% and 98% overall efficiency.

Considering highly resistive formations, one way to achieve high power transmission is by driving the formation with a signal having a large voltage amplitude. Considering low resistance formations, high power transmission may be achieved by delivering large current. Thus, in certain embodiments, the output of the amplifier is both high voltage and low impedance. In certain embodiments the amplifier provides for an adjustable aspect. The adjustable aspect can be selected from voltage, current, power, frequency, phase and the like. In certain embodiments where the amplifier provides for an adjustable aspect, said aspect may be adjusted in run-time to optimize a condition, for instance, signal integrity at the receiver, or power consumption by the power system. In certain embodiments, a system of the present invention provides for EM telemetry in a well at a depth of up to about 40,000 feet, e.g. up to about 30,000 feet, e.g. up to about 20,000 feet, e.g. up to about 10,000 feet.

In certain embodiments, a system of the present invention provides for EM telemetry in a well at a transmission frequency of up to about 100 Hz, e.g. up to about 75 Hz, e.g. up to about 50 Hz, e.g. up to about 25 Hz, e.g. up to about 15 Hz.

In certain embodiments, a system of the present invention may include some or all of the EM telemetry devices and techniques described in U.S. Provisional Patent Application Ser. No. 62/066,337 filed Oct. 20, 2014, the entire contents of which are incorporated herein by reference. For example, some embodiments may include a downhole EM telemetry system that transmits an EM signal with an output power in the range of 20 W to 2 kW, and any sub-range thereof, e.g., with a maximum output power of at least 200 W, 500, W, 750 W, 1,000 W, 1,250 W, 1,500 W, 1,750 W, 2,00 W or more.

5. Data Systems

In one embodiment, the modular signal interface device (MSID) of the present invention may be useful as component of a data system, e.g., configured for data logging and/or reporting, e.g., in MWD or LWD or other applications. In this embodiment, the data system may comprise an MSID that may comprise modular circuit boards selected from one or more sensor circuit boards, a junction circuit board, an EMS circuit, at least one memory or memory circuit, and any combination there of, for example, wherein said junction circuit board may be adapted to communicate with external computers/networks. In certain embodiments, a data system may further comprise circuits selected from an ultracapacitor charger, an HTRES, and a power interface for receiving power.

The MSID monitors downhole conditions and can be configured to log in memory and/or communicate in real-time data and parameters, for instance, warning levels, levels of downhole shocks, vibrations, stick slip, temperature or other such measurements. Certain advantages include, but are not limited to, the ability to prevent or mitigate the risk of toolstring damage and failure downhole, the ability to log data for accountability purposes, the ability to log data for repair and maintenance or service purposes, the ability to affect drilling dynamics, e.g., in real-time, such that drilling may be performed with increased efficiency, reduced shock, increased rate of penetration (ROP), increased bit performance, reduction of non-productive time (NPT) costs; reduction of fluid kicks and fractures. For example, if a drill bit is stuck, and the bit continues to drill and rotate, the result may be, for example, increased shock, reduced bit performance due to damage, and increased NPT costs, as well as potential damage to the entire electronic tool string.

Accordingly, the MSID may monitor one or more conditions such as shock, vibration, weight on bit (WOB), torque on bit (TOB), pressure and temperature, and hole size, which, for example, may be the related to effects of underbalanced drilling or air drilling, i.e. in some cases certain conditions are amplified in underbalanced or air drilling, e.g. shock and vibration is generally less dampened in those cases. Monitoring such downhole conditions, in certain embodiments, allows the driller to increase the effectiveness of drilling parameters and, for example, reduce the risk of toolstring fatigue, premature trips for failure, stuck pipe, kicks, downhole battery venting, lost circulation, etc. In certain embodiments, the MSID, e.g., disposed inside a housing described herein, is positioned in the toolstring or the collar of the bit. In certain embodiments, the MSID configured for data logging may provide one or more of the following: increased reliability of downhole tools, improved directional service, and/or improved tracking of wear on tool for improved replacement economics.

In certain embodiments, the MSID is configured to provide measurements based on the use of a unique configuration of sensor circuit boards that make available six degrees of freedom, which are composed of three lateral degrees of freedom, x, y, and z, and the rotation around each of these axis, $x_r$, $y_r$, and $z_r$.

In certain embodiments, the MSID is configured to provide downhole rpm measurements, e.g., rotational velocity of the toolstring or bit, weight on bit measurements, and torque on bit measurements.

In certain embodiments, the MSID is configured to provide downhole rpm measurements, e.g., rotational velocity of the toolstring or bit.

In certain embodiments, the MSID is configured to provide weight on bit measurements, and torque on bit measurements.

In certain embodiments, the MSID is configured to provide torque on bit measurements.

In certain embodiments, the power source comprises a wireline power source.

In certain embodiments, the power source comprises a generator.

In certain embodiments, the power source comprises a battery.

In certain embodiments, the power source comprises two batteries. In this embodiment, the MSID may further comprise a cross over circuit board. In particular embodiments, the MSID further comprises a state of charge circuit board.

In certain embodiments, the power source comprises a wireline power source, and at least one battery, e.g., a backup battery. In this embodiment, the MSID may further comprise a cross over circuit board. In particular embodiments, the MSID further comprises a state of charge circuit board electrically connected to junction circuit board.

In certain embodiments, the MSID configured for data logging is disposed in a housing alone, e.g., without an HTRES, e.g., one or more ultracapacitors described herein.

In certain embodiments, the MSID configured for data logging is disposed in housing along with an HTRES, e.g., one or more ultracapacitors described herein. For example, the MSID may be disposed in a housing along with an ultracapacitor string described herein, e.g., for use as a backup power source.

In certain embodiments, the MSID is connected to external components by a modular connection, e.g., a universal connector pin configuration.

As described above for the general composition of the MSID, the MSID may be constructed using, stacked circuit boards, e.g., stacked circular circuit boards, and a modular bus. In certain embodiments, the MSID may benefit from potting or encapsulating, e.g., using the advanced potting techniques described herein.

In certain embodiments, the modular boards are circular, e.g., with a diameter of less than 1.5 inches, e.g. less than 1.49 inches, e.g. less than 1.48 inches, e.g. less than 1.475 inches, e.g. less than 1.4 inches, e.g. less than 1.375 inches, e.g. less than 1.3 inches, e.g. less than 1.275 inches, e.g. less than 1.251 inches.

In certain embodiments, an MSID (e.g., disposed in a housing) may be relatively small compared to known standards, e.g., less than 12 inches long, e.g., less than 11 inches long, e.g., less than 10 inches long, e.g., less than 9 inches long, e.g., less than 8 inches long, e.g., less than 7 inches long, e.g., less than 6 inches long, e.g., less than 5 inches long, e.g., less than 4 inches long. Said MSID may then be readily disposed at various locations along a drill string or tool string. In this way, a plurality of MSID's may be employed to indicate, for instance, downhole conditions as they vary along the length of the drill string or tool string. Such spatial measurements may be useful for, among other things, locating, and making distinction of the source of a troublesome excitation, for example, whether it be an aspect of the drill string or tool string itself or an aspect of the formation or other well components, or an aspect of an interaction among said aspects, characterizing the spatial response of the toolstring to various excitations, further identifying potentially hazardous downhole effects such as stick slip or whirl, or identifying weak aspects of a system. To organize data received from said plurality of MSID, each may be assigned an identification or address on a data bus and each may transmit its information in conjunction with said identification or address and/or in response to a request for information relating to said identification or address, or according to a schedule which allocates a certain time or frequency to MSID with said identification or address.

In certain embodiments, an MSID may provide for logging and/or reporting of downhole conditions. Logging generally entails storing of data or information in memory. In particular embodiments, the MSID may be configured to provide that the memory may be interrogated at a later time, for instance, once the MSID is on surface. Alternatively, reporting may entail transmitting data from a downhole environment to a remote location for instance to the surface. Said reporting may be accomplished effectively in near real-time, or with a delay. Reporting features may exist in systems also having logging features. Reporting features may compliment logging features, e.g., reporting may interrogate a local memory while a system is still downhole to report information that had been previously logged.

In certain embodiments, the MSID configured for data logging may be coupled with a tool string data bus. In this way, the MSID may provide for information to be transmitted to the surface, for example, using the transmission taking place by way of telemetry systems already or otherwise incorporated into the tool string. For example, a tool string microprocessor unit (MPU) module may interpret data bus signals originating from the MSID and input those to a mud pulse telemetry system. The mud pulse telemetry system and specifically the mud pulser may then transmit the data to a surface system by way of mud pulse telemetry known in the industry. In an alternative embodiment, the information from the MSID may utilize electromagnetic (EM) telemetry, also known in the industry.

In certain embodiments, the MSID may comprise a circuit useful for detecting a fault in any part of the tool string, e.g., in real-time. In a particular embodiment, the MSID configured for data logging may be coupled with a tool string data bus to afford this detection of a fault.

In certain embodiments, an MSID may provide for an "interrupt-style" telemetry scheme to the surface. In these examples, information may be transmitted to the surface for instance by methods leveraging tool string telemetry, e.g., well-known in the art or as described herein. The interrupt style communication scheme may override usual data transmissions to the surface, e.g., data transmissions needed to continue drilling operations. In this way, warnings of downhole conditions that should be addressed (hazardous conditions), for instance by stopping drilling operations, may force operators to stop drilling operations, e.g., by starving them of needed information or power. Drilling operators may remedy the situation leading to hazardous conditions and then continue drilling. In this way, an overall reliability of downhole systems may be improved. Additionally, in certain embodiments, a record of deviations from recommended practices may be logged.

In certain embodiments with interrupt-style communication, data transmitted to the surface may comprise warning information or raw data that would indicate certain conditions, or data otherwise parameterized or configured in a manner deemed useful by the designer or user. For example, levels of continuous vibration may be mapped to warning levels or warning signals indicating a level of severity. Similarly, levels of shock, temperature, anomalies in torque on bit (TOB) or weight on bit (WOB) or other downhole effects that may be hazardous may be mapped to warning levels or warning signals. Examples of downhole effects that may be hazardous include stick-slip, whirl, or drill pipe bending, or other art-recognized downhole effects.

Additionally, in certain embodiments with interrupt-style telemetry, combinations of downhole conditions may contribute collectively to increased warning levels, for example a combination of relatively high temperature, e.g., greater than 150 degrees Celsius, and relatively high rate and magnitude of shocks, e.g., 100 counts per second (cps) greater than 50 G, may indicate a more severe warning level than either measurement alone. A time integration of said measurements may also indicate an increasing warning level, for instance, 20 Grms (root mean square acceleration) of continuous vibration for a total of 100 hrs may indicate a more severe warning level than for instance 20 Grms of continuous vibration for a total of 10 hrs. As such, said warning levels may escalate over time. In one exemplary warning scheme, an integer may be transmitted, for example, between 1 and 4 to indicate levels of severity, or more explicitly to indicate a recommended action such as to halt drilling operations. Warning levels may be interpreted for intuitive purposes by a surface system to indicate, for instance, "red", "yellow", or "green" warning levels corresponding to for instance "halt drilling", "proceed with caution", or "proceed normally" respectively.

Although exemplified herein for use in data logging for MWD/LWD, the MSID configured for data logging may be used in any harsh environment, e.g., downhole environments, where the ability to measure vibration and shock is beneficial, for instance in heavy manufacturing equipment, engine compartments of planes, cars, etc, or energy production plants/turbines.

Moreover, while described herein using a circular housing embodiment, the MSID configured for data logging may also be used in any other shaped housing that would be sufficient for use in the tool string or the collar of the drill string. For instance an ring-shaped circuit board may be disposed in an annular cavity in a collar-mounted tool, a conventionally-shaped, e.g. rectangular, circuit board may be disposed in said cavity, in some instances axially. Said circuit boards, in some instances, may comprise a modular bus or components thereof. Said circuit boards may be stacked, for instance ring-shaped circuit boards may be stacked in an annular cavity. An MSID disposed in a collar may be particularly useful for accessing measurements helpful for determining TOB and WOB, for instance by disposing at least on strain gauge on a portion of a collar mounted housing, and coupling said at least one strain gauge to said MSID for measurement purposes.

i. Sensor Circuit Boards

The MSID of the present invention comprises one or more sensor circuit boards for measuring downhole conditions or orientation of the downhole tools. Such circuit boards may include or couple to one or more of the following components: at least one of an accelerometer, a magnetometer, a gyroscope, a temperature sensor, a pressure sensor, a strain gauge, useful for measuring a downhole condition or orientation of a downhole tool, e.g., the toolstring or the drill bit.

In certain embodiments, the MSID is able to determine a rotational rate of a tool string about an axis.

In certain embodiments, the MSID is able to account for the effect of gravity in some embodiments.

In certain embodiments, the MSID is able to account for the effect of "whirl," which is art-recognized as lateral downhole vibration, in some embodiments.

Generally, both torsional acceleration and time-domain measurements of drill string rotation rate (RPMs) may indicate potentially hazardous downhole effects such as stick slip and whirl. For instance, stick slip (i.e., a reaction to built up torsional energy along the length of the drill string) may be measured by a time-varying and somewhat periodic torsional acceleration by way of a radially offset accelerometer with at least one measurement axis having a component tangential to the tool string or drill string. Alternatively, stick slip may be measured by a time-varying rotational rate (RPMs), for instance in a periodically varying rotational rate. A rotational rate may be measured by accelerometers configured to measure centripetal acceleration by way of a radially offset accelerometer with at least one measurement axis having a component radially to the tool string or drill string. A rotational rate may also be determined by an integration of torsional acceleration. In some examples, mild stick slip may be indicated by a variation in rotational rate less than about the average rotational rate and may be termed moderate-to-pronounced torsional vibration in some instances. In said examples, more sever stick slip may be indicated by a variation in rotational rate greater than about the average rotational rate and may be termed significant to severe stick slip in some instances. In some examples, the severity levels of stick slip and other effects may simply be indicated by a level of torsional acceleration. In certain embodiments herein, torsional acceleration may be determined by way of tangential acceleration measurements and/or centripetal acceleration measurements (the latter requiring the effect of a time-derivative to determine torsional acceleration).

In one embodiment of the invention, the MSID includes sensor circuit boards sufficient to measure accelerometer based vibration detection and/or shock detection. In certain embodiments, the MSID sensor circuit boards are configured for detection of acceleration, e.g. shock and vibration, among 6 degrees of freedom. In certain embodiments, the MSID sensor circuit boards are configured for detection of shock, e.g., with the range of detectable shocks approximately less than about 1,000 G.

In certain embodiments, a sensor circuit board may comprise one accelerometer. In certain embodiments a sensor circuit board may comprise multiple accelerometers.

In certain embodiments, the MSID comprises a combination of two sensor circuit boards, wherein one sensor circuit board comprises one accelerometer, and the second sensor circuit board comprises two accelerometers. In a specific embodiment, 3 accelerometers may be arranged in accordance with FIG. 38B. This configuration of sensor circuit boards makes available six degrees of freedom (6-DOF), which are composed of three translational (axial or lateral) degrees of freedom, (x, y, and z), and three rotational degrees of freedom (the rotation around each of these axis, $x_r$, $y_r$, and $z_r$). Translational acceleration can be measured by a single 3-axis accelerometer. In order to measure the three degrees of rotational acceleration, a difference between two parallel axes of acceleration may be taken. FIG. 38B shows a sample orientation suited for measuring 6-DOF.

Accordingly, in certain embodiments, a system of the present invention comprises a configuration of sensors providing for 6 degree of freedom acceleration measurements.

In certain embodiments, the MSID comprises at least one sensor circuit board configured to measure rotation. FIG. 38B depicts that the rotation $x_r$ may be found through the difference of the y vectors of A1 and A3; the rotation $y_r$ may be found through the difference of the x vectors of A1 and A3; and the rotation $z_r$ may be found through the difference between the x acceleration vectors of A1 and A2. Furthermore, the rotational velocity of a drill string around the central z axis is directly related to the centripetal acceleration. Centripetal acceleration may be measured by a sensor with at least one measurement axis having a component directed radially, for instance, A3 in FIG. 38B. Another example configuration suited for determining rotational velocity by way of centripetal acceleration is shown in FIG. 38A. In FIG. 38A, a radial acceleration measurement may be taken as the difference between radial components of A1 and A2, as well as between the radial components of A1 and A3. The orthogonal placement and redundant radial measurements enables separation of angular velocity around the z axis from the four acceleration components while providing less measurement uncertainty.

As such, in one embodiment, the invention provides an MSID configured for data logging and/or reporting comprising a configuration of accelerometers in a 3-axis orientation, wherein this 3-axis orientation is comprised of a first sensor circuit board with at least one accelerometer electrically coupled to at least a second sensor circuit board, e.g. comprising two accelerometers, wherein one of the said two accelerometers on said second board is axially aligned with an accelerometer on the first sensor circuit board.

It may be generally advantageous to use different accelerometers to measure different accelerations, e.g. those used to measure rotational velocity, those used to measure vibration, and those used to measure shock. These three examples generally differ in drilling applications in their typical ranges of acceleration, for instance, centripetal acceleration as may be used to determine rotational velocity may range from about 0 to about 5 G, vibration whether it be translational or rotational may range from about 0 to about 50 G, and shock, whether it be translational or rotational may range from about 0 to about several thousand G. Generally acceleration measuring units, e.g. accelerometers, present tradeoffs between range and resolution, for instance an accelerometer having a range of 1,000 G may have a resolution of about 5 G, while an accelerometer having a range of 5 G may have a resolution of about 100 mG. Typically, measurements requiring higher range, also have relaxed requirements on resolution. Additionally, various accelerometers, are characterized by various frequency response aspects, e.g. bandwidth specifications. As an example, vibration and shock measurements generally require moderate to high bandwidth, and moderate to high g accelerometers, and in particular shock measurements generally require high bandwidth and high g accelerometers. On the other hand, RPM measurements generally require low g accelerometers and do not need high bandwidth. Low g accelerometers are useful in order to achieve high resolution analog-to-digital conversion across the expected range of radial accelerations. Greater power efficiency and signal to noise ratio can be achieved with low bandwidth accelerometers. A low g, low bandwidth, but high resolution accelerometer useful for these measurements is the Analog Devices Inc. part number AD22293Z. Meanwhile an accelerometer that presents a compromise between range and resolution for both shock and vibration is the Analog Devices Inc. part number ADXL377BCPZ-RL7. Analog Devices Inc. has offices Norwood, MA USA. In summary, various accelerometers with various performance aspects may be employed to measure the various quantities or effects described herein. In some cases, at least one accelerometer is "dual-used", i.e. for measuring more than one quantity or effect.

For clarity, torsional oscillation and stick slip refer to the condition during which the RPM of the BHA differ from the RPM at the surface and periodically fluctuates between a maximum and a minimum value. In some examples, the torsional oscillation and stick slip measurements may be reported based on Stick Slip Index (SSI), which is calculated based on the equation: SSI=(Max RPM−Min RPM)/(2× Avg·RPM).

In certain embodiments, the sensor circuit board includes a magnetometer. Said magnetometer may be useful for among other things, to determine a rate of rotation by way of a measuring a magnetic orientation relative to earth's magnetic field and/or to aide in a determination of direction, e.g., by providing a directional measurement which may be useful for among other things directional drilling operations.

In certain embodiments an MSID may be used for directional measurements. Methods for converting measurements of acceleration in the presence of gravity to directional measurements are well known in the industry. In some instances a magnetometer aids those measurements. An example method provides for a directional measurement by way of coordinate system aspects sometimes called pitch and roll estimation through rotation matrices chosen to depend only on pitch and roll while the third degree of freedom, sometimes called yaw, is left to be determined by way of a magnetometer configured to detect earth's magnetic field. Pitch, roll, and yaw are terms known in the industry, especially in avionics but more recently in the context of handheld devices comprising accelerometers for entertainment and the like. In some examples, a magnetometer may reside elsewhere in a tool string or drill string and access to said magnetometer may be had by an MSID by way of a tool string or drill string signal or data bus. In those examples, readings from said magnetometer may be used by an MSID for the purposes described above.

In certain embodiments, it may be useful to convert analog measurements indicative of downhole conditions or orientation to digital signals, for instance for recording in memory, for communicating the signals to another digital system, for instance a tool string digital system by way of a digital bus, and/or a digital telemetry system.

Due to the scarcity of power in downhole systems, in certain embodiments, power consumption is minimized. A variety of techniques may be utilized to accomplish this minimization, including, but not limited to designing based on the knowledge of expected signals. For example, some acceleration signals are typically wideband and/or continuous, e.g., "continuous vibration," wherein an appropriate sampling rate of the acceleration signals can be selected to capture a substantial amount of the information therein, for example by setting the sampling frequency to be more than twice as the highest frequency aspect typically expected. Choosing a frequency substantially higher is generally expected to increase power consumption, e.g. beyond about 1-5 mW, without providing for substantially more useful information. Another example may involve temperature, which is expected to change slowly. Other examples include shock. Those acceleration signals typically change quickly and may be intermittent (as opposed to continuous). Generally the magnitude and rate of shocks are important. Moreover, they are relatively short in duration, e.g. less than about 500 ms in duration each. Reliable and accurate measurement of the important features of shocks requires a sample rate yielding several samples per shock, e.g. 100 samples. Sample rates of a single channel for shock measurement may be as high as about 50 or 100 ksps. However, due to the intermittency of some shock a continuously sampled signal, sampled at a relatively high rate, e.g. 100 ksps, is generally expected to increase power consumption, e.g. beyond about 1-5 mW, without providing for substantially more useful information on average. One alternative solution is to provide for an analog detection circuit, which may draw relatively low power on average, e.g. less than 100 uW. An example of such a circuit is a comparator configured to provide a signal transition or a logic level signal when an acceleration beyond a predetermined shock threshold, e.g. 20-50 G, is detected. Said signal transition of logic level signal may be coupled to an input on a digital controller and said digital controller may be configured to treat said signal as an interrupt. In this way, high resolution or high speed sampling of the relevant acceleration signal may commence only when shocks are present, while power consumption of the full solution is generally expected to be substantially less than full digital solutions.

Generally, an MSID should report a faithful representation of downhole conditions. Meanwhile, those downhole conditions may be damaging to the MSID itself—the MSID may be similar in construction to other components in the downhole system, the same components that the MSID's information may be useful for protecting. Therefore, it is desirable, in certain embodiments, that the MSID is protected from downhole conditions, but is simultaneously enabled to provide a faithful representations of monitored conditions. For example, downhole shock and vibration may be damaging to systems including the MSID. The MSID may employ a body of protection features, for instance damped mechanical coupling between relatively sensitive electronic components and the housing. Dampening may be provided for by way of encapsulant such as a potting compound surrounding said electronic components, or dampening pads or inserts disposed between relatively hard surfaces of an electronics system and a portion of a housing or the like, or combinations thereof. Generally protection features may include dampening, mechanical energy dissipation and or soft coupling mechanisms. In certain embodiments, given an MSID with protection features such as those listed above, a faithful representation of downhole conditions can be recovered by providing for a pre-determined "map" between ambient conditions and measured conditions. Said map may be measured, for example, in the form of a transfer function in the frequency domain, the transfer function describing the gain and perhaps phase contribution of the protection features to the ambient excitation signal as measured by the MSID. Said map may be determined (calibrated) on the surface and then stored in memory. Said map may be quantified for a variety of different operating conditions, for instance at a variety of temperatures or pressures or immersed in a variety of fluid types. Said map may be stored locally (e.g. in a memory on the MSID), or remotely (e.g. in a memory accessible to a surface system). In the latter case, the MSID may be responsible for transmitting enough downhole parameters independent of the protection features such that the surface system may map measured conditions to downhole conditions.

Furthermore, logging, and in certain cases, reporting, may require a memory in one of the circuits of the MSID, e.g., on the sensor circuit board. Both volatile and non-volatile memory may be employed for these purposes. In the case of volatile memory, a designer will enjoy a higher density of memory (more information may be stored in a comparable volume compared to in non-volatile memory). However, volatile memory must be supported with a source of power in order to retain its stored data. Several solutions for using volatile memory downhole are possible, including, but not limited to utilizing a backup high temperature primary cell, e.g. a lithium thionyl chloride cell. Such a backup cell may be an explicit cell within the housing of the system, for instance, a coin cell, or it may be shared in a larger system. A primary battery available to the system may also be used for this purpose so long as a connection to the primary battery may be maintained until memory can be downloaded. In some instances, said primary battery can be a primary battery otherwise used for power downhole or directional systems so long as the battery terminals are available to the system. In some instances, the battery terminals are available to the system by way of a drill sting or tool string electrical bus. An alternative solution may be to employ high temperature rechargeable energy storage (HTRES) that is charged before disconnection of the system from a power source. Said HTRES may be charged by a downhole power source, e.g. a primary battery, generator or wireline connection. Said HTRES could provide enough useable energy to supply power to the volatile memory until memory can be downloaded. For instance a high temperature 16 Megabit SRAM Part number TTS1MX16LVn3 available from TT semiconductor, Inc. Anaheim, CA USA requires about 6 mA of data retention current at about 2 V or 12 mW of power. Therefore a HTRES having a stored energy of about 45 Joules would be capable of providing power to said volatile memory for data retention up to an hour. Examples of HTRES, including ultracapacitors described herein, are described below with respect to the modular systems. However, said HTRES may be provided by way of a High temperature ultracapacitor available from FastCAP Systems Inc. Boston, MA USA with about 15-20 mL of volume. An alternative solution would combine an MSID with a power system comprising HTRES such as those available from FastCAP Systems Inc. Said HTRES may be charged by a downhole power source and provide for the data retention power following disconnection for a downhole power source until memory can be downloaded. The SRAM above is available in a 52 pin package having an edge length of about one inch and a temperature rating of 200 degrees Celsius making it suitable for use in downhole tools such as an MSID. Non-volatile memory may also be employed, albeit generally at lower densities. For instance 1 Mbit EEPROM Part number TTE28HT010 available from TT semiconductor may be employed. The EEPROM above is available in an LCC package having an edge length about one half of an inch and a temperature rating of 200 degrees Celsius making it suitable for use in downhole tools such as an MSID. Generally volatile memory may also have a limit on the number of write cycles (the number of times one can write to memory) before it fails. Therefore, a designer may employ a scheme to buffer memory, for instance in a volatile memory and then periodically write that memory to a non-volatile memory.

In certain embodiments, certain monitoring data may be locally (e.g. in a memory on the MSID), and/or remotely (e.g. in a memory accessible to a surface system).

In certain embodiments, efficient use of memory capacity, e.g., in the MSID, is desirable. Any number of schemes for efficiently utilizing a downhole memory may be employed. In certain embodiments, the schemes generally employ a parameterization of the data that is recorded, for example, instead of recording all of the temperature data in an interval of one minute (a one minute window), the temperature data may be recorded over that minute in high resolution, for instance one sample per second (1 sps) temporarily, and then the mean and standard deviation computed; then the mean and standard deviation may be stored instead of the raw temperature data. In this example, and for the purposes of definition, the mean and standard deviation represent parameters of the data and so we consider the above a method of parameterization of the data. The result, in this example is that most of the meaningful information is stored in a much smaller amount of memory, e.g., as 2 bytes or pieces of data, as opposed to the larger amount of memory for the entirety of the raw temperature data, e.g., 60 pieces of data.

In certain embodiments, the scheme for collecting and storing and/or parameterizing data may be informed by typical behavior relating to the signal to be recorded. For instance, temperature generally varies slowly in downhole environments and as the tool moves down the borehole. In contrast, vibration may have high frequency content, however the average power in the frequency spectrum may not vary faster than a timescale of about a minute. Mechanical shock on the other hand tends to be intermittent, short duration, and requires high resolution during the shock event to accurately measure its salient features. An example of a shock and vibration logging scheme includes vibration logging parameterized by mean and standard deviation once per minute (1 spm) for each axis, shock count, peak shock magnitude and average shock magnitude parameterized at 1 spm; temperature averaged once every ten minutes (0.1 spm), stick slip index mean, standard deviation and peak, averaged at 1 spm, rotational rate (RPMs) averaged at 1 spm. Based on the number of measured quantities and their relative importance to the designer or user, the desired record length, and the amount of available memory, the logging scheme may be adjusted, for example even by the user. Resolution of the various quantities may be subject to trade off for longer record lengths and/or more resolution in measurement of other quantities.

In certain embodiments, the sensor circuit board may comprise a circuit board configured to receive data from sensors outside the MSID, e.g., from strain gauges, temperature sensors, or annular pressure, e.g., mounted along with the housing containing the MSID.

Accordingly, in one embodiment, the sensor circuit board is configured to determine torque on bit (TOB) by receiving data from one or more strain gauges coupled to the toolstring. A collar-mounted version of the system, in certain embodiments, may simplify the coupling to the drill string. In certain embodiments, a strain gauge may be mounted so that its major axis is not aligned with the circumference of a drill string housing, such that the gauge is able to indicate a "twisting" of the drill string housing, e.g., by way of a change in its resistance.

In another embodiment, the sensor circuit board is configured to determine weight on bit (WOB) by receiving data from one or more strain gauges coupled to the toolstring. In certain embodiments, a strain gauge may be mounted so that its major axis is substantially aligned with the major axis of the drill string, such that the gauge is able to indicate a compression of the drill string housing by way of a change in its resistance.

In another embodiment, the sensor circuit board is configured to determine temperature by way of a temperature sensor, by receiving data from a resistance temperature detector (RTD) which indicates a temperature by way of changing resistance.

Said changes in variable resistance above, (as in strain gauge or as in RTD cases) may be measured in any number of ways, but one example includes providing for a fixed resistance in series with the strain gauge or the RTD the combination connected to a reference voltage and ground. The node at the connection between the fixed resistance and the variable resistance will provide for a voltage indicative of the variable resistance. For example, as the strain gauge resistance decreases, said voltage will decrease. In some examples, it is then useful to read said voltage to a digital controller by way of an analog to digital conversion.

Ultracapacitors

Further disclosed herein are capacitors for use the present invention that provide users with improved performance in a wide range of temperatures. Such ultracapacitors may comprise an energy storage cell and an electrolyte system within an hermetically sealed housing, the cell electrically coupled to a positive contact and a negative contact, wherein the ultracapacitor is configured to operate at a temperature within a temperature range between about −40 degrees Celsius to about 210 degrees Celsius. For example, the capacitors for use in the present invention may comprise advanced electrolyte systems described herein, and may be operable at temperatures ranging from about as low as minus 40 degrees Celsius to as high as about 210 degrees Celsius. Such capacitors shall be described herein with reference to FIG. 3.

In general, the capacitor of the present invention includes energy storage media that is adapted for providing a combination of high reliability, wide operating temperature range, high power density and high energy density when compared to prior art devices. The capacitor includes components that are configured to ensure operation over the temperature range, and includes electrolytes 6 that are selected, e.g., from known electrolyte systems or from the advanced electrolyte systems described herein. The combination of construction, energy storage media and electrolyte systems described herein provide the robust capacitors for use in the present invention that afford operation under extreme conditions with enhanced properties over existing capacitors, and with greater performance and durability.

Accordingly, the present invention may comprise an ultracapacitor comprising: an energy storage cell and an advanced electrolyte system (AES) within an hermetically sealed housing, the cell electrically coupled to a positive contact and a negative contact, wherein the ultracapacitor is configured to operate at a temperature within a temperature range ("operating temperature") between about −40 degrees Celsius to about 210 degrees Celsius; about −35 degrees Celsius to about 210 degrees Celsius; about −40 degrees Celsius to about 205 degrees Celsius; about −30 degrees Celsius to about 210 degrees Celsius; about −40 degrees Celsius to about 200 degrees Celsius; about −25 degrees Celsius to about 210 degrees Celsius; about −40 degrees Celsius to about 195 degrees Celsius; about −20 degrees Celsius to about 210 degrees Celsius; about −40 degrees Celsius to about 190 degrees Celsius; about −15 degrees Celsius to about 210 degrees Celsius; about −40 degrees Celsius to about 185 degrees Celsius; about −10 degrees Celsius to about 210 degrees Celsius; about −40 degrees Celsius to about 180 degrees Celsius; about −5 degrees Celsius to about 210 degrees Celsius; about −40 degrees Celsius to about 175 degrees Celsius; about 0 degrees Celsius to about 210 degrees Celsius; about −40 degrees Celsius to about 170 degrees Celsius; about 5 degrees Celsius to about 210 degrees Celsius; about −40 degrees Celsius to about 165 degrees Celsius; about 10 degrees Celsius to about 210 degrees Celsius; about −40 degrees Celsius to about 160 degrees Celsius; about 15 degrees Celsius to about 210 degrees Celsius; about −40 degrees Celsius to about 155 degrees Celsius; about 20 degrees Celsius to about 210 degrees Celsius; about −40 degrees Celsius to about 150 degrees Celsius.

Figure 3:
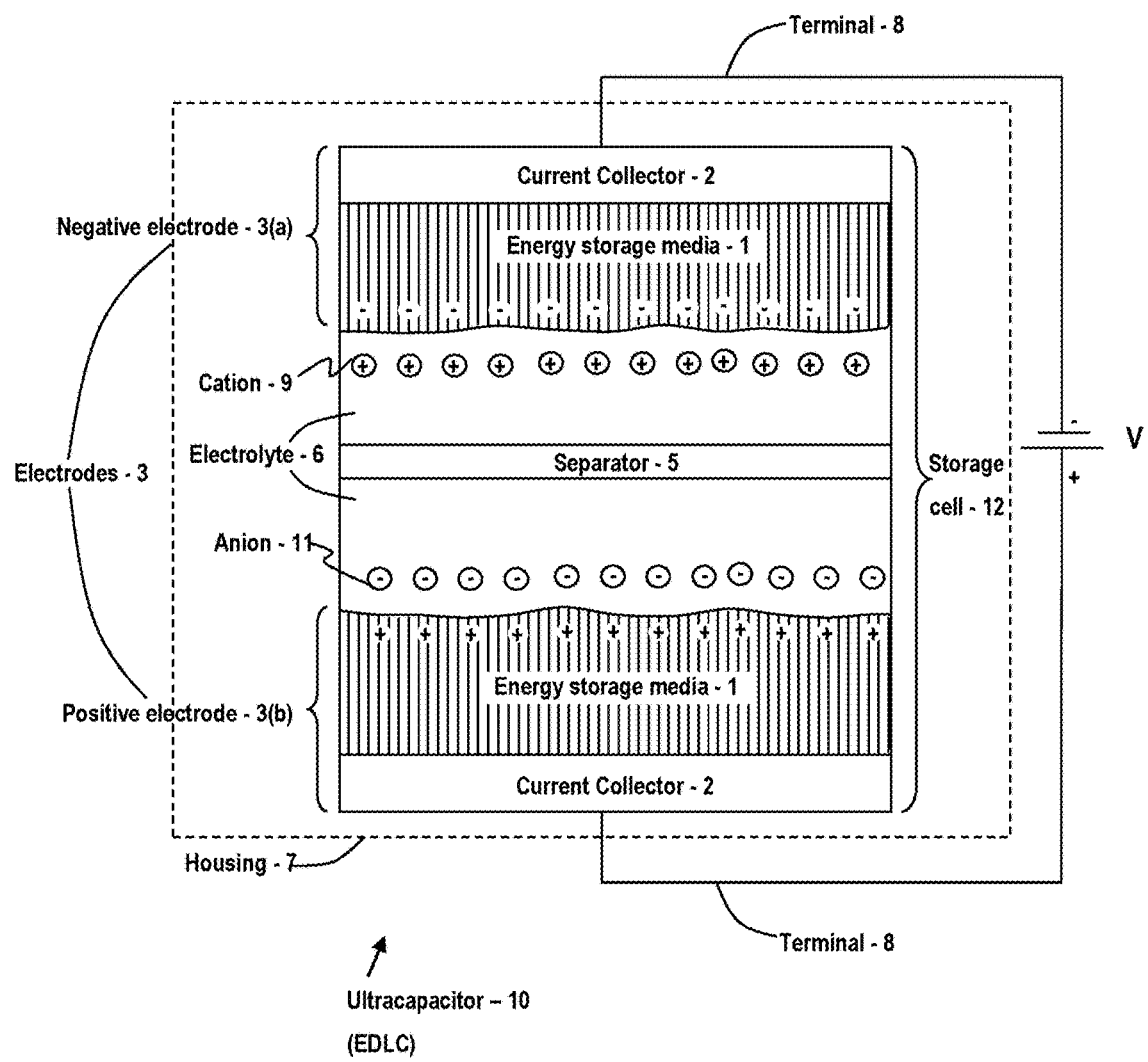
FIG. 3 illustrates aspects of an exemplary ultracapacitor.

For example, as shown in FIG. 3, an exemplary embodiment of a capacitor is shown. In this case, the capacitor is an "ultracapacitor 10." The exemplary ultracapacitor 10 is an electric double-layer capacitor (EDLC). The ultracapacitor 10 may be embodied in several different form factors (i.e., exhibit a certain appearance). Examples of potentially useful form factors include a cylindrical cell, an annular or ring-shaped cell, a flat prismatic cell or a stack of flat prismatic cells comprising a box-like cell, and a flat prismatic cell that is shaped to accommodate a particular geometry such as a curved space. A cylindrical form factor may be most useful in conjunction with a cylindrical system or a system mounted in a cylindrical form factor or having a cylindrical cavity. An annular or ring-shaped form factor may be most useful in conjunction with a system that is ring-shaped or mounted in a ring-shaped form factor or having a ring-shaped cavity. A flat prismatic form factor may be most useful in conjunction with a system that is rectangularly-shaped, or mounted in a rectangularly-shaped form factor or having a rectangularly-shaped cavity.

While generally disclosed herein in terms of a "jelly roll" application (i.e., a storage cell 12 that is configured for a cylindrically shaped housing 7), the rolled storage cell 23 (referring to FIG. 25) may take any form desired. For example, as opposed to rolling the storage cell 12, folding of the storage cell 12 may be performed to provide for the rolled storage cell 23. Other types of assembly may be used. As one example, the storage cell 12 may be a flat cell, referred to as a coin type, pouch type, or prismatic type of cell. Accordingly, rolling is merely one option for assembly of the rolled storage cell 23. Therefore, although discussed herein in terms of being a "rolled storage cell 23", this is not limiting. It may be considered that the term "rolled storage cell 23" generally includes any appropriate form of packaging or packing the storage cell 12 to fit well within a given design of the housing 7.

Various forms of the ultracapacitor 10 may be joined together. The various forms may be joined using known techniques, such as welding contacts together, by use of at least one mechanical connector, by placing contacts in electrical contact with each other and the like. A plurality of the ultracapacitors 10 may be electrically connected in at least one of a parallel and a series fashion.

For the purposes of this invention, an ultracapacitor 10 may have a volume in the range from about 0.05 cc to about 7.5 liters.

The components of the ultracapacitors of the present invention will now be discussed, in turn.

Electrolyte Systems

Electrolytes

Figure 4:
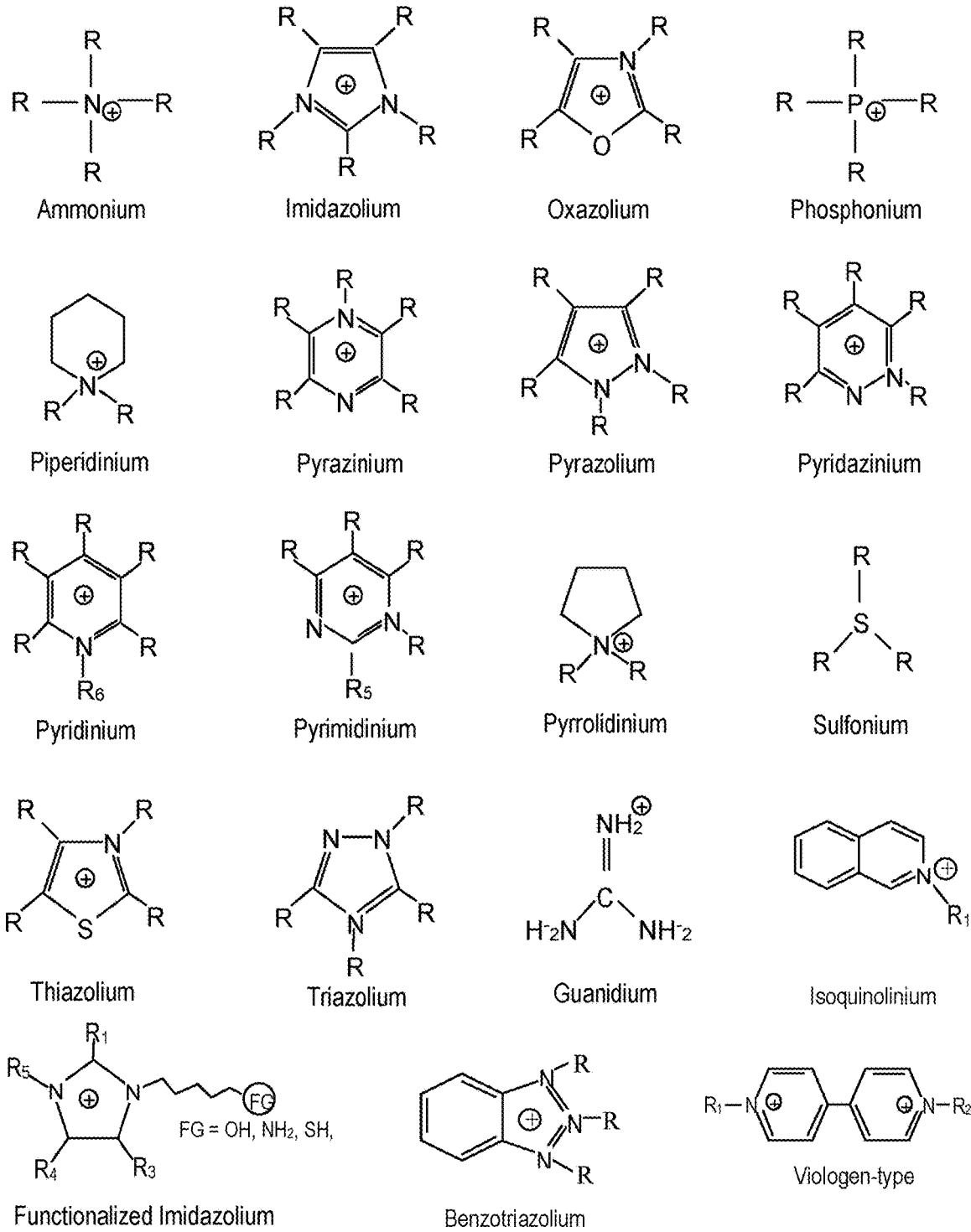
FIG. 4 depicts embodiments of primary structures for cations that may be included in an exemplary ultracapacitor.

The electrolyte 6 includes a pairing of cations 9 and anions 11 and may include a solvent. The electrolyte 6 may be referred to as an "ionic liquid" as appropriate. Various combinations of cations 9, anions 11 and solvent may be used. In the exemplary ultracapacitor 10, the cations 9 may include at least one of 1-(3-Cyanopropyl)-3-methylimidazolium, 1,2-Dimethyl-3-propylimidazolium, 1,3-Bis(3-cyanopropyl)imidazolium, 1,3-Diethoxyimidazolium, 1-Butyl-1-methylpiperidinium, 1-Butyl-2,3-dimethylimidazolium, 1-Butyl-3-methylimidazolium, 1-Butyl-4-methylpyridinium, 1-Butylpyridinium, 1-Decyl-3-methylimidazolium, 1-Ethyl-3-methylimidazolium, 3-Methyl-1-propylpyridinium, and combinations thereof as well as other equivalents as deemed appropriate. Additional exemplary cations 9 include imidazolium, pyrazinium, piperidinium, pyridinium, pyrimidinium, and pyrrolidinium (structures of which are depicted in FIG. 4). In the exemplary ultracapacitor 10, the anions 11 may include at least one of bis(trifluoromethanesulfonate)imide, tris(trifluoromethanesulfonate)methide, dicyanamide, tetrafluoroborate, hexafluorophosphate, trifluoromethanesulfonate, bis(pentafluoroethanesulfonate)imide, thiocyanate, trifluoro(trifluoromethyl)borate, and combinations thereof as well as other equivalents as deemed appropriate.

The solvent may include acetonitrile, amides, benzonitrile, butyrolactone, cyclic ether, dibutyl carbonate, diethyl carbonate, diethylether, dimethoxyethane, dimethyl carbonate, dimethylformamide, dimethylsulfone, dioxane, dioxolane, ethyl formate, ethylene carbonate, ethylmethyl carbonate, lactone, linear ether, methyl formate, methyl propionate, methyltetrahydrofuran, nitrile, nitrobenzene, nitromethane, n-methylpyrrolidone, propylene carbonate, sulfolane, sulfone, tetrahydrofuran, tetramethylene sulfone, thiophene, ethylene glycol, diethylene glycol, triethylene glycol, polyethylene glycols, carbonic acid ester, α-butyrolactone, nitrile, tricyanohexane, any combination thereof or other material(s) that exhibit appropriate performance characteristics.

Referring now to FIG. 4, there are shown various additional embodiments of cations 9 suited for use in an ionic liquid to provide the electrolyte 6. These cations 9 may be used alone or in combination with each other, in combination with at least some of the foregoing embodiments of cations 9, and may also be used in combination with other cations 9 that are deemed compatible and appropriate by a user, designer, manufacturer or other similarly interested party. The cations 9 depicted in FIG. 4 include, without limitation, ammonium, imidazolium, oxazolium, phosphonium, piperidinium, pyrazinium, pyrazinium, pyridazinium, pyridinium, pyrimidinium, pyrrolidinium, sulfonium, thiazolium, triazolium, guanidium, isoquinolinium, benzotriazolium, viologen-types, and functionalized imidazolium cations.

With regard to the cations 9 shown in FIG. 4, various branch groups ($R_1$, $R_2$, $R_3$, ... $R_x$) are included. In the case of the cations 9, each branch groups ($R_x$) may be one of alkyl, heteroalkyl, alkenyl, heteroalkenyl, alkynyl, heteroalkynyl, halo, amino, nitro, cyano, hydroxyl, sulfate, sulfonate, or a carbonyl group any of which is optionally substituted.

Generally, any ion with a negative charge maybe used as the anion 11. The anion 11 selected is generally paired with a large organic cation 9 to form a low temperature melting ionic salt. Room temperature (and lower) melting salts come from mainly large anions 9 with a charge of −1. Salts that melt at even lower temperatures generally are realized with anions 11 with easily delocalized electrons. Anything that will decrease the affinity between ions (distance, delocalization of charge) will subsequently decrease the melting point. Although possible anion formations are virtually infinite, only a subset of these will work in low temperature ionic liquid application. This is a non-limiting overview of possible anion formations for ionic liquids.

Common substitute groups (á) suited for use of the anions 11 provided in Table 6 include: —F⁻, —Cl⁻, —Br⁻, —I⁻, —OCH₃⁻, —CN⁻, —SCN⁻, —C₂H₃O₂⁻, —ClO⁻, —ClO₂⁻, —ClO₃⁻, —ClO₄⁻, —NCO⁻, —NCS⁻, —NCSe⁻, —NCN⁻, —OCH(CH₃)₂⁻, —CH₂OCH₃⁻, —COOH⁻, —OH⁻, —SOCH₃⁻, —SO₂CH₃⁻, —SOCH₃⁻, —SO₂CF₃⁻, —SO₃H⁻, —SO₃CF₃⁻, —O(CF₃)₂C₂(CF₃)₂O⁻, —CF₃⁻, —CHF₂⁻, —CH₂F⁻, —CH₃⁻, —NO₃⁻, —NO₂⁻, —SO₃⁻, —SO₄²⁻, —SF₅⁻, —CB₁₁H₁₂⁻, —CB₁₁H₆C₁₆⁻, —CH₃CB₁₁H₁₁⁻, —C₂H₅CB₁₁H₁₁⁻, -A-PO₄⁻, -A-SO₂⁻, A-SO₃⁻, -A-SO₃H⁻, -A-COO⁻, -A-CO⁻ {where A is a phenyl (the phenyl group or phenyl ring is a cyclic group of atoms with the formula C₆H₅) or substituted phenyl, alkyl, (a radical that has the general formula $CnH_{2n+1}$, formed by removing a hydrogen atom from an alkane) or substituted alkyl group, negatively charged radical alkanes, (alkane are chemical compounds that consist only of hydrogen and carbon atoms and are bonded exclusively by single bonds) halogenated alkanes and ethers (which are a class of organic compounds that contain an oxygen atom connected to two alkyl or aryl groups).

With regard to anions 11 suited for use in an ionic liquid that provides the electrolyte 6, various organic anions 11 may be used. Exemplary anions 11 and structures thereof are provided in Table 6. In a first embodiment, (No. 1), exemplary anions 11 are formulated from the list of substitute groups (á) provided above, or their equivalent. In additional embodiments, (Nos. 2-5), exemplary anions 11 are formulated from a respective base structure ($Y_2$, $Y_3$, $Y_4$, ... $Y_n$) and a respective number of anion substitute groups ($á_1$, $á_2$, $á_3$, ... $á_n$), where the respective number of anion substitute groups (a) may be selected from the list of substitute (á) groups provided above, or their equivalent. Note that in some embodiments, a plurality of anion substitute groups (á) (i.e., at least one differing anion substitute group (á)) may be used in any one embodiment of the anion 11. Also, note that in some embodiments, the base structure (Y) is a single atom or a designated molecule (as described in Table 6), or may be an equivalent.

More specifically, and by way of example, with regard to the exemplary anions provided in Table 6, certain combinations may be realized. As one example, in the case of No. 2, the base structure ($Y_2$) includes a single structure (e.g., an atom, or a molecule) that is bonded to two anion substitute groups ($á_2$). While shown as having two identical anion substitute groups ($á_2$), this need not be the case. That is, the base structure ($Y_2$) may be bonded to varying anion substitute groups ($á_2$), such as any of the anion substitute groups (á) listed above. Similarly, the base structure ($Y_3$) includes a single structure (e.g., an atom) that is bonded to three anion substitute groups ($á_3$), as shown in case No. 3. Again, each of the anion substitute groups (á) included in the anion may be varied or diverse, and need not repeat (be repetitive or be symmetric) as shown in Table 6. In general, with regard to the notation in Table 6, a subscript on one of the base structures denotes a number of bonds that the respective base structure may have with anion substitute groups (á). That is, the subscript on the respective base structure ($Y_n$) denotes a number of accompanying anion substitute groups ($á_n$) in the respective anion.

TABLE 6

Exemplary Organic Anions for an Ionic Liquid

| No.: | Ion | Guidelines for Anion Structure and Exemplary Ionic Liquids |
|---|---|---|
| 1 | -á₁ | Some of the above á may mix with organic cations to form an ionic liquid. An exemplary anion: Cl⁻ Exemplary ionic liquid: [BMI*][Cl] *BMI—butyl methyl imidazolium |
| 2 | -Y₂á₂ | Y₂ may be any of the following: N, O, C=O, S=O. Exemplary anions include: B (CF₃CO₂)₄⁻ ⁻N(SO₂CF₃)₂⁻ Exemplary ionic liquid: [EMI*][NTF₂] *EMI—ethyl methyl imidazolium |
| 3 | -Y₃á₃ | Y₃ may be any of the following: Be, C, N, O, Mg, Ca, Ba, Ra, Au. Exemplary anions include: —C(SO₂CF₃)₃⁻ Exemplary ionic liquid: [BMI] C(SO₂CF₃)₃⁻ |

TABLE 6-continued

Exemplary Organic Anions for an Ionic Liquid

| No.: | Ion | Guidelines for Anion Structure and Exemplary Ionic Liquids |
|---|---|---|
| 4 | $-Y_4\mathring{a}_4$ | $Y_4$ may be any of the following: B, Al, Ga, Th, In, P. Exemplary anions include: $-BF_4^-$, $-AlCl_4^-$ Exemplary ionic liquid: $[BMI][BF_4]$ |
| 5 | $-Y_6\mathring{a}_6$ | $Y_6$ can be any of the following: P, S, Sb, As, N, Bi, Nb, Sb. Exemplary anions include: $-P(CF_3)_4F_2^-$, $-AsF_6^-$ Exemplary ionic liquid: $[BMI][PF_6]$ |

Advanced Electrolyte Systems of the Invention

The advanced electrolyte systems that may be used in the capacitors of the present invention provide the electrolyte component of the ultracapacitors of the present invention, and are noted as "electrolyte 6" in FIG. 3. The electrolyte 6 fills void spaces in and between the electrode 3 and the separator 5. In general, the advanced electrolyte systems of the invention comprise unique electrolytes, purified enhanced electrolytes, or combinations thereof, wherein the electrolyte 6 is a substance, e.g., comprised of one or more salts or ionic liquids, which disassociate into electrically charged ions (i.e., positively charged cations and negatively charged anions) and may include a solvent. In the advanced electrolyte systems of the present invention, such electrolyte components are selected based on the enhancement of certain performance and durability characteristics, and may be combined with one or more solvents, which dissolve the substance to generate compositions with novel and useful electrochemical stability and performance.

The advanced electrolyte systems that may be used in the capacitors of the present invention afford unique and distinct advantages to the ultracapacitors over existing energy storage devices (e.g., energy storage devices containing electrolytes not disclosed herein, or energy storage devices containing electrolytes having insufficient purity). These advantages include improvements in both performance and durability characteristics, such as one or more of the following: decreased total resistance, increased long-term stability of resistance (e.g., reduction in increased resistance of material over time at a given temperature), increased total capacitance, increased long-term stability of capacitance (e.g. reduction in decreased capacitance of a capacitor over time at a given temperature), increased energy density (e.g. by supporting a higher voltage and/or by leading to a higher capacitance), increased voltage stability, reduced vapor pressure, wider temperature range performance for an individual capacitor (e.g. without a significant drop in capacitance and/or increase in ESR when transitioning between two temperatures, e.g. without more than a 90% decrease in capacitance and/or a 1000% increase in ESR when transitioning from about +30° C. to about −40° C.), increased temperature durability for an individual capacitor (e.g., less than a 50% decrease in capacitance at a given temperature after a given time and/or less than a 100% increase in ESR at a given temperature after a given time, and/or less than 10 A/L of leakage current at a given temperature after a given time, e.g., less than a 40% decrease in capacitance and/or a 75% increase in ESR, and/or less than 5 A/L of leakage current, e.g., less than a 30% decrease in capacitance and/or a 50% increase in ESR, and/or less than 1 A/L of leakage current); increased ease of manufacturability (e.g. by having a reduced vapor pressure, and therefore better yield and/or more efficient methods of filling a capacitor with electrolyte), and improved cost effectiveness (e.g. by filling void space with material that is less costly than another material). For clarity, performance characteristics relate to the properties directed to utility of the device at a given point of use suitable for comparison among materials at a similar given point of use, while durability characteristics relate to properties directed to ability to maintain such properties over time. The performance and durability examples above should serve to provide context for what are considered "significant changes in performance or durability" herein.

The properties of the AES, or Electrolyte 6, may be the result of improvements in properties selected from increases in capacitance, reductions in equivalent-series-resistance (ESR), high thermal stability, a low glass transition temperature (Tg), an improved viscosity, a particular rheopectic or thixotropic property (e.g., one that is dependent upon temperature), as well as high conductivity and exhibited good electric performance over a wide range of temperatures. As examples, the electrolyte 6 may have a high degree of fluidicity, or, in contrast, be substantially solid, such that separation of electrode 3 is assured.

The advanced electrolyte systems of the present invention include, novel electrolytes described herein for use in high temperature ultracapacitors, highly purified electrolytes for use in high temperature ultracapacitors, and enhanced electrolyte combinations suitable for use in temperature ranges from −40 degrees Celsius to 210 degrees Celsius, without a significant drop in performance or durability across all temperatures.

In one particular embodiment, the AES comprises a novel electrolyte entity (NEE), e.g., wherein the NEE is adapted for use in high temperature ultracapacitors. In certain embodiments, the ultracapacitor is configured to operate at a temperature within a temperature range between about 80 degrees Celsius to about 210 degrees Celsius, e.g., a temperature range between about 80 degrees Celsius to about 150 degrees Celsius.

In one particular embodiment, the AES comprises a highly purified electrolyte, e.g., wherein the highly purified electrolyte is adapted for use in high temperature ultracapacitors. In certain embodiments, the ultracapacitor is configured to operate at a temperature within a temperature range between about 80 degrees Celsius to about 210 degrees Celsius.

In one particular embodiment, the AES comprises an enhanced electrolyte combination, e.g., wherein the enhanced electrolyte combination is adapted for use in both high and low temperature ultracapacitors. In certain embodiments, the ultracapacitor is configured to operate at a temperature within a temperature range between about −40 degrees Celsius to about 150 degrees Celsius.

As such, and as noted above, the advantages over the existing electrolytes of known energy storage devices are selected from one or more of the following improvements: decreased total resistance, increased long-term stability of resistance, increased total capacitance, increased long-term stability of capacitance, increased energy density, increased voltage stability, reduced vapor pressure, wider temperature range performance for an individual capacitor, increased temperature durability for an individual capacitor, increased ease of manufacturability, and improved cost effectiveness.

In certain embodiments of the ultracapacitor, the energy storage cell comprises a positive electrode and a negative electrode.

In certain embodiments of the ultracapacitor, at least one of the electrodes comprises a carbonaceous energy storage media, e.g., wherein the carbonaceous energy storage media comprises carbon nanotubes. In particular embodiments, the carbonaceous energy storage media may comprise at least one of activated carbon, carbon fibers, rayon, graphene, aerogel, carbon cloth, and carbon nanotubes.

In certain embodiments of the ultracapacitor, each electrode comprises a current collector.

In certain embodiments of the ultracapacitor, the AES is purified to reduce impurity content. In certain embodiments of the ultracapacitor, the content of halide ions in the electrolyte is less than about 1,000 parts per million, e.g., less than about 500 parts per million, e.g., less than about 100 parts per million, e.g., less than about 50 parts per million. In a particular embodiment, the halide ion in the electrolyte is selected from one or more of the halide ions selected from the group consisting of chloride, bromide, fluoride and iodide. In particular embodiments, the total concentration of impurities in the electrolyte is less than about 1,000 parts per million. In certain embodiments, the impurities are selected from one or more of the group consisting of bromoethane, chloroethane, 1-bromobutane, 1-chlorobutane, 1-methylimidazole, ethyl acetate and methylene chloride.

In certain embodiments of the ultracapacitor, the total concentration of metallic species in the electrolyte is less than about 1,000 parts per million. In a particular embodiment, the metallic species is selected from one or more metals selected from the group consisting of Cd, Co, Cr, Cu, Fe, K, Li, Mo, Na, Ni, Pb, and Zn. In another particular embodiment, the metallic species is selected from one or more alloys of metals selected from the group consisting of Cd, Co, Cr, Cu, Fe, K, Li, Mo, Na, Ni, Pb, and Zn. In yet another particular embodiment, the metallic species is selected from one or more oxides of metals selected from the group consisting of Cd, Co, Cr, Cu, Fe, K, Li, Mo, Na, Ni, Pb, and Zn.

In certain embodiments of the ultracapacitor, the total water content in the electrolyte is less than about 500 parts per million, e.g., less than about 100 parts per million, e.g., less than about 50 parts per million, e.g., about 20 parts per million.

In certain embodiments of the ultracapacitor, the housing comprises a barrier disposed over a substantial portion of interior surfaces thereof. In particular embodiments, the barrier comprises at least one of polytetrafluoroethylene (PTFE), perfluoroalkoxy (PFA), fluorinated ethylene propylene (FEP), ethylene tetrafluoroethylene (ETFE). In particular embodiments, the barrier comprises a ceramic material. The barrier may also comprise a material that exhibits corrosion resistance, a desired dielectric property, and a low electrochemical reactivity. In a specific embodiment of the barrier, the barrier comprises multiple layers of materials.

In certain embodiments of the ultracapacitor, the housing comprises a multilayer material, e.g., wherein the multilayer material comprises a first material clad onto a second material. In a particular embodiment, the multilayer material comprises at least one of steel, tantalum and aluminum.

In certain embodiments of the ultracapacitor, the housing comprises at least one hemispheric seal.

In certain embodiments of the ultracapacitor, the housing comprises at least one glass-to-metal seal, e.g., wherein a pin of the glass-to-metal seal provides one of the contacts. In a particular embodiment, the glass-to-metal seal comprises a feed-through that is comprised of a material selected from the group consisting of an iron-nickel-cobalt alloy, a nickel iron alloy, tantalum, molybdenum, niobium, tungsten, and a form of stainless and titanium. In another particular embodiment, the glass-to-metal seal comprises a body that is comprised of at least one material selected from the group consisting of nickel, molybdenum, chromium, cobalt, iron, copper, manganese, titanium, zirconium, aluminum, carbon, and tungsten and an alloy thereof.

In certain embodiments of the ultracapacitor, the energy storage cell comprises a separator to provide electrical separation between a positive electrode and a negative electrode, e.g., wherein the separator comprises a material selected from the group consisting of polyamide, polytetrafluoroethylene (PTFE), polyether ether ketone (PEEK), aluminum oxide ($Al_2O_3$), fiberglass, fiberglass reinforced plastic, or any combination thereof. In a particular embodiment, the separator is substantially free of moisture. In another particular embodiment, the separator is substantially hydrophobic.

In certain embodiments of the ultracapacitor, the hermetic seal exhibits a leak rate that is no greater than about $5.0 \times 10^{-6}$ atm-cc/sec, e.g., no greater than about $5.0 \times 10^{-7}$ atm-cc/sec, e.g., no greater than about $5.0 \times 10^{-8}$ atm-cc/sec, e.g., no greater than about $5.0 \times 10^{-9}$ atm-cc/sec, e.g., no greater than about $5.0 \times 10^{-10}$ atm-cc/sec.

In certain embodiments of the ultracapacitor, at least one contact is configured for mating with another contact of another ultracapacitor.

In certain embodiments of the ultracapacitor, the storage cell comprises a wrapper disposed over an exterior thereof, e.g., wherein the wrapper comprises one of PTFE and polyimide.

In certain embodiments of the ultracapacitor, a volumetric leakage current is less than about 10 Amperes per Liter within the temperature range.

In certain embodiments of the ultracapacitor, a volumetric leakage current is less than about 10 Amperes per Liter over a specified voltage range between about 0 Volts and about 4 Volts, e.g. between about 0 Volts and about 3 Volts, e.g. between about 0 Volts and about 2 Volts, e.g. between about 0 Volts and about 1 Volt. In certain embodiments of the ultracapacitor, the level of moisture within the housing is less than about 1,000 parts per million (ppm), e.g., less than about 500 parts per million (ppm), e.g., less than about 350 parts per million (ppm).

In certain embodiments of the ultracapacitor, the moisture content in an electrode of the ultracapacitor that is less than about 1,000 ppm, e.g., less than about 500 ppm, e.g., less than about 350 parts per million (ppm).

In certain embodiments of the ultracapacitor, the moisture content in a separator of the ultracapacitor that is less than about 1,000 ppm, e.g., less than about 500 ppm, e.g., less than about 160 parts per million (ppm).

In certain embodiments of the ultracapacitor, the chloride content is less than about 300 ppm for one of the components selected from the group consisting of an electrode, electrolyte and a separator.

In certain embodiments of the ultracapacitor, the volumetric leakage current (mA/cc) of the ultracapacitor is less than about 10 mA/cc while held at the substantially constant temperature, e.g., less than about 1 mA/cc while held at the substantially constant temperature. In a particular embodiment, In certain embodiments of the ultracapacitor, the volumetric leakage current of the ultracapacitor is greater than about 0.0001 mA/cc while held at the substantially constant temperature.

In certain embodiments of the ultracapacitor, volumetric capacitance of the ultracapacitor is between about 6 F/cc and about 1 mF/cc; between about 10 F/cc and about 5 F/cc; or between about 50 F/cc and about 8 F/cc.

In certain embodiments of the ultracapacitor, the volumetric ESR of the ultracapacitor is between about 20 mOhms·cc and 200 mOhms·cc; between about 150 mOhms·cc and 2 Ohms·cc; between about 1.5 Ohms·cc and 200 Ohms·cc; or between about 150 Ohms·cc and 2000 Ohms·cc.

In certain embodiments of the ultracapacitor, the ultracapacitor exhibits a capacitance decrease less than about 90 percent while held at a substantially constant voltage and operating temperature. In a particular embodiment, the ultracapacitor exhibits a capacitance decrease less than about 90 percent while held at a substantially constant voltage and operating temperature for at least 1 hour, e.g. for at least 10 hours, e.g. for at least 50 hours, e.g. for at least 100 hours, e.g. for at least 200 hours, e.g. for at least 300 hours, e.g. for at least 400 hours, e.g. for at least 500 hours, e.g. for at least 1,000 hours.

In certain embodiments of the ultracapacitor, the ultracapacitor exhibits an ESR increase less than about 1,000 percent while held at a substantially constant voltage and operating temperature for at least 1 hour, e.g. for at least 10 hours, e.g. for at least 50 hours, e.g. for at least 100 hours, e.g. for at least 200 hours, e.g. for at least 300 hours, e.g. for at least 400 hours, e.g. for at least 500 hours, e.g. for at least 1,000 hours.

Novel Electrolyte Entities (NEE)

The advanced electrolyte systems (AES) of the present invention comprise, in one embodiment, certain novel electrolytes for use in high temperature ultracapacitors. In this respect, it has been found that maintaining purity and low moisture relates to a degree of performance of the energy storage 30; and that the use of electrolytes that contain hydrophobic materials and which have been found to demonstrate greater purity and lower moisture content are advantageous for obtaining improved performance. These electrolytes exhibit good performance characteristics in a temperature range of about 80 degrees Celsius to about 210 degrees Celsius, e.g., about 80 degrees Celsius to about 200 degrees Celsius, e.g., about 80 degrees Celsius to about 190 degrees Celsius e.g., about 80 degrees Celsius to about 180 degrees Celsius e.g., about 80 degrees Celsius to about 170 degrees Celsius e.g., about 80 degrees Celsius to about 160 degrees Celsius e.g., about 80 degrees Celsius to about 150 degrees Celsius e.g., about 85 degrees Celsius to about 145 degrees Celsius e.g., about 90 degrees Celsius to about 140 degrees Celsius e.g., about 95 degrees Celsius to about 135 degrees Celsius e.g., about 100 degrees Celsius to about 130 degrees Celsius e.g., about 105 degrees Celsius to about 125 degrees Celsius e.g., about 110 degrees Celsius to about 120 degrees Celsius.

Accordingly, novel electrolyte entities useful as the advanced electrolyte system (AES) include species comprising a cation (e.g., cations shown in FIG. 4 and described herein) and an anion, or combinations of such species. In some embodiments, the species comprises a nitrogen-containing, oxygen-containing, phosphorus-containing, and/or sulfur-containing cation, including heteroaryl and heterocyclic cations. In one set of embodiments, the advanced electrolyte system (AES) include species comprising a cation selected from the group consisting of ammonium, imidazolium, oxazolium, phosphonium, piperidinium, pyrazinium, pyrazolium, pyridazinium, pyridinium, pyrimidinium, sulfonium, thiazolium, triazolium, guanidium, isoquinolinium, benzotriazolium, and viologen-type cations, any of which may be substituted with substituents as described herein. In one embodiment, the novel electrolyte entities useful for the advanced electrolyte system (AES) of the present invention in FIG. 4, selected from the group consisting of phosphonium, piperidinium, and ammonium, wherein the various branch groups $R_x$ (e.g., $R_1$, $R_2$, $R_3$, ... $R_x$) may be selected from the group consisting of alkyl, heteroalkyl, alkenyl, heteroalkenyl, alkynyl, heteroalkynyl, halo, amino, nitro, cyano, hydroxyl, sulfate, sulfonate, and carbonyl, any of which is optionally substituted, and wherein at least two $R_x$ are not H (i.e., such that the selection and orientation of the R groups produce the cationic species shown in FIG. 4); and the anion selected from the group consisting of tetrafluoroborate, bis(trifluoromethylsulfonyl)imide, tetracyanoborate, and trifluoromethanesulfonate.

For example, given the combinations of cations and anions above, in a particular embodiment, the AES may be selected from the group consisting of trihexyltetradecylphosphonium bis(trifluoromethylsulfonyl)imide, 1-butyl-1-methylpiperidinium bis(trifluoromethylsulfonyl)imide, and butyltrimethylammonium bis(trifluoromethylsulfonyl)imide. Data supporting the enhanced performance characteristics in a temperature range as demonstrated through Capacitance and ESR measurements over time, indicate high temperature utility and long term durability.

In certain embodiments, the AES is trihexyltetradecylphosphonium bis(trifluoromethylsulfonyl)imide.

In certain embodiments, the AES is 1-butyl-1-methylpiperidinium bis(trifluoromethylsulfonyl)imide.

In certain embodiments, the AES is butyltrimethylammonium bis(trifluoromethylsulfonyl)imide.

In another embodiment, the novel electrolyte entities useful for the advanced electrolyte system (AES) of the present invention include any combination of cations presented in FIG. 4, selected from the group consisting of imidazolium and pyrrolidinium, wherein the various branch groups $R_x$ (e.g., $R_1$, $R_2$, $R_3$, ... $R_x$) may be selected from the group consisting of alkyl, heteroalkyl, alkenyl, heteroalkenyl, alkynyl, heteroalkynyl, halo, amino, nitro, cyano, hydroxyl, sulfate, sulfonate, and carbonyl, any of which is optionally substituted, and wherein at least two $R_x$ are not H (i.e., such that the selection and orientation of the R groups produce the cationic species shown in FIG. 4); and the anion selected from the group consisting of tetrafluoroborate, bis(trifluoromethylsulfonyl)imide, tetracyanoborate, and trifluoromethanesulfonate. In one particular embodiment, the two $R_x$ that are not H, are alkyl. Moreover, the noted cations exhibit high thermal stability, as well as high conductivity and exhibit good electrochemical performance over a wide range of temperatures.

For example, given the combinations of cations and anions above, in a particular embodiment, the AES may be selected from the group consisting of 1-butyl-3-methylimidazolium tetrafluoroborate; 1-butyl-3-methylimidazolium bis(trifluoromethylsulfonyl)imide, 1-ethyl-3-methylimidazolium tetrafluoroborate; 1-ethyl-3-methylimidazolium tetracyanoborate; 1-hexyl-3-methylimidazolium tetracyanoborate; 1-butyl-1-methylpyrrolidinium bis(trifluoromethylsulfonyl)imide; 1-butyl-1-methylpyrrolidinium tris(pentafluoroethyl)trifluorophosphate; 1-butyl-1-methylpyrrolidinium tetracyanoborate, and 1-butyl-3-methylimidazolium trifluoromethanesulfonate.

In one embodiment, the AES is 1-butyl-3-methylimidazolium tetrafluoroborate.

In one embodiment, the AES is 1-butyl-3-methylimidazolium bis(trifluoromethylsulfonyl)imide.

In one embodiment, the AES is 1-ethyl-3-methylimidazolium tetrafluoroborate.

In one embodiment, the AES is 1-ethyl-3-methylimidazolium tetracyanoborate.

In one embodiment, the AES is 1-hexyl-3-methylimidazolium tetracyanoborate.

In one embodiment, the AES is 1-butyl-1-methylpyrrolidinium bis(trifluoromethylsulfonyl)imide.

In one embodiment, the AES is 1-butyl-1-methylpyrrolidinium tris(pentafluoroethyl)trifluorophosphate.

In one embodiment, the AES is 1-butyl-1-methylpyrrolidinium tetracyanoborate.

In one embodiment, the AES is 1-butyl-3-methylimidazolium trifluoromethanesulfonate.

In another particular embodiment, one of the two $R_x$ that are not H, is alkyl, e.g., methyl, and the other is an alkyl substituted with an alkoxy. Moreover, it has been found that cations having an N,O-acetal skeleton structure of the formula (1) in the molecule have high electrical conductivity, and that an ammonium cation included among these cations and having a pyrrolidine skeleton and an N,O-acetal group is especially high in electrical conductivity and solubility in organic solvents and supports relatively high voltage. As such, in one embodiment, the advanced electrolyte system comprises a salt of the following formula:

(1)

wherein R1 and R2 can be the same or different and are each alkyl, and X– is an anion. In some embodiments, $R_1$ is straight-chain or branched alkyl having 1 to 4 carbon atoms, $R_2$ is methyl or ethyl, and $X^-$ is a cyanoborate-containing anion 11. In a specific embodiment, $X^-$ comprises $[B(CN)]_4$ and $R_2$ is one of a methyl and an ethyl group. In another specific embodiment, $R_1$ and $R_2$ are both methyl. In addition, in one embodiment, cyanoborate anions 11, $X^-$ suited for the advanced electrolyte system of the present invention include, $[B(CN)_4]^-$ or $[BFn(CN)4-n]^-$, where n=0, 1, 2 or 3.

Examples of cations of the AES of the present invention comprising a Novel Electrolyte Entity of formula (1), and which are composed of a quaternary ammonium cation shown in formula (I) and a cyanoborate anion are selected from N-methyl-N-methoxymethylpyrrolidinium (N-methoxymethyl-N-methylpyrrolidinium), N-ethyl-N-methoxymethylpyrrolidinium, N-methoxymethyl-N-n-propylpyrrolidinium, N-methoxymethyl-N-iso-propylpyrrolidinium, N-n-butyl-N-methoxymethylpyrrolidinium, N-iso-butyl-N-methoxymethylpyrrolidinium, N-tert-butyl-N-methoxymethylpyrrolidinium, N-ethoxymethyl-N-methylpyrrolidinium, N-ethyl-N-ethoxymethylpyrrolidinium (N-ethoxymethyl-N-ethylpyrrolidinium), N-ethoxymethyl-N-n-propylpyrrolidinium, N-ethoxymethyl-N-iso-propylpyrrolidinium, N-n-butyl-N-ethoxymethylpyrrolidinium, N-iso-butyl-N-ethoxymethylpyrrolidinium and N-tert-butyl-N-ethoxymethylpyrrolidinium. Other examples include N-methyl-N-methoxymethylpyrrolidinium (N-methoxymethyl-N-methylpyrrolidinium), N-ethyl-N-methoxymethylpyrrolidinium and N-ethoxymethyl-N-methylpyrrolidinium.

Additional examples of the cation of formula (1) in combination with additional anions may be selected from N-methyl-N-methoxymethylpyrrolidinium tetracyanoborate (N-methoxymethy-N-methylpyrrolidinium tetracyanoborate), N-ethyl-N-methoxymethylpyrrolidinium tetracyanoborate, N-ethoxymethyl-N-methylpyrrolidinium tetracyanoborate, N-methyl-N-methoxymethylpyrrolidinium bistrifluoromethanesulfonylimide, (N-methoxymethy-N-methylpyrrolidinium bistrifluoromethanesulfonylimide), N-ethyl-N-methoxymethylpyrrolidinium bistrifluoromethanesulfonylimide, N-ethoxymethyl-N-methylpyrrolidinium bistrifluoromethanesulfonylimide, N-methyl-N-methoxymethylpyrrolidinium trifluoromethanesulfolate (N-methoxymethyl-N-methyltrifluoromethanesulfolate).

When to be used as an electrolyte, the quaternary ammonium salt may be used as admixed with a suitable organic solvent. Useful solvents include cyclic carbonic acid esters, chain carbonic acid esters, phosphoric acid esters, cyclic ethers, chain ethers, lactone compounds, chain esters, nitrile compounds, amide compounds and sulfone compounds. Examples of such compounds are given below although the solvents to be used are not limited to these compounds.

Examples of cyclic carbonic acid esters are ethylene carbonate, propylene carbonate, butylene carbonate and the like, among which propylene carbonate is preferable.

Examples of chain carbonic acid esters are dimethyl carbonate, ethylmethyl carbonate, diethyl carbonate and the like, among which dimethyl carbonate and ethylmethyl carbonate are preferred.

Examples of phosphoric acid esters are trimethyl phosphate, triethyl phosphate, ethyldimethyl phosphate, diethylmethyl phosphate and the like. Examples of cyclic ethers are tetrahydrofuran, 2-methyltetrahydrofuran and the like. Examples of chain ethers are dimethoxyethane and the like. Examples of lactone compounds are α-butyrolactone and the like. Examples of chain esters are methyl propionate, methyl acetate, ethyl acetate, methyl formate and the like. Examples of nitrile compounds are acetonitrile and the like. Examples of amide compounds are dimethylformamide and the like. Examples of sulfone compounds are sulfolane, methyl sulfolane and the like. Cyclic carbonic acid esters, chain carbonic acid esters, nitrile compounds and sulfone compounds may be particularly desirable, in some embodiments.

These solvents may be used singly, or at least two kinds of solvents may be used in admixture. Examples of preferred organic solvent mixtures are mixtures of cyclic carbonic acid ester and chain carbonic acid ester such as those of ethylene carbonate and dimethyl carbonate, ethylene carbonate and ethylmethyl carbonate, ethylene carbonate and diethyl carbonate, propylene carbonate and dimethyl carbonate, propylene carbonate and ethylmethyl carbonate and propylene carbonate and diethyl carbonate, mixtures of chain carbonic acid esters such as dimethyl carbonate and ethylmethyl carbonate, and mixtures of sulfolane compounds such as sulfolane and methylsulfolane. More preferable are mixtures of ethylene carbonate and ethylmethyl carbonate, propylene carbonate and ethylmethyl carbonate, and dimethyl carbonate and ethylmethyl carbonate.

In some embodiments, when the quaternary ammonium salt of the invention is to be used as an electrolyte, the electrolyte concentration is at least 0.1 M, in some cases at least 0.5 M and may be at least 1 M. If the concentration is less than 0.1 M, low electrical conductivity will result, producing electrochemical devices of impaired performance. The upper limit concentration is a separation concentration when the electrolyte is a liquid salt at room temperature. When the solution does not separate, the limit concentration is 100%. When the salt is solid at room temperature, the limit concentration is the concentration at which the solution is saturated with the salt.

In certain embodiments, the advanced electrolyte system (AES) may be admixed with electrolytes other than those disclosed herein provided that such combination does not significantly affect the advantages achieved by utilization of the advanced electrolyte system, e.g., by altering the performance or durability characteristics by greater than 10%. Examples of electrolytes that may be suited to be admixed with the AES are alkali metal salts, quaternary ammonium salts, quaternary phosphonium salts, etc. These electrolytes may be used singly, or at least two kinds of them are usable in combination, as admixed with the AES disclosed herein. Useful alkali metal salts include lithium salts, sodium salts and potassium salts. Examples of such lithium salts are lithium hexafluorophosphate, lithium borofluoride, lithium perchlorate, lithium trifluoromethanesulfonate, sulfonylimide lithium, sulfonylmethide lithium and the like, which nevertheless are not limitative. Examples of useful sodium salts are sodium hexafluorophosphate, sodium borofluoride, sodium perchlorate, sodium trifluoromethanesulfonate, sulfonylimide sodium, sulfonylmethide sodium and the like. Examples of useful potassium salts are potassium hexafluorophosphate, potassium borofluoride, potassium perchlorate, potassium trifluoromethanesulfonate, sulfonylimide potassium, sulfonylmethide potassium and the like although these are not limitative.

Useful quaternary ammonium salts that may be used in the combinations described above (i.e., which do not significantly affect the advantages achieved by utilization of the advanced electrolyte system) include tetraalkylammonium salts, imidazolium salts, pyrazolium salts, pyridinium salts, triazolium salts, pyridazinium salts, etc., which are not limitative. Examples of useful tetraalkylammonium salts are tetraethylammonium tetracyanoborate, tetramethylammonium tetracyanoborate, tetrapropylammonium tetracyanoborate, tetrabutylammonium tetracyanoborate, triethylmethylammonium tetracyanoborate, trimethylethylammonium tetracyanoborate, dimethyldiethylammonium tetracyanoborate, trimethylpropylammonium tetracyanoborate, trimethylbutylammonium tetracyanoborate, dimethylethylpropylammonium tetracyanoborate, methylethylpropylbutylammonium tetracyanoborate, N,N-dimethylpyrrolidinium tetracyanoborate, N-ethyl-N-methylpyrrolidinium tetracyanoborate, N-methyl-N-propylpyrrolidinium tetracyanoborate, N-ethyl-N-propylpyrrolidinium tetracyanoborate, N,N-dimethylpiperidinium tetracyanoborate, N-methyl-N-ethylpiperidinium tetracyanoborate, N-methyl-N-propylpiperidinium tetracyanoborate, N-ethyl-N-propylpiperidinium tetracyanoborate, N,N-dimethylmorpholinium tetracyanoborate, N-methyl-N-ethylmorpholinium tetracyanoborate, N-methyl-N-propylmorpholinium tetracyanoborate, N-ethyl-N-propylmorpholinium tetracyanoborate and the like, whereas these examples are not limitative.

Examples of imidazolium salts that may be used in the combinations described above (i.e., which do not significantly affect the advantages achieved by utilization of the advanced electrolyte system) include 1,3-dimethylimidazolium tetracyanoborate, 1-ethyl-3-methylimidazolium tetracyanoborate, 1,3-diethylimidazolium tetracyanoborate, 1,2-dimethyl-3-ethylimidazolium tetracyanoborate and 1,2-dimethyl-3-propylimidazolium tetracyanoborate, but are not limited to these. Examples of pyrazolium salts are 1,2-dimethylpyrazolium tetracyanoborate, 1-methyl-2-ethylpyrazolium tetracyanoborate, 1-propyl-2-methylpyrazolium tetracyanoborate and 1-methyl-2-butylpyrazolium tetracyanoborate, but are not limited to these. Examples of pyridinium salts are N-methylpyridinium tetracyanoborate, N-ethylpyridinium tetracyanoborate, N-propylpyridinium tetracyanoborate and N-butylpyridinium tetracyanoborate, but are not limited to these. Examples of triazolium salts are 1-methyltriazolium tetracyanoborate, 1-ethyltriazolium tetracyanoborate, 1-propyltriazolium tetracyanoborate and 1-butyltriazolium tetracyanoborate, but are not limited to these. Examples of pyridazinium salts are 1-methylpyridazinium tetracyanoborate, 1-ethylpyridazinium tetracyanoborate, 1-propylpyridazinium tetracyanoborate and 1-butylpyridazinium tetracyanoborate, but are not limited to these. Examples of quaternary phosphonium salts are tetraethylphosphonium tetracyanoborate, tetramethylphosphonium tetracyanoborate, tetrapropylphosphonium tetracyanoborate, tetrabutylphosphonium tetracyanoborate, triethylmethylphosphonium tetrafluoroborate, trimethylethylphosphonium tetracyanoborate, dimethyldiethylphosphonium tetracyanoborate, trimethylpropylphosphonium tetracyanoborate, trimethylbutylphosphonium tetracyanoborate, dimethylethylpropylphosphonium tetracyanoborate, methylethylpropylbutylphosphonium tetracyanoborate, but are not limited to these.

In certain embodiments, the novel electrolytes selected herein for use the advanced electrolyte systems may also be purified. Such purification may be performed using art-recognized techniques or the techniques provided herein. This purification may further improve the characteristics of the Novel Electrolyte Entities described herein.

Highly Purified Electrolytes

The advanced electrolyte systems of the present comprise, in one embodiment, certain highly purified electrolytes for use in high temperature ultracapacitors. In certain embodiments. The highly purified electrolytes that comprise the AES of the present invention are those electrolytes described below as well as those novel electrolytes described above purified by the purification process described herein. The purification methods provided herein produce impurity levels that afford an advanced electrolyte system with enhanced properties for use in high temperature applications, e.g., high temperature ultracapacitors, for example in a temperature range of about 80 degrees Celsius to about 210 degrees Celsius, e.g., about 80 degrees Celsius to about 200 degrees Celsius, e.g., about 80 degrees Celsius to about 190 degrees Celsius e.g., about 80 degrees Celsius to about 180 degrees Celsius e.g., about 80 degrees Celsius to about 170 degrees Celsius e.g., about 80 degrees Celsius to about 160 degrees Celsius e.g., about 80 degrees Celsius to about 150 degrees Celsius e.g., about 85 degrees Celsius to about 145 degrees Celsius e.g., about 90 degrees Celsius to about 140 degrees Celsius e.g., about 95 degrees Celsius to about 135 degrees Celsius e.g., about 100 degrees Celsius to about 130 degrees Celsius e.g., about 105 degrees Celsius to about 125 degrees Celsius e.g., about 110 degrees Celsius to about 120 degrees Celsius.

Obtaining improved properties of the ultracapacitor 10 results in a requirement for better electrolyte systems than presently available. For example, it has been found that increasing the operational temperature range may be achieved by the significant reduction/removal of impurities from certain forms of known electrolytes. Impurities of particular concern include water, halide ions (chloride, bromide, fluoride, iodide), free amines (ammonia), sulfate, and metal cations (Ag, Al, Ba, Ca, Cd, Co, Cr, Cu, Fe, K, Li, Mg, Mn, Mo, Na, Ni, Pb, Sr, Ti, Zn). The highly purified electrolyte product of such purification provides electrolytes that are surprisingly far superior to the unpurified electrolyte, and as such, fall with the advanced electrolyte systems of the present invention.

In a particular embodiment, the present invention provides a purified mixture of cation 9 and anion 11 and, in some instances a solvent, which may serve as the AES of the present invention which comprises less than about 5000 parts per million (ppm) of chloride ions; less than about 1000 ppm of fluoride ions; and/or less than about 1000 ppm of water (e.g. less than about 2000 ppm of chloride ions; less than about less than about 200 ppm of fluoride ions; and/or less than about 200 ppm of water, e.g. less than about 1000 ppm of chloride ions; less than about less than about 100 ppm of fluoride ions; and/or less than about 100 ppm of water, e.g. less than about 500 ppm of chloride ions; less than about less than about 50 ppm of fluoride ions; and/or less than about 50 ppm of water, e.g. less than about 780 parts per million of chloride ions; less than about 11 parts per million of fluoride ions; and less than about 20 parts per million of water.)

Generally, impurities in the purified electrolyte are removed using the methods of purification described herein. For example, in some embodiments, a total concentration of halide ions (chloride, bromide, fluoride, iodide), may be reduced to below about 1,000 ppm. A total concentration of metallic species (e.g., Cd, Co, Cr, Cu, Fe, K, Li, Mo, Na, Ni, Pb, Zn, including an at least one of an alloy and an oxide thereof), may be reduced to below about 1,000 ppm. Further, impurities from solvents and precursors used in the synthesis process may be reduced to below about 1,000 ppm and can include, for example, bromoethane, chloroethane, 1-bromobutane, 1-chlorobutane, 1-methylimidazole, ethyl acetate, methylene chloride and so forth.

In some embodiments, the impurity content of the ultracapacitor 10 has been measured using ion selective electrodes and the Karl Fischer titration procedure, which has been applied to electrolyte 6 of the ultracapacitor 10. In certain embodiments, it has been found that the total halide content in the ultracapacitor 10 according to the teachings herein has been found to be less than about 200 ppm of halides ($Cl^-$ and $F^-$) and water content is less than about 100 ppm.

Impurities can be measured using a variety of techniques, such as, for example, Atomic Absorption Spectrometry (AAS), Inductively Coupled Plasma-Mass Spectrometry (ICPMS), or simplified solubilizing and electrochemical sensing of trace heavy metal oxide particulates. AAS is a spectro-analytical procedure for the qualitative and quantitative determination of chemical elements employing the absorption of optical radiation (light) by free atoms in the gaseous state. The technique is used for determining the concentration of a particular element (the analyte) in a sample to be analyzed. AAS can be used to determine over seventy different elements in solution or directly in solid samples. ICPMS is a type of mass spectrometry that is highly sensitive and capable of the determination of a range of metals and several non-metals at concentrations below one part in $10^{12}$ (part per trillion). This technique is based on coupling together an inductively coupled plasma as a method of producing ions (ionization) with a mass spectrometer as a method of separating and detecting the ions. ICPMS is also capable of monitoring isotopic speciation for the ions of choice.

Additional techniques may be used for analysis of impurities. Some of these techniques are particularly advantageous for analyzing impurities in solid samples. Ion Chromatography (IC) may be used for determination of trace levels of halide impurities in the electrolyte 6 (e.g., an ionic liquid). One advantage of Ion Chromatography is that relevant halide species can be measured in a single chromatographic analysis. A Dionex AS9-HC column using an eluent consisting 20 mM NaOH and 10% (v/v) acetonitrile is one example of an apparatus that may be used for the quantification of halides from the ionic liquids. A further technique is that of X-ray fluorescence.

X-ray fluorescence (XRF) instruments may be used to measure halogen content in solid samples. In this technique, the sample to be analyzed is placed in a sample cup and the sample cup is then placed in the analyzer where it is irradiated with X-rays of a specific wavelength. Any halogen atoms in the sample absorb a portion of the X-rays and then reflect radiation at a wavelength that is characteristic for a given halogen. A detector in the instrument then quantifies the amount of radiation coming back from the halogen atoms and measures the intensity of radiation. By knowing the surface area that is exposed, concentration of halogens in the sample can be determined. A further technique for assessing impurities in a solid sample is that of pyrolysis.

Adsorption of impurities may be effectively measured through use of pyrolysis and microcoulometers. Microcoulometers are capable of testing almost any type of material for total chlorine content. As an example, a small amount of sample (less than 10 milligrams) is either injected or placed into a quartz combustion tube where the temperature ranges from about 600 degrees Celsius to about 1,000 degrees Celsius. Pure oxygen is passed through the quartz tube and any chlorine containing components are combusted completely. The resulting combustion products are swept into a titration cell where the chloride ions are trapped in an electrolyte solution. The electrolyte solution contains silver ions that immediately combine with any chloride ions and drop out of solution as insoluble silver chloride. A silver electrode in the titration cell electrically replaces the used up silver ions until the concentration of silver ions is back to where it was before the titration began. By keeping track of the amount of current needed to generate the required amount of silver, the instrument is capable of determining how much chlorine was present in the original sample. Dividing the total amount of chlorine present by the weight of the sample gives the concentration of chlorine that is actually in the sample. Other techniques for assessing impurities may be used.

Surface characterization and water content in the electrode 3 may be examined, for example, by infrared spectroscopy techniques. The four major absorption bands at around 1130, 1560, 3250 and 2300 $cm^{-1}$, correspond to íC═O in, íC═C in aryl, íO—H and íC—N, respectively. By measuring the intensity and peak position, it is possible to quantitatively identify the surface impurities within the electrode 3.

Another technique for identifying impurities in the electrolyte 6 and the ultracapacitor 10 is Raman spectroscopy. This spectroscopic technique relies on inelastic scattering, or Raman scattering, of monochromatic light, usually from a laser in the visible, near infrared, or near ultraviolet range. The laser light interacts with molecular vibrations, phonons or other excitations in the system, resulting in the energy of the laser photons being shifted up or down. Thus, this technique may be used to characterize atoms and molecules within the ultracapacitor 10. A number of variations of Raman spectroscopy are used, and may prove useful in characterizing contents the ultracapacitor 10.

Enhanced Electrolyte Combinations

The advanced electrolyte systems of the present comprise, in one embodiment, include certain enhanced electrolyte combinations suitable for use in temperature ranges from −40 degrees Celsius to 210 degrees Celsius, e.g., −40 degrees Celsius to 150 degrees Celsius, e.g., −30 degrees Celsius to 150 degrees Celsius, e.g., −30 degrees Celsius to 140 degrees Celsius, e.g., −20 degrees Celsius to 140 degrees Celsius, e.g., −20 degrees Celsius to 130 degrees Celsius, e.g., −10 degrees Celsius to 130 degrees Celsius, e.g., −10 degrees Celsius to 120 degrees Celsius, e.g., 0 degrees Celsius to 120 degrees Celsius, e.g., 0 degrees Celsius to 110 degrees Celsius, e.g., 0 degrees Celsius to 100 degrees Celsius, e.g., 0 degrees Celsius to 90 degrees Celsius, e.g., 0 degrees Celsius to 80 degrees Celsius, e.g., 0 degrees Celsius to 70 degrees Celsius, without a significant drop in performance or durability.

Generally, a higher degree of durability at a given temperature may be coincident with a higher degree of voltage stability at a lower temperature. Accordingly, the development of a high temperature durability AES, with enhanced electrolyte combinations, generally leads to simultaneous development of high voltage, but lower temperature AES, such that these enhanced electrolyte combinations described herein may also be useful at higher voltages, and thus higher energy densities, but at lower temperatures.

In one embodiment, the present invention provides an enhanced electrolyte combination suitable for use in an energy storage cell, e.g., an ultracapacitor, comprising a novel mixture of electrolytes selected from the group consisting of an ionic liquid mixed with a second ionic liquid, an ionic liquid mixed with an organic solvent, and an ionic liquid mixed with a second ionic liquid and an organic solvent:
wherein each ionic liquid is selected from the salt of any combination of the following cations and anions, wherein the cations are selected from the group consisting of 1-butyl-3-methylimidazolium, 1-ethyl-3-methylimidazolium, 1-hexyl-3-methylimidazolium, 1-butyl-1-methylpiperidinium, butyltrimethylammonium, 1-butyl-1-methylpyrrolidinium, trihexyltetradecylphosphonium, and 1-butyl-3-methylimidaxolium; and the anions are selected from the group consisting of tetrafluoroborate, bis(trifluoromethylsulfonyl)imide, tetracyanoborate, and trifluoromethanesulfonate; and
wherein the organic solvent is selected from the group consisting of linear sulfones (e.g., ethyl isopropyl sulfone, ethyl isobutyl sulfone, ethyl methyl sulfone, methyl isopropyl sulfone, isopropyl isobutyl sulfone, isopropyl s-butyl sulfone, butyl isobutyl sulfone, and dimethyl sulfone), linear carbonates (e.g., ethylene carbonate, propylene carbonate, and dimethyl carbonate), and acetonitrile.

For example, given the combinations of cations and anions above, each ionic liquid may be selected from the group consisting of 1-butyl-3-methylimidazolium tetrafluoroborate; 1-butyl-3-methylimidazolium bis(trifluoromethylsulfonyl)imide; 1-ethyl-3-methylimidazolium tetrafluoroborate; 1-ethyl-3-methylimidazolium tetracyanoborate; 1-hexyl-3-methylimidazolium tetracyanoborate; 1-butyl-1-methylpyrrolidinium bis(trifluoromethylsulfonyl)imide; 1-butyl-1-methylpyrrolidinium tris(pentafluoroethyl)trifluorophosphate; 1-butyl-1-methylpyrrolidinium tetracyanoborate; trihexyltetradecylphosphonium bis(trifluoromethylsulfonyl)imide, 1-butyl-1-methylpiperidinium bis(trifluoromethylsulfonyl)imide, butyltrimethylammonium bis(trifluoromethylsulfonyl)imide, and 1-butyl-3-methylimidazolium trifluoromethanesulfonate.

In certain embodiments, the ionic liquid is 1-butyl-3-methylimidazolium tetrafluoroborate.

In certain embodiments, the ionic liquid is 1-butyl-3-methylimidazolium bis(trifluoromethylsulfonyl)imide.

In certain embodiments, the ionic liquid is 1-ethyl-3-methylimidazolium tetrafluoroborate.

In certain embodiments, the ionic liquid is 1-ethyl-3-methylimidazolium tetracyanoborate.

In certain embodiments, the ionic liquid is 1-hexyl-3-methylimidazolium tetracyanoborate.

In certain embodiments, the ionic liquid is 1-butyl-1-methylpyrrolidinium bis(trifluoromethylsulfonyl)imide.

In one embodiment, the ionic liquid is 1-butyl-1-methylpyrrolidinium tris(pentafluoroethyl)trifluorophosphate.

In certain embodiments, the ionic liquid is 1-butyl-1-methylpyrrolidinium tetracyanoborate.

In certain embodiments, the ionic liquid is trihexyltetradecylphosphonium bis(trifluoromethylsulfonyl)imide.

In certain embodiments, the ionic liquid is 1-butyl-1-methylpiperidinium bis(trifluoromethylsulfonyl)imide.

In certain embodiments, the ionic liquid is butyltrimethylammonium bis(trifluoromethylsulfonyl)imide In certain embodiments, the ionic liquid is 1-butyl-3-methylimidazolium trifluoromethanesulfonate.

In certain embodiments, the organic solvent is selected from ethyl isopropyl sulfone, ethyl isobutyl sulfone, ethyl methyl sulfone, methyl isopropyl sulfone, isopropyl isobutyl sulfone, isopropyl s-butyl sulfone, butyl isobutyl sulfone, or bimethyl sulfone, linear sulfones.

In certain embodiments, the organic solvent is selected from polypropylene carbonate, propylene carbonate, dimethyl carbonate, ethylene carbonate.

In certain embodiments, the organic solvent is acetonitrile.

In certain embodiments, the enhanced electrolyte composition is an ionic liquid with an organic solvent, wherein the organic solvent is 55%-90%, e.g., 37.5%, by volume of the composition.

In certain embodiments, the enhanced electrolyte composition is an ionic liquid with a second ionic liquid, wherein one ionic liquid is 5%-90%, e.g., 60%, by volume of the composition.

The enhanced electrolyte combinations of the present invention provide a wider temperature range performance for an individual capacitor (e.g. without a significant drop in capacitance and/or increase in ESR when transitioning between two temperatures, e.g. without more than a 90% decrease in capacitance and/or a 1000% increase in ESR when transitioning from about +30° C. to about −40° C.), and increased temperature durability for an individual capacitor (e.g., less than a 50% decrease in capacitance at a given temperature after a given time and/or less than a 100% increase in ESR at a given temperature after a given time, and/or less than 10 A/L of leakage current at a given temperature after a given time, e.g., less than a 40% decrease in capacitance and/or a 75% increase in ESR, and/or less than 5 A/L of leakage current, e.g., less than a 30% decrease in capacitance and/or a 50% increase in ESR, and/or less than 1 A/L of leakage current).

Without wishing to be bound by theory, the combinations described above provide enhanced eutectic properties that affect the freezing point of the advanced electrolyte system to afford ultracapacitors that operate within performance and durability standards at temperatures of down to −40 degrees Celsius.

As described above for the novel electrolytes of the present invention, in certain embodiments, the advanced electrolyte system (AES) may be admixed with electrolytes provided that such combination does not significantly affect the advantages achieved by utilization of the advanced electrolyte system.

In certain embodiments, the enhanced electrolyte combinations are selected herein for use the advanced electrolyte systems may also be purified. Such purification may be performed using art-recognized techniques or techniques provided herein.

B. Electrodes

The EDLC includes at least one pair of electrode 3 (where the electrode 3 may be referred to as a negative electrodes 33 and a positive electrodes 34, merely for purposes of referencing herein). When assembled into the ultracapacitor 10, each of the electrode 3 presents a double layer of charge at an electrolyte interface. In some embodiments, a plurality of electrode 3 is included (for example, in some embodiments, at least two pairs of electrode 3 are included). However, for purposes of discussion, only one pair of electrode 3 are shown. As a matter of convention herein, at least one of the electrodes 33/34 uses a carbon-based energy storage media 1 (as discussed further herein) to provide energy storage. However, for purposes of discussion herein, it is generally assumed that each of the electrodes includes the carbon-based energy storage media 1.

i. Current Collector

Current Collector

Each of the electrode 3 includes a respective current collector 2 (also referred to as a "charge collector"). In some embodiments, the electrode 3 are separated by a separator 5. In general, the separator 5 is a thin structural material (usually a sheet) used to separate the negative electrode 3 from the positive electrode 3. The separator 5 may also serve to separate pairs of the electrode 3. Note that, in some embodiments, the carbon-based energy storage media 1 may not be included on one or both of the electrode 3. That is, in some embodiments, a respective electrode 3 might consist of only the current collector 2. The material used to provide the current collector 2 could be roughened, anodized or the like to increase a surface area thereof. In these embodiments, the current collector 2 alone may serve as the electrode 3. With this in mind, however, as used herein, the term "electrode 3" generally refers to a combination of the energy storage media 1 and the current collector 2 (but this is not limiting, for at least the foregoing reason).

Energy Storage Media

In the exemplary ultracapacitor 10, the energy storage media 1 is formed of carbon nanotubes. The energy storage media 1 may include other carbonaceous materials including, for example, activated carbon, carbon fibers, rayon, graphene, aerogel, carbon cloth, and a plurality of forms of carbon nanotubes. Activated carbon electrodes can be manufactured, for example, by producing a carbon base material by carrying out a first activation treatment to a carbon material obtained by carbonization of a carbon compound, producing a formed body by adding a binder to the carbon base material, carbonizing the formed body, and finally producing an active carbon electrode by carrying out a second activation treatment to the carbonized formed body. Carbon fiber electrodes can be produced, for example, by using paper or cloth pre-form with high surface area carbon fibers.

In an exemplary method for fabricating carbon nanotubes, an apparatus for producing an aligned carbon-nanotube aggregate includes apparatus for synthesizing the aligned carbon-nanotube aggregate on a base material having a catalyst on a surface thereof. The apparatus includes a formation unit that processes a formation step of causing an environment surrounding the catalyst to be an environment of a reducing gas and heating at least either the catalyst or the reducing gas; a growth unit that processes a growth step of synthesizing the aligned carbon-nanotube aggregate by causing the environment surrounding the catalyst to be an environment of a raw material gas and by heating at least either the catalyst or the raw material gas; and a transfer unit that transfers the base material at least from the formation unit to the growth unit. A variety of other methods and apparatus may be employed to provide the aligned carbon-nanotube aggregate.

In some embodiments, material used to form the energy storage media 1 may include material other than pure carbon (and the various forms of carbon as may presently exist or be later devised). That is, various formulations of other materials may be included in the energy storage media 1. More specifically, and as a non-limiting example, at least one binder material may be used in the energy storage media 1, however, this is not to suggest or require addition of other materials (such as the binder material). In general, however, the energy storage media 1 is substantially formed of carbon, and may therefore referred to herein as a "carbonaceous material," as a "carbonaceous layer" and by other similar terms. In short, although formed predominantly of carbon, the energy storage media 1 may include any form of carbon (as well as any additives or impurities as deemed appropriate or acceptable) to provide for desired functionality as energy storage media 1.

In one set of embodiments, the carbonaceous material includes at least about 60% elemental carbon by mass, and in other embodiments at least about 75%, 85%, 90%, 95% or 98% by mass elemental carbon.

Carbonaceous material can include carbon in a variety forms, including carbon black, graphite, and others. The carbonaceous material can include carbon particles, including nanoparticles, such as nanotubes, nanorods, graphene sheets in sheet form, and/or formed into cones, rods, spheres (buckyballs) and the like.

Some embodiments of various forms of carbonaceous material suited for use in energy storage media 1 are provided herein as examples. These embodiments provide robust energy storage and are well suited for use in the electrode 3. It should be noted that these examples are illustrative and are not limiting of embodiments of carbonaceous material suited for use in energy storage media 1.

In certain embodiments, the porosity of the energy storage media 1 of each electrode may be selected based on the size of the respective electrolyte to improve the performance of the capacitor.

An exemplary process for complimenting the energy storage media 1 with the current collector 2 to provide the electrode 3 is now provided. Referring now to FIG. 2, a substrate 14 that is host to carbonaceous material in the form of carbon nanotube aggregate (CNT) is shown. In the embodiment shown, the substrate 14 includes a base material 17 with a thin layer of a catalyst 18 disposed thereon.

In general, the substrate 14 is at least somewhat flexible (i.e., the substrate 14 is not brittle), and is fabricated from components that can withstand environments for deposition of the energy storage media 1 (e.g., CNT). For example, the substrate 14 may withstand a high-temperature environment of between about 400 degrees Celsius to about 1,100 degrees Celsius. A variety of materials may be used for the substrate 14, as determined appropriate.

Once the energy storage media 1 (e.g., CNT) has been fabricated on the substrate 14, the current collector 2 may be disposed thereon. In some embodiments, the current collector 2 is between about 0.5 micrometers (μm) to about 25 micrometers (μm) thick. In some embodiments, the current collector 2 is between about 20 micrometers (μm) to about 40 micrometers (μm) thick. The current collector 2 may appear as a thin layer, such as layer that is applied by chemical vapor deposition (CVD), sputtering, e-beam, thermal evaporation or through another suitable technique. Generally, the current collector 2 is selected for its properties such as conductivity, being electrochemically inert and compatible with the energy storage media 1 (e.g., CNT). Some exemplary materials include aluminum, platinum, gold, tantalum, titanium, and may include other materials as well as various alloys.

Once the current collector 2 is disposed onto the energy storage media 1 (e.g., CNT), an electrode element 15 is realized. Each electrode element 15 may be used individually as the electrode 3, or may be coupled to at least another electrode element 15 to provide for the electrode 3.

Once the current collector 2 has been fabricated according to a desired standard, post-fabrication treatment may be undertaken. Exemplary post-treatment includes heating and cooling of the energy storage media 1 (e.g., CNT) in a slightly oxidizing environment. Subsequent to fabrication (and optional post-treatment), a transfer tool may be applied to the current collector 2.

In one embodiment of an application of transfer tool 13 to the current collector 2, the transfer tool 13 is a thermal release tape, used in a "dry" transfer method. Exemplary thermal release tape is manufactured by NITTO DENKO CORPORATION of Fremont, California and Osaka, Japan. One suitable transfer tape is marketed as REVALPHA. This release tape may be characterized as an adhesive tape that adheres tightly at room temperature and can be peeled off by heating. This tape, and other suitable embodiments of thermal release tape, will release at a predetermined temperature. Advantageously, the release tape does not leave a chemically active residue on the electrode element 15.

In another process, referred to as a "wet" transfer method, tape designed for chemical release may be used. Once applied, the tape is then removed by immersion in a solvent. The solvent is designed to dissolve the adhesive.

In other embodiments, the transfer tool 13 uses a "pneumatic" method, such as by application of suction to the current collector 2. The suction may be applied, for example, through a slightly oversized paddle having a plurality of perforations for distributing the suction. In another example, the suction is applied through a roller having a plurality of perforations for distributing the suction. Suction driven embodiments offer advantages of being electrically controlled and economic as consumable materials are not used as a part of the transfer process. Other embodiments of the transfer tool 13 may be used.

Once the transfer tool 13 has been temporarily coupled to the current collector 2, the electrode element 15 is gently removed from the substrate 14. The removal generally involves peeling the energy storage media 1 (e.g., CNT) from the substrate 14, beginning at one edge of the substrate 14 and energy storage media 1 (e.g., CNT).

Subsequently, the transfer tool 13 may be separated from the electrode element 15. In some embodiments, the transfer tool 13 is used to install the electrode element 15. For example, the transfer tool 13 may be used to place the electrode element 15 onto the separator 5. In general, once removed from the substrate 14, the electrode element 15 is available for use.

In instances where a large electrode 3 is desired, a plurality of the electrode elements 15 may be mated. A plurality of the electrode elements 15 may be mated by, for example, coupling a coupling 52 to each electrode element 15 of the plurality of electrode elements 15. The mated electrode elements 15 provide for an embodiment of the electrode 3.

In some embodiments, the coupling 22 is coupled to each of the electrode elements 15 at a weld 21. Each of the welds 21 may be provided as an ultrasonic weld 21. It has been found that ultrasonic welding techniques are particularly well suited to providing each weld 21. That is, in general, the aggregate of energy storage media 1 (e.g., CNT) is not compatible with welding, where only a nominal current collector, such as disclosed herein is employed. As a result, many techniques for joining electrode elements 15 are disruptive, and damage the element 15. However, in other embodiments, other forms of coupling are used, and the coupling 22 is not a weld 21.

The coupling 22 may be a foil, a mesh, a plurality of wires or in other forms. Generally, the coupling 22 is selected for properties such as conductivity and being electrochemically inert. In some embodiments, the coupling 22 is fabricated from the same material(s) as are present in the current collector 2.

In some embodiments, the coupling 22 is prepared by removing an oxide layer thereon. The oxide may be removed by, for example, etching the coupling 22 before providing the weld 21. The etching may be accomplished, for example, with potassium hydroxide (KOH). The electrode 3 may be used in a variety of embodiments of the ultracapacitor 10. For example, the electrode 3 may be rolled up into a "jelly roll" type of energy storage.

Separator

The separator 5 may be fabricated from various materials. In some embodiments, the separator 5 is non-woven glass. The separator 5 may also be fabricated from fiberglass, ceramics and fluoro-polymers, such as polytetrafluoroethylene (PTFE), commonly marketed as TEFLON™ by DuPont Chemicals of Wilmington, DE. For example, using non-woven glass, the separator 5 can include main fibers and binder fibers each having a fiber diameter smaller than that of each of the main fibers and allowing the main fibers to be bonded together.

For longevity of the ultracapacitor 10 and to assure performance at high temperature, the separator 5 should have a reduced amount of impurities and in particular, a very limited amount of moisture contained therein. In particular, it has been found that a limitation of about 200 ppm of moisture is desired to reduce chemical reactions and improve the lifetime of the ultracapacitor 10, and to provide for good performance in high temperature applications. Some embodiments of materials for use in the separator 5 include polyamide, polytetrafluoroethylene (PTFE), polyetheretherketone (PEEK), aluminum oxide ($Al_2O_3$), fiberglass, and glass-reinforced plastic (GRP).

In general, materials used for the separator 5 are chosen according to moisture content, porosity, melting point, impurity content, resulting electrical performance, thickness, cost, availability and the like. In some embodiments, the separator 5 is formed of hydrophobic materials.

Accordingly, procedures may be employed to ensure excess moisture is eliminated from each separator 5. Among other techniques, a vacuum drying procedure may be used. A selection of materials for use in the separator 5 is provided in Table 7. Some related performance data is provided in Table 8.

TABLE 7

Separator Materials

| Material | Melting point | PPM H$_2$O unbaked | PPM H$_2$O baked | Vacuum dry procedure |
|---|---|---|---|---|
| Polyamide | 256° C. | 2052 | 20 | 180° C. for 24 h |
| Polytetrafluoroethylene, PTFE | 327° C. | 286 | 135 | 150° C. for 24 h |
| Polyether ether ketone, PEEK | 256° C. | 130 | 50 | 215° C. for 12 h |
| Aluminum Oxide, Al$_2$O$_3$ | 330° C. | 1600 | 100 | 215° C. for 24 h |
| Fiberglass (GRP) | 320° C. | 2000 | 167 | 215° C. for 12 h |

TABLE 8

Separator Performance Data

| Material | μm | Porosity | ESR 1$^{st}$ test (Ω) | ESR 2$^{nd}$ test (Ω) | After 10 CV |
|---|---|---|---|---|---|
| Polyamide | 42 | Nonwoven | 1.069 | 1.069 | 1.213 |
| PEEK | 45 | Mesh | 1.665 | 1.675 | 2.160 |
| PEEK 60% | 25 | 60% | 0.829 | 0.840 | 0.883 |
| Fiberglass (GRP) | 160 | Nonwoven | 0.828 | 0.828 | 0.824 |
| Aluminum Oxide, Al$_2$O$_3$ | 25 | — | 2.400 | 2.400 | 2.400 |

In order to collect data for Table 7, two electrode 3, based on carbonaceous material, were provided. The electrode 3 were disposed opposite to and facing each other. Each of the separators 5 were placed between the electrode 3 to prevent a short circuit. The three components were then wetted with electrolyte 6 and compressed together. Two aluminum bars and PTFE material was used as an external structure to enclose the resulting ultracapacitor 10.

The ESR Pt test and ESR 2$^{nd}$ test were performed with the same configuration one after the other. The second test was run five minutes after the first test, leaving time for the electrolyte 6 to further soak into the components.

In certain embodiments, the ultracapacitor 10 does not include the separator 5. For example, in particular embodiments, such as where the electrode 3 are assured of physical separation by a geometry of construction, it suffices to have electrolyte 6 alone between the electrode 3. More specifically, and as an example of physical separation, one such ultracapacitor 10 may include electrode 3 that are disposed within a housing such that separation is assured on a continuous basis. A bench-top example would include an ultracapacitor 10 provided in a beaker.

Storage Cell

Once assembled, the electrode 3 and the separator 5 provide a storage cell 12. Generally, the storage cell 12 is formed into one of a wound form or prismatic form which is then packaged into a cylindrical or prismatic housing 7. Once the electrolyte 6 has been included, the housing 7 may be hermetically sealed. In various examples, the package is hermetically sealed by techniques making use of laser, ultrasonic, and/or welding technologies. In addition to providing robust physical protection of the storage cell 12, the housing 7 is configured with external contacts to provide electrical communication with respective terminals 8 within the housing 7. Each of the terminals 8, in turn, provides electrical access to energy stored in the energy storage media 1, generally through electrical leads which are coupled to the energy storage media 1.

Generally, the ultracapacitor 10 disclosed herein is capable of providing a hermetic seal that has a leak rate no greater than about 5.0×10$^{-6}$ atm-cc/sec, and may exhibit a leak rate no higher than about 5.0×10$^{-10}$ atm-cc/sec. It is also considered that performance of a successfully hermetic seal is to be judged by the user, designer or manufacturer as appropriate, and that "hermetic" ultimately implies a standard that is to be defined by a user, designer, manufacturer or other interested party.

Leak detection may be accomplished, for example, by use of a tracer gas. Using tracer gas such as helium for leak testing is advantageous as it is a dry, fast, accurate and non destructive method. In one example of this technique, the ultracapacitor 10 is placed into an environment of helium. The ultracapacitor 10 is subjected to pressurized helium. The ultracapacitor 10 is then placed into a vacuum chamber that is connected to a detector capable of monitoring helium presence (such as an atomic absorption unit). With knowledge of pressurization time, pressure and internal volume, the leak rate of the ultracapacitor 10 may be determined.

In some embodiments, at least one lead (which may also be referred to herein as a "tab") is electrically coupled to a respective one of the current collectors 2. A plurality of the leads (accordingly to a polarity of the ultracapacitor 10) may be grouped together and coupled to into a respective terminal 8. In turn, the terminal 8 may be coupled to an electrical access, referred to as a "contact" (e.g., one of the housing 7 and an external electrode (also referred to herein for convention as a "feed-through" or "pin")).

Housing of Capacitor

Figure 5:
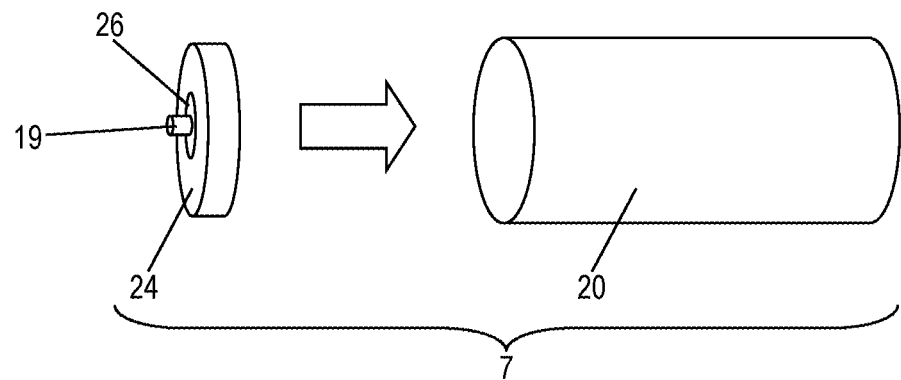
FIG. 5 depicts an embodiment of a housing for an exemplary ultracapacitor.

FIG. 5 depicts aspects of an exemplary housing 7. Among other things, the housing 7 provides structure and physical protection for the ultracapacitor 10. In this example, the housing 7 includes an annular cylindrically shaped body 10 and a complimentary cap 24. In this embodiment, the cap 24 includes a central portion that has been removed and filled with an electrical insulator 26. A cap feed-through 19 penetrates through the electrical insulator 26 to provide users with access to the stored energy. Moreover, the housing may also include an inner barrier 30.

Although this example depicts only one feed-through 19 on the cap 24, it should be recognized that the construction of the housing 7 is not limited by the embodiments discussed herein. For example, the cap 24 may include a plurality of feed-throughs 19. In some embodiments, the body 10 includes a second, similar cap 24 at the opposing end of the annular cylinder. Further, it should be recognized that the housing 7 is not limited to embodiments having an annular cylindrically shaped body 10. For example, the housing 7 may be a clamshell design, a prismatic design, a pouch, or of any other design that is appropriate for the needs of the designer, manufacturer or user.

Figure 6:
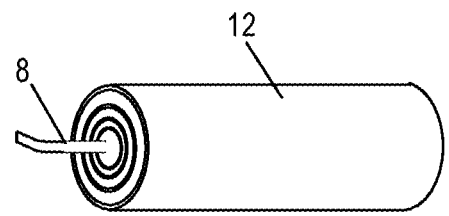
FIG. 6 illustrates an embodiment of a storage cell for an exemplary capacitor.

Referring now to FIG. 6, there is shown an exemplary energy storage cell 12. In this example, the energy storage cell 12 is a "jelly roll" type of energy storage. In these embodiments, the energy storage materials are rolled up into a tight package. A plurality of leads generally form each terminal 8 and provide electrical access to the appropriate layer of the energy storage cell 12. Generally, when assembled, each terminal 8 is electrically coupled to the housing 7 (such as to a respective feed-through 19 and/or directly to the housing 7). The energy storage cell 12 may assume a variety of forms. There are generally at least two plurality of leads (e.g., terminals 8), one for each current collector 2.

A highly efficient seal of the housing 7 is desired. That is, preventing intrusion of the external environment (such as air, humidity, etc,) helps to maintain purity of the components of the energy storage cell 12. Further, this prevents leakage of electrolyte 6 from the energy storage cell 12.

In this example, the cap 24 is fabricated with an outer diameter that is designed for fitting snugly within an inner diameter of the body 10. When assembled, the cap 24 may be welded into the body 10, thus providing users with a hermetic seal. Exemplary welding techniques include laser welding and TIG welding, and may include other forms of welding as deemed appropriate.

Common materials for the housing 7 include stainless steel, aluminum, tantalum, titanium, nickel, copper, tin, various alloys, laminates, and the like. Structural materials, such as some polymer-based materials may be used in the housing 7 (generally in combination with at least some metallic components).

In some embodiments, a material used for construction of the body 10 includes aluminum, which may include any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 10). Additional materials (such as structural materials or electrically insulative materials, such as some polymer-based materials) may be used to compliment the body and/or the housing 7. The materials disposed over the aluminum may likewise be chosen by what is deemed appropriate by a designer or fabricator.

In some embodiments, the multi-layer material is used for internal components. For example, aluminum may be clad with stainless steel to provide for a multi-layer material in at least one of the terminals 8. In some of these embodiments, a portion of the aluminum may be removed to expose the stainless steel. The exposed stainless steel may then be used to attach the terminal 8 to the feed-through 19 by use of simple welding procedures.

Using the clad material for internal components may call for particular embodiments of the clad material. For example, it may be beneficial to use clad material that include aluminum (bottom layer), stainless steel and/or tantalum (intermediate layer) and aluminum (top layer), which thus limits exposure of stainless steel to the internal environment of the ultracapacitor 10. These embodiments may be augmented by, for example, additional coating with polymeric materials, such as PTFE.

Accordingly, providing a housing 7 that takes advantage of multi-layered material provides for an energy storage that exhibits leakage current with comparatively low initial values and substantially slower increases in leakage current over time in view of the prior art. Significantly, the leakage current of the energy storage remains at practical (i.e., desirably low) levels when the ultracapacitor 10 is exposed to ambient temperatures for which prior art capacitors would exhibit prohibitively large initial values of leakage current and/or prohibitively rapid increases in leakage current over time.

Additionally, the ultracapacitor 10 may exhibit other benefits as a result of reduced reaction between the housing 7 and the energy storage cell 12. For example, an effective series resistance (ESR) of the energy storage may exhibit comparatively lower values over time. Further, the unwanted chemical reactions that take place in a prior art capacitor often create unwanted effects such as out-gassing, or in the case of a hermetically sealed housing, bulging of the housing 7. In both cases, this leads to a compromise of the structural integrity of the housing 7 and/or hermetic seal of the energy storage. Ultimately, this may lead to leaks or catastrophic failure of the prior art capacitor. These effects may be substantially reduced or eliminated by the application of a disclosed barrier.

By use of a multi-layer material (e.g., a clad material), stainless steel may be incorporated into the housing 7, and thus components with glass-to-metal seals may be used. The components may be welded to the stainless steel side of the clad material using techniques such as laser or resistance welding, while the aluminum side of the clad material may be welded to other aluminum parts (e.g., the body 10).

In some embodiments, an insulative polymer may be used to coat parts of the housing 7. In this manner, it is possible to insure that the components of the energy storage are only exposed to acceptable types of metal (such as the aluminum). Exemplary insulative polymer includes PFA, FEP, TFE, and PTFE. Suitable polymers (or other materials) are limited only by the needs of a system designer or fabricator and the properties of the respective materials. Reference may be had to FIG. 17, where a small amount of insulative material 39 is included to limit exposure of electrolyte 6 to the stainless steel of the sleeve 51 and the feed-through 19. In this example, the terminal 8 is coupled to the feed-through 19, such as by welding, and then coated with the insulative material 39.

Housing Cap

Although this example depicts only one feed-through 19 on the cap 24, it should be recognized that the construction of the housing 7 is not limited by the embodiments discussed herein. For example, the cap 24 may include a plurality of feed-throughs 19. In some embodiments, the body 10 includes a second, similar cap 24 at an opposing end of the annular cylinder. Further, it should be recognized that the housing 7 is not limited to embodiments having an annular cylindrically shaped body 10. For example, the housing 7 may be a clamshell design, a prismatic design, a pouch, or of any other design that is appropriate for the needs of the designer, manufacturer or user.

Referring now to FIG. 12, aspects of embodiments of a blank 34 for the cap 24 are shown. In FIG. 12A, the blank 34 includes a multi-layer material. A layer of a first material 41 may be aluminum. A layer of a second material 42 may be stainless steel. In the embodiments of FIG. 12, the stainless steel is clad onto the aluminum, thus providing for a material that exhibits a desired combination of metallurgical properties. That is, in the embodiments provided herein, the aluminum is exposed to an interior of the energy storage cell (i.e., the housing), while the stainless steel is exposed to exterior. In this manner, advantageous electrical properties of the aluminum are enjoyed, while structural properties (and metallurgical properties, i.e., weldability) of the stainless steel are relied upon for construction. The multi-layer material may include additional layers as deemed appropriate.

As mentioned above, the layer of first material 41 is clad onto (or with) the layer of second material 42. Referring still to FIG. 12A, in one embodiment, a sheet of flat stock (as shown) is used to provide the blank 34 to create a flat cap 24. A portion of the layer of second material 42 may be removed (such as around a circumference of the cap 24) in order to facilitate attachment of the cap 24 to the body 10. In FIG. 12B, another embodiment of the blank 34 is shown. In this example, the blank 34 is provided as a sheet of clad material that is formed into a concave configuration. In FIG. 12C, the blank 34 is provided as a sheet of clad material that is formed into a convex configuration. The cap 24 that is fabricated from the various embodiments of the blank 34 (such as those shown in FIG. 12), are configured to support welding to the body 10 of the housing 7. More specifically, the embodiment of FIG. 12B is adapted for fitting within an inner diameter of the body 10, while the embodiment of FIG. 12C is adapted for fitting over an outer diameter of the body 10. In various alternative embodiments, the layers of clad material within the sheet may be reversed.

Referring now to FIG. 13, there is shown an embodiment of an electrode assembly 50. The electrode assembly 50 is designed to be installed into the blank 34 and to provide electrical communication from the energy storage media to a user. Generally, the electrode assembly 50 includes a sleeve 51. The sleeve 51 surrounds the insulator 26, which in turn surrounds the feed-through 19. In this example, the sleeve 51 is an annular cylinder with a flanged top portion.

In order to assemble the cap 24, a perforation (not shown) is made in the blank 34. The perforation has a geometry that is sized to match the electrode assembly 50. Accordingly, the electrode assembly 50 is inserted into perforation of the blank 34. Once the electrode assembly 50 is inserted, the electrode assembly 50 may be affixed to the blank 34 through a technique such as welding. The welding may be laser welding which welds about a circumference of the flange of sleeve 51. Referring to FIG. 14, points 61 where welding is performed are shown. In this embodiment, the points 61 provide suitable locations for welding of stainless steel to stainless steel, a relatively simple welding procedure. Accordingly, the teachings herein provide for welding the electrode assembly 50 securely into place on the blank 34.

Material for constructing the sleeve 51 may include various types of metals or metal alloys. Generally, materials for the sleeve 51 are selected according to, for example, structural integrity and bondability (to the blank 34). Exemplary materials for the sleeve 51 include 304 stainless steel or 316 stainless steel. Material for constructing the feed-through 19 may include various types of metals or metal alloys. Generally, materials for the feed-through 19 are selected according to, for example, structural integrity and electrical conductance. Exemplary materials for the electrode include 446 stainless steel or 52 alloy.

Generally, the insulator 26 is bonded to the sleeve 51 and the feed-through 19 through known techniques (i.e., glass-to-metal bonding). Material for constructing the insulator 26 may include, without limitation, various types of glass, including high temperature glass, ceramic glass or ceramic materials. Generally, materials for the insulator are selected according to, for example, structural integrity and electrical resistance (i.e., electrical insulation properties).

Use of components (such as the foregoing embodiment of the electrode assembly 50) that rely on glass-to-metal bonding as well as use of various welding techniques provides for hermetic sealing of the energy storage. Other components may be used to provide hermetic sealing as well. As used herein, the term "hermetic seal" generally refers to a seal that exhibits a leak rate no greater than that which is defined herein. However, it is considered that the actual seal efficacy may perform better than this standard.

Additional or other techniques for coupling the electrode assembly 50 to the blank 34 include use of a bonding agent under the flange of the sleeve 51 (between the flange and the layer of second material 42), when such techniques are considered appropriate.

Referring now to FIG. 15, the energy storage cell 12 is disposed within the body 10. The at least one terminal 8 is coupled appropriately (such as to the feed-through 19), and the cap 24 is mated with the body 10 to provide for the ultracapacitor 10.

Once assembled, the cap 24 and the body 10 may be sealed. FIG. 22 depicts various embodiments of the assembled energy storage (in this case, the ultracapacitor 10). In FIG. 16A, a flat blank 34 (see FIG. 12A) is used to create a flat cap 24. Once the cap 24 is set on the body 10, the cap 24 and the body 10 are welded to create a seal 62. In this case, as the body 10 is an annular cylinder, the weld proceeds circumferentially about the body 10 and cap 24 to provide the seal 62. In a second embodiment, shown in FIG. 16B, the concave blank 34 (see FIG. 12B) is used to create a concave cap 24. Once the cap 24 is set on the body 10, the cap 24 and the body 10 are welded to create the seal 62. In a third embodiment, shown in FIG. 16C, the convex blank 34 (see FIG. 12C) is used to create a convex cap 24. Once the cap 24 is set on the body 10, the cap 24 and the body 10 may be welded to create the seal 62.

As appropriate, clad material may be removed (by techniques such as, for example, machining or etching, etc,) to expose other metal in the multi-layer material. Accordingly, in some embodiments, the seal 62 may include an aluminum-to-aluminum weld. The aluminum-to-aluminum weld may be supplemented with other fasteners, as appropriate.

Other techniques may be used to seal the housing 7. For example, laser welding, TIG welding, resistance welding, ultrasonic welding, and other forms of mechanical sealing may be used. It should be noted, however, that in general, traditional forms of mechanical sealing alone are not adequate for providing the robust hermetic seal offered in the ultracapacitor 10.

Refer now to FIG. 12 in which aspects of assembly another embodiment of the cap 24 are depicted. FIG. 12A depicts a template (i.e., the blank 34) that is used to provide a body of the cap 24. The template is generally sized to mate with the housing 7 of an appropriate type of energy storage cell (such as the ultracapacitor 10). The cap 24 may be formed by initially providing the template forming the template, including a dome 37 within the template (shown in FIG. 12B) and by then perforating the dome 37 to provide a through-way 32 (shown in FIG. 12C). Of course, the blank 34 (e.g., a circular piece of stock) may be pressed or otherwise fabricated such that the foregoing features are simultaneously provided.

In general, and with regard to these embodiments, the cap may be formed of aluminum, or an alloy thereof. However, the cap may be formed of any material that is deemed suitable by a manufacturer, user, designer and the like. For example, the cap 24 may be fabricated from steel and passivated (i.e., coated with an inert coating) or otherwise prepared for use in the housing 7.

Referring now also to FIG. 19, there is shown another embodiment of the electrode assembly 50. In these embodiments, the electrode assembly 50 includes the feed-through 19 and a hemispherically shaped material disposed about the feed-through 19. The hemispherically shaped material serves as the insulator 26, and is generally shaped to conform to the dome 37. The hemispheric insulator 26 may be fabricated of any suitable material for providing a hermetic seal while withstanding the chemical influence of the electrolyte 6. Exemplary materials include PFA (perfluoroalkoxy polymer), FEP (fluorinated ethylene-propylene), PVF (polyvinylfluoride), TFE (tetrafluoroethylene), CTFE (chlorotrifluoroethylene), PCTFE (polychlorotrifluoroethylene), ETFE (polyethylenetetrafluoroethylene), ECTFE (polyethylenechlorotrifluoroethylene), PTFE (polytetrafluoroethylene), another fluoropolymer based material as well as any other material that may exhibit similar properties (in varying degrees) and provide for satisfactory performance (such as by exhibiting, among other things, a high resistance to solvents, acids, and bases at high temperatures, low cost and the like).

The feed-through 19 may be formed of aluminum, or an alloy thereof. However, the feed-through 19 may be formed of any material that is deemed suitable by a manufacturer, user, designer and the like. For example, the feed-through 19 may be fabricated from steel and passivated (i.e., coated with an inert coating, such as silicon) or otherwise prepared for use in the electrode assembly 50. An exemplary technique for passivation includes depositing a coating of hydrogenated amorphous silicon on the surface of the substrate and functionalizing the coated substrate by exposing the substrate to a binding reagent having at least one unsaturated hydrocarbon group under pressure and elevated temperature for an effective length of time. The hydrogenated amorphous silicon coating is deposited by exposing the substrate to silicon hydride gas under pressure and elevated temperature for an effective length of time.

The hemispheric insulator 26 may be sized relative to the dome 37 such that a snug fit (i.e., hermetic seal) is achieved when assembled into the cap 24. The hemispheric insulator 26 need not be perfectly symmetric or of classic hemispheric proportions. That is, the hemispheric insulator 26 is substantially hemispheric, and may include, for example, slight adjustments in proportions, a modest flange (such as at the base) and other features as deemed appropriate. The hemispheric insulator 26 is generally formed of homogeneous material, however, this is not a requirement. For example, the hemispheric insulator 26 may include an air or gas filled torus (not shown) therein to provide for desired expansion or compressibility.

As shown in FIG. 20, the electrode assembly 50 may be inserted into the template (i.e., the formed blank 34) to provide for an embodiment of the cap 24 that includes a hemispheric hermetic seal.

As shown in FIG. 21, in various embodiments, a retainer 43 may be bonded or otherwise mated to a bottom of the cap 24 (i.e., a portion of the cap 24 that faces to an interior of the housing 7 and faces the energy storage cell 12). The retainer 43 may be bonded to the cap 24 through various techniques, such as aluminum welding (such as laser, ultrasonic and the like). Other techniques may be used for the bonding, including for example, stamping (i.e., mechanical bonding) and brazing. The bonding may occur, for example, along a perimeter of the retainer 43. Generally, the bonding is provided for in at least one bonding point to create a desired seal 71. At least one fastener, such as a plurality of rivets may be used to seal the insulator 26 within the retainer 43.

In the example of FIG. 21, the cap 24 is of a concave design (see FIG. 12B). However, other designs may be used. For example, a convex cap 24 may be provided (FIG. 12C), and an over-cap 24 may also be used (a variation of the embodiment of FIG. 12C, which is configured to mount as depicted in FIG. 16C).

The material used for the cap as well as the feed-through 19 may be selected with regard for thermal expansion of the hemispheric insulator 26. Further, manufacturing techniques may also be devised to account for thermal expansion. For example, when assembling the cap 24, a manufacturer may apply pressure to the hemispheric insulator 26, thus at least somewhat compressing the hemispheric insulator 26. In this manner, there at least some thermal expansion of the cap 24 is provided for without jeopardizing efficacy of the hermetic seal.

For further clarification of the assembled ultracapacitor, refer to FIG. 22, where a cut-away view of the ultracapacitor 10 is provided. In this example, the storage cell 12 is inserted into and contained within the body 10. Each plurality of leads are bundled together and coupled to the housing 7 as one of the terminals 8. In some embodiments, the plurality of leads are coupled to a bottom of the body 10 (on the interior), thus turning the body 10 into a negative contact 55. Likewise, another plurality of leads are bundled and coupled to the feed-through 19, to provide a positive contact 56. Electrical isolation of the negative contact 55 and the positive contact 56 is preserved by the electrical insulator 26. Generally, coupling of the leads is accomplished through welding, such as at least one of laser and ultrasonic welding. Of course, other techniques may be used as deemed appropriate.

Inner Barrier

Figure 7:
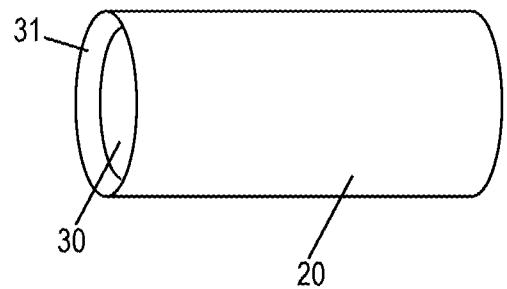
FIG. 7 depicts a barrier disposed on an interior portion of an exemplary body of a housing.

Referring now to FIG. 7, the housing 7 may include an inner barrier 30. In some embodiments, the barrier 30 is a coating. In this example, the barrier 30 is formed of polytetrafluoroethylene (PTFE). Polytetrafluoroethylene (PTFE) exhibits various properties that make this composition well suited for the barrier 30. PTFE has a melting point of about 327 degrees Celsius, has excellent dielectric properties, has a coefficient of friction of between about 0.05 to 0.10, which is the third-lowest of any known solid material, has a high corrosion resistance and other beneficial properties. Generally, an interior portion of the cap 24 may include the barrier 30 disposed thereon.

Other materials may be used for the barrier 30. Among these other materials are forms of ceramics (any type of ceramic that may be suitably applied and meet performance criteria), other polymers (preferably, a high temperature polymer) and the like. Exemplary other polymers include perfluoroalkoxy (PFA) and fluorinated ethylene propylene (FEP) as well as ethylene tetrafluoroethylene (ETFE).

The barrier 30 may include any material or combinations of materials that provide for reductions in electrochemical or other types of reactions between the energy storage cell 12 and the housing 7 or components of the housing 7. In some embodiments, the combinations are manifested as homogeneous dispersions of differing materials within a single layer. In other embodiments, the combinations are manifested as differing materials within a plurality of layers. Other combinations may be used. In short, the barrier 30 may be considered as at least one of an electrical insulator and chemically inert (i.e., exhibiting low reactivity) and therefore substantially resists or impedes at least one of electrical and chemical interactions between the storage cell 12 and the housing 7. In some embodiments, the term "low reactivity" and "low chemical reactivity" generally refer to a rate of chemical interaction that is below a level of concern for an interested party.

Figure 8A:
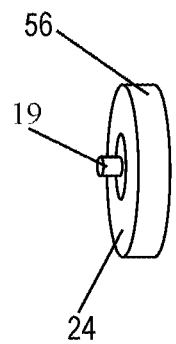
FIGS. 8A and 8B, collectively referred to herein as FIG. 8, depict aspects of an exemplary cap for a housing.
Figure 8B:
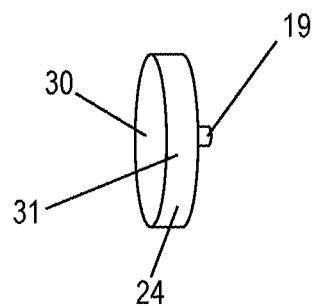

In general, the interior of the housing 7 may be host to the barrier 30 such that all surfaces of the housing 7 which are exposed to the interior are covered. At least one untreated area 31 may be included within the body 10 and on an outer surface 36 of the cap 24 (see FIG. 8A). In some embodiments, untreated areas 31 (see FIG. 8B) may be included to account for assembly requirements, such as areas which will be sealed or connected (such as by welding).

The barrier 30 may be applied to the interior portions using conventional techniques. For example, in the case of PTFE, the barrier 30 may be applied by painting or spraying the barrier 30 onto the interior surface as a coating. A mask may be used as a part of the process to ensure untreated areas 31 retain desired integrity. In short, a variety of techniques may be used to provide the barrier 30.

Figure 9:
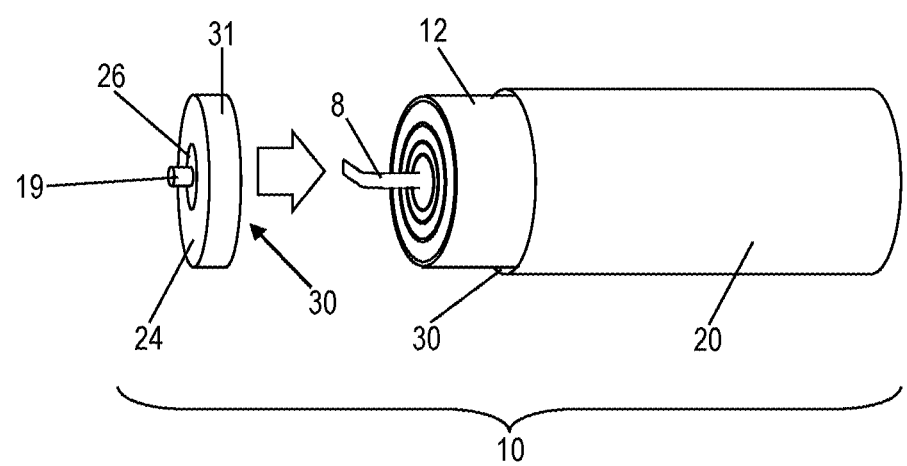
FIG. 9 depicts an exemplary assembly of the ultracapacitor according to certain of the teachings herein.

In an exemplary embodiment, the barrier 30 is about 3 mil to about 5 mil thick, while material used for the barrier 30 is a PFA based material. In this example, surfaces for receiving the material that make up the barrier 30 are prepared with grit blasting, such as with aluminum oxide. Once the surfaces are cleaned, the material is applied, first as a liquid then as a powder. The material is cured by a heat treating process. In some embodiments, the heating cycle is about 10 minutes to about 15 minutes in duration, at temperatures of about 370 degrees Celsius. This results in a continuous finish to the barrier 30 that is substantially free of pin-hole sized or smaller defects. FIG. 9 depicts assembly of an embodiment of the ultracapacitor 10 according to the teachings herein. In this embodiment, the ultracapacitor 10 includes the body 10 that includes the barrier 30 disposed therein, a cap 24 with the barrier 30 disposed therein, and the energy storage cell 12. During assembly, the cap 24 is set over the body 10. A first one of the terminals 8 is electrically coupled to the cap feed-through 19, while a second one of the terminals 8 is electrically coupled to the housing 7, typically at the bottom, on the side or on the cap 24. In some embodiments, the second one of the terminals 8 is coupled to another feed-through 19 (such as of an opposing cap 24).

With the barrier 30 disposed on the interior surface(s) of the housing 7, electrochemical and other reactions between the housing 7 and the electrolyte are greatly reduced or substantially eliminated. This is particularly significant at higher temperatures where a rate of chemical and other reactions is generally increased.

Notably, the leakage current for ultracapacitor 10 with a barrier indicates a comparably lower initial value and no substantial increase over time while the leakage current for ultracapacitor 10 without a barrier indicates a comparably higher initial value as well as a substantial increase over time.

Generally, the barrier 30 provides a suitable thickness of suitable materials between the energy storage cell 12 and the housing 7. The barrier 30 may include a homogeneous mixture, a heterogeneous mixture and/or at least one layer of materials. The barrier 30 may provide complete coverage (i.e., provide coverage over the interior surface area of the housing with the exception of electrode contacts) or partial coverage. In some embodiments, the barrier 30 is formed of multiple components.

Referring to FIG. 11, aspects of an additional embodiment are shown. In some embodiments, the energy storage cell 12 is deposited within an envelope 73. That is, the energy storage cell 12 has the barrier 30 disposed thereon, wrapped thereover, or otherwise applied to separate the energy storage cell 12 from the housing 7 once assembled. The envelope 73 may be applied well ahead of packaging the energy storage cell 12 into the housing 7. Therefore, use of an envelope 73 may present certain advantages, such as to manufacturers. (Note that the envelope 73 is shown as loosely disposed over the energy storage cell 12 for purposes of illustration).

In some embodiments, the envelope 73 is used in conjunction with the coating, wherein the coating is disposed over at least a portion of the interior surfaces. For example, in one embodiment, the coating is disposed within the interior of the housing 7 only in areas where the envelope 73 may be at least partially compromised (such as be a protruding terminal 8). Together, the envelope 73 and the coating form an efficient barrier 30.

Accordingly, incorporation of the barrier 30 may provide for an ultracapacitor that exhibits leakage current with comparatively low initial values and substantially slower increases in leakage current over time in view of the prior art. Significantly, the leakage current of the ultracapacitor remains at practical (i.e., desirably low) levels when the ultracapacitor is exposed to ambient temperatures for which prior art capacitors would exhibit prohibitively large initial values of leakage current and/or prohibitively rapid increases in leakage current over time.

Having thus described embodiments of the barrier 30, and various aspects thereof, it should be recognized the ultracapacitor 10 may exhibit other benefits as a result of reduced reaction between the housing 7 and the energy storage media 1. For example, an effective series resistance (ESR) of the ultracapacitor 10 may exhibit comparatively lower values over time. Further, unwanted chemical reactions that take place in a prior art capacitor often create unwanted effects such as out-gassing, or in the case of a hermetically sealed housing, bulging of the housing. In both cases, this leads to a compromise of the structural integrity of the housing and/or hermetic seal of the capacitor. Ultimately, this may lead to leaks or catastrophic failure of the prior art capacitor. In some embodiments, these effects may be substantially reduced or eliminated by the application of a disclosed barrier 30.

It should be recognized that the terms "barrier" and "coating" are not limiting of the teachings herein. That is, any technique for applying the appropriate material to the interior of the housing 7, body 10 and/or cap 24 may be used. For example, in other embodiments, the barrier 30 is actually fabricated into or onto material making up the housing body 10, the material then being worked or shaped as appropriate to form the various components of the housing 7. When considering some of the many possible techniques for applying the barrier 30, it may be equally appropriate to roll on, sputter, sinter, laminate, print, or otherwise apply the material(s). In short, the barrier 30 may be applied using any technique deemed appropriate by a manufacturer, designer and/or user.

Materials used in the barrier 30 may be selected according to properties such as reactivity, dielectric value, melting point, adhesion to materials of the housing 7, coefficient of friction, cost, and other such factors. Combinations of materials (such as layered, mixed, or otherwise combined) may be used to provide for desired properties.

Using an enhanced housing 7, such as one with the barrier 30, may, in some embodiments, limit degradation of the advanced electrolyte system. While the barrier 30 presents one technique for providing an enhanced housing 7, other techniques may be used. For example, use of a housing 7 fabricated from aluminum would be advantageous, due to the electrochemical properties of aluminum in the presence of electrolyte 6. However, given the difficulties in fabrication of aluminum, it has not been possible (until now) to construct embodiments of the housing 7 that take advantage of aluminum.

Additional embodiments of the housing 7 include those that present aluminum to all interior surfaces, which may be exposed to electrolyte, while providing users with an ability to weld and hermetically seal the housing. Improved performance of the ultracapacitor 10 may be realized through reduced internal corrosion, elimination of problems associated with use of dissimilar metals in a conductive media and for other reasons. Advantageously, the housing 7 makes use of existing technology, such available electrode inserts that include glass-to-metal seals (and may include those fabricated from stainless steel, tantalum or other advantageous materials and components), and therefore is economic to fabricate.

Although disclosed herein as embodiments of the housing 7 that are suited for the ultracapacitor 10, these embodiments (as is the case with the barrier 30) may be used with any type of energy storage deemed appropriate, and may include any type of technology practicable. For example, other forms of energy storage may be used, including electrochemical batteries, in particular, lithium based batteries.

In general, the material(s) exposed to an interior of the housing 7 exhibit adequately low reactivity when exposed to the electrolyte 6, i.e., the advanced electrolyte system of the present invention, and therefore are merely illustrative of some of the embodiments and are not limiting of the teachings herein.

Factors for General Construction of Capacitors

An important aspect for consideration in construction of the ultracapacitor 10 is maintaining good chemical hygiene. In order to assure purity of the components, in various embodiments, the activated carbon, carbon fibers, rayon, carbon cloth, and/or nanotubes making up the energy storage media 1 for the two electrode 3, are dried at elevated temperature in a vacuum environment. The separator 5 is also dried at elevated temperature in a vacuum environment. Once the electrode 3 and the separator 5 are dried under vacuum, they are packaged in the housing 7 without a final seal or cap in an atmosphere with less than 50 parts per million (ppm) of water. The uncapped ultracapacitor 10 may be dried, for example, under vacuum over a temperature range of about 100 degrees Celsius to about 300 degrees Celsius. Once this final drying is complete, the electrolyte 6 may be added and the housing 7 is sealed in a relatively dry atmosphere (such as an atmosphere with less than about 50 ppm of moisture). Of course, other methods of assembly may be used, and the foregoing provides merely a few exemplary aspects of assembly of the ultracapacitor 10.

Supporting Methods of the Invention

Certain methods are provided herein for producing the ultracapacitors that may be utilized by the systems of the present invention, including methods of reducing impurities or fabricating devices of the present invention. Such methods of purification are also additionally applicable to any advanced electrolyte system of the present invention i. AES Contaminants In certain embodiments, the advanced electrolyte system (AES) of the present invention is purified remove contaminants and to provide desired enhanced performance characteristics described herein. As such, the present disclosure provides a method for purifying an AES, the method comprising: mixing water into an advanced electrolyte system to provide a first mixture; partitioning the first mixture; collecting the advanced electrolyte system from the first mixture; adding a solvent to the collected liquid to provide a second mixture; mixing carbon into the second mixture to provide a third mixture; separating the advanced electrolyte system from the third mixture to obtain the purified advanced electrolyte system. Generally, the process calls for selecting an electrolyte, adding de-ionized water as well as activated carbon under controlled conditions. The de-ionized water and activated carbon are subsequently removed, resulting in an electrolyte that is substantially purified. The purified electrolyte is suited for use in, among other things, an ultracapacitor.

This method may be used to ensure a high degree of purity of the advanced electrolyte system (AES) of the present invention. It should be noted that although the process is presented in terms of specific parameters (such as quantities, formulations, times and the like), that the presentation is merely exemplary and illustrative of the process for purifying electrolyte and is not limiting thereof.

For example, the method may further comprise one or more of the following steps or characterizations: heating the first mixture; wherein partitioning comprises letting the first mixture sit undisturbed until the water and the AES are substantially partitioned; wherein adding a solvent comprises adding at least one of diethylether, pentone, cyclopentone, hexane, cyclohexane, benzene, toluene, 1-4 dioxane, and chloroform; wherein mixing carbon comprises mixing carbon powder; wherein mixing carbon comprises stirring the third mixture substantially constantly; wherein separating the AES comprises at least one of filtering carbon from the third mixture and evaporating the solvent from the third mixture.

In a first step of the process for purifying electrolyte, the electrolyte 6 (in some embodiments, the ionic liquid) is mixed with deionized water, and then raised to a moderate temperature for some period of time. In a proof of concept, fifty (50) milliliters (ml) of ionic liquid was mixed with eight hundred and fifty (850) milliliters (ml) of the deionized water. The mixture was raised to a constant temperature of sixty (60) degrees Celsius for about twelve (12) hours and subjected to constant stirring (of about one hundred and twenty (120) revolutions per minute (rpm)).

In a second step, the mixture of ionic liquid and deionized water is permitted to partition. In this example, the mixture was transferred via a funnel, and allowed to sit for about four (4) hours.

In a third step, the ionic liquid is collected. In this example, a water phase of the mixture resided on the bottom, with an ionic liquid phase on the top. The ionic liquid phase was transferred into another beaker.

In a fourth step, a solvent was mixed with the ionic liquid. In this example, a volume of about twenty five (25) milliliters (ml) of ethyl acetate was mixed with the ionic liquid. This mixture was again raised to a moderate temperature and stirred for some time.

Although ethyl acetate was used as the solvent, the solvent can be at least one of diethylether, pentone, cyclopentone, hexane, cyclohexane, benzene, toluene, 1-4 dioxane, chloroform or any combination thereof as well as other material(s) that exhibit appropriate performance characteristics. Some of the desired performance characteristics include those of a non-polar solvent as well as a high degree of volatility.

In a fifth step, carbon powder is added to the mixture of the ionic liquid and solvent. In this example, about twenty (20) weight percent (wt %) of carbon (of about a 0.45 micrometer diameter) was added to the mixture.

In a sixth step, the ionic liquid is again mixed. In this example, the mixture with the carbon powder was then subjected to constant stirring (120 rpm) overnight at about seventy (70) degrees Celsius.

In a seventh step, the carbon and the ethyl acetate are separated from the ionic liquid. In this example, the carbon was separated using Buchner filtration with a glass microfiber filter. Multiple filtrations (three) were performed. The ionic liquid collected was then passed through a 0.2 micrometer syringe filter in order to remove substantially all of the carbon particles. In this example, the solvent was then subsequently separated from the ionic liquid by employing rotary evaporation. Specifically, the sample of ionic liquid was stirred while increasing temperature from seventy (70) degrees Celsius to eighty (80) degrees Celsius, and finished at one hundred (100) degrees Celsius. Evaporation was performed for about fifteen (15) minutes at each of the respective temperatures.

The process for purifying electrolyte has proven to be very effective. For the sample ionic liquid, water content was measured by titration, with a titration instrument provided by Mettler-Toledo Inc., of Columbus, Ohio (model No: AQC22). Halide content was measured with an ISE instrument provided by Hanna Instruments of Woonsocket, Rhode Island (model no. AQC22). The standards solution for the ISE instrument was obtained from Hanna, and included HI 4007-03 (1,000 ppm chloride standard), HI 4010-03 (1,000 ppm fluoride standard) HI 4000-00 (ISA for halide electrodes), and HI 4010-00 (TISAB solution for fluoride electrode only). Prior to performing measurements, the ISE instrument was calibrated with the standards solutions using 0.1, 10, 100 and 1,000 parts per million (ppm) of the standards, mixed in with deionized water. ISA buffer was added to the standard in a 1:50 ratio for measurement of Cl− ions. Results are shown in Table 9.

TABLE 9

Purification Data for Electrolyte Containing 1-butyl-1-methylpyrolidinium and tetracyanoborate

| Impurity | Before (ppm) | After (ppm) | DI Water (ppm) |
|---|---|---|---|
| Cl− | 5,300.90 | 769 | 9.23E−1 |
| F— | 75.61 | 10.61 | 1.10E−1 |
| $H_2O$ | 1080 | 20 | — |

A four step process was used to measure the halide ions. First, Cl− and F− ions were measured in the deionized water. Next, a 0.01 M solution of ionic liquid was prepared with deionized water. Subsequently, Cl− and F− ions were measured in the solution. Estimation of the halide content was then determined by subtracting the quantity of ions in the water from the quantity of ions in the solution.

Purification standards were also examined with respect to the electrolyte contaminant compositions through the analysis of leakage current. Leakage current for purified electrolyte in a similarly structured ultracapacitor 10 shows a substantial decrease in initial leakage current, as well as a modest decrease in leakage current over the later portion of the measurement interval. More information is provided on the construction of each embodiment in Table 10.

TABLE 10

Test Ultracapacitor Configuration

| Parameter | | |
|---|---|---|
| Cell Size: | Open Sub C | Open Sub C |
| Casing: | Coated P870 | Coated P870 |
| Electrode Material: | Double Sided Activated Carbon(150/40) | Double Sided Activated Carbon(150/40) |
| Separator: | Fiberglass | Fiberglass |

TABLE 10-continued

Test Ultracapacitor Configuration

| Parameter | | |
|---|---|---|
| Size of Electrodes: | IE: 233 × 34 mm OE: 256 × 34 mm | IE: 233 × 34 mm OE: 256 × 34 mm |
| Tabs: | 0.005" Aluminum (3 Tabs) | 0.005" Aluminum (3 Tabs) |
| Temperature | 150° C. | 150° C. |
| Electrolyte: | Unpurified AES | Purified AES |

Other benefits are also realized, including improvements in stability of resistance and capacitance of the ultracapacitor 10.

Leakage current may be determined in a number of ways. Qualitatively, leakage current may be considered as current drawn into a device, once the device has reached a state of equilibrium. In practice, it is always or almost always necessary to estimate the actual leakage current as a state of equilibrium that may generally only be asymptotically approached. Thus, the leakage current in a given measurement may be approximated by measuring the current drawn into the ultracapacitor 10, while the ultracapacitor 10 is held at a substantially fixed voltage and exposed to a substantially fixed ambient temperature for a relatively long period of time. In some instances, a relatively long period of time may be determined by approximating the current time function as an exponential function, then allowing for several (e.g., about 3 to 5) characteristic time constants to pass. Often, such a duration ranges from about 50 hours to about 100 hours for many ultracapacitor technologies. Alternatively, if such a long period of time is impractical for any reason, the leakage current may simply be extrapolated, again, perhaps, by approximating the current time function as an exponential or any approximating function deemed appropriate. Notably, leakage current will generally depend on ambient temperature. So, in order to characterize performance of a device at a temperature or in a temperature range, it is generally important to expose the device to the ambient temperature of interest when measuring leakage current.

Note that one approach to reduce the volumetric leakage current at a specific temperature is to reduce the operating voltage at that temperature. Another approach to reduce the volumetric leakage current at a specific temperature is to increase the void volume of the ultracapacitor. Yet another approach to reduce the leakage current is to reduce loading of the energy storage media 1 on the electrode 3.

Having disclosed aspects of embodiments for purification of electrolyte and ionic liquid, it should be recognized that a variety of embodiments may be realized. Further a variety of techniques may be practiced. For example, steps may be adjusted, the order of steps and the like.

ii. Water/Moisture Content and Removal

The housing 7 of a sealed ultracapacitor 10 may be opened, and the storage cell 12 sampled for impurities. Water content may be measured using the Karl Fischer method for the electrodes, separator and electrolyte from the cell 42. Three measurements may be taken and averaged.

In general, a method for characterizing a contaminant within the ultracapacitor includes breaching the housing 7 to access contents thereof, sampling the contents and analyzing the sample. Techniques disclosed elsewhere herein may be used in support of the characterizing.

Note that to ensure accurate measurement of impurities in the ultracapacitor and components thereof, including the electrode, the electrolyte and the separator, assembly and disassembly may be performed in an appropriate environment, such as in an inert environment within a glove box.

By reducing the moisture content in the ultracapacitor 10 (e.g., to less than 500 part per million (ppm) over the weight and volume of the electrolyte and the impurities to less than 1,000 ppm), the ultracapacitor 10 can more efficiently operate over the temperature range, with a leakage current (I/L) that is less than 10 Amperes per Liter within that temperature range and voltage range.

In one embodiment, leakage current (I/L) at a specific temperature is measured by holding the voltage of the ultracapacitor 10 constant at the rated voltage (i.e., the maximum rated operating voltage) for seventy two (72) hours. During this period, the temperature remains relatively constant at the specified temperature. At the end of the measurement interval, the leakage current of the ultracapacitor 10 is measured.

In some embodiments, a maximum voltage rating of the ultracapacitor 10 is about 4 V at room temperature. An approach to ensure performance of the ultracapacitor 10 at elevated temperatures (for example, over 210 degrees Celsius), is to derate (i.e., to reduce) the voltage rating of the ultracapacitor 10. For example, the voltage rating may be adjusted down to about 0.5 V, such that extended durations of operation at higher temperature are achievable.

iii. Fabrication Techniques for Ultracapacitors

Moreover, it should be recognized that certain robust assembly techniques may be required to provide highly efficient energy storage of the ultracapacitors described herein. Accordingly, some of the techniques for assembly are now discussed.

Once the ultracapacitor 10 is fabricated, it may be used in high temperature applications with little or no leakage current and little increase in resistance. The ultracapacitor 10 described herein can operate efficiently at temperatures from about minus 40 degrees Celsius to about 210 degrees Celsius with leakage currents normalized over the volume of the device less than 10 amperes per liter (A/L) of volume of the device within the entire operating voltage and temperature range. In certain embodiments, the capacitor is operable across temperatures from minus 40 degrees Celsius to 210 degrees Celsius.

As an overview, a method of assembly of a cylindrically shaped ultracapacitor 10 is provided. Beginning with the electrode 3, each electrode 3 is fabricated once the energy storage media 1 has been associated with the current collector 2. A plurality of leads are then coupled to each electrode 3 at appropriate locations. A plurality of electrode 3 are then oriented and assembled with an appropriate number of separators 5 therebetween to form the storage cell 12. The storage cell 12 may then be rolled into a cylinder, and may be secured with a wrapper. Generally, respective ones of the leads are then bundled to form each of the terminals 8.

Prior to incorporation of the electrolyte 6, i.e., the advanced electrolyte systems of the present invention, into the ultracapacitor 10 (such as prior to assembly of the storage cell 12, or thereafter) each component of the ultracapacitor 10 may be dried to remove moisture. This may be performed with unassembled components (i.e., an empty housing 7, as well as each of the electrode 3 and each of the separators 5), and subsequently with assembled components (such as the storage cell 12).

Drying may be performed, for example, at an elevated temperature in a vacuum environment. Once drying has been performed, the storage cell 12 may then be packaged in the housing 7 without a final seal or cap. In some embodiments, the packaging is performed in an atmosphere with less than 50 parts per million (ppm) of water. The uncapped ultracapacitor 10 may then be dried again. For example, the ultracapacitor 10 may be dried under vacuum over a temperature range of about 100 degrees Celsius to about 300 degrees Celsius. Once this final drying is complete, the housing 7 may then be sealed in, for example, an atmosphere with less than 50 ppm of moisture.

In some embodiments, once the drying process (which may also be referred to a "baking" process) has been completed, the environment surrounding the components may be filled with an inert gas. Exemplary gasses include argon, nitrogen, helium, and other gasses exhibiting similar properties (as well as combinations thereof).

Generally, a fill port (a perforation in a surface of the housing 7) is included in the housing 7, or may be later added. Once the ultracapacitor 10 has been filled with electrolyte 6, i.e., the advanced electrolyte systems of the present invention, the fill port may then be closed. Closing the fill port may be completed, for example, by welding material (e.g., a metal that is compatible with the housing 7) into or over the fill port. In some embodiments, the fill port may be temporarily closed prior to filling, such that the ultracapacitor 10 may be moved to another environment, for subsequent re-opening, filling and closure. However, as discussed herein, it is considered that the ultracapacitor 10 is dried and filled in the same environment.

A number of methods may be used to fill the housing 7 with a desired quantity of the advanced electrolyte system. Generally, controlling the fill process may provide for, among other things, increases in capacitance, reductions in equivalent-series-resistance (ESR), and limiting waste of electrolyte. A vacuum filling method is provided as a non-limiting example of a technique for filling the housing 7 and wetting the storage cell 12 with the electrolyte 6.

First, however, note that measures may be taken to ensure that any material that has a potential to contaminate components of the ultracapacitor 10 is clean, compatible and dry. As a matter of convention, it may be considered that "good hygiene" is practiced to ensure assembly processes and components do not introduce contaminants into the ultracapacitor 10.

In the "vacuum method" a container is placed onto the housing 7 around the fill port. A quantity of electrolyte 6, i.e., the advanced electrolyte systems of the present invention, is then placed into the container in an environment that is substantially free of oxygen and water (i.e., moisture). A vacuum is then drawn in the environment, thus pulling any air out of the housing and thus simultaneously drawing the electrolyte 6 into the housing 7. The surrounding environment may then be refilled with inert gas (such as argon, nitrogen, or the like, or some combination of inert gases), if desired. The ultracapacitor 10 may be checked to see if the desired amount of electrolyte 6 has been drawn in. The process may be repeated as necessary until the desired amount of electrolyte 6 is in the ultracapacitor 10.

After filling with electrolyte 6, i.e., the advanced electrolyte systems of the present invention, in certain embodiments, material may be fit into the fill port to seal the ultracapacitor 10. The material may be, for example, a metal that is compatible with the housing 7 and the electrolyte 6. In one example, material is force fit into the fill port, essentially performing a "cold weld" of a plug in the fill port.

In particular embodiments, the force fit may be complimented with other welding techniques as discussed further herein.

In general, assembly of the housing often involves placing the storage cell 12 within the body 10 and filling the body 10 with the advanced electrolyte system. Another drying process may be performed. Exemplary drying includes heating the body 10 with the storage cell 12 and advanced electrolyte system therein, often under a reduced pressure (e.g., a vacuum). Once adequate (optional) drying has been performed, final steps of assembly may be performed. In the final steps, internal electrical connections are made, the cap 24 is installed, and the cap 24 is hermetically sealed to the body 10, by, for example, welding the cap 24 to the body 10.

In some embodiments, at least one of the housing 7 and the cap 24 is fabricated to include materials that include a plurality of layers. For example, a first layer of material may include aluminum, with a second layer of material being stainless steel. In this example, the stainless steel is clad onto the aluminum, thus providing for a material that exhibits a desired combination of metallurgical properties. That is, in the embodiments provided herein, the aluminum is exposed to an interior of the energy storage cell (i.e., the housing), while the stainless steel is exposed to exterior. In this manner, advantageous electrical properties of the aluminum are enjoyed, while structural properties (and metallurgical properties, i.e., weldability) of the stainless steel are relied upon for construction. The multi-layer material may include additional layers as deemed appropriate. Advantageously, this provides for welding of stainless steel to stainless steel, a relatively simple welding procedure.

While material used for construction of the body 10 includes aluminum, any type of aluminum or aluminum alloy deemed appropriate by a designer or fabricator (all of which are broadly referred to herein simply as "aluminum"). Various alloys, laminates, and the like may be disposed over (e.g., clad to) the aluminum (the aluminum being exposed to an interior of the body 10. Additional materials (such as structural materials or electrically insulative materials, such as some polymer-based materials) may be used to compliment the body and/or the housing 7. The materials disposed over the aluminum may likewise be chosen by what is deemed appropriate by a designer or fabricator.

Use of aluminum is not necessary or required. In short, material selection may provide for use of any material deemed appropriate by a designer, fabricator, or user and the like. Considerations may be given to various factors, such as, for example, reduction of electrochemical interaction with the electrolyte 6, structural properties, cost and the like.

Embodiments of the ultracapacitor 10 that exhibit a relatively small volume may be fabricated in a prismatic form factor such that the electrode 3 of the ultracapacitor 10 oppose one another, at least one electrode 3 having an internal contact to a glass to metal seal, the other having an internal contact to a housing or to a glass to metal seal.

A volume of a particular ultracapacitor 10 may be extended by combining several storage cells (e.g., welding together several jelly rolls) within one housing 7 such that they are electrically in parallel or in series.

In a variety of embodiments, it is useful to use a plurality of the ultracapacitors 10 together to provide a power supply. In order to provide for reliable operation, individual ultracapacitors 10 may be tested in advance of use. In order to perform various types of testing, each of the ultracapacitors 10 may be tested as a singular cell, in series or in parallel with multiple ultracapacitors 10 attached. Using different metals joined by various techniques (such as by welding) can reduce the ESR of the connection as well as increase the strength of the connections. Some aspects of connections between ultracapacitors 10 are now introduced.

In some embodiments, the ultracapacitor 10 includes two contacts. The two contacts are the glass-to-metal seal pin (i.e., the feed-through 19) and the entire rest of the housing 7. When connecting a plurality of the ultracapacitors 10 in series, it is often desired to couple an interconnection between a bottom of the housing 7 (in the case of the cylindrical form housing 7), such that distance to the internal leads is minimized, and therefore of a minimal resistance. In these embodiments, an opposing end of the interconnection is usually coupled to the pin of the glass-to-metal seal.

With regard to interconnections, a common type of weld involves use of a parallel tip electric resistance welder. The weld may be made by aligning an end of the interconnection above the pin and welding the interconnection directly to the pin. Using a number of welds will increase the strength and connection between the interconnection and the pin. Generally, when welding to the pin, configuring a shape of the end of the interconnection to mate well with the pin serves to ensure there is substantially no excess material overlapping the pin that would cause a short circuit.

An opposed tip electric resistance welder may be used to weld the interconnection to the pin, while an ultrasonic welder may used to weld the interconnection to the bottom of the housing 7. Soldering techniques may used when metals involved are compatible.

With regard to materials used in interconnections, a common type of material used for the interconnection is nickel. Nickel may be used as it welds well with stainless steel and has a strong interface. Other metals and alloys may be used in place of nickel, for example, to reduce resistance in the interconnection.

Generally, material selected for the interconnection is chosen for compatibility with materials in the pin as well as materials in the housing 7. Exemplary materials include copper, nickel, tantalum, aluminum, and nickel copper clad. Further metals that may be used include silver, gold, brass, platinum, and tin.

In some embodiments, such as where the pin (i.e., the feed-through 19) is made of tantalum, the interconnection may make use of intermediate metals, such as by employing a short bridge connection. An exemplary bridge connection includes a strip of tantalum, which has been modified by use of the opposed tip resistance welder to weld a strip of aluminum/copper/nickel to the bridge. A parallel resistance welder is then used to weld the tantalum strip to the tantalum pin.

The bridge may also be used on the contact that is the housing 7. For example, a piece of nickel may be resistance welded to the bottom of the housing 7. A strip of copper may then be ultrasonic welded to the nickel bridge. This technique helps to decrease resistance of cell interconnections. Using different metals for each connection can reduce the ESR of the interconnections between cells in series.

Having thus described aspects of a robust ultracapacitor 10 that is useful for high temperature environments (i.e., up to about 210 degrees Celsius), some additional aspects are now provided and/or defined.

A variety of materials may be used in construction of the ultracapacitor 10. Integrity of the ultracapacitor 10 is essential if oxygen and moisture are to be excluded and the electrolyte 6 is to be prevented from escaping. To accomplish this, seam welds and any other sealing points should meet standards for hermiticity over the intended temperature range for operation. Also, materials selected should be compatible with other materials, such as ionic liquids and solvents that may be used in the formulation of the advanced electrolyte system.

In some embodiments, the feed-through 19 is formed of metal such as at least one of KOVAR™ (a trademark of Carpenter Technology Corporation of Reading, Pennsylvania, where KOVAR is a vacuum melted, iron-nickel-cobalt, low expansion alloy whose chemical composition is controlled within narrow limits to assure precise uniform thermal expansion properties), Alloy 52 (a nickel iron alloy suitable for glass and ceramic sealing to metal), tantalum, molybdenum, niobium, tungsten, Stainless Steel 446 (a ferritic, non-heat treatable stainless steel that offers good resistance to high temperature corrosion and oxidation) and titanium.

The body of glass-to-metal seals that take advantage of the foregoing may be fabricated from 300 series stainless steels, such as 304, 304L, 316, and 316L alloys. The bodies may also be made from metal such as at least one of various nickel alloys, such as Inconel (a family of austenitic nickel-chromium-based superalloys that are oxidation and corrosion resistant materials well suited for service in extreme environments subjected to pressure and heat) and Hastelloy (a highly corrosion resistant metal alloy that includes nickel and varying percentages of molybdenum, chromium, cobalt, iron, copper, manganese, titanium, zirconium, aluminum, carbon, and tungsten).

The insulating material between the feed-through 19 and the surrounding body in the glass-to-metal seal is typically a glass, the composition of which is proprietary to each manufacturer of seals and depends on whether the seal is under compression or is matched. Other insulative materials may be used in the glass-to-metal seal. For example, various polymers may be used in the seal. As such, the term "glass-to-metal" seal is merely descriptive of a type of seal, and is not meant to imply that the seal must include glass.

The housing 7 for the ultracapacitor 10 may be made from, for example, types 304, 304L, 316, and 316L stainless steels. They may also be constructed from, but not limited to, some of the aluminum alloys, such as 1100, 3003, 5052, 4043 and 6061. Various multi-layer materials may be used, and may include, for example, aluminum clad to stainless steel. Other non-limiting compatible metals that may be used include platinum, gold, rhodium, ruthenium and silver.

Specific examples of glass-to-metal seals that have been used in the ultracapacitor 10 include two different types of glass-to-metal seals. A first one is from SCHOTT with a US location in Elmsford, NY. This embodiment uses a stainless steel pin, glass insulator, and a stainless steel body. A second glass-to-metal seal is from HERMETIC SEAL TECHNOLOGY of Cincinnati, OH. This second embodiment uses a tantalum pin, glass insulator and a stainless steel body. Varying sizes of the various embodiments may be provided.

An additional embodiment of the glass-to-metal seal includes an embodiment that uses an aluminum seal and an aluminum body. Yet another embodiment of the glass-to-metal seal includes an aluminum seal using epoxy or other insulating materials (such as ceramics or silicon).

A number of aspects of the glass-to-metal seal may be configured as desired. For example, dimensions of housing and pin, and the material of the pin and housing may be modified as appropriate. The pin can also be a tube or solid pin, as well as have multiple pins in one cover. While the most common types of material used for the pin are stainless steel alloys, copper cored stainless steel, molybdenum, platinum-iridium, various nickel-iron alloys, tantalum and other metals, some non-traditional materials may be used (such as aluminum). The housing is usually formed of stainless steel, titanium and/or various other materials.

A variety of fastening techniques may be used in assembly of the ultracapacitor 10. For example, and with regards to welding, a variety of welding techniques may be used. The following is an illustrative listing of types of welding and various purposes for which each type of welding may be used.

Ultrasonic welding may be used for, among other things: welding aluminum tabs to the current collector; welding tabs to the bottom clad cover; welding a jumper tab to the clad bridge connected to the glass-to-metal seal pin; and welding jelly roll tabs together. Pulse or resistance welding may be used for, among other things: welding leads onto the bottom of the can or to the pin; welding leads to the current collector; welding a jumper to a clad bridge; welding a clad bridge to the terminal 8; welding leads to a bottom cover. Laser welding may be used for, among other things: welding a stainless steel cover to a stainless steel can; welding a stainless steel bridge to a stainless steel glass-to-metal seal pin; and welding a plug into the fill port. TIG welding may be used for, among other things: sealing aluminum covers to an aluminum can; and welding aluminum seal into place. Cold welding (compressing metals together with high force) may be used for, among other things: sealing the fillport by force fitting an aluminum ball/tack into the fill port.

iv. Certain Advantageous Embodiments of the Fabrication

Certain advantageous embodiments, which are not intended to be limiting are provided herein below.

In one particular embodiment, and referring to FIG. 23, components of an exemplary electrode 3 are shown. In this example, the electrode 3 will be used as the negative electrode 3 (however, this designation is arbitrary and merely for referencing).

As may be noted from the illustration, at least in this embodiment, the separator 5 is generally of a longer length and wider width than the energy storage media 1 (and the current collector 2). By using a larger separator 5, protection is provided against short circuiting of the negative electrode 3 with the positive electrode 3. Use of additional material in the separator 5 also provides for better electrical protection of the leads and the terminal 8.

Refer now to FIG. 24 which provides a side view of an embodiment of the storage cell 12. In this example, a layered stack of energy storage media 1 includes a first separator 5 and a second separator 5, such that the electrode 3 are electrically separated when the storage cell 12 is assembled into a rolled storage cell 23. Note that the term "positive" and "negative" with regard to the electrode 3 and assembly of the ultracapacitor 10 is merely arbitrary, and makes reference to functionality when configured in the ultracapacitor 10 and charge is stored therein. This convention, which has been commonly adopted in the art, is not meant to apply that charge is stored prior to assembly, or connote any other aspect other than to provide for physical identification of different electrodes.

Prior to winding the storage cell 12, the negative electrode 3 and the positive electrode 3 are aligned with respect to each other. Alignment of the electrode 3 gives better performance of the ultracapacitor 10 as a path length for ionic transport is generally minimized when there is a highest degree of alignment. Further, by providing a high degree of alignment, excess separator 5 is not included and efficiency of the ultracapacitor 10 does not suffer as a result.

Referring now also to FIG. 25, there is shown an embodiment of the storage cell 12 wherein the electrode 3 have been rolled into the rolled storage cell 23. One of the separators 5 is present as an outermost layer of the storage cell 12 and separates energy storage media 1 from an interior of the housing 7.

"Polarity matching" may be employed to match a polarity of the outermost electrode in the rolled storage cell 23 with a polarity of the body 10. For example, in some embodiments, the negative electrode 3 is on the outermost side of the tightly packed package that provides the rolled storage cell 23. In these embodiments, another degree of assurance against short circuiting is provided. That is, where the negative electrode 3 is coupled to the body 10, the negative electrode 3 is the placed as the outermost electrode in the rolled storage cell 23. Accordingly, should the separator 5 fail, such as by mechanical wear induced by vibration of the ultracapacitor 10 during usage, the ultracapacitor 10 will not fail as a result of a short circuit between the outermost electrode in the rolled storage cell 23 and the body 10.

For each embodiment of the rolled storage cell 23, (see for example, FIG. 25) a reference mark 72 may be in at least the separator 5. The reference mark 72 will be used to provide for locating the leads on each of the electrode 3. In some embodiments, locating of the leads is provided for by calculation. For example, by taking into account an inner diameter of the jelly roll and an overall thickness for the combined separators 5 and electrode 3, a location for placement of each of the leads may be estimated. However, practice has shown that it is more efficient and effective to use a reference mark 72. The reference mark 72 may include, for example, a slit in an edge of the separator(s) 5.

Generally, the reference mark 72 is employed for each new specification of the storage cell 12. That is, as a new specification of the storage cell 12 may call for differing thickness of at least one layer therein (over a prior embodiment), use of prior reference marks may be at least somewhat inaccurate.

In general, the reference mark 72 is manifested as a single radial line that traverses the roll from a center thereof to a periphery thereof. Accordingly, when the leads are installed along the reference mark 72, each lead will align with the remaining leads. However, when the storage cell 12 is unrolled (for embodiments where the storage cell 12 is or will become a roll), the reference mark 72 may be considered to be a plurality of markings (as shown in FIG. 26). As a matter of convention, regardless of the embodiment or appearance of marking of the storage cell 12, identification of a location for incorporation of the lead is considered to involve determination of a "reference mark 72" or a "set of reference marks 72."

Referring now to FIG. 26, once the reference mark 72 has been established (such as by marking a rolled up storage cell 12), an installation site for installation each of the leads is provided (i.e., described by the reference mark 72). Once each installation site has been identified, for any given build specification of the storage cell 12, the relative location of each installation site may be repeated for additional instances of the particular build of storage cell 12.

Generally, each lead is coupled to a respective current collector 2 in the storage cell 12. In some embodiments, both the current collector 2 and the lead are fabricated from aluminum. Generally, the lead is coupled to the current collector 2 across the width, W, however, the lead may be coupled for only a portion of the width, W. The coupling may be accomplished by, for example, ultrasonic welding of the lead to the current collector 2. In order to accomplish the coupling, at least some of the energy storage media 1 may be removed (as appropriate) such that each lead may be appropriately joined with the current collector 2. Other preparations and accommodations may be made, as deemed appropriate, to provide for the coupling.

In certain embodiments, opposing reference marks 73 may be included. That is, in the same manner as the reference marks 72 are provided, a set of opposing reference marks 73 may be made to account for installation of leads for the opposing polarity. That is, the reference marks 72 may be used for installing leads to a first electrode 3, such as the negative electrode 3, while the opposing reference marks 73 may be used for installing leads to the positive electrode 3. In the embodiment where the rolled storage cell 23 is cylindrical, the opposing reference marks 73 are disposed on an opposite side of the energy storage media 1, and offset lengthwise from the reference marks 72 (as depicted).

Note that in FIG. 26, the reference marks 72 and the opposing reference marks 73 are both shown as being disposed on a single electrode 3. That is, FIG. 23 depicts an embodiment that is merely for illustration of spatial (i.e., linear) relation of the reference marks 72 and the opposing reference marks 73. This is not meant to imply that the positive electrode 3 and the negative electrode 3 share energy storage media 1. However, it should be noted that in instances where the reference marks 72 and the opposing reference marks 73 are placed by rolling up the storage cell 12 and then marking the separator 5, that the reference marks 72 and the opposing reference marks 73 may indeed by provided on a single separator 5. However, in practice, only one set of the reference marks 72 and the opposing reference marks 73 would be used to install the leads for any given electrode 3. That is, it should be recognized that the embodiment depicted in FIG. 26 is to be complimented with another layer of energy storage media 1 for another electrode 3 which will be of an opposing polarity.

As shown in FIG. 27, the foregoing assembly technique results in a storage cell 12 that includes at least one set of aligned leads. A first set of aligned leads 91 are particularly useful when coupling the rolled storage cell 23 to one of the negative contact 55 and the positive contact 56, while a set of opposing aligned leads 92 provide for coupling the energy storage media 1 to an opposite contact (55, 56).

The rolled storage cell 23 may be surrounded by a wrapper 93. The wrapper 93 may be realized in a variety of embodiments. For example, the wrapper 93 may be provided as KAPTON™ tape (which is a polyimide film developed by DuPont of Wilmington DE), or PTFE tape. In this example, the KAPTON™ tape surrounds and is adhered to the rolled storage cell 23. The wrapper 93 may be provided without adhesive, such as a tightly fitting wrapper 93 that is slid onto the rolled storage cell 23. The wrapper 93 may be manifested more as a bag, such as one that generally engulfs the rolled storage cell 23 (e.g., such as the envelope 83 of FIG. 11, discussed above). In some of these embodiments, the wrapper 93 may include a material that functions as a shrink-wrap would, and thereby provides an efficient physical (and in some embodiments, chemical) enclosure of the rolled storage cell 23. Generally, the wrapper 93 is formed of a material that does not interfere with electrochemical functions of the ultracapacitor 10. The wrapper 93 may also provide partial coverage as needed, for example, to aid insertion of the rolled storage cell 23.

In some embodiments, the negative leads and the positive leads are located on opposite sides of the rolled storage cell 23 (in the case of a jelly-roll type rolled storage cell 23, the leads for the negative polarity and the leads for the positive polarity may be diametrically opposed). Generally, placing the leads for the negative polarity and the leads for the positive polarity on opposite sides of the rolled storage cell 23 is performed to facilitate construction of the rolled storage cell 23 as well as to provide improved electrical separation.

In some embodiments, once the aligned leads 91, 92 are assembled, each of the plurality of aligned leads 91, 92 are bundled together (in place) such that a shrink-wrap (not shown) may be disposed around the plurality of aligned leads 91, 92. Generally, the shrink-wrap is formed of PTFE, however, any compatible material may be used.

In some embodiments, once shrink-wrap material has been placed about the aligned leads 91, the aligned leads 91 are folded into a shape to be assumed when the ultracapacitor 10 has been assembled. That is, with reference to FIG. 28, it may be seen that the aligned leads assume a "Z" shape. After imparting a "Z-fold" into the aligned leads 91, 92 and applying the shrink-wrap, the shrink-wrap may be heated or otherwise activated such that the shrink-wrap shrinks into place about the aligned leads 91, 92. Accordingly, in some embodiments, the aligned leads 91, 92 may be strengthened and protected by a wrapper. Use of the Z-fold is particularly useful when coupling the energy storage media 1 to the feed-through 19 disposed within the cap 24.

Additionally, other embodiments for coupling each set of aligned leads 91, 92 (i.e., each terminal 8) to a respective contact 55, 56 may be practiced. For example, in one embodiment, an intermediate lead is coupled to the one of the feed-through 19 and the housing 7, such that coupling with a respective set of aligned leads 91, 92 is facilitated.

Furthermore, materials used may be selected according to properties such as reactivity, dielectric value, melting point, adhesion to other materials, weldability, coefficient of friction, cost, and other such factors. Combinations of materials (such as layered, mixed, or otherwise combined) may be used to provide for desired properties.

v. Particular Ultracapacitor Embodiments

Physical aspects of an exemplary ultracapacitor 10 of the present invention are shown below. Note that in the following tables, the terminology "tab" generally refers to the "lead" as discussed above; the terms "bridge" and "jumper" also making reference to aspects of the lead (for example, the bridge may be coupled to the feed-through, or "pin," while the jumper is useful for connecting the bridge to the tabs, or leads). Use of various connections may facilitate the assembly process, and take advantage of certain assembly techniques. For example, the bridge may be laser welded or resistance welded to the pin, and coupled with an ultrasonic weld to the jumper.

TABLE 11

Weights of Complete Cell With Electrolyte

| Component | Weight (grams) | Percent of total |
|---|---|---|
| SS Can (body of the housing) | 14.451 | 20.87% |
| SS Top cover (cap) | 5.085 | 7.34% |
| Tantalum glass-metal Seal | 12.523 | 18.09% |
| SS/Al Clad Bottom | 10.150 | 14.66% |
| Tack (seal for fill hole) | 0.200 | 0.29% |
| Inner Electrode (cleared, no tabs) | 3.727 | 5.38% |
| Inner Electrode Aluminum | 1.713 | 2.47% |

TABLE 11-continued

Weights of Complete Cell With Electrolyte

| Component | Weight (grams) | Percent of total |
|---|---|---|
| Inner Electrode Carbon | 2.014 | 2.91% |
| Outer Electrode (cleared, no tabs) | 4.034 | 5.83% |
| Outer Electrode Aluminum | 1.810 | 2.61% |
| Outer Electrode Carbon | 2.224 | 3.21% |
| Separator | 1.487 | 2.15% |
| Alum. Jelly roll Tabs (all 8) | 0.407 | 0.59% |
| Ta/Al clad bridge | 0.216 | 0.31% |
| Alum. Jumper (bridge-JR tabs) | 0.055 | 0.08% |
| Teflon heat shrink | 0.201 | 0.29% |
| AES | 16.700 | 24.12% |
| Total Weight | 69.236 | 100.00% |

TABLE 12

Weights of Complete Cell Without Electrolyte

| Component | Weight (grams) | Percent of total |
|---|---|---|
| SS Can | 14.451 | 27.51% |
| SS Top cover | 5.085 | 9.68% |
| Tantalum glass-metal Seal | 12.523 | 23.84% |
| SS/Al Clad Bottom | 10.150 | 19.32% |
| Tack | 0.200 | 0.38% |
| Inner Electrode (cleared, no tabs) | 3.727 | 7.09% |
| Outer Electrode (cleared, no tabs) | 4.034 | 7.68% |
| Separator | 1.487 | 2.83% |
| Alum. Jelly roll Tabs (all 8) | 0.407 | 0.77% |
| Ta/Al clad bridge | 0.216 | 0.41% |
| Alum. Jumper (bridge-JR tabs) | 0.055 | 0.10% |
| Teflon heat shrink | 0.201 | 0.38% |
| Total Weight | 52.536 | 100.00% |

TABLE 13

Weights of Cell Components in Full Cell with Electrolyte

| Component | Weight (grams) | Percent of total |
|---|---|---|
| Can, covers, seal, bridge, jumper, heat shrink, tack | 42.881 | 61.93% |
| Jelly Roll with Electrodes, tabs, separator | 9.655 | 13.95% |
| Electrolyte | 16.700 | 24.12% |
| Total Weight | 69.236 | 100.00% |

TABLE 14

Weights of Electrode

| Component | Weight (grams) | Percent of total |
|---|---|---|
| Inner electrode carbon | 2.014 | 25.95% |
| Inner electrode aluminum | 1.713 | 22.07% |
| Outer electrode carbon | 2.224 | 28.66% |
| Outer electrode aluminum | 1.810 | 23.32% |
| Total Weight | 7.761 | 100.00% |

Generally, the ultracapacitor 10 may be used under a variety of environmental conditions and demands. For example, terminal voltage may range from about 100 mV to 10 V. Ambient temperatures may range from about minus 40 degrees Celsius to plus 210 degrees Celsius. Typical high temperature ambient temperatures range from plus 60 degrees Celsius to plus 210 degrees Celsius.

Tables 15 and 16 provide comparative performance data for these embodiments of the ultracapacitor 10. The performance data was collected for a variety of operating conditions as shown.

TABLE 15

Comparative Performance Data

| Cell # | Temperature (° C.) | Voltage (V) | Time (Hrs) | ESR Initial (mOhm) | % ESR Increase | Capacitance Initial (F) | % Capacitance Decrease | Cell Weight (g) | Ending Current (mA) |
|---|---|---|---|---|---|---|---|---|---|
| D2011-09 | 150 | 1.25 | 1500 | 30 | 0 | 93 | 5 | — | 0.5 |
| C1041-02 | 150 | 1.5 | 1150 | 45 | 60 | 32 | — | 28.35 | 0.5 |
| C2021-01 | 150 | 1.5 | 1465 | 33 | 100 | 32 | 70 | 26.61 | 0.8 |
| D5311-01 | 150 | 1.6 | 150 | 9 | 10 | 87 | 4 | — | 5 |
| C6221-05 | 150 | 1.75 | 340 | 15 | 50 | — | — | 38.31 | 1 |
| C6221-05 | 150 | 1.75 | 500 | 15 | 100 | — | — | 38.31 | 2 |
| C6221-05 | 150 | 1.75 | 600 | 15 | 200 | — | — | 38.31 | 2 |
| C6221-05 | 150 | 1.75 | 650 | 15 | 300 | — | — | 38.31 | 2 |
| D1043-02 | 150 | 1.75 | 615 | 43 | 50 | 100 | — | — | 3 |
| D1043-02 | 150 | 1.75 | 700 | 43 | 100 | 100 | — | — | 3 |
| C5071-01 | 150 | 1.75 | 600 | 26 | 100 | 27 | 32 | — | 2 |
| C5071-01 | 150 | 1.75 | 690 | 26 | 200 | 27 | 35 | — | 2 |
| C5071-01 | 150 | 1.75 | 725 | 26 | 300 | 27 | 50 | — | 2 |
| C8091-06 | 125 | 1.75 | 500 | 38 | 5 | 63 | 11 | 37.9 | 0.5 |
| C9021-02 | 125 | 1.75 | 1250 | 37 | 10 | 61 | — | 39.19 | 0.3 |
| D5011-02 | 125 | 1.9 | 150 | 13 | 0 | 105 | 0 | — | 1.4 |
| C8091-06 | 125 | 2 | 745 | 41 | 22 | 56 | — | 37.9 | 1.2 |
| D2011-08 | 175 | 1 | 650 | 33 | 12 | 89 | 30 | — | 4 |
| D1043-10 | 175 | 1.3 | 480 | 30 | 100 | 93 | 50 | — | 6.5 |
| C2021-04 | 175 | 1.4 | 150 | 35 | 100 | 27 | — | 27.17 | 3.5 |
| C4041-04 | 210 | 0.5 | 10 | 28 | 0 | 32 | — | 28.68 | 1 |
| C4041-04 | 210 | 0.5 | 20 | 28 | 0 | 32 | — | 28.68 | 7 |
| C4041-04 | 210 | 0.5 | 50 | 28 | 100 | 32 | — | 28.68 | 18 |

TABLE 16

Comparative Performance Data

| Cell # | T (° C.) | Voltage (V) | Time (Hrs) | ESR Initial (mOhm) | Initial Capacitance (F) | Leakage Current (mA) | Volumetric ESR (Ohms × cc) | Volumetric Capacitance (F/cc) | Volumetric Leakage Current (mA/cc) | % ESR Increase | % Capacitance Decrease | Volume (cc) |
|---|---|---|---|---|---|---|---|---|---|---|---|---|
| D2011-09 | 150 | 1.25 | 1500 | 30 | 93 | 0.5 | 0.75 | 3.72 | 0.02 | 0 | 5 | 25 |
| C2021-01 | 150 | 1.5 | 1465 | 33 | 32 | 0.75 | 0.396 | 2.67 | 0.06 | 100 | 5 | 12 |
| C5071-01 | 150 | 1.75 | 600 | 26 | 27 | 2 | 0.338 | 2.08 | 0.15 | 100 | 32 | 13 |
| C5071-01 | 150 | 1.75 | 690 | 26 | 27 | 2 | 0.338 | 2.08 | 0.15 | 200 | 35 | 13 |
| C5071-01 | 150 | 1.75 | 725 | 26 | 27 | 2 | 0.338 | 2.08 | 0.15 | 300 | 50 | 13 |
| C8091-06 | 125 | 1.75 | 500 | 38 | 63 | 0.5 | 0.494 | 4.85 | 0.04 | 5 | 11 | 13 |
| C9021-02 | 125 | 1.75 | 1250 | 37 | 61 | 0.25 | 0.481 | 4.69 | 0.02 | 10 | 11 | 13 |
| D2011-08 | 175 | 1 | 650 | 33 | 89 | 4 | 0.825 | 3.56 | 0.16 | 12 | 30 | 25 |
| D1043-10 | 175 | 1.3 | 480 | 30 | 93 | 6.5 | 0.75 | 3.72 | 0.26 | 100 | 50 | 25 |
| C4041-04 | 210 | 0.5 | 50 | 28 | 32 | 18 | 0.336 | 2.67 | 1.50 | 100 | 50 | 12 |

Thus, data provided in Tables 15 and 16 demonstrate that the teachings herein enable performance of ultracapacitors in extreme conditions. Ultracapacitors fabricated accordingly may, for example, exhibit leakage currents of less than about 1 mA per milliliter of cell volume, and an ESR increase of less than about 100 percent in 500 hours (while held at voltages of less than about 2 V and temperatures less than about 150 degrees Celsius). As trade-offs may be made among various demands of the ultracapacitor (for example, voltage and temperature) performance ratings for the ultracapacitor may be managed (for example, a rate of increase for ESR, capacitance, etc) may be adjusted to accommodate a particular need. Note that in reference to the foregoing, "performance ratings" is given a generally conventional definition, which is with regard to values for parameters describing conditions of operation.

Another exemplary ultracapacitor tested included an AES comprising 1-butyl-3-methylimidazolium bis(trifluoromethylsulfonyl)imide.

Another exemplary ultracapacitor tested included an AES comprising 1-ethyl-3-methylimidazolium tetrafluoroborate.

Another exemplary ultracapacitor tested included an AES comprising 1-ethyl-3-methylimidazolium tetracyanoborate.

Another exemplary ultracapacitor tested included an AES comprising 1-hexyl-3-methylimidazolium tetracyanoborate.

Another exemplary ultracapacitor tested included an AES comprising 1-butyl-1-methylpyrrolidinium bis(trifluoromethylsulfonyl)imide Another exemplary ultracapacitor tested included an AES comprising 1-butyl-1-methylpyrrolidinium tris(pentafluoroethyl)trifluorophosphate.

Another exemplary ultracapacitor tested included an AES comprising 1-butyl-1-methylpyrrolidinium tetracyanoborate.

Another exemplary ultracapacitor tested included an AES comprising 1-butyl-3-methylimidazolium trifluoromethanesulfonate.

Another exemplary ultracapacitor tested included an AES comprising 1-ethyl-3-methylimidazolium tetracyanoborate.

Another exemplary ultracapacitor tested included an AES comprising 1-ethyl-3-methylimidazolium and 1-butyl-1-methylpyrrolidinium and tetracyanoborate.

Another exemplary ultracapacitor tested included an AES comprising 1-butyl-1-methylpyrrolidinium and tetracyanoborate and ethyl isopropyl sulfone.

Note that measures of capacitance as well as ESR, as presented in Table 9 and elsewhere herein, followed generally known methods. Consider first, techniques for measuring capacitance.

Capacitance may be measured in a number of ways. One method involves monitoring the voltage presented at the capacitor terminals while a known current is drawn from (during a "discharge") or supplied to (during a "charge") of the ultracapacitor. More specifically, we may use the fact that an ideal capacitor is governed by the equation:

$$I=C*dV/dt,$$

where I represents charging current, C represents capacitance and dV/dt represents the time-derivative of the ideal capacitor voltage, V. An ideal capacitor is one whose internal resistance is zero and whose capacitance is voltage-independent, among other things. When the charging current, I, is constant, the voltage V is linear with time, so dV/dt may be computed as the slope of that line, or as DeltaV/DeltaT. However, this method is generally an approximation and the voltage difference provided by the effective series resistance (the ESR drop) of the capacitor should be considered in the computation or measurement of a capacitance. The effective series resistance (ESR) may generally be a lumped element approximation of dissipative or other effects within a capacitor. Capacitor behavior is often derived from a circuit model comprising an ideal capacitor in series with a resistor having a resistance value equal to the ESR. Generally, this yields good approximations of actual capacitor behavior.

In one method of measuring capacitance, one may largely neglect the effect of the ESR drop in the case that the internal resistance is substantially voltage-independent, and the charging or discharging current is substantially fixed. In that case, the ESR drop may be approximated as a constant and is naturally subtracted out of the computation of the change in voltage during said constant-current charge or discharge. Then, the change in voltage is substantially a reflection of the change in stored charge on the capacitor. Thus, that change in voltage may be taken as an indicator, through computation, of the capacitance.

For example, during a constant-current discharge, the constant current, I, is known. Measuring the voltage change during the discharge, DeltaV, during a measured time interval DeltaT, and dividing the current value I by the ratio DeltaV/DeltaT, yields an approximation of the capacitance. When I is measured in amperes, DeltaV in volts, and DeltaT in seconds, the capacitance result will be in units of Farads.

Turning to estimation of ESR, the effective series resistance (ESR) of the ultracapacitor may also be measured in a number of ways. One method involves monitoring the voltage presented at the capacitor terminals while a known current is drawn from (during a "discharge") or supplied to (during a "charge") the ultracapacitor. More specifically, one may use the fact that ESR is governed by the equation:

$$V=I*R,$$

where I represents the current effectively passing through the ESR, R represents the resistance value of the ESR, and V represents the voltage difference provided by the ESR (the ESR drop). ESR may generally be a lumped element approximation of dissipative or other effects within the ultracapacitor. Behavior of the ultracapacitor is often derived from a circuit model comprising an ideal capacitor in series with a resistor having a resistance value equal to the ESR. Generally, this yields good approximations of actual capacitor behavior.

In one method of measuring ESR, one may begin drawing a discharge current from a capacitor that had been at rest (one that had not been charging or discharging with a substantial current). During a time interval in which the change in voltage presented by the capacitor due to the change in stored charge on the capacitor is small compared to the measured change in voltage, that measured change in voltage is substantially a reflection of the ESR of the capacitor. Under these conditions, the immediate voltage change presented by the capacitor may be taken as an indicator, through computation, of the ESR.

For example, upon initiating a discharge current draw from a capacitor, one may be presented with an immediate voltage change Delta V over a measurement interval DeltaT. So long as the capacitance of the capacitor, C, discharged by the known current, I, during the measurement interval, DeltaT, would yield a voltage change that is small compared to the measured voltage change, DeltaV, one may divide Delta V during the time interval DeltaT by the discharge current, I, to yield an approximation to the ESR. When I is measured in amperes and Delta V in volts, the ESR result will have units of Ohms.

Both ESR and capacitance may depend on ambient temperature. Therefore, a relevant measurement may require the user to subject the ultracapacitor 10 to a specific ambient temperature of interest during the measurement.

Performance requirements for leakage current are generally defined by the environmental conditions prevalent in a particular application. For example, with regard to a capacitor having a volume of 20 mL, a practical limit on leakage current may fall below 100 mA. Nominal values of normalized parameters may be obtained by multiplying or dividing the normalized parameters (e.g. volumetric leakage current) by a normalizing characteristic (e.g. volume). For instance, the nominal leakage current of an ultracapacitor having a volumetric leakage current of 10 mA/cc and a volume of 50 cc is the product of the volumetric leakage current and the volume, 500 mA. Meanwhile the nominal ESR of an ultracapacitor having a volumetric ESR of 20 mOhm·cc and a volume of 50 cc is the quotient of the volumetric ESR and the volume, 0.4 mOhm High Performance Ultracapacitors.

Although a number of exemplary ultracapacitors have been described it is to be understood that in some embodiments, other suitable ultracapacitors may be used. For example, some embodiments may include one or more of the ultracapacitors (or components thereof, related techniques, etc.) described in International Publication No. PCT/US14/59971 filed Oct. 9, 2014, the entire contents of which are incorporated herein by reference.

For example, as described in the reference incorporated above, various embodiments may include ultracapacitors that include an ionic liquid and at least one additive that decreases the rate of degradation of the ionic liquid when the ultracapacitor is operating. For example, the additive may be gelling agent. Some embodiments may include capacitors that employ a solid state electrolyte. In some such embodiments, the ultracapacitor may operate without the use of a separator.

Various embodiments may include ultracapacitors that include an electrode of the type described in U.S. Provisional Patent Application Ser. No. 62/061,947, filed Oct. 9, 2014. The electrode may include a current collector comprising aluminum with a carbide (e.g., aluminum carbide) layer on at least one surface, on which at least one layer of CNTs is disposed. The electrode may comprise vertically-aligned, horizontally-aligned, or nonaligned (e.g., tangled or clustered) CNTs. The electrode may comprise compressed CNTs. The electrode may comprise single-walled, double-walled, or multiwalled CNTs. The electrode may comprise multiple layers of CNTs. In some embodiments the aluminum carbide layer may include whisker-like protrusions of carbide material, on which CNTs may be disposed (e.g., in a conformal manner).

Ultracapacitors of the type described above may perform advantageously in downhole conditions. For example, in some embodiments, such ultracapacitors may, for example, operate at temperatures as high as 210 degrees Celsius, 225 degrees Celsius, 250 degrees Celsius, or more for 10,000 charge/discharge cycles and/or over 100 hours or more at a voltage of 0.5V or more while exhibiting and increase in ESR or less than 100%, e.g. less than about 85% and a decrease in capacitance of less than about 10%. In some embodiments, such ultracapacitors may have a volumetric capacitance of about 5 Farad per liter (F/L), 6 F/L, 7 F/L, 8 F/L, 8 F/L, 10 F/L or more, e.g., in the range of about 1 to about 10 F/L or any sub-range thereof.

In some embodiments, ultracapacitors of the types described herein may exhibit any of: a high volumetric energy density (e.g., exceeding 5 Wh/L, 6 Wh/L, 7 Wh/L, 8 Wh/L, 9 Wh/L, 10 Wh/L. 11 Wh/L, 12 Wh/L, 15 Wh/L, 18 Wh/L, 20 Wh/L, or more), a high gravimetric energy density (e.g., exceeding 5 Wh/kg, 6 Wh/kg, 7 Wh/kg, 8 Wh/kg, 9 Wh/kg, 10 Wh/kg. 11 Wh/kg, 12 Wh/kg, 15 Wh/kg, 18 Wh/kg, or more), a high volumetric power density (e.g., exceeding 30 kW/L, 40 kW/L, 50 kW/L, 60 kW/L, 70 kW/L, 80 kW/L, 90 kW/L, 100 kW/L, 110 kW/L, 120 kW/L, or more), a high gravimetric power density (e.g., exceeding 30 kW/kg, 40 kW/kg, 50 kW/kg, 60 kW/kg, 70 kW/kg, 80 kW/kg, 90 kW/kg, 100 kW/kg, 110 kW/kg, 120 kw/KG or more), and combinations thereof. In some embodiments, ultracapacitors of the types described herein demonstrate high performance as indicated by the product of energy density and power density, e.g., exceeding 300 Wh-kW/L$^2$, 500 Wh-kW/L$^2$, 700 Wh-kW/L$^2$, or more. For example, the ultracapacitors disclosed herein are capable of maintaining their performance over a long period of time, e.g., hundreds of thousands, or even millions of charge/discharge cycles.

Power Systems for Use with Downhole Toolstring Power Bus

In some embodiments, the methods and apparatus described herein may provide power downhole in environments that have temperatures ranging from as low as −40 degrees Celsius to up to about 200 degrees Celsius or higher, including up to about 300 degrees Celsius. Some embodiments provide power generation capabilities as well as energy storage, and can thus provide power for extended durations of operation in harsh environments. Some embodiments are be economical to own and maintain.

As shown in FIG. 1 above, downhole instrumentation is typically organized into a toolstring in which various downhole instruments, or tools, are connected to each other, usually in series. The downhole tools may be electrically connected to each other to each other to communicate with each other and/or to provide electrical power to each tool in the toolstring. Various methods of electrically connecting tools to each other may be used, e.g., the MSID based electrical connections of the type described herein. Such electrical connections are generally referred to herein as a toolstring power bus, or '"TPB."

In some embodiments, tools connected to the TPB obtain electrical power from one or more power sources connected to the TPB. In other words, the TPB distributes power from a source or sources to the individual tools in the string.

The power source may be a downhole source such as a downhole generator or a battery. In some embodiments, the power source may be a topside electrical power source located on the surface, provided there is a suitable electrical connection between the topside source and the downhole tool string.

In various embodiments, the power source feeding the TPB may not be able to meet the peak power requirements of certain types of downhole instruments. Disclosed herein are power systems that overcome such limitations.

The power systems disclosed herein may include energy storage devices (ESDs), particularly high temperature rechargeable energy storage devices (HIRESD's), disposed at certain locations along the tool string to provide power to certain tools in the toolstring. The ESDs disclosed herein are capable of meeting peak power requirements of one or more corresponding tools in the toolstring.

For example, the ESD may provide power to such tools as a nuclear magnetic resonance tool, a coring tool, a sonic tool, a neutron density tool, a gamma detector tool a seismic measurement tool, a telemetry tool (e.g., an EM or mud pulse telemetry tool) a resistivity tool, a formation tester, or any other tool with high peak power requirements.

In certain embodiments, the ESDs are HTRESDs that are capable of operating at the temperatures found in the downhole environment. In certain embodiments the HTRESDs include ultracapacitors capable of operating over a wide range of temperatures e.g., between about −40 degrees Celsius up to about 250 degrees Celsius, or even higher temperatures under certain conditions. Specific examples of HTRESDs, particularly ultracapacitors, of the present invention are disclosed herein, and in PCT Publication No. WO2013009720 published Jan. 17, 2013. PCT Publication No. WO2013126915 published Aug. 29, 2013, PCT Publication No. WO2014145259 published Sep. 18, 2014, PCT Publication No. WO2014145520 published Sep. 18, 2014, and International Publication No. PCT/US14/59971 filed Oct. 9, 2014, each of which is incorporated herein by reference in its entirety.

A great compliment of components may also be powered by the power systems disclosed herein. In certain embodiments the ESDs, including HTRESDs and ultracapacitors, will be connected at various locations in a toolstring in order to provide the peak power demand of various instruments including, for example: resistivity sensors, nuclear sensors including pulsed neutron and gamma sensors, nuclear magnetic resonance sensors such as magnetic resonance imaging sensors, acoustic sensors, coring devices, seismic sensors, telemetry devices, devices for implementing various sampling protocols, geosteering devices, devices for communications, data processing, data storage, and any suitable combination thereof. In some embodiments, each ESD provides power to a single tool or tool module. In other embodiments, one ESD may provide power to multiple tools or tool modules (e.g., one upstring module and one downstring module).

According to various embodiments, the power system disclosed herein may be used with any tool having an instantaneous power requirement, also referred to herein as peak power demand or requirement, which cannot be provided by other power sources (e.g., a downhole battery or generator) connected to the TPB. In certain embodiments, the power systems disclosed herein provide a peak power ranging from one tenth (0.10) of a Watt to about one hundred megaWatts (MW) or any sub-range thereof. In certain embodiments, the ESDs disclosed herein, including HTRESDs and ultracapacitors, may have an initial peak power density in the range of 0.01 w/L to 150 kW/L, or any sub-range thereof. In certain embodiments, a number of ESDs, e.g., HTRESDs including ultracapacitors, are arranged, e.g., in series, to provide a power system with the desired performance characteristics, e.g., peak operating current, voltage, and power, necessary for operation of the associated tools in the toolstring.

In some embodiments the ESDs are capable of being recharged at least once to provide multiple charging and discharging cycles. Thus, an associated downhole instrument may be used multiple times during a drilling operation without requiring breaking of the toolstring. In some embodiments, the ESD is capable of being recharged numerous times without significant performance degradation, e.g., more than 10, 100, 1,000, 10,000, or more times.

As shown in FIG. 41A, a toolstring 4100 may include multiple tools 4101 connected to a TPB 4102. The toolstring 4100 may also include power source 4103 (e.g., a battery or generator) connected to the TPB. As shown in FIG. 41A, prior to inclusion of the power systems disclosed herein, each tool obtains electrical power from the power source 4103 distributed through the TPB 4102.

The downhole power source 4103 may have limitations (e.g., voltage, current, peak power, etc.) that fall short of the requirements of one or more of the tools 4101 (e.g., where one of the tools requires high peak power, such as an EM or mud pulse telemetry tool, or one of the other high power instruments mentioned above).

Some embodiments may use a topside power source (not shown) in addition to or instead of the downhole power source 4103. However in some embodiments, the topside source may also fair to meet the output requirements of one or more tools.

To overcome the limitations of the power source 4103, one or more ESDs may be incorporated in the toolstring 4100. FIG. 41B is a schematic demonstrating the implementation of such an ESD power system to meet the power requirements of the tool string 4100. As shown, a single ESD 4104 is used to provide power to the tool 4101 labeled "Tool B." However, it is to be understood that in various embodiments multiple ESDs may be used, each providing power to one or more tools 4101 in the toolstring 4100.

As shown in FIG. 41B, an ESD 4104 is connected to a TPB 4102 which distributes power from the downhole power source 4103. In various embodiments, power will be input into the ESD 4104 through the TPB 4102 at relatively low voltage, current, and/or power. For example, in some embodiments, the ESD 4104 receives input voltage and power at about 20 V to about 50 V and about 20 w to 100 W, respectively.

In various embodiments, the ESD can store energy, e.g., 100 J to 10 kJ or more or energy, and provide output (e.g., a pulsed output) at a relatively high voltage, current and/or power. For example, the ESD may provide output at voltages of 30 V to 200 V or more, and/or may output power at voltages of 100 W to 10 kW or more. Thus in various embodiments, the ESD may meet one or more requirements of the associated Tool B that could not be met by the TPB 4102 and power source 4103 alone. In various embodiments, the ESD may provide the above described performance in harsh environments, e.g., at temperatures throughout the range of −40 degrees Celsius to 250 degrees Celsius, or any sub-range thereof.

Various embodiments may include suitable devices for controlling the charging and discharging of the ESD 4104 with power from power supplied from the power source 4103 (or a topside power source, not shown) For example, any of the UCC charging circuits of the type described herein may be used. For example, a regulator may be included for regulating the power supplied from the power source 4103 (or a topside power source, not shown). The regulator may be, e.g., power based, current based, or voltage based.

Having thus described aspects of an ESD based power system, it is to be understood that various embodiments may be realized. For example, the ESD based power system may include circuits that provide a state of charge monitoring a state of charge of the ESD or components thereof (e.g., an HTRESD, batter, ultracapacitor, or the like), and/or the downhole power supple 4303 and components thereof.

In certain embodiments, an ESD power system may include any suitable control circuitry, e.g., for drawing power from one or more of several battery packs arranged, for example, in a redundant configuration.

In certain embodiments, an ESD based power system may further include or be coupled to a motor drive, e.g., of the type described above.

In certain embodiments, an ESD based power system may include various sensors, such as pressure, temperature and vibration sensors, and the like, which may provide output to control circuitry for controlling the system as appropriate. In some embodiments, these sensors may include sensors of the type described in International Publication No. PCT/US14/59775 filed Oct. 8, 2014, the entire contents of which are incorporated by reference. In various embodiments, an ESD based power system may include a MSID of the type described herein, e.g., for implementing various types of control, monitoring, power distribution, and other techniques for the tool string 4100 and incorporated ESDs 4104.

In general, the downhole power system disclosed herein is adapted for operation in the harsh environment encountered downhole. For example, the ESD and the power system as a whole are, in some embodiments, adapted for operation in a temperature range from ambient temperatures up to about 250 degrees Celsius, or even higher temperatures in certain embodiments. In various embodiments, the system may include any of the high temperature components described herein, and may be fabricated suing any of the techniques described herein.

For example, components and techniques that may be used in the power system described herein may include: bare die silicon and silicon-on-insulator active devices, silicon carbide active power devices, high temperature rated and low temperature coefficient ceramic passives (COG or NPO dielectrics), and high temperature magnetic passives. AN (aluminum nitride) ceramics may be used as a circuit substrate material for excellent thermal stability and thermal conductivity. Circuit interconnects may be formed of oxidation resistant Au traces. Bonding strategies may employ flip chip or Au or Al wire bonding for bare die active components using, for instance, AuGe high temperature solder. In some embodiments, wire bonding is expected to be advantageous over flip chip bonding due to the added mechanical compliance, especially in the presence of thermal expansion and shock and vibration.

High temperature circuit techniques may be employed, for example, to ensure stability of feedback regulation circuits despite very wide temperature swings as passive circuit components used for frequency compensation may vary in value. Low or essentially zero temperature coefficient circuit designs can be achieved by coupling negative temperature coefficient resistors with conventional resistors, by closely matching active devices and by relying on ratiometric (relative) rather than absolute sensing and control. For example, bandgap derived voltage references can be employed to cancel the effect of very wide temperature variations on set points in feedback regulation circuits. Temperature coefficient strategic component selections mitigate these problems as well, for instance CGO or NPO dielectric ceramic capacitors have a relatively flat response to temperature across this range. Active device performance variations can be significantly mitigated by use of silicon-on-insulator (SOI) and silicon carbide (SiC) technology widely available in both hermetic and bare die form.

Other high temperature materials, components and architectures as are known in the art may be employed to provide for operability at a specified (high) temperature. Silicon-on-insulator (SOI), Silicon Carbide (SiC), bare die components, ceramic PCB's, low temperature coefficient passives and high temperature, hi-rel solders may be used the electronic systems. Examples of such components are described herein and, e.g., in PCT Publication No. WO2012162500, published Nov. 29, 2012 and PCT Publication No. WO2013009729 published Jan. 17, 2013, each of which is incorporated herein by reference in its entirety.

The power systems described herein can be arranged in a variety of configurations within a toolstring. In certain embodiments, the power systems described herein, such an ESD Power System, can be arranged to satisfy different form factors for toolstrings, including probe- and collar-mounted toolstrings. Described herein are ESDs and ESD-containing power systems configured for different form factors. For example, in various embodiments, the ESD based power systems described herein may be included in a tool string having an outer diameter of less than 36 inches, 12 inches, 6, inches, 3 inches, 2 inches, 1.75 inches, 1.5 inches, 1 inch, 0.5 inches, or less, e.g., in the range of 0.5 inches to 36 inches, or any sub-range thereof.

Although in the examples above in the present section of the application, the ESD based power system was employed to meet the peak power requirements of various tools, it is to be understood that the system may, additionally or alternatively, be used to provide for higher efficiency power and/or for continuous power in the presence of an intermittent power source, as described in greater detail above.

DESIGNS OF THE PRESENT INVENTION

Any designs that are novel for their aesthetic appearance, are intended to be included as part of the present invention.

INCORPORATION BY REFERENCE

The entire contents of all patents, published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents were considered to be within the scope of this invention and are covered by the following claims. Moreover, any numerical or alphabetical ranges provided herein are intended to include both the upper and lower value of those ranges. In addition, any listing or grouping is intended, at least in one embodiment, to represent a shorthand or convenient manner of listing independent embodiments; as such, each member of the list should be considered a separate embodiment.

In support of the teachings herein, various analysis components may be used, including a digital system and/or an analog system. The system(s) may have components such as a processor, storage media, memory, input, output, communications link (wired, wireless, pulsed mud, optical or other), user interfaces, software and firmware programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

It should be recognized that the teachings herein are merely illustrative and are not limiting of the invention. Further, one skilled in the art will recognize that additional components, configurations, arrangements and the like may be realized while remaining within the scope of this invention. For example, configurations of layers, electrodes, leads, terminals, contacts, feed-throughs, caps and the like may be varied from embodiments disclosed herein. Generally, design and/or application of components of the ultracapacitor and ultracapacitors making use of the electrodes are limited only by the needs of a system designer, manufacturer, operator and/or user and demands presented in any particular situation.

Further, various other components may be included and called upon for providing for aspects of the teachings herein. For example, an additional power supply (e.g., at least one of a generator, a wireline, a remote supply and a chemical battery), cooling component, heating component, pressure retaining component, insulation, actuator, sensor, electrodes, transmitter, receiver, transceiver, antenna, controller, electrical unit or electromechanical unit may be included in support of the various aspects discussed herein or in support of other functions beyond this disclosure.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention but to be construed by the claims appended herein.

What is claimed is:

1. A downhole power system comprising:
    a first energy storage device (ESD) positioned within a toolstring to provide power to one or more instruments within the toolstring;
    wherein the first ESD is configured to operate at a temperature range of −40 degrees C. to 250 degrees C. to:
        receive power from a power source at a first power level that is lower than a power requirement of a first tool in the toolstring, and
        output power to the tool at a second power level that is at or above the requirement of the first tool in the toolstring;
    wherein the ESD comprises an ultracapacitor comprising an advanced electrolyte system (AES) and the AES comprises a salt of the following formula:

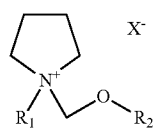

(1)

wherein $R_1$ is straight-chain or branched alkyl comprising 1 to 4 carbon atoms, $R_2$ is methyl or ethyl, and $X^-$ is $[B(CN)_4]^-$ or $[BF_n(CN)_{4-n}d]^-$ where n=0, 1, 2 or 3;
    wherein the AES comprises less than 500 ppm of chloride ions, less than 50 ppm of fluoride ions, and less than 50 ppm of water.

2. The system of claim 1, wherein the ESD receives power from the power source through a tool string power bus configured to provide power to one or more tools in the toolstring.

3. The system of claim 2, wherein the first tool comprises at least one selected from the list consisting of: a nuclear magnetic resonance tool, a coring tool, a sonic tool, a neutron density tool, a gamma detector tool, a seismic measurement tool, a telemetry tool, a resistivity tool, and a formation tester.

4. The system of claim 2, wherein the first ESD has an energy storage capacity in the range of 100 J to 100 kJ of energy.

5. The system of claim 4, wherein the first ESD is configured to provide an output voltage in the range of 30 V to 200 V.

6. The system of claim 4, wherein the first ESD is configured to provide an output power in the range of 50 W to about 100 kW.

7. The system of claim 6, wherein the first ESD has a peak output power of about 100 W.

8. The system of claim 6, wherein the first ESD has a peak output power of about 1 kW to about 100 kW.

9. The system of claim 6, wherein the first ESD has an operational temperature range of −40 degrees C. to 210 degrees C.

10. The system of claim 6, wherein the first ESD comprises a rechargeable energy storage device (HTRESD).

11. The system of claim 10, wherein the ultracapacitor has a volumetric power density of at least 50 kW/L to about 120 kW/L.

12. The system of claim 11, wherein the ultracapacitor has a volumetric power density of at least 100 kW/L to about 120 kW/L.

13. The system of claim 6, wherein the HTRESD is the ultracapacitor.

14. The system of claim 13, wherein the ultracapacitor is configured to operate at temperatures above 210 degrees Celsius to about 250 degrees Celsius for about 10,000 charge/discharge cycles at a voltage of about 0.5V while exhibiting an increase in equivalent series resistance (ESR) of less than about 100% to about 85%.

15. The system of claim 2, wherein the first ESD has an energy storage capacity of at least 1 kJ to 100 kJ.

16. The system of claim 1, wherein the first ESD is located adjacent to the first tool in the toolstring.

17. The system of claim 1, wherein the power source comprises a downhole generator or downhole battery.

18. The system of claim 1, further comprising:
    a second ESD positioned within a toolstring to provide power to the one or more instruments within the toolstring;
    wherein the second ESD is configured to operate at temperatures at about 210 degrees C. to about 250 degrees C. to:
    receive power from a power source at a first power level that is lower than a power requirement of a second tool of the one or more instruments in the toolstring, and
    output power to the tool at a second power level that is at or above the requirement of the second tool in the toolstring.

19. The system of claim 1, further comprising:
    a modular signal interface device ("MSID") module for controlling at least one of the power provided to a downhole tool connected to the downhole power system and the charge discharge cycles of the first ESD, wherein the MSID is adapted to connect to the power source.

20. A method comprising:
    providing a first energy storage device (ESD) positioned within a toolstring to provide power to one or more instruments within the toolstring;
    operating the first ESD at a temperature range of −40 degrees C. to 250 degrees C. to:
    receive power from a power source at a first power level that is lower than a power requirement of a first tool in the toolstring, and
    output power to the tool at a second power level that is at or above the requirement of the first tool in the toolstring;
    wherein the ESD comprises an ultracapacitor comprising an advanced electrolyte system (AES) and the AES comprises a salt of the following formula:

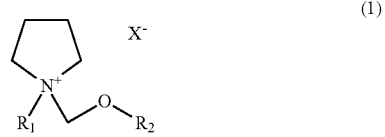

(1)

wherein $R_1$ is straight-chain or branched alkyl comprising 1 to 4 carbon atoms, $R_2$ is methyl or ethyl, and $X^-$ is $[B(CN)_4]^-$ or $[BF_n(CN)_{4-n}]^-$ where n=0, 1, 2 or 3; wherein the AES comprises less than 500 ppm of chloride ions, less than 50 ppm of fluoride ions, and less than 50 ppm of water.

* * * * *